US012057305B2

(12) United States Patent
Giles et al.

(10) Patent No.: US 12,057,305 B2
(45) Date of Patent: Aug. 6, 2024

(54) MASS ANALYSIS APPARATUSES AND METHODS

(71) Applicant: SHIMADZU CORPORATION, Kyoto (JP)

(72) Inventors: Roger Giles, West Yorkshire (GB); Alina Giles, West Yorkshire (GB)

(73) Assignee: SHIMADZU CORPORATION, Kyoto (JP)

( * ) Notice: Subject to any disclaimer, the term of this patent is extended or adjusted under 35 U.S.C. 154(b) by 276 days.

(21) Appl. No.: 17/633,649

(22) PCT Filed: Aug. 28, 2020

(86) PCT No.: PCT/EP2020/074163
§ 371 (c)(1),
(2) Date: Feb. 8, 2022

(87) PCT Pub. No.: WO2021/038091
PCT Pub. Date: Mar. 4, 2021

(65) Prior Publication Data

US 2022/0328298 A1 Oct. 13, 2022

(30) Foreign Application Priority Data

Aug. 30, 2019 (GB) ..................................... 1912489

(51) Int. Cl.
*H01J 49/06* (2006.01)
*H01J 49/36* (2006.01)
*H01J 49/40* (2006.01)

(52) U.S. Cl.
CPC ............ *H01J 49/065* (2013.01); *H01J 49/36* (2013.01); *H01J 49/401* (2013.01)

(58) Field of Classification Search
CPC ......... H01J 49/065; H01J 49/36; H01J 49/401
See application file for complete search history.

(56) References Cited

U.S. PATENT DOCUMENTS 7,456,388 B2 11/2008 Loboda et al.
8,067,747 B2 11/2011 Wollnik
(Continued)

FOREIGN PATENT DOCUMENTS

CN 101479828 A 7/2009
JP 5-509437 A 12/1993
(Continued)

OTHER PUBLICATIONS

Kevin Giles et al., "Applications of a travelling wave-based radio-frequency-only stacked ring ion guide", Rapid Commun. Mass Spectrom., 2004, pp. 2401-2414, vol. 18.
(Continued)

*Primary Examiner* — David E Smith
(74) *Attorney, Agent, or Firm* — Sughrue Mion, PLLC

(57) ABSTRACT

A device (1) for manipulating charged particles, the device comprising a series of electrodes (2, 3) disposed so as to form a channel for transportation of the charged particles. A power supply unit (5) provides a first supply voltage (7) which changes according to a waveform having a period (T), to axially segmented bunching electrodes (3) to create an electric field within the channel. The potential of the electric field defines a potential well which is translated along the length of the channel such that the potential well is translated a distance substantially equal to its length in an interval of time substantially equal to the period (T). The waveform is substantially continuously smooth throughout its period (T); and, substantially constant in value throughout a finite duration of time ($T_L$<T) within the period (T), corresponding to a minimum of the waveform. A power supply unit (6) provides a second supply voltage (8) to radial confinement electrodes (2) to create a radially confining electric field within the channel configured to radially confine charged particles within the channel.

34 Claims, 56 Drawing Sheets

(56) References Cited

U.S. PATENT DOCUMENTS

| | | | | |
|---|---|---|---|---|
| 9,536,721 | B2 * | 1/2017 | Berdnikov | H01J 49/062 |
| 10,236,168 | B1 * | 3/2019 | Kovtoun | H01J 49/0031 |
| 2005/0253064 | A1 | 11/2005 | Loboda et al. | |
| 2009/0072136 | A1 * | 3/2009 | Pringle | H01J 49/4235 250/290 |
| 2014/0061457 | A1 * | 3/2014 | Berdnikov | H01J 49/0095 250/281 |
| 2014/0070087 | A1 | 3/2014 | Giles et al. | |

FOREIGN PATENT DOCUMENTS

| | | | |
|---|---|---|---|
| JP | 2008-523554 | A | 7/2008 |
| JP | 2009-502017 | A | 1/2009 |
| JP | 2009-543311 | A | 12/2009 |
| JP | 2020-501294 | A | 1/2020 |
| WO | 92/14259 | A1 | 8/1992 |
| WO | 2005/106922 | A1 | 11/2005 |
| WO | 2006/061625 | A2 | 6/2006 |
| WO | 2007/010272 | A2 | 1/2007 |
| WO | 2008/007069 | A2 | 1/2008 |
| WO | 2017/194974 | A1 | 11/2017 |
| WO | 2018/114442 | A1 | 6/2018 |

OTHER PUBLICATIONS

Kevin L. Hunter et al., "An Improved Model of the Fringing Fields of a Quadrupole Mass Filter", International Journal of Mass Spectrometry and Ion Processes, 1989, pp. 157-164, vol. 87.

International Search Report of PCT/EP2020/074163 dated Nov. 27, 2020 [PCT/ISA/210].

Written Opinion of PCT/EP2020/074163 dated Nov. 27, 2020 [PCT/ISA/237].

International Search Report of related PCT application PCT/EP2020/074164 dated Nov. 27, 2020 [PCT/ISA/210].

Written Opinion of PCT/EP2020/074164 dated Nov. 27, 2020 (PCT/ISA/237).

Alexander V. Loboda et al., "A Novel Ion Trap That Enables High Duty Cycle and Wide m/z Range on an Orthogonal Injection TOF Mass Spectrometer", J. Am. Soc. Mass. Spectrom., 2009, vol. 20, pp. 1342-1348 (7 pages total).

* cited by examiner

MASS ANALYSIS APPARATUSES AND METHODS

CROSS REFERENCE TO RELATED APPLICATIONS

This application is a National Stage of International Application No. PCT/EP2020/074163 filed on Aug. 28, 2020, claiming priority based on British Patent Application No. 1912489.0 filed on Aug. 30, 2019.

FIELD OF THE INVENTION

The present invention relates to apparatuses and methods for manipulating charged particles, for performing mass analysis, e.g. of controlling charged particles, such as ions, for this purpose. This may be in terms of an analysis of mass-to-charge ratios or charged particles, etc.

BACKGROUND

US patent application document US2014/0070087A1 discloses an ion guide that comprises at least one extraction region, whereas the extraction direction is substantially orthogonal to the optical axis of the ion guide. A ToF mass analyser is preferred for analysis of the extracted ions.

In US2014/0070087A1 it is experimentally proven that the beam of ions radially confined and cooled during travelling in the ion guide could be successfully extracted in orthogonal direction. The ions could be propelled along the axis by a small DC gradient. No additional cooling in the trap prior to extraction is needed. If the cooling in the trap is omitted, the mass analysis could be done with much higher throughput. An increase of up to 100 times was envisaged in US2014/0070087A1.

To further improve the duty cycle of the analysis, it was suggested in US2014/0070087A1 to use bunches of ions instead of continuous ion beam. In this case, the wastage of the ions between the "shots" of orthogonal extraction could be reduced. For this purpose, the following embodiments were suggested. They comprise a 4-pole electrode structure (80) with primary poles (82) and auxiliary segmented rods (84) that provide bunching of the ions, as shown in FIG. 1 of the present application (which corresponds to FIG. 6 of US2014/0070087A1). In these embodiments, a pair of primary rods would have a separate segment with a slit (88), where the extraction potential could be applied when the ion packet reaches the extraction region (86), as shown in FIG. 2 of the present application (which corresponds to FIG. 7 of US2014/0070087A1). The primary rods also provide radial confinement of the ions by creating a quadrupole field by RF voltages applied to them. The auxiliary electrodes have varying DC voltages to define a bunching function.

However, US2014/0070087A1 does not teach any details of methods of producing such varying DC voltages. Although it follows from the description, they are mainly pulses of DC voltage travelling along the transport channel of the ion guide.

The present inventors have found from experience that the type of the bunching voltages play an important role in the parameters of the ions that they propel. Applying pulsed voltages on the segmented auxiliary electrodes as suggested in US2014/0070087A1 is very likely to create an electric field that changes in time abruptly but slowly enough to let the ions within the associated ion bunch accelerate.

As it was demonstrated before (e.g. see reference [3] herein), impulse voltages do impart some energy into the bunched ions. For certain conditions (certain amplitude of the impulses and certain pressure range) even CID (collision induced dissociation) was observed. The acceleration process is likely to contribute to the spillage of the ions into the neighbouring wells of the travelling DC voltage waveforms, and this could separate ions by m/z as well as increase the overall kinetic energy of the ions by the time they reach the extraction region. This is an example of travelling waves that cause ion acceleration, that is to say that the ion bunch propagates by alternating accelerating and deaccelerating steps. Furthermore, the structure of the device used in reference [3] herein, is a stacked ring guide. The inventors have found that this structure is not suitable for transport, or translation, of ions along an ion guide because the stacked ring structure of the ion guide provides a trapping field that is ribbed on and in the vicinity of the central axis of the ion guide. FIG. 3 of the present application shows the pseudo-potential of the trapping field associated with a stacked ring ion guide. The ribs shown in the figure are stationary and substantial. Transport of ions in bunches along the guide axis by any type of transport potential will result in incomplete cooling and of ions once they are transported into the high vacuum region there can be significant expiation and ion loss. In other words, the pseudo-potential ribs interact with the transported ions that pass across them, so as to heat those ions.

Bunching waveforms are described in detail in US patent document U.S. Pat. No. 9,536,721B2. One most simple example of such a waveform is of type:

$$U_0*\cos(2\pi t/T+\Phi)*\cos(2\eta ft+\phi)$$

Here, t is time (sec), $U_0$ is an amplitude (Volts), T is the period of the low-frequency traveling wave (sec), Φ is the phase of the travelling waveform, f is the frequency (Hz) of an RF waveform, ϕ is the initial phase of the high-frequency (HF) oscillations of the RF waveform. This waveform is applied to each electrode, at a different respective phase (Φ) of the waveform, of a series of electrodes collectively forming an ion guide channel.

The number and phase relations between the travelling waves Φ depends on the number of electrodes in the repeated set of N electrodes that creates the travelling waves. It generally follows the rule: $\Phi=2\pi*i/N+\Phi_0$, where i=0, 1, . . . N−1, and $\Phi_0$ is initial phase that can be arbitrary. In general frequency 1/T should be significantly lower than f, for example, f=1 MHz, 1/T=1 kHz. In FIGS. 4*a-b* of the present application there is shown an example of the pseudo potential at the longitudinal axis of the ion guide created by repeated sets of 8 electrodes (N=8) with the waveforms described in U.S. Pat. No. 9,536,721B2. The present disclosure may particularly, though not exclusively, relate to a particular structure disclosed within U.S. Pat. No. 9,536,721 B2, namely a quadrupole ion guide in which one pair of rods is continuous and one pair is finely segmented, the latter also referred to as bunching electrodes. The more important feature is the electrical field that this structure creates, rather than the structure itself. There are a number of methods to create the desired field arrangement, as will be described later.

The main purpose of the above waveforms is to create a sequence of maxima and minima of resulting electrical potential (e.g. pseudo-potential), moving along the axis of the ion guide. Such moving minima and maxima create an effect of travelling waves propagating along the axis with a constant velocity, L/T, where L is the axial length of the repeated set of N electrodes. Such travelling waves allow to keep positively and negatively charged particles in the same minima (wells) of the travelling waves. This enables chemical reactions of said ions, for example, low energy fragmentation of ions by, for example, the method of electron transfer dissociation ETD).

Most importantly, it is desirable that such methods of producing bunches of ions allow to keep ions cooled for a preferably unrestricted time during their transportation. Once kinetic energy of the ions is reduced to the thermal energy via collisions with neutral gas particles (that is a well-known method of cooling), it is desirable that such traveling waves allow to maintain the ions' low energy for as long as needed, even when transported into a region of high vacuum, that is where the collisions with gas are nearly absent. This is a very desirable and useful property when used in conjunction with a Time-of-Flight (ToF) mass analyser since the working pressure of typical ToF mass analyser is well below $10^{-4}$ mbar, and ions that are aimed to be delivered to the extraction region of an ion guide in bunches and already cooled to thermal energy. Hence, the waveforms most desirably should allow to transfer the ions from a higher pressure region, where they cooled down to thermal energy by collisional cooling, to the low pressure region of the extraction region, whilst maintaining the kinetic energy of the ions low, i.e. substantially thermal energy, and so ions may be immediately extracted, accelerated into the ToF analyser. Hence, the ions are most desirably extracted into the ToF as soon as they arrive into the extraction region of the ion guide so there is no need for a higher gas pressure region or some additional cooling time prior to extraction in the extraction region/extractions regions.

This represents a big advantage as compared to earlier prior art of ion-trap ToF (IT-ToF) and linear ion-trap ToF (LIT-ToF) configurations, where ions are delivered to the ion trap, using pulsed DC voltages and are then given sufficient time to cool to thermal equilibrium prior to extraction to ToF. In these prior art instruments, the pressure in the extraction region is a compromise between the cooling time and the gas load on the ToF analyser.

The present invention has been devised in light of the above considerations.

SUMMARY OF THE INVENTION

The invention includes the combination of the aspects and preferred features described herein except where such a combination is clearly impermissible or expressly avoided.

At its most general, in its first aspect, the invention proposes to generate an electric field within a charged particle guide (i.e. ion guide) which defines a potential well within which to gather, or bunch, charged particles by applying voltages to bunching electrodes that are controlled to change in time according to a waveform that is deliberately shaped such that an extended minimum of the waveform corresponds to (or coincides with) a minimum of the potential well. This has been found to greatly help to reduce heating of charged particles within the potential well. The invention may preferably provide a 'constant velocity' ion bunching device and methods (i.e. providing a non-accelerating motion of ion bunches).

For example, the waveform may be shaped to be continuously smooth and to reduce to a minimal value during which it is constant, or effectively/practically constant, or at least changes insignificantly or negligibly. By shaping the waveform one may ensure that this minimum lasts for a finite length of time (i.e. extended over time) amounting to a significant portion of the whole period of the waveform itself. The voltage applied to bunching electrodes closest to a bunch of ions, within the potential well, may then be arranged such that it has reached a point in time when the waveform (and the voltage) is within the waveform minimum, and may contribute to forming the minimum (e.g. base) of the potential well. Similarly, the voltage applied to bunching electrodes further from the bunch of ions may then arranged be such that it has reached a point in time when the waveform (and the voltage) is not within the waveform minimum, and may contribute to forming the sides/walls of the potential well.

The term "waveform" herein may be taken to include at least, but not exclusively, a reference to a quantity (e.g. an AC voltage, or an AC modulation envelope applied to an RF voltage) that varies in value in a periodic or wave-like manner. A "voltage waveform" herein may be understood in this context. Where the context provides, a reference to a "voltage waveform" may be taken to include a reference to a periodic or wavelike variation in a voltage that is not a high-frequency AC voltage signal (such as an RF signal), but changes much more slowly over time, as would be readily understood by the person skilled in the art. The term "voltage waveform" may include a reference to a AC voltage that is 'pulsating' in value over time, and has constant polarity. This may include a "voltage waveform" which is a modulation applied to, or an envelope function of, a high-frequency RF voltage signal, or may include a pure "voltage waveform" having no underlying RF signal component, as the context requires. A waveform may have a "period" which may be taken to include a reference to the interval of time (T) between successive occurrences of the same state in an oscillatory or cyclic phenomenon.

The waveform preferably is translated in a substantially smooth manner. That is to say, the potentials (and features thereof) preferably move smoothly such that any ion acceleration and de-accretion is smooth. Most preferably axial potentials should move along the axial of the device at a substantially constant velocity.

The potentials wells formed by the waveforms preferably move smoothly due to the smooth and gradual rising and falling of the edges of the waveform, to allow smooth motion of the ions.

In a first aspect, the invention may provide a device for manipulating charged particles, the device comprising:

a series of electrodes disposed so as to form a channel for transportation of the charged particles;

a power supply unit(s) adapted to provide a first supply voltage which changes according to a waveform having a period (T), to axially segmented bunching electrodes amongst said electrodes so as to create an electric field within said channel, the potential of said electric field having one or more local minima between local maxima defining a potential well which is translated along at least a part of the length of said channel such that the potential well is translated a distance substantially equal to its length (e.g. axial length in a direction along the channel) in an interval of time substantially equal to the period (T);

a power supply unit(s) adapted to provide a second supply voltage to radial confinement electrodes amongst said electrodes so as to create a radially confining electric field within said channel configured to radially confine charged particles within the channel;

wherein said waveform is:

(a) substantially continuously smooth throughout its period (T); and, (b) substantially constant in value throughout a finite duration of time ($T_L<T$) within said period (T), corresponding to a minimum of the waveform.

Furthermore, most preferably, the waveform has no local waveform maxima throughout the finite duration of time ($T_L<T$). Put in other words, the finite duration of time may contain only one minimum of the waveform. Indeed, the waveform as a whole may contain only one minimum within its period, T.

The first supply voltage may comprise an RF voltage signal modulated according to the waveform such that the potential well is formed by a pseudo-potential. Alternatively, the first supply voltage may comprise AC voltages that vary in value over time according to the waveform, and do not comprise, or modulate, any underlying RF voltage signal. In this latter case, the potential well is not formed by a pseudo-potential but is formed by a 'real' potential.

In this way, the waveform when applied to bunching electrodes, may provide a potential well having a smooth minimum at which to bunch charged particles where, simultaneously, the bunching electrodes closest to that minimum receive the first supply voltage when it is within its finite (i.e. extended in time) minimum. This means that any noise that may or may not arise within the first supply voltage signal applied to those electrode(s) is greatly suppressed by the waveform. This reduces the occurrence of heating of the bunched ions there, due to unwanted voltage impulses. In addition, the smooth nature of the waveform also assists in avoiding the occurrence of heating of the bunched ions within the potential well. The electric field generated within the open inner volume of the ion guide channel defined by the electrodes to which the first supply voltage is applied, may comprise a spatially travelling wave-shaped potential able to bunch charged particles (e.g. ions) and convey them, at the speed of motion of the travelling wave shape, along the ion guide channel.

The first supply voltage may be applied, at a different appropriate phase of the waveform, to each of a plurality of the axially segmented bunching electrodes, e.g. forming a group of spatially successive neighbouring electrodes, concurrently during the finite duration of time ($T_L<T$) within said period (T) of the waveform. In this way, a spatially extended range of successive bunching electrodes may concurrently receive the first supply voltage at a value corresponding to its substantially constant minimum. As a result, the substantially constant minimum may extend spatially along the plurality of the axially segmented bunching electrodes in question, along the axis of the ion guide channel.

In mathematics, a "continuous" function (whether analytical or numerical) is a function that does not have any abrupt changes, breaks or jumps in value, known as discontinuities. The term "continuously smooth" may be understood in to include a reference to this meaning. Preferably, the rate of change of the waveform (e.g. $\partial U/\partial t$ applied to the waveform, U) is substantially continuously smooth throughout its period (T).

The minima of the waveform may be substantially constant in value throughout the aforesaid finite duration of time ($T_L<T$) within the aforesaid period (T), in the sense that it is actually constant, or is effectively or practically constant, or is at least such that it varies insignificantly during the aforesaid finite duration of time ($T_L<T$). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change ($\Delta U$) in the value of the waveform, throughout $T_L$, expressed as a percentage (%) of the amplitude ($U_0$) of the waveform, then preferably: $X\leq10$, or $X\leq5$, or $X\leq2.5$, or $X\leq1.0$, or $X\leq0.5$, or $X\leq0.25$, or $X\leq0.1$, or $X\leq0.05$, $X\leq0.01$.

The finite duration of time ($T_L$) may be such that: $T>T_L\geq T/k$, where k is any positive number (i.e. either a non-integer number or an integer) greater than one (1) (i.e. k>1). Preferably, $k\geq1.2$. Preferably, $k\leq20$, or $k\leq15$, or $k\leq10$. Preferably, for example, $1.2\leq k\leq8.0$.

Defining $\hat{T}_L=100\times T_L/T$, as the duration of $T_L$ expressed as a percentage (%) of the period T, then given $X=100\times\Delta U/U_0$, preferably: $X/\hat{T}_L\leq2.0$; or more preferably $X/\hat{T}_L\leq1.0$; or more preferably $X/\hat{T}_L\leq0.5$; or more preferably $X/\hat{T}_L\leq0.25$; or more preferably $X/\hat{T}_L\leq0.1$; or more preferably $X/\hat{T}_L\leq0.05$; or more preferably $X/\hat{T}_L\leq0.01$; or more preferably $X/\hat{T}_L\leq0.001$. The minima of the waveform may be substantially constant in value, throughout the aforesaid finite duration of time ($T_L<T$), in this sense.

Preferably, the modulus of the first time derivative ($\partial U/\partial t$) of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L$) within the aforesaid period (T) of the waveform wherein Y=50. For example, $50\geq Y\geq1.4$, or more preferably $10\geq Y\geq2$, or yet more preferably $7\geq Y\geq3$, for example Y may be a value of about 5. In some examples, $Y\geq1.4$. In this sense, the waveform may be said to be substantially constant during the finite duration of time, $T_L$. Preferably, the average value of the modulus of the first time derivative ($\partial U/\partial t$) of the waveform (U), throughout the aforesaid finite duration of time ($T_L<T$) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L<T$), in this sense.

Preferably, the value of the first time derivative (i.e. $\partial U/\partial t$) of the first supply voltage waveform is substantially continuous at least during the time interval, $T_L$, within the period (T) of the waveform. Preferably, the value of the first time derivative (i.e. $\partial U/\partial t$) of the first supply voltage waveform is substantially continuous throughout substantially the whole period, T, of the waveform. Preferably, the value of the modulus of the first time derivative of the first supply voltage waveform, of waveform amplitude $U_0$, is such that:

$$\left|\left(\frac{T}{U_0}\right)\frac{\partial U}{\partial t}\right| \leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf). This has the benefit of preventing unwanted impulses of force upon the charges particles within the potential well. The minima of the waveform may be substantially constant in value, throughout the aforesaid finite duration of time ($T_L$<T), in this sense.

The power supply unit(s) may be adapted to provide first supply voltages comprising RF voltage signals that are modulated according to the waveform, to the axially segmented bunching electrodes to create a potential in the form of a pseudo-potential within the channel, the pseudo-potential having the one or more local minima between local maxima defining a said potential well which is translated along at least a part of the length of the channel.

Alternatively, the power supply unit(s) may be adapted to provide first supply voltages comprising an AC voltage that changes according to the waveform (e.g. non-RF signals), to a plurality of bunching electrodes so as to define a potential well from the applied first supply voltage waveforms (i.e. the potential forming the travelling well is not a pseudo-potential, but is formed by voltage waveforms), which is translated along at least a part of the length of the channel.

The power supply unit(s) may be adapted to provide second supply voltage(s) (e.g. RF signals, or non-RF voltage waveforms) to create a radially (i.e. transverse to the channel axis) confining potential (e.g. a pseudo-potential, or otherwise) within the channel.

Preferably, the amplitude of the second supply voltage(s) is not periodically modulated over time. The amplitude of the second supply voltage(s) may be substantially constant. The effect of the second supply voltage(s) applied to radial confinement electrodes, in combination with the presence of the axially segmented bunching electrodes, is to generate a radially confining electric field (potential). The series of electrodes may be configured as a quadrupole ion guide. The radially confining electric field (potential) may be configured as a quadrupole field, or at least substantially or approximately as a quadrupole field. The invention is applicable to higher-order fields and ion guides comprising greater number of poles, such as: hexapole, octopole, decapole etc.

The power supply unit(s) may be adapted to generate an RF voltage signal having any desired amplitude (e.g. of several hundred volts) according to techniques readily available to the skilled person and found in the relevant prior art. For example, such a voltage signal may be applied to radial confinement electrodes and/or axially segmented bunching electrodes when supplying the first supply voltage waveform and/or the second supply voltage. The power supply unit(s) may be adapted to generate an RF voltage signal having a square waveform by switching between the two preselected voltage levels at a preselected RF switching frequency. Any one of, or both of, the two preselected voltage levels used to create the first supply voltage waveform, may be varied with time in any desired manner or rate of time variation, but preferably at a rate that is much slower than the preselected RF switching rate. Accordingly, a time variation of any one or both of the preselected voltage levels provides an amplitude modulation envelope of the RF waveform. The time variation may be a time periodic variation. The waveform shape of the modulation envelope of the RF voltage signal may be any desired shape predetermined by the user. Alternatively, the power supply unit(s) may be configured to generate a voltage waveform comprising a varying AC voltage that varies only according to the waveform, when supplying the first supply voltage waveform and/or the second supply voltage. Thus, the waveform may be without any RF component. In that case, the preselected voltage may be a AC voltage varied in a desired manner, over time, to define/provide the voltage. The preselected voltage may be of constant polarity, and may be periodic in form. It may periodically reduce to substantially zero (or at least be negligible) in value. Accordingly, in this way, desirably, the waveform shape (whether an amplitude modulation envelope, or a variation applied to a AC voltage) may comprise parts in which the amplitude (of the modulation) is substantially constant (e.g. non-zero, or substantially zero) in value during a finite duration of time ($T_L$) within said interval of time (T) wherein the finite duration of time ($T_L$) corresponds to the aforesaid local minima.

Each bunching electrode, or at least a group of successive such electrodes, may be supplied with such a waveform (i.e. either as a modulation upon an RF voltage signal, or a time-varying AC voltage waveform) and successive bunching electrodes may receive a respective such waveform which is at a different respective phase of a common time-periodic modulation. This is explained in more detail below, and may result in the generation of a spatially varying potential (i.e. the aforementioned potential well) supported across the successive bunching electrodes whereby at any given point in time, each bunching electrode contributes a respective local value of potential to the potential field that extends along the group of bunching electrodes (or all of them) and defines the potential well. The respective local contribution is determined by the value of the waveform applied to the contributing bunching electrode at that time.

By halting, e.g. temporarily, the time-variation of the waveform, one may halt the translational motion of the potential well and preserve its shape and structure according to the value of the waveform that continues to be applied (without time variation) to respective bunching electrodes of the group of electrodes in question (or all of them). One may then resume the time variation of the halted waveform applied to respective bunching electrodes of the group of bunching electrodes (or all bunching electrodes) so as to resume translation motion of the potential well. By reversing the time-variation of the waveform, one may reverse the direction of this translational motion.

The power supply unit(s) may comprise any suitable electronic switching apparatus readily available to the skilled person (e.g. precisely timed MOSFETs), for supplying an RF voltage component to either or both of the first and second supply voltages, as desired. The switching apparatus may be configured to switch so as to alternately electrically connect to and disconnect from a respective one of two DC voltage supplies each having a respective predetermined DC voltage value that varies according to the waveform. The respective predetermined DC voltage values of the two voltage supplies may be of opposite polarity. It means that, in practice, the fast-oscillating RF component of the first and/or second supply voltage is not a sinusoidal waveform but rather like a square waveform. The RF voltage signal may be provided, for example, by electrically controlling high-frequency (e.g. RF) switches so as to selectively electrically connect respective bunching electrodes, and/or radial confinement electrodes, alternately to positive and negative power supply rails to provide the RF voltage signal. The respective predetermined DC voltage values of the two DC voltage supplies may be varied, by the power supply unit(s), according to substantially identical respective waveforms, or according to different respective waveforms. In this way, the waveform modulation applied to the negative polarity parts of the RF signal may match, or may differ from, the waveform modulation applied to the positive polarity parts of the RF signal.

The power supply unit(s) may comprise a first power supply unit(s) adapted to provide first supply voltage(s), and a separate second power supply unit(s) adapted to provide second supply voltage(s). This separation of power supply units may permit the voltage signals (e.g. RF and/or voltage waveform and/or AC) applied to the bunching electrodes, and their control, to be independent of the voltage signals (e.g. RF and/or voltage waveform and/or AC) applied to the radial confinement electrodes, and their control. This has advantages in terms of ease of operation, reduced complexity and reduced cost of manufacture.

Desirably, the aforementioned local minima of the potential are bounded by a first local maxima located on a first side of the minima and a second local maxima located on a second, opposite, side of the local minima. The potential well may comprise a well floor or base containing one or more local minima, bounded by two separate well walls each containing, or defining, a respective one of two of the local maxima with each located at a respective one of two opposite sides of the well floor. The potential well may comprise a leading local maxima (or leading well wall) and a trailing local maxima (or trailing well wall), wherein the leading local maxima leads, or precedes, the trailing local maxima in the direction of translation of the potential well. In other words, preferably the trailing local maxima (or trailing well wall) follows the leading local maxima (or leading well wall).

The value of the potential defining the well floor is preferably substantially smoothly-varying spatially and preferably comprises only one local minimum. This enables charged particles within the potential to be desirably located at the one local minimum within the well, thereby accurately defining their position during transport through the channel, and extraction from it. Most preferably, the potential wells translate/move along the channel of the device smoothly, e.g. at a constant velocity.

Preferably, the power supply unit(s) may be adapted to provide said first supply voltage waveforms to bunching electrodes of the plurality of electrodes, so as to form concurrently a plurality of said potential wells spaced along the axis of the channel. Preferably, each of plurality of said potential wells so formed are translated in unison along at least a part of the length of the channel. Preferably, the plurality of potential wells are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

Preferably, the power supply unit(s) may be adapted to provide periodic first supply voltage waveforms with a waveform frequency (i.e. 1/T, where T is the waveform period) of between about 0.1 kHz and about 20 kHz, to bunching electrodes so as to generate a said potential well, or concurrently the plurality of potential wells. Preferably, the waveform frequency is between about 1 kHz and about 4 kHz. The first supply voltage waveforms may define a modulation waveform applied to an RF voltage signal, so as to provide an ‘envelope’ to the amplitude of the RF voltage signal, or may be applied as a time-varying AC voltage waveform alone in which there is no RF voltage signal component within the first supply voltage. If an RF voltage signal, having an RF frequency, is amplitude-modulated by this waveform, then the RF frequency may be in the range: about 0.2 MHz to about 5 MHz. Other values of frequency may be used.

Preferably, the power supply unit(s) may be adapted to supply the first supply voltage waveform to each respective bunching electrode of segmented electrodes such that it is time-shifted, or phase-shifted, compared with the voltage waveform concurrently supplied to adjacent electrodes. Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. For example, the phase of the first supply voltage waveform applied to a given ($n^{th}$) bunching electrode (n is a positive integer) may correspond with a phase of the waveform that is more advanced relative to the phase of the same waveform applied an immediately preceding neighbouring ($[n-1]^{th}$) bunching electrode. Similarly, the phase of the first supply voltage waveform applied to a given ($n^{th}$) bunching electrode may correspond with a phase of the waveform that is less advanced relative to the phase of the same waveform applied to an immediately succeeding neighbouring ($[n+1]^{th}$) bunching electrode. In this way, each bunching electrode may be driven to receive the same voltage waveform, overtime, but each bunching electrode is ‘fed’ a version of the first supply voltage waveform that is at a different phase in its periodic cycle.

Preferably, the power supply unit(s) may be adapted to provide the first supply voltage waveforms to selected groups or subsets of successive bunching electrodes, being N in number, such that the phase of the first supply voltage waveform applied to the first bunching electrode of a given group is substantially equal to the phase of the first supply voltage waveform applied to the first bunching electrode of an successive groups of N bunching electrodes. For example, the power supply unit(s) may be adapted to provide the first supply voltage waveforms to the N bunching electrodes of a given group of bunching electrodes, (e.g. that given group and each of its immediately neighbouring groups) such that the phase of the waveform applied to a given bunching electrode of that group differs from the phase of the waveform applied to the immediately succeeding bunching electrode of that group, by a phase difference ($\Delta\phi$) of substantially $\Delta\phi=-360/N$, and simultaneously differs from the phase of the waveform applied to the immediately preceding bunching electrode of that group, by a phase difference ($\Delta\phi$) of substantially $\Delta\phi=+360/N$. As a result, one full cycle of the waveform plays out across each group of N bunching electrodes at any given time. In this way, the $n^{th}$ bunching electrode of each group/subset of N bunching electrodes each receives substantially the same first supply voltage waveform at substantially the same phase in its periodic cycle. In other words, bunching electrodes n; n+N; n+2N; . . . ; n+(M−1)N, each receive the waveform at the same point in its periodic cycle. Here, $1 \leq n \leq N$ and M is the total number of groups of bunching electrodes, with each group consisting of N bunching electrodes.

Desirably, the power supply unit(s) may be adapted to provide the first supply voltage waveforms to generate a plurality of potential wells. The spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrodes are plates or are planar. The well spacing configuration may be selected by selecting an appropriate value of N Preferably, N≥6. This has been found to be particularly suitable lower limit for ensuring smoothly-moving potential wells. For example, preferably, N is equal to or greater than 8 (eight).

Preferably, the waveform frequency of the first supply voltage waveforms is such that the speed of translation, v, of a potential well along the axis of the channel is proportional to: f·L, where f=1/T is the waveform frequency (Hz) and L is the spatial separation, along the axis of the channel, between bunching electrodes at which the same value (e.g. same phase) of the applied first supply voltage waveform exists (e.g. v=f·L).

Preferably, the waveform shape and/or the waveform frequency (i.e. f=1/T, where T is the waveform period) is such that during a predetermined finite time interval, $T_L$, the voltage value of the waveform is not greater than about 10% of the maximum voltage value of the waveform within the period of the waveform, where $T_L \geq T/N$. Here, N is the number of individual bunching electrodes in each subset of bunching electrodes, wherein each subset of bunching electrodes supports a respective period of the first supply voltage waveform. More preferably, this voltage value of the first supply voltage waveform is not greater than about 5% of the maximum voltage value of the waveform during the time interval, $T_L$. Yet more preferably, this voltage value of the first supply voltage waveform is not greater than about 3% of the maximum voltage value of the waveform during the time interval, $T_L$. Even more preferably, this voltage value of the first supply voltage waveform is not greater than about 2%, or preferably about 1%, or about 0.5%, or about 0.25%, or about 0.1% or about 0.01% of the maximum voltage value of the first supply voltage waveform during the time interval, $T_L$. Most preferably, this voltage value of the first supply voltage waveform is substantially zero (e.g. practically, or effectively zero) during the time interval, $T_L$.

The shape of the waveform may be defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)*\xi(2\pi ft+\phi)$$

Here, the function $U(2\pi t/T+\Phi)$ represents the waveform as a periodic modulation function having a period T (sec), phase $\Phi$, and an amplitude $U_0$. The function $\xi(2\pi ft+\phi)$ may either be a fast oscillating (e.g. RF) periodic function with frequency f and phase $\phi$, or may be constant in value (e.g. analogous to setting: f=0) in cases where no RF component is present within the first supply voltage.

For example, the shape of the waveform $U(2\pi t/T+\Phi)$ may, at least in part, comprise the shape of an 'error function' (erf(y)) such that:

$$U\left(2\pi\frac{t}{T}+\Phi\right)\sim(1+\mathrm{erf}(y))/2$$

during at least some of the duration of the period, T, of the waveform, where:

$$\mathrm{erf}(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T).

Preferably, the waveform $U(2\pi t/T+\Phi)$ is either always positive in value, or is always negative in value. Preferably, the waveform $U(2\pi t/T+\Phi)$ is a continuous function. Preferably, the waveform $U(2\pi t/T+\Phi)$ has a maximum value that is substantially constant in value throughout a finite duration of time ($T_H<T$) within the period (T) of the waveform. This maximum may preferably correspond to a local maximum of the potential well. Preferably, the waveform $U(2\pi t/T+\Phi)$ changes substantially continuously between the time interval $T_H$ and the aforementioned time interval $T_L$, within the period of the waveform, T.

The device may comprise a memory unit within which is stored numerical data comprising a set of multiple pairs of coordinates collectively defining the waveform. In other words, a plurality of separate and discrete values of the waveform corresponding to a respective plurality of separate and discrete points along its cycle, may be digitally stored in the device. The device ay be configured to generate the voltage waveform according to the discrete digital values stored within the memory unit. Values of the waveform corresponding to points within its cycle that are located between two successive stored values of the waveform, may be generated, by the device, by any suitable process of numerical interpolation.

The stored numerical data may represent the waveform in terms of the normalised value, $\hat{U}(t)=U(t)/U_0$, of the waveform of amplitude $U_0$ and period T, at normalised points in time $\hat{t}=t/T$.

The stored numerical data may represent the waveform in terms of numerical values of a mathematical analytical function (i.e. expressed as an equation), or of a numerical function (i.e. not expressed as an equation), or as the digitised values of an arbitrary waveform curve/shape drawn by an operator or user of the device, and digitised into digital numerical values (coordinates) at a plurality of discrete points along the waveform/curve.

Any appropriate waveform disclosed herein, for use with the invention in any aspect, may be recorded in digitally and stored in computer memory. The N phases of the waveform are created by N digital to analogue converters and then amplified by N audio amplifiers to produce the analogue waveforms to be applied to the bunching ions guide. The function that defines the waveform e.g. with N=8, may be defined by a number of discrete time steps. For this example, where N=8, 256 discrete times steps per period, T, is a suitable number but should be greater than 32. In general, the number of discrete time steps is preferably a multiple of N. Thus, by way of another example, if N=6, then the number of discrete steps may be 36, 72, 108, 144, and so on. Preferably, the device comprises a memory unit within which is stored a plurality of separate and discrete values of the waveform corresponding to a respective plurality of separate and discrete points along its cycle.

Preferably, the minimum of the potential well defines a well floor and the value of the potential defining the well floor comprises only one local minimum which does not vary in value over time.

Preferably, the device comprises a buffer gas control unit configured to control the pressure of a buffer gas within the channel such that the pressure at the entrance (ion entrance) of the channel is lower than 0.5 mbar. Alternatively, or in addition, the buffer gas control unit may be configured to control the pressure of a buffer gas within the channel such that the pressure of the buffer gas at one end of the channel is at least 20 times greater than the pressure at the other end of the channel. The entrance of the channel preferably is held at a higher pressure than is the pressure at the exit of the channel.

For the avoidance of doubt, the device disclosed herein in any of its aspects, and in corresponding methods disclosed herein, may be configured such that:

(a) both the axially segmented rods and the radial confinement rods are axially segmented; and/or, (b) an RF voltage may be applied to either:

a. to the axially segmented rods but not to the radial confinement rods, or b. to the radial confinement rods but not to the axially segmented rods, or c. to both the axially segmented rods and the radial confinement rods. This electrode structure allows the application of the AC voltages (preferably not modulated voltages) to be applied to all 4 opposing segments located at one common axial position. That is to say, the segments of the bunching rods and the segments of radial confining rods having the same axial spacing and located at the same axial positions. An example of a doubly segmented device, is shown by FIG. 7*b*.

The radial confinement electrodes may comprise axially segmented electrodes. The radial confinement electrodes may comprise axially segmented or may comprise axial regions of segmented electrodes and axial regions of continuous unsegmented electrodes. The waveform may comprise a sinusoidal function or a set of sinusoidal functions.

As a result of the considerations above, the invention in this aspect may provide a potential well for translating charges particles along a guide channel with much stronger axial confinement.

The device described above implements a corresponding method of manipulating charged particles, which is a further, corresponding aspect of the invention. As such, features of the invention described above in relation to the device are to be understood as implementation of a corresponding method.

In a second aspect, the invention may provide method for manipulating charged particles, the method comprising:

providing a series of electrodes disposed so as to form a channel for transportation of the charged particles;

providing a power supply unit(s) and therewith providing a first supply voltage which changes according to a waveform having a period (T), to axially segmented bunching electrodes amongst said electrodes so as to create an electric field within said channel, the potential of said electric field having one or more local minima between local maxima defining a potential well which is translated along at least a part of the length of said channel such that the potential well is translated a distance substantially equal to its length (e.g. axial length in a direction along the channel) in an interval of time substantially equal to the period (T);

providing a power supply unit(s) and therewith providing a second supply voltage to radial confinement electrodes amongst said electrodes so as to create a radially confining electric field within said channel configured to radially confine charged particles within the channel;

wherein said waveform is:

(a) substantially continuously smooth throughout its period (T); and, (b) substantially constant in value throughout a finite duration of time ($T_L$<T) within said period (T), corresponding to a minimum of the waveform.

Most preferably, in the method, the waveform has no waveform maxima throughout the finite duration of time ($T_L$<T). For example, the finite duration of time may contain only one minimum of the waveform. The waveform as a whole may contain only one minimum within its period, T.

Preferably, in the method, the first supply voltage may comprise an RF voltage signal modulated according to the waveform such that the potential well is formed by a pseudo-potential. Alternatively, the first supply voltage may comprise a AC voltage that varies in value over time according to the waveform, and does not comprise, or modulate, any underlying RF voltage signal. In this latter case, the potential well is not formed by a pseudo-potential but is formed by a 'real' potential.

Desirably, according to the method, the first supply voltage may be applied, at an appropriate phase of the waveform, to each of a plurality of the axially segmented bunching electrodes, e.g. forming a group of spatially successive neighbouring electrodes, concurrently during the finite duration of time ($T_L$<T) within said period (T) of the waveform. In this way, a spatially extended range of successive bunching electrodes may concurrently receive the first supply voltage at a value corresponding to its substantially constant minimum. As a result, the substantially constant minimum may extend spatially along the plurality of the axially segmented bunching electrodes in question, along the axis of the ion guide channel.

Desirably, in the method, the minimum of the waveform may be substantially constant in value throughout the aforesaid finite duration of time ($T_L$<T) within the aforesaid period (T), in the sense that it is actually constant, or is effectively or practically constant, or is at least such that it varies insignificantly during the aforesaid finite duration of time ($T_L$<T). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, in the method, one may define: $X=100\times\Delta U/U_0$, as the maximum permissible change ($\Delta U$) in the value of the waveform, throughout $T_L$, expressed as a percentage (%) of the amplitude ($U_0$) of the waveform, then preferably: $X\leq10$, or $X\leq5$, or $X\leq2.5$, or $X\leq1.0$, or $X\leq0.5$, or $X\leq0.25$, or $X\leq0.1$, or $X\leq0.05$, $X\leq0.01$.

The method preferably comprises constraining the finite duration of time ($T_L$) such that: $T>T_L\geq T/k$, where k is any positive number (i.e. either a non-integer number or an integer) greater than one (1) (i.e. k>1). Preferably, k≥1.2. Preferably, k≤20, or k≤15, or k≤10. Preferably, for example, 1.2≤k≤8.0.

Preferably, in the method, one may define: $\hat{T}_L=100\times T_L/T$, as the minimum permissible duration of $T_L$ expressed as a percentage (%) of the period T. Preferably, in the method, the ratio of the maximum permissible change ($\Delta U$) in the value of the waveform within $T_L$, and the minimum permissible duration of $T_L$ may be constrained such that: $X/\hat{T}_L\leq1.0$; or more preferably $X/\hat{T}_L\leq0.75$; or more preferably $X/\hat{T}_L\leq0.5$; or more preferably $X/\hat{T}_L\leq0.25$; or more preferably $X/\hat{T}_L\leq0.1$; or more preferably $X/\hat{T}_L\leq0.05$; or more preferably $X/\hat{T}_L\leq0.01$; or more preferably $X/\hat{T}_L\leq0.001$.

Preferably, the method may include controlling the first supply voltage waveform such that the value of the first time derivative (i.e. ∂/∂t) thereof is substantially continuous at least during the time interval, $T_L$, within the period of the waveform. Preferably, the value of the first time derivative (i.e. ∂/∂t) of the first supply voltage waveform is substantially continuous during substantially the whole period, T, of the waveform. Preferably, the value of the first time derivative (i.e. ∂/∂t) of the first supply voltage waveform does not exceed during substantially the whole period, T, of the waveform.

Preferably, the modulus of the first time derivative (∂U/∂t) of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L<T$) within the aforesaid period (T) of the waveform wherein Y=50. For example, 50≥Y≥1.4, or more preferably 10≥Y≥2, or yet more preferably 7≥Y≥3, for example Y may be a value of about 5. In some examples, Y≥1.4. In this sense, the waveform may be said to be substantially constant during the finite duration of time, $T_L$. Preferably, the average value of the modulus of the first time derivative (∂U/∂t) of the waveform (U), throughout the aforesaid finite duration of time ($T_L<T$) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L<T$), in this sense.

The method may comprise providing first supply voltages comprising RF voltage signals that are modulated according to the waveform, to the axially segmented bunching electrodes to create a potential in the form of a pseudo-potential within the channel, the pseudo-potential having the one or more local minima between local maxima defining a said potential well which is translated along at least a part of the length of the channel.

More generally, preferably, the method comprises constraining the value of the first time derivative (i.e. ∂U/∂t) of the first supply voltage waveform (U) to be substantially continuous at least during the time interval, $T_L$, within the period (T) of the waveform. Preferably, the value of the first time derivative (i.e. ∂U/∂t) of the first supply voltage waveform is constrained to be substantially continuous throughout substantially the whole period, T, of the waveform. Preferably, in the method, the value of the modulus of the first time derivative of the first supply voltage waveform, of waveform amplitude $U_0$, is constrained such that:

$$\left|\left(\frac{T}{U_0}\right)\frac{\partial U}{\partial t}\right| \leq 100$$

throughout the aforesaid period (T) of the waveform. More preferably, this modulus may be no greater than 75, or more preferably no greater than 50 or more preferably no greater than 20, or more preferably between about 10 and about 15, such as about 12. Preferably, the waveform (U) comprises, or is at least partially defined according to, an 'error function' (erf). This has the benefit of preventing unwanted impulses of force upon the charges particles within the potential well.

Alternatively, the method may include providing first supply voltages comprising a AC voltage that changes according to the waveform (e.g. non-RF signals) to a plurality of bunching electrodes so as to define a potential well from the applied first supply voltage waveforms (i.e. the potential forming the travelling well is not a pseudo-potential, but is formed by voltage waveforms), which is translated along at least a part of the length of the channel.

The method may include providing second supply voltage(s) (e.g. RF signals, or non-RF voltage waveforms) to the axially segmented bunching electrodes (i.e. in addition to radial confinement electrodes) to create a radially (i.e. transverse to the channel axis) confining potential (e.g. a pseudo-potential, or otherwise) within the channel. The amplitude of the second supply voltage(s) is preferably substantially constant. Preferably, the amplitude of the second supply voltage(s) is not modulated over time. The effect of the second supply voltage(s) applied to radial confinement electrodes, in combination with the presence of the axially segmented bunching electrodes, is to generate a radially confining electric field (potential). The series of electrodes may be configured as a quadrupole ion guide. The radially confining electric field (potential) may be configured as a quadrupole field. The invention is applicable to higher-order fields and ion guides comprising greater number of poles, such as: hexapole, octopole, decapole etc.

The method may include generating an RF voltage signal having a square waveform by switching between the two preselected voltage levels at a preselected RF switching frequency. The method may include varying any one of, or both of, the two preselected voltage levels with time in any desired manner or rate of time variation, but preferably at a rate that is much slower than the preselected RF switching rate. A time variation of any one or both of the preselected voltage levels may provide an amplitude modulation envelope of the RF waveform. The time variation may be a time periodic variation. The method may include generating the waveform shape of the modulation envelope to comprise parts in which the envelope (of the modulation) is substantially constant (e.g. non-zero, or substantially zero) in value during a finite duration of time ($T_L$) within said interval of time (T) wherein the finite duration of time ($T_L$) corresponds to the aforesaid local minima.

The method may comprise supplying each bunching electrode, or at least a group of successive such electrodes, with such a modulated RF voltage signal, or a non-RF waveform, wherein successive bunching electrodes may receive a respective such modulated RF voltage signal, or a non-RF waveform, which is at a different respective phase of a common time-periodic modulation.

The method may include providing the RF voltage signal by electrically controlling high-frequency (e.g. RF) switches so as to selectively electrically connect respective bunching electrodes alternately to positive and negative power supply rails to provide the RF oscillating component of the waveform.

The method may include providing a first power supply unit(s) and therewith providing first supply voltage(s), and a separate second power supply unit(s) adapted to provide second supply voltage(s).

Desirably, the local minima are surrounded by a first local maxima located on a first side of the minima and a second local maxima located on a second, opposite, side of the local minima. The potential well may be structured as described above.

The value of the potential defining the well floor is preferably substantially smoothly-varying and preferably comprises only one local minimum. This enables charged particles within the potential to be desirably located at the one local minimum within the well, thereby accurately defining their position during transport through the channel, and extraction from it. The local minimum is preferably continuous with the two well walls bounding it, having substantially no (or at least no substantial) discontinuities in value or in gradient.

The method may include providing first supply voltage waveforms to bunching electrodes of the plurality of electrodes, so as to form concurrently a plurality of said potential wells spaced along the axis of the channel. Preferably, each of plurality of said potential wells so formed are translated in unison along at least a part of the length of the channel. Preferably, the plurality of potential wells are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

The method may include providing periodic first supply voltage waveforms with a waveform frequency (i.e. 1/T, where T is the waveform period) of between about 0.1 kHz and about 20 kHz, to bunching electrodes so as to generate said potential well, or concurrently generate the plurality of potential wells. Preferably, the waveform frequency is between about 1 kHz and about 4 kHz. The first supply voltage waveforms may define a modulation waveform applied to an RF voltage signal, so as to provide an 'envelope' to the amplitude of the RF voltage signal, or may be applied as a pure voltage waveform alone, or in the absence of an RF voltage signal within the first supply voltage. If an RF voltage signal, having an RF frequency, is amplitude-modulated by this waveform, then the RF frequency may be in the range: about 0.2 MHz to about 5 MHz.

Preferably, the method may include providing the first supply voltage waveform to each respective bunching electrode of segmented electrodes such that it is time-shifted, or phase-shifted, compared with the voltage waveform concurrently supplied to adjacent electrodes. Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. For example, the phase of the first supply voltage waveform applied to a given ($n^{th}$) bunching electrode (n is a positive integer), may correspond with a phase of the waveform that is more advanced relative to the phase of the same waveform applied an immediately preceding neighbouring ($[n-1]^{th}$) bunching electrode. Similarly, the phase of the first supply voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the first supply voltage waveform that is at a slightly different phase in its periodic cycle. The method may include providing the first supply voltage waveforms to selected groups or subsets of successive bunching electrodes, being N in number, such that the phase of the first supply voltage waveform applied to the first bunching electrode of a given group is substantially equal to the phase of the first supply voltage waveform applied to the first bunching electrode of an immediately neighbouring group of N bunching electrodes. For example, the method may include providing supply the first supply voltage waveforms to the N bunching electrodes of a given group of bunching electrodes (e.g. that group and each of its immediate neighbour groups), such that the phase of the waveform applied to a given bunching electrode of that group differs from the phase of the waveform applied to the immediately succeeding bunching electrode of that group, by a phase difference ($\Delta\Phi$) of substantially $\Delta\phi$=—360/N, and simultaneously differs from the phase of the waveform applied to the immediately preceding bunching electrode of that group, by a phase difference ($\Delta\Phi$) of substantially $\Delta\Phi=+360/N$.

The method may include providing the first supply voltage waveforms to generate a plurality of potential wells. The spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrodes are plates or are planar. The method may include selectively to adjusting the well spacing configuration by adjusting the value of N. For example, preferably, N is equal to or greater than 8 (eight).

The method may include controlling the waveform frequency of the first supply voltage waveforms such that the speed of translation, v, of a potential well along the axis of the channel is proportional to: $f \cdot L$, where f is the waveform frequency (Hz) and L is the spatial separation, along the axis of the channel, between bunching electrodes at which the same value (e.g. same phase) of the applied first supply voltage waveform exists (e.g. $v=f \cdot L$).

Preferably, the method may include controlling the first supply voltage waveform shape and/or the waveform frequency (i.e. $f=1/T$, where T is the waveform period) such that during a predetermined finite time interval, $T_L$, the voltage value of the waveform is not greater than about 10% of the maximum voltage value of the first supply voltage waveform within the period of the waveform, where $T_L \geq T/N$. Here, N is the number of individual bunching electrodes in each subset of bunching electrodes, wherein each subset of bunching electrodes supports a respective period of the first supply voltage waveform. More preferably, this voltage value of the first supply voltage waveform is not greater than about 5% of the maximum voltage value of the waveform during the time interval, $T_L$. Yet more preferably, this voltage value of the first supply voltage waveform is not greater than about 3% of the maximum voltage value of the waveform during the time interval, $T_L$. Even more preferably, this voltage value of the first supply voltage waveform is not greater than about 2%, or preferably about 1%, or about 0.5%, or about 0.25%, or about 0.1% or about 0.01% of the maximum voltage value of the first supply voltage waveform during the time interval, $T_L$. Most preferably, this voltage value of the first supply voltage waveform is substantially zero during the time interval, $T_L$.

Desirably, the method comprises providing the waveform with a shape defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)*\xi(2\pi ft+\phi)$$

Here, the function $U(2\pi t/T+\Phi)$ represents the waveform as a periodic modulation function having a period T (sec), phase $\Phi$, and an amplitude $U_0$. The function $\xi(2\pi ft+\phi)$ may either be a fast oscillating (e.g. RF) periodic function with frequency f and phase $\phi$, or may be constant in value (e.g. analogous to setting: f=0) in cases where no RF component is present within the first supply voltage. For example, the shape of the waveform $U(2\pi t/T+\Phi)$ may, at least in part, comprise the shape of an 'error function' (erf(y)) such that:

$$U\left(2\pi\frac{t}{T}+\Phi\right)\sim(1+\mathrm{erf}(y))/2$$

during at least some of the duration of the period, T, of the waveform, where:

$$\mathrm{erf}(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T). Preferably, the waveform $U(2\pi t/T+\Phi)$ is either always positive in value, or is always negative in value. Preferably, the waveform $U(2\pi t/T+\Phi)$ is a continuous function. Preferably, the waveform $U(2\pi t/T+\Phi)$ has a maxima that is substantially constant in value throughout a finite duration of time ($T_H<T$) within the period (T) of the waveform. This maxima may preferably correspond to a local maxima of the potential well. Preferably, the waveform $U(2\pi t/T+\Phi)$ changes substantially continuously between the time interval $T_H$ and the aforementioned time interval $T_L$, within the period of the waveform, T.

The method may comprise providing a memory unit within which is stored a plurality of separate and discrete values of the waveform corresponding to a respective plurality of separate and discrete points along its cycle.

The method may comprise controlling the pressure of a buffer gas within the channel such that the pressure at the exit of the channel is lower than 0.5 mbar. The method may comprise controlling the pressure of a buffer gas within the channel such that the pressure of the buffer gas at one end of the channel is at least 20 times greater than the pressure at the other end of the channel.

In a further aspect, the invention may provide a method for controlling an ion guide, or mass filter, or mass analyser, or ion trap, comprising the method described above.

In another aspect, the invention may provide a computer-readable medium having computer-executable instructions configured to cause: a mass spectrometry apparatus, or ion guide apparatus, or mass filter apparatus, or mass analyser apparatus, or ion trap apparatus to perform the method as described above. The apparatus may comprise a signal processing unit or may comprise a processor or computer programmed or programmable (e.g. comprising a computer-readable medium containing a computer program) to implement the configured to execute the computer-executable instructions.

A third aspect of the present disclosure relates to a method and apparatus useful for improving an oaToF (orthogonal acceleration time of flight) mass analyser. In more detail, this aspect of the present disclosure relates to a method, and an apparatus, of axial extraction from the ion guide which is particularly suited for use in inputting extracted ions (or charged particles more generally) into the "pulser" region of an oaToF in such a way as to provide improvements to the oaToF analyser.

At its most general, the invention in this third aspect proposes axial release of charged particles by manipulating the depth of an axially traveling potential well which is at least in part produced using a pseudo-potential. By exploiting the fact that the amplitude, or strength, of a pseudo-potential is inversely proportional to the mass-to-charge ratio (m/z) of ions within it, the invention aims to provide an apparatus and method by which the traveling well may achieve mass discrimination when releasing/extracting charged particles axially from the ion guide. The invention proposes exploiting the property that the magnitude, or amplitude, of a pseudo-potential is inversely proportional to the m/z of an ion experiencing or perceiving that pseudo-potential, in order to provide a way of axially extracting charged particles of different masses within an ion bunch, at different times from an ion guide.

Accordingly, in a third aspect, the invention may provide a device for manipulating charged particles, the device comprising:

- a series of electrodes disposed so as to form a channel for transportation of the charged particles;
- a power supply unit(s) adapted to provide supply voltages:
  - (a) to axially segmented bunching electrodes amongst the series of electrodes so as to create an electric field defining a potential within said channel, the potential having one or more local minima between local maxima defining a potential well which is translated along at least a part of the length of the channel, and
  - (b) to radial confinement electrodes amongst the series of electrodes so as to create a radially confining electric field within the channel configured to radially confine charged particles within the channel;
- an axial extraction region comprising electrodes amongst the series of electrodes disposed at least at, or defining, an end of the channel of the device and arranged to receive a the supply voltage to create therewith an electric field defining a pseudo-potential within the channel such that the depth of the potential well varies according to the mass-to-charge ratio (m/z) of the charged particles transported therein and reduces as a local maxima of the potential well is translated axially towards and/or along the axial extraction region thereby to release the transported charged particles of different mass-to-charge ratio (m/z) at different respective times.

The potential well may comprise a well floor or base containing one or more local minima, bounded by two separate well walls each containing, or defining, a respective one of two of the local maxima with each located at a respective one of two opposite sides of the well floor. The potential well may comprise a leading local maxima (or leading well wall) and a trailing local maxima (or trailing well wall), wherein the leading local maxima leads, or precedes, the trailing local maxima in the direction of translation of the potential well. In other words, preferably the trailing local maxima (or trailing well wall) follows the leading local maxima (or trailing well wall).

The value of the potential defining the well floor is preferably substantially smoothly-varying and preferably comprises only one local minimum. This enables charged particles within the potential to be desirably located at the one local minimum within the well, thereby accurately defining their position during transport through the channel, and extraction from it.

The depth of the potential well may reduce as the potential well is translated axially towards or along the axial extraction region. This may be achieved by configuring the device such that the height of a local maxima of the potential well is reduced as it travels towards and/or through the extraction region: the well depth being defined by the potential difference between the local minima and an adjacent leading local maxima (e.g. the one preceding the local minima). Alternatively, or in addition, this may be achieved by configuring the device such that the height of a local minima of the potential well is increased as it travels towards and/or through the extraction region: the well depth being defined by the potential difference between the leading local minima and an adjacent local maxima (e.g. the one preceding the local minima).

The reduction in well depth (i.e. reducing a height of a local maxima) may be achieved by the effect of fringing fields in diminishing the height of a leading wall of the advancing pseudo-potential well, and/or by applying an internal or external DC potential outside the extraction region to diminishing the height of a leading wall of the advancing potential well. The external DC potential may comprise a potential gradient generated between the axial extraction region (e.g. terminal electrodes/output end) and an external electrode(s) located outside of the ion guide beyond the extraction region. The external DC potential may be selected and applied in any suitable manner that achieves the result of diminishing the height of a leading wall of the advancing potential well within the channel defined by the series of electrodes and/or locally beyond the those electrodes as, and immediately after, the advancing potential well exits the channel defined by the series of electrodes and enters the fringing field region formed by the electrodes. The axial extraction region may comprise axially segmented bunching electrodes. It may comprise radial confinement electrodes. The terminal electrodes of the channel may comprise axially segmented bunching electrodes. They may comprise radial confinement electrodes. The power supply unit(s) may be adapted to provide supply voltages to the terminal axially segmented bunching electrodes such that all parts of the travelling potential well ultimately travel to the terminal electrodes of the channel (e.g. such that the preceding parts of the travelling do not stop once succeeding parts have reached the terminal electrodes of the channel). This may ensure that all parts of a travelling potential well travel into, and enter, the fringing field region of the channel.

The reduction in well depth (i.e. increasing a height of the local minima) may be achieved by changes in the dynamical shape of a composite potential well formed by a travelling potential well, which is not a pseudo-potential well, as it abuts and moves up against a separate pseudo-potential barrier. This is found to have the effect of raising the height of a floor of the composite potential well as the travelling potential well advances towards (e.g. and against) the pseudo-potential barrier.

The power supply unit(s) may be adapted to provide supply voltages to the axially segmented bunching electrodes in the form of RF voltage signals. Accordingly, the bunching electrodes so suppled may generate an electric field defining a potential which is a pseudo-potential. This potential may have the aforesaid one or more local minima between local maxima defining the potential well. The segmented bunching electrodes may include the electrodes disposed at least at, or defining, an end of the channel of the device. The power supply unit(s) may be adapted to provide supply voltages in the form of RF voltage signals to electrodes disposed at least at, or defining, an end of the channel of the device such that those electrodes may generate an electric field defining a potential which is a pseudo-potential. This potential may have the aforesaid one or more local minima between local maxima defining the potential well which is translated along the length of the extraction region of the channel. The power supply unit(s) may be arranged such that RF voltage signals are supplied to bunching electrodes to generate the potential well are concurrently supplied to electrodes disposed at, or defining, the end of the channel to which RF voltage signals are to be supplied. Thus, translation of the pseudo-potential well may progress through the extraction region and to the terminal output end of the channel. In this way, a pseudo-potential travelling well may be translated into the fringing field region of the device.

Alternatively, the power supply unit(s) may be adapted to provide supply voltages to the axially segmented bunching electrodes in the form of voltage waveform signals, as opposed to modulated RF voltage signals. Accordingly, those bunching electrodes so suppled may generate an electric field defining a potential which is not a pseudo-potential. This potential may have the aforesaid one or more local minima between local maxima defining the potential well. The power supply unit(s) may be adapted to provide supply voltages in the form of modulated RF voltage signals to electrodes disposed at least at, or defining, an end of the channel of the device such that those electrodes may generate an electric field defining a potential which is a pseudo-potential. This may define a pseudo-potential barrier. The power supply unit(s) may be arranged such that the non-RF voltage waveform signals supplied to bunching electrodes to generate the potential well(s) are not concurrently supplied to electrodes disposed at, or defining, the end of the channel to which modulated RF voltage signals are to be supplied.

The pseudo-potential barrier may be substantially static upon the axis of the channel (e.g. it is not translated along that axis) within the extraction region. The pseudo-potential may be shaped to define a potential barrier on/along the axis of the channel within the extraction region. The pseudo-potential barrier may define a local pseudo-potential maximum the height or amplitude of which exceeds the value of the potential of the aforesaid one or more local minima of the potential well (e.g. the well floor). Preferably, the potential barrier may define a local pseudo-potential maximum the height or amplitude of which is less than the value of the potential of the aforesaid trailing local maxima of the potential well. Accordingly, the trailing well wall preferably possesses a region between the local maxima of that wall and the adjacent local minima of the well (e.g. the well floor), along which the value of the potential thereof exceeds the local maximum of the pseudo-potential barrier. This means that if charged particles within the potential well are raised (in potential energy) to this region, by the translation of the potential well at the vicinity of the pseudo-potential barrier, then they may pass over the pseudo-potential barrier and continue to move (i.e. be extracted) along the channel in the direction of translation, ultimately moving out of the channel.

As a result, a travelling potential well may be controlled to travel up to the pseudo-potential barrier, but to travel no further. The travelling potential well may be controlled to not travel through the pseudo-potential barrier or travel past/beyond it. The travelling potential well formed by voltage waveforms (i.e. non-RF) may be translated towards the extraction region so as to meet, intercept, or "wash-up" against, the rising edge of the static pseudo-potential barrier formed within the extraction region. In doing so, a composite potential well is formed from two sections: one section comprises the parts of the travelling potential well (formed by the voltage waveforms) that have not yet reached, but are adjacent to and approaching, the pseudo-potential barrier; the other section is formed by the pseudo-potential barrier.

The composite potential well may comprise a local minimum disposed between two local maxima. One of the local maxima (the voltage waveform potential) may travel towards the other local maxima (the pseudo-potential barrier), which may be static. In doing so, the potential of the local minimum may be caused to rise as the trailing inner wall of the travelling potential well advances towards and washes-up against the facing side of the pseudo-potential barrier. The rising of the potential of the local minimum may continue until its value coincides with the peak potential of the pseudo-potential barrier whereupon potential well ceases to be a well in the sense that it is no longer the case that a local minimum is bounded by two local maxima. At this point, charged particles within the composite potential well are released from that well, and from the axial extraction region. It is to be noted that because the amplitude, or height, of the pseudo-potential barrier is inversely proportional to the mass-to-charge ratio (m/z) of charged particles within the device, this means that the condition for releasing a given charged particle from the composite potential well, and therefore the time of release of that charged particle, is inversely proportional to the mass-to-charge ratio (m/z) of charged particle in question. As a result, axial extraction of charged particles is possible in a manner that provides mass discrimination: particles within the bunch of particles in the potential well, of relatively larger mass-to-charge ratio (m/z) are released from a given composite potential well before particles within the bunch of relatively smaller mass-to-charge ratio (m/z) are released from the same well.

Preferably, the voltage amplitude, or height, of the trailing inner wall of the travelling potential well formed by voltage waveforms (i.e. non-RF), exceeds the voltage amplitude, or height, of the pseudo-potential barrier. The voltage amplitude of the leading wall of the travelling potential well formed by voltage waveforms, may preferably also exceed the voltage amplitude of the pseudo-potential barrier. This condition may be in respect of charged particles of a mass-to-charge ratio (m/z) in respect of which the device (e.g. an ion guide, ion trap, or a mass filter) is configured to transmit, or in respect of which the trajectory of the charged particle within the device is stable (i.e. corresponds to a ‘stability region" of the stability diagram associated with the device and its operating parameters).

Preferably, the potential gradient of the trailing inner wall of the travelling potential well formed by voltage waveforms, is substantially continuous and finite in value (i.e. does not comprise a step-change in value). This has the advantage of allowing smooth and continuous rising of the local minimum of the composite potential well, over time, as the trailing inner wall of the travelling potential well advances against the pseudo-potential barrier, thereby avoiding heating if the charged particles within the composite well or ‘kicking’ charged particles out of the well by virtue of the force impulse associated with a discontinuity in the electrical potential.

The pseudo-potential may have a local maxima defining a peak of the pseudo-potential barrier, which is preferably static within the extraction region. Preferably, the pseudo-potential barrier does not possess a local minima, thereby avoiding the possibility of trapping charged particles within the pseudo-potential barrier.

The axial extraction region may be disposed at, or be defined by, a terminal end of the channel of the device, for releasing the ions of different m/z at different respective times. For example, the axial extraction region may comprise the terminal, or final, bunching electrodes and/or radial confinement electrodes of the series of electrodes that define a physical end (e.g. the output end) of the series of electrodes. In this case, for example, the terminal, or final, bunching electrodes may be driven to define the aforementioned travelling potential well. Alternatively, the axial extraction region may comprise the terminal, or final, electrodes that are not bunching electrodes, and/or radial confinement electrodes of the series of electrodes, but that define a physical end (e.g. the output end) of the series of electrodes. In this case, for example, the terminal, or final, electrodes that are not bunching electrodes may be driven to define the aforementioned pseudo-potential barrier.

The axial extraction region may comprise one or more extraction electrodes disposed adjacent to a terminal end of the channel and axially spaced therefrom by an axial spacing defining an acceleration region (e.g. comprising a voltage ramp) within which a potential gradient is formable by voltages applied to the extraction electrode(s) and voltages applied to electrodes disposed at, or defining, the terminal end of the channel of the device.

The one or more extraction electrodes may be located at a position spaced from the electrodes defining the terminal end of the channel of the device such that a potential gradient is formable between the end of the channel and the one or more extraction electrodes. This may be achieved by applying voltages to the extraction electrode(s) and to the terminal end of the channel that collectively defines a potential gradient in the spacing between them, which urges away from the end of the channel those charged particles that are released from the channel. The one or more extraction electrodes may be spaced (e.g. as a grouping or separately) from the terminal end of the channel of the device by a spacing of between about 0.02 m and about 0.005 m, or preferably between about 0.015 m and about 0.005 m, such as about 0.01 m.

The potential gradient may be a value between about −7000 V/m and about −100 V/m. The negative values of the voltage represent the accelerating voltage for positively charged particles. Naturally, for negatively charged particles the values of the accelerating voltage are positive but similar in its modulus. For example, the potential gradient may be a value between about −7000 V/m and about −2000 V/m. In another example, the potential gradient may be a value between about −2000 V/m and about −100 V/m, or more preferably between about −2000 V/m and about −200 V/m, or yet more preferably between about −1500 V/m and about −200 V/m, or even more preferably between about −1200 V/m and about −300 V/m. The potential gradient may be defined in terms of the spatial gradient of a potential comprising the pseudo-potential extending from/beyond the terminal end of the channel of the device (i.e. within the fringing field region) combined with a DC potential extending from the extraction electrode(s).

The electrodes disposed at, or defining, the end of the channel may comprise electrodes having the same shape, form and configuration as the bunching electrodes. Alternatively, the electrodes disposed at, or defining, the end of the channel may differ in shape, form and/or configuration from the bunching electrodes.

The device may comprise a power supply unit adapted to provide a supply voltage to the extraction electrode(s) so as to create an electric field defining a DC potential which is lower in magnitude than a said minima (e.g. any minima) of the one or more local minima of the potential generated by electrodes forming the channel. The power supply unit may be adapted to supply to the extraction electrode(s) an accelerating DC voltage. For example, the DC voltage for positive ions may be a value of between about −5 v and 0 v, or between about −4 v and 0 v, or between about −3 v and 0 v, or between about −2 v and 0 v, or between about −1 v and 0 v. The voltage may be 0 v (i.e. no voltage applied, or earth voltage applied). Of course, these voltage values should be positive in polarity instead of negative, when used for negative ions. Other voltage values are possible, as appropriate to circumstances.

The device may comprise one or more charged-particle optical elements (e.g. ion optical element(s), lenses etc.) arranged to receive charged particles extracted from the extraction region and to impose a convergence of the trajectories of the received charged particles. For example, one or more ion-optics lenses (e.g. Einzel lenses, etc.) may be so arranged downstream of the extraction region. For example, the extraction electrode(s) may also serve the function of at least a part of such a charged-particle optical element(s). This assists in directing and positioning extracted charged particles at a desired location downstream of the extraction region, such as at the entrance to a time-of-flight (ToF) mass spectrometer (e.g. its flight tube). Accordingly, extracted charged particles may be accurately and efficiently delivered to a ToF spectrometer.

For example, the extraction electrode(s) may comprise, and may also serve the function of, at least a part of an acceleration electrode (also known as a 'pusher' or 'pulser' electrode) within a time-of-flight (ToF) mass spectrometer. After travelling in the downstream direction and being introduced into a time-of-flight (ToF) mass spectrometer, the charged particles may approach an orthogonal acceleration electrode of the ToF mass spectrometer at which they may be urged, by an electric field generated by the orthogonal acceleration electrode, to start a flight along a flight tube of the ToF mass spectrometer with an acceleration in the orthogonal direction, with a predetermined timing. The charged particles so accelerated from the orthogonal acceleration electrode may then first fly freely in the flight space within a flight tune of the ToF spectrometer, and then be returned back in the opposite direction by a reflection electric field formed by a reflector to again fly freely in the flight space until the charged particles reach the ion detector of the ToF mass spectrometer. In this way, the axial translation of charged particles within potential wells within the device, may allow a supply of charged particles to a ToF and, at the ToF, the axial motion of the delivered charged particles may be converted to an orthogonal motion within the flight tube of the ToF, for spectral ToF measurements. The device may include such a time-of-flight (ToF) mass spectrometer. The invention is not restricted by any particular type of the ToF analyser (for example, it could be an analyser with more than one set of reflecting mirrors), as long as its entrance is organised as a "pusher" or "pulser".

Preferably, the device may be arranged to apply to the acceleration electrode of the time-of-flight (ToF) mass spectrometer a pusher voltage signal configured to generate the electric field at the orthogonal acceleration electrode to achieve the aforementioned flight of charged particles. The pusher voltage signal may be periodic. The pusher voltage signal may be in synchrony with a periodic voltage signal applied to bunching electrodes for generating the translated potential wells. The period of the periodic pusher voltage signal may substantially match the period (k*T) where T is a period of a periodic voltage signal applied to bunching electrodes for generating the translated potential wells (e.g. the time period between the arrival of successive potential wells at the extraction region), and k is a positive integer. The phase of the periodic pusher voltage may be controlled to be out of phase with the phase of the periodic voltage signal applied to bunching electrodes, according to a predetermined phase difference, or phase delay. The predetermined phase difference, or phase delay, may be determined according to the charged particle transit distance, this being the spatial separation between the location of the extraction region (e.g. terminal output end) and the location of the acceleration electrode (e.g. the downstream travel distance from the former to the latter). This may achieve the predetermined timing of the pusher voltage signal, to achieve a synchrony between the time of arrival of the extracted charged particles from the extraction region, and the application of the pusher voltage at the orthogonal acceleration electrode of the ToF mass spectrometer. For example, the phase delay $\partial\phi$ may be determined as:

$$\delta\Phi = 2\pi\frac{\delta x}{vT}$$

Here, v is the speed of translation of a potential well, T is the period of the periodic voltage signal applied to bunching electrodes, and δx is the amount by which the charged particle transit distance exceeds an integer multiple of the spatial separation between successive potential wells (e.g. corresponding locations or features within successive potential wells). Put in other terms, the charged particle transit distance is: $m\times W+\delta x$, where W is the axial length of each potential well (e.g. axial length in a direction along the channel), and m is a positive integer. Here $v=W/T$.

The power supply unit(s) may be adapted to provide supply voltage waveforms (e.g. according to the invention in its first and second aspects, described above) to a plurality of bunching electrodes so as to define a potential well from the applied voltage waveforms (i.e. the potential forming the travelling well is not a pseudo-potential, but is formed by voltage waveforms), which is translated along at least a part of the length of the channel towards the axial extraction region. This may supply of voltage signals may be in the manner described above according to the invention in its first aspect. The power supply unit(s) may be adapted to provide supply voltages (e.g. RF signals) to a one or more other electrodes, at the extraction region, so as to create a pseudo-potential within the channel. Preferably, at least some of the electrodes of the extraction region are supplied with voltages (e.g. RF signals) for generating the pseudo-potential barrier (or parts of it), without being supplied simultaneously with voltage waveforms (e.g. non-RF) used to generate the travelling potential well.

Preferably, the power supply unit(s) may be adapted to provide supply voltage waveforms to bunching electrodes of the plurality of electrodes, so as to form concurrently a plurality of said potential wells spaced along the axis of the channel. Preferably, each of plurality of said potential wells so formed are translated in unison along at least a part of the length of the channel. Preferably, the plurality of potential wells are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

Preferably, the power supply unit(s) may be adapted to provide supply periodic voltage waveforms with a waveform frequency (i.e. 1/T, where T is the waveform period) of between about 0.1 kHz and about 20 kHz, to bunching electrodes so as to generate concurrently the plurality of potential wells. Preferably, the waveform frequency is between about 1 kHz and about 4 kHz. The voltage waveforms may define a modulation waveform applied to an RF voltage signal, so as to provide an 'envelope' to the amplitude of the RF voltage signal, or may be applied as a pure voltage waveform alone, or in the absence of an RF voltage signal.

Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. In particular, the waveform is preferably as described above in relation to the first aspect of the invention. For example, the phase of the voltage waveform applied to a given ($n^{th}$) bunching electrode may correspond with a phase of the waveform that is more advanced relative to the phase of the same waveform applied an immediately preceding neighbouring ($[n-1]^{th}$) bunching electrode. Similarly, the phase of the voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the waveform that is at a slightly different phase in its periodic cycle.

Preferably, the power supply unit(s) may be adapted to provide supply the voltage waveforms to selected groups or subsets of successive bunching electrodes, being N in number (N is a positive integer), such that the phase of the voltage waveform applied to the first bunching electrode of a given group is substantially equal to the phase of the voltage waveform applied to the first bunching electrode of an immediately neighbouring group of N bunching electrodes. For example, the power supply unit(s) may be adapted to provide supply the voltage waveforms to the N bunching electrodes of a given group of bunching electrodes, such that the phase of the waveform applied to a given bunching electrode of that group differs from the phase applied to the immediately succeeding bunching electrode of that group, by a phase difference ($\Delta\phi$) of substantially $\Delta\phi=-360/N$, and simultaneously differs from the phase applied to the immediately preceding bunching electrode of that group, by a phase difference OP) of substantially $\Delta\phi=+360/N$. As a result, one full cycle of the waveform plays out across each group of N bunching electrodes at any given time. In particular, in this regard, the waveform is preferably as described above in relation to the first aspect of the invention.

Desirably, when the power supply unit(s) may be adapted to provide supply the voltage waveforms to generate a plurality of potential wells, the spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrode are plates or are planar. The power supply unit(s) may be adapted selectively to adjust the well spacing configuration by adjusting the value of N. A larger value of N may be more suitable for channels having a larger lateral dimension or diameter. The inventors have found that this adjustment can lead to better resolution in the discrimination of the masses of charged particles extracted from the device. For example, preferably, N is equal to or greater than 8 (eight).

Preferably, the waveform frequency is such that the speed of translation, v, of a potential well along the axis of the channel is proportional to: f·L, where f is the modulation frequency (Hz) and L is the spatial separation, along the axis of the channel, between bunching electrodes at which the same value (e.g. same phase) of the applied voltage waveform exists (e.g. v=f·L).

The power supply unit(s) may be adapted to provide the supply voltages to axially segmented bunching electrodes in the manner described above in relation to the invention in its first (and second) aspects. For example, the power supply unit(s) may be adapted to provide the supply voltage in a form which changes according to a waveform having a period (T), and to translate the potential along at least a part of the length of said channel such that the potential well is translated a distance substantially equal to its length (e.g. axial length in a direction along the channel) in an interval of time substantially equal to the period (T). Preferably, the waveform is:

(a) substantially continuously smooth throughout its period (T); and, (b) substantially constant in value throughout a finite duration of time ($T_L<T$) within said period (T), corresponding to a minimum of the waveform.

In mathematics, a "continuous" function (whether analytical or numerical) is a function that does not have any abrupt changes, breaks or jumps in value, known as discontinuities. The term "continuously smooth" may be understood in to include a reference to this meaning. Preferably, the rate of change of the waveform (e.g. $\partial U/\partial t$ applied to the waveform, U) is substantially continuously smooth throughout its period (T).

Most preferably, the waveform has no waveform maxima throughout the finite duration of time ($T_L<T$). For example, the finite duration of time may contain only one minimum of the waveform. Indeed, the waveform as a whole may contain only one minimum within its period, T.

The supply voltage may comprise a AC voltage that varies in value over time according to the waveform, and does not comprise, or modulate, any underlying RF voltage signal. In this latter case, the potential well is not formed by a pseudo-potential but is formed by a 'real' potential.

The supply voltage may be applied, at an appropriate phase of the waveform, to each of a plurality of the axially segmented bunching electrodes, e.g. forming a group of spatially successive neighbouring electrodes, concurrently during the finite duration of time ($T_L<T$) within said period (T) of the waveform.

The minima of the waveform may be substantially constant in value throughout the aforesaid finite duration of time ($T_L<T$) within the aforesaid period (T), in the sense that it is actually constant, or is effectively or practically constant, or is at least such that it varies insignificantly during the aforesaid finite duration of time ($T_L<T$). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change ($\Delta U$) in the value of the waveform, throughout $T_L$, expressed as a percentage (%) of the amplitude ($U_0$) of the waveform, then preferably: X≤10, or X≤5, or X≤2.5, or X≤1.0, or X≤0.5, or X≤0.25, or X≤0.1, or X≤0.05, X≤0.01.

The finite duration of time ($T_L$) may be such that: $T>T_L\geq T/k$, where k is any positive number (i.e. either a non-integer number or an integer) greater than one (1) (i.e. k>1). Preferably, k≥1.2. Preferably, k≤20, or k≤15, or k≤10. Preferably, for example, 1.2≤k≤8.0.

Defining $\hat{T}_L=100\times T_L/T$, as the duration of $T_L$ expressed as a percentage (%) of the period T, then preferably: $X/\hat{T}_L\leq 2.0$; or more preferably $X/\hat{T}_L\leq 1.0$; or more preferably $X/\hat{T}_L\leq 0.5$; or more preferably $X/\hat{T}_L\leq 0.25$; or more preferably $X/\hat{T}_L\leq 0.1$; or more preferably $X/\hat{T}_L\leq 0.05$; or more preferably $X/\hat{T}_L\leq 0.01$; or more preferably $X/\hat{T}_L\leq 0.001$.

Preferably, the modulus of the first time derivative (∂U/∂t) of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L$<T) within the aforesaid period (T) of the waveform wherein Y=50. For example, 50≥Y≥1.4, or more preferably 10≥Y≥2, or yet more preferably 7≥Y≥3, for example Y may be a value of about 5. In some examples, Y≥1.4. In this sense, the waveform may be said to be substantially constant during the finite duration of time, $T_L$. Preferably, the average value of the modulus of the first time derivative (∂U/∂t) of the waveform (U), throughout the aforesaid finite duration of time ($T_L$<T) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L$<T), in this sense.

Preferably, the value of the first time derivative (i.e. ∂U/∂t) of the waveform (U) is substantially continuous at least during the time interval, $T_L$, within the period (T) of the waveform. Preferably, the value of the first time derivative (i.e. ∂U/∂t) of the waveform is substantially continuous throughout substantially the whole period, T, of the waveform. Preferably, the value of the modulus of the first time derivative of the waveform, of waveform amplitude $U_0$, is such that:

$$\left|\left(\frac{T}{U_0}\right)\frac{\partial U}{\partial l}\right| \leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf).

Preferably, the waveform shape and/or the waveform frequency (i.e. f=1/T, where T is the waveform period) is such that during a predetermined finite time interval, $T_L$, the voltage value of the waveform is not greater than about 10% of the maximum voltage value of the waveform within the period of the waveform, where $T_L\geq T/N$. Here, N is the number of individual bunching electrodes in each subset of bunching electrodes, wherein each subset of bunching electrodes supports a respective period of the waveform. More preferably, this voltage value of the waveform is not greater than about 5% of the maximum voltage value of the waveform during the time interval, $T_L$. Yet more preferably, this voltage value of the waveform is not greater than about 3% of the maximum voltage value of the waveform during the time interval, $T_L$. Even more preferably, this voltage value of the waveform is not greater than about 2%, or preferably about 1%, or about 0.5%, or about 0.25%, or about 0.1% or about 0.01% of the maximum voltage value of the waveform during the time interval, $T_L$. Most preferably, this voltage value of the waveform is substantially zero during the time interval, $T_L$.

Desirably, the waveform is shape is defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+{}^*\xi(2\pi ft+\phi)$$

Here, the function U(2πt/T+Φ) represents the waveform as a periodic modulation function having a period T (sec), phase Φ, and an amplitude $U_0$. The function ξ(2ηft+ϕ) may either be a fast oscillating (e.g. RF) periodic function with frequency f and phase ϕ, or may be constant in value (e.g. analogous to setting: f=0) in cases where no RF component is present within the first supply voltage. For example, the shape of the waveform U(2πt/T+Φ) may, at least in part, comprise the shape of an 'error function' (erf(y)) such that:

$$U\left(2\pi\frac{t}{T}+\Phi\right) \sim (1+\text{erf}(y))/2$$

during at least some of the duration of the period, T, of the waveform, where:

$$\text{erf}(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T). Preferably, the waveform U(2πt/T+Φ) is either always positive in value, or is always negative in value. Preferably, the waveform U(2πt/T+Φ) is a continuous function. Preferably, the waveform U(2πt/T+Φ) has a maxima that is substantially constant in value throughout a finite duration of time ($T_H$<T) within the period (T) of the waveform. This maxima may preferably correspond to a local maxima of the potential well. Preferably, the waveform U(2πt/T+Φ) changes substantially continuously between the time interval $T_H$ and the aforementioned time interval $T_L$, within the period of the waveform, T.

The device may comprise a first power supply unit adapted to provide a first supply voltage to axially segmented bunching electrodes amongst the electrodes so as to create an electric field defining the potential well(s) within the channel, and a separate second power supply unit adapted to provide a second supply voltage to radial confinement electrodes amongst the electrodes so as to create a radially confining electric field within the channel configured to radially confine ions within the channel. This separation of power supply units may permit the voltage signals (e.g. RF and/or voltage waveform and/or AC) applied to the bunching electrodes, and their control, to be independent of the voltage signals (e.g. RF and/or voltage waveform and/or AC) applied to the radial confinement electrodes, and their control. This has advantages in terms of ease of operation, reduced complexity and reduced cost of manufacture.

The power supply unit(s) may be adapted to provide second supply voltage(s) (e.g. RF signals, or non-RF voltage waveforms) to the axially segmented bunching electrodes to create a radially (i.e. transverse to the channel axis) confining potential (e.g. a pseudo-potential, or otherwise) within the channel. The amplitude of the second supply voltage(s) is preferably substantially constant. Preferably, the amplitude of the second supply voltage(s) is not modulated over time. The effect of the second supply voltage(s) applied to radial confinement electrodes, in combination with the presence of the axially segmented bunching electrodes, is to generate a radially confining electric field (potential). The series of electrodes may be configured as a quadrupole ion guide. The radially confining electric field (potential) may be configured as a quadrupole field. The invention is applicable to higher-order fields and ion guides comprising greater number of poles, such as: hexapole, octopole, decapole etc.

The power supply unit(s) may be adapted to generate an RF voltage signal having any desired amplitude (e.g. of several hundred volts) according to techniques readily available to the skilled person and found in the relevant prior art. For example, such a voltage signal may be applied to radial confinement electrodes. The power supply unit(s) may be adapted to generate an RF voltage signal having a square waveform by switching between the two preselected voltage levels at a preselected RF switching frequency. Any one of, or both of, the two preselected voltage levels may be varied with time in any desired manner of rate of time variation, but preferably at a rate that is much slower than the preselected RF switching rate. Accordingly a time variation of any one or both of the preselected voltage levels provides an amplitude modulation envelope of the RF waveform. The time variation may be a time periodic variation. The waveform shape of the amplitude modulation envelope of the RF voltage signal may be any desired shape predetermined by the user. Desirably, the waveform shape of the amplitude modulation envelope may comprise parts in which the amplitude (of the modulation) is substantially constant (e.g. non-zero, or substantially zero) in value during a finite duration of time ($T_L$) within said interval of time (n wherein the finite duration of time ($T_L$) corresponds to the aforesaid local minima. This may be in accord with the invention in its first aspect, as described above.

The power supply unit(s) may comprise any suitable electronic high-frequency switching apparatus readily available to the skilled person (e.g. precisely timed MOSFETs). It means that, in practice, the fast-oscillating RF component of the waveform is not a sinusoidal waveform but rather a square waveform. The RF voltage signal may be provided, for example, by electrically controlling high-frequency (e.g. RF) switches so as to selectively electrically connect respective bunching electrodes alternately to positive and negative power supply rails to provide the RF oscillating component of the waveform.

In a further aspect, the invention may provide an ion guide, or mass filter, or mass analyser, or ion trap, comprising the device described above. In a yet further aspect, the invention may provide a time of flight mass analyser (e.g. an orthogonally acceleration time of flight mass analyser) comprising the device described above.

The device described above implements a corresponding method of manipulating charged particles, which is a further, corresponding aspect of the invention. As such, features of the invention described above in relation to the device are to be understood as implementation of a corresponding method.

Accordingly, in a fourth aspect, the invention may provide a method for manipulating charged particles, the method comprising:

- providing a series of electrodes disposed so as to form a channel for transportation of the charged particles;
- providing a power supply unit(s) and therewith supplying voltages:
  - (a) to axially segmented bunching electrodes amongst the series of electrodes so as to create an electric field defining a potential within said channel, the potential having one or more local minima between local maxima defining a potential well which is translated along at least a part of the length of the channel, and
  - (b) to radial confinement electrodes amongst the series of electrodes so as to create a radially confining electric field within the channel configured to radially confine charged particles within the channel;

providing an axial extraction region comprising electrodes amongst the series of electrodes disposed at least at, or defining, an end of the channel of the device and thereat receiving a the supply voltage to create therewith an electric field defining a pseudo-potential within the channel such that the depth of the potential well varies according to the mass-to-charge ratio (m/z) of the charged particles transported therein and reduces as a local maxima of the potential well is translated axially towards and/or along the axial extraction region thereby to release the transported charged particles of different mass-to-charge ratio (m/z) at different respective times.

The method may include controlling the potential well to comprise a well floor or base containing one or more local minima, bounded by two separate well walls each containing, or defining, a respective one of two of the local maxima with each located at a respective one of two opposite sides of the well floor. The method may include controlling the potential well to comprise a leading local maxima (or leading well wall) and a trailing local maxima (or trailing well wall), wherein the leading local maxima leads, or precedes, the trailing local maxima in the direction of translation of the potential well. In other words, preferably the trailing local maxima (or trailing well wall) follows the leading local maxima (or trailing well wall).

The method may include controlling the value of the potential defining the well floor to be substantially smoothly-varying and preferably comprises only one local minimum. The method may include controlling the local minimum to be continuous with the two well walls bounding it, having substantially no (or at least no substantial) discontinuities in value of in gradient.

The method may include controlling the depth of the potential well to reduce as the potential well is translated axially towards or along the axial extraction region.

This may be achieved by controlling the height of a local maxima of the potential well is reduced as it travels towards and/or through the extraction region: the well depth being defined by the potential difference between the local minima and an adjacent local maxima (e.g. the lowest one). Alternatively, or in addition, this may include controlling the height of a local minima of the potential well is increased as it travels towards and/or through the extraction region: the well depth being defined by the potential difference between the local minima and an adjacent local maxima (e.g. the lowest one).

The reduction in well depth (i.e. reducing a height of a local maxima) may be achieved by the effect of fringing fields in diminishing the height of a leading wall of the advancing potential well, and/or by applying an external DC potential outside the extraction region to diminishing the height of a leading wall of the advancing potential well. The external DC potential may comprise a potential gradient generated between the axial extraction region (e.g. terminal electrodes/output end) and an external electrode(s) located outside of the ion guide beyond the extraction region. The external DC potential may be selected and applied in any suitable manner that achieves the result of diminishing the height of a leading wall of the advancing potential well within the channel defined by the series of electrodes and/or locally beyond the those electrodes as, and immediately after, the advancing potential well exits the channel defined by the series of electrodes and enters the fringing field region formed by the electrodes. The axial extraction region may comprise axially segmented bunching electrodes. The terminal electrodes of the channel may comprise axially segmented bunching electrodes. The method may include controlling the supply voltages to the terminal axially segmented bunching electrodes such that all parts of the travelling potential well ultimately travel to the terminal electrodes of the channel (e.g. such that the preceding parts of the travelling do not stop once succeeding parts have reached the terminal electrodes of the channel). This may ensure that all parts of a travelling potential well travel into, and enter, the fringing field region of the channel.

The reduction in well depth (i.e. increasing a height of the local minima) may be achieved by changes in the dynamical shape of a composite potential well formed by a travelling potential well, which is not a pseudo-potential well, as it abuts and moves up against a separate pseudo potential barrier. This is found to have the effect of raising the height of a floor of the composite potential well as the travelling potential well advances towards the pseudo-potential barrier.

The method may include supplying voltages to the axially segmented bunching electrodes in the form of RF voltage signals. Accordingly, the bunching electrodes so suppled may generate an electric field defining a potential which is a pseudo-potential. This potential may have the aforesaid one or more local minima between local maxima defining the potential well. The segmented bunching electrodes may include the electrodes disposed at least at, or defining, an end of the channel of the device. The method may include supplying voltages in the form of RF voltage signals to electrodes disposed at least at, or defining, an end of the channel of the device such that those electrodes may generate an electric field defining a potential which is a pseudo-potential. This potential may have the aforesaid one or more local minima between local maxima defining the potential well defining which is translated along the length of the extraction region of the channel. In the method RF voltage signals may be supplied to bunching electrodes to generate the potential well and may be concurrently supplied to electrodes disposed at, or defining, the end of the channel to which RF voltage signals are to be supplied. Thus, translation of the pseudo-potential well may progress through the extraction region and to the terminal output end of the channel. In this way, a pseudo-potential travelling well may be translated into the fringing field region of the device.

Alternatively, the method may comprise providing supply voltages to the axially segmented bunching electrodes in the form of voltage waveform signals, as opposed to RF voltage signals. Accordingly, those bunching electrodes so suppled may generate an electric field defining a potential which is not a pseudo-potential. This potential may have the aforesaid one or more local minima between local maxima defining the potential well. The method may include providing supply voltages in the form of RF voltage signals to electrodes disposed at least at, or defining, an end of the channel of the device such that those electrodes may generate an electric field defining a potential which is a pseudo-potential. The method may be such that the voltage waveform signals supplied to bunching electrodes to generate the potential well are not concurrently supplied to electrodes disposed at, or defining, the end of the channel to which RF voltage signals are to be supplied.

The pseudo-potential barrier may be substantially static upon the axis of the channel (e.g. it is not translated along that axis) within the extraction region. The pseudo-potential may be shaped to define a potential barrier on/along the axis of the channel within the extraction region. The potential barrier may define a local pseudo-potential maxima the height or amplitude of which exceeds the value of the potential of the aforesaid one or more local minima of the potential well (e.g. the well floor). Preferably, the potential barrier may define a local pseudo-potential maxima the height or amplitude of which is less than the value of the potential of the aforesaid trailing local maxima of the potential well. Accordingly, the trailing well wall preferably possesses a region, between the local maxima of that wall and the adjacent local minima of the well (e.g. the well floor), along which the value of the potential thereof exceeds the local maximum of the pseudo-potential barrier.

The method may include controlling the travelling potential well to travel up to the pseudo-potential barrier, but to travel no further. The travelling potential well may be controlled to not travel through the pseudo-potential barrier or travel past/beyond it. The travelling potential well formed by voltage waveforms may be translated towards the extraction region so as to meet, intercept, or "wash-up" against, the rising edge of the static pseudo-potential barrier formed within the extraction region. In doing so, a composite potential well is formed from two sections: one section comprises the parts of the travelling potential well (formed by the voltage waveforms) that have not yet reached, but are adjacent to and approaching, the pseudo-potential barrier; the other section is formed by the pseudo-potential barrier.

The composite potential well may comprise a local minimum disposed between two local maxima. One of the local maxima (the voltage waveform potential) may travel towards the other local maxima (the pseudo-potential barrier), which may be static. The rising of the potential of the local minimum may continue until its value coincides with the peak potential of the pseudo-potential barrier whereupon potential well ceases to be a well in the sense that it is no longer the case that a local minimum is bounded by two local maxima.

Preferably, the voltage amplitude, or height, of the trailing inner wall of the travelling potential well formed by voltage waveforms, exceeds the voltage amplitude, or height, of the pseudo-potential barrier. The voltage amplitude of the leading wall of the travelling potential well formed by voltage waveforms, may preferably also exceed the voltage amplitude of the pseudo-potential barrier.

Preferably, the potential gradient of the trailing inner wall of the travelling potential well formed by voltage waveforms, is substantially continuous and finite in value (i.e. does not comprise a step-change in value). The pseudo-potential may have a local maxima defining a peak of the pseudo-potential barrier, which is preferably static within the extraction region. Preferably, the pseudo-potential barrier does not possess a local minima, thereby avoiding the possibility of trapping charged particles within the pseudo-potential barrier.

The method may include providing at the axial extraction region one or more extraction electrodes disposed adjacent to a terminal end of the channel and axially spaced therefrom by an axial spacing defining a voltage an acceleration region and generating a potential gradient therein by applying voltages to the extraction electrode(s) and electrodes disposed at, or defining, the terminal end of the channel of the device.

The method may include providing the one or more extraction electrodes at a position spaced from the electrodes defining the terminal end of the channel of the device such that the potential gradient is formed between the end of the channel and the one or more extraction electrodes. The method may include applying voltages to the extraction electrode(s) and to the terminal end of the channel, to form a potential gradient which urges away from the end of the channel those charged particles that are released from the channel. The method may include providing one or more extraction electrodes may be spaced (e.g. as a grouping or separately) from the terminal end of the channel of the device by a spacing of between about 0.02 m and about 0.005 m, or preferably between about 0.015 m and about 0.005 m, such as about 0.01 m.

The method may include controlling the accelerating potential gradient to be a value between about −7000 V/m and about −100 V/m. Naturally, these voltage values would be positive for negatively charged particles. For example, the potential gradient may be a value between about −7000 V/m and about −2000 V/m. In another example, the potential gradient may be a value between about −2000 V/m and about −100 V/m, or more preferably between about −2000 V/m and about −200 V/m, or yet more preferably between about −1500 V/m and about −200 V/m, or even more preferably between about −1200 V/m and about −300 V/m. The potential gradient may be defined in terms of the spatial gradient of a potential comprising the pseudo-potential extending from/beyond the terminal end of the channel of the device (i.e. within the fringing field region) combined with a DC potential extending from the extraction electrode(s).

The method may include providing a supply voltage to the extraction electrode(s) so as to create an electric field defining a DC potential which is lower in magnitude than a said minima (e.g. any minima) of the one or more local minima of the potential generated by electrodes forming the channel. The method may include supplying to the extraction electrode(s) an accelerating DC voltage. The DC voltage, for positive ions, may be a value of between about −5V and 0V, or between about −4V and 0V, or between about −3V and 0V, or between about −2V and 0V, or between about −1V and 0V. The voltage may be 0V (i.e. no voltage applied, or earth voltage applied). Of course, these voltage values should be positive in polarity instead of negative, when used for negative ions. Other voltage values are possible, as appropriate to circumstances.

The method may include providing one or more charged-particle optical elements (e.g. ion optical element(s), lenses etc.) and receiving thereat charged particles extracted from the extraction region and therewith imposing a convergence of the trajectories of the received charged particles.

The method may include using the extraction electrode(s) as at least a part of an acceleration electrode (also known as a 'pusher' or 'pulser' electrode) within a time-of-flight (ToF) mass spectrometer.

The method may include applying to the acceleration electrode of the time-of-flight (ToF) mass spectrometer a pusher voltage signal configured to generate the electric field at the orthogonal acceleration electrode to achieve the aforementioned flight of charged particles. The pusher voltage signal may be periodic. The pusher voltage signal may controlled to be in synchrony with a periodic voltage signal applied to bunching electrodes for generating the translated potential wells. The method may include controlling the period of the periodic pusher voltage signal to substantially match the period (T) of a periodic voltage signal applied to bunching electrodes for generating the translated potential wells (e.g. the time period between the arrival of successive potential wells at the extraction region). The method may include controlling the phase of the periodic pusher voltage to be out of phase with the phase of the periodic voltage signal applied to bunching electrodes, according to a predetermined phase difference, or phase delay. The predetermined phase difference, or phase delay, may be determined according to the charged particle transit distance, this being the spatial separation between the location of the extraction region (e.g. terminal output end) and the location of the acceleration electrode (e.g. the downstream travel distance from the former to the latter). This may achieve the predetermined timing of the pusher voltage signal, to achieve a synchrony between the time of arrival of the extracted charged particles from the extraction region, and the application of the pusher voltage at the acceleration of the ToF mass spectrometer. For example, the phase delay 8P may be determined as:

$$\delta\Phi = 2\pi\frac{\delta x}{vT}$$

Here, v is the speed of translation of a potential well, T is the period of the periodic voltage signal applied to bunching electrodes, and δx is the amount by which the charged particle transit distance exceeds an integer multiple of the spatial separation between successive potential well (e.g. corresponding locations or features within successive potential wells). Put in other terms, the charged particle transit distance is: $m\times W+\delta x$, where W is the axial length of each potential well (e.g. axial length in a direction along the channel), and m is a positive integer.

The method may include providing supply voltages (e.g. RF signals) to the axially segmented bunching electrodes and therewith creating a potential (e.g. a pseudo-potential, or otherwise) within the channel, the potential having the one or more local minima between local maxima defining a said potential well. The method may include providing supply voltages to successive bunching electrodes defining at least the extraction region of the channel. This supply of voltage signals may be in the manner described above according to the invention in its first aspect. The method may include providing supply voltages (e.g. RF signals) to a plurality of bunching electrodes so as to define a pseudo-potential well (i.e. the potential forming the travelling well is a pseudo-potential) which is translated along at least a part of the length of the channel to, and through, the axial extraction region.

Alternatively, the power supply unit(s) may be adapted to provide supply voltage waveforms to a plurality of bunching electrodes so as to define a potential well from the applied voltage waveforms (i.e. the potential forming the travelling well is not a pseudo-potential, but is formed by voltage waveforms), which is translated along at least a part of the length of the channel towards the axial extraction region. This may supply of voltage signals may be in the manner described above according to the invention in its first aspect. The power supply unit(s) may be adapted to provide supply voltages (e.g. RF signals) to a one or more other electrodes, at the extraction region, so as to create a pseudo-potential within the channel. Preferably, at least some of the electrodes of the extraction region are supplied with voltages (e.g. RF signals) for generating the pseudo-potential barrier (or parts of it), without being supplied simultaneously with voltage waveforms used to generate the travelling potential well.

The method may include providing supply voltage waveforms to bunching electrodes of the plurality of electrodes, so as to form concurrently a plurality of said potential wells spaced along the axis of the channel. Preferably, each of plurality of said potential wells so formed are translated in unison along at least a part of the length of the channel. Preferably, the plurality of potential wells are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

The method may include providing supply periodic voltage waveforms with a waveform frequency (i.e. 1/T, where T is the waveform period) of between about 0.1 kHz and about 20 kHz, to bunching electrodes so as to generate concurrently the plurality of potential wells. Preferably, the waveform frequency is between about 1 kHz and about 4 kHz. The voltage waveforms may define a modulation waveform applied to an RF voltage signal, so as to provide an 'envelope' to the amplitude of the RF voltage signal, or may be applied as a pure voltage waveform alone, or in the absence of an RF voltage signal.

Preferably, the method includes applying substantially the same temporal waveform to each of the plurality of bunching electrodes concurrently, with each bunching electrode receiving the waveform at a phase of the waveform that differs from the phase of the waveform received by neighbouring bunching electrodes. In particular, the waveform is preferably as described above in relation to the first aspect of the invention. For example, the phase of the voltage waveform applied to a given ($n^{th}$) bunching electrode may correspond with a phase of the waveform that is more advanced relative to the phase of the same waveform applied an immediately preceding neighbouring ($[n-1]^{th}$) bunching electrode. Similarly, the phase of the voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the waveform that is at a slightly different phase in its periodic cycle.

Preferably, the method includes applying the voltage waveforms to selected groups or subsets of successive bunching electrodes, being N in number, such that the phase of the voltage waveform applied to the first bunching electrode of a given group is substantially equal to the phase of the voltage waveform applied to the first bunching electrode of an immediately neighbouring group of N bunching electrodes. Preferably, the method includes applying the voltage waveforms to the N bunching electrodes of a given group of bunching electrodes, such that the phase of the waveform applied to a given bunching electrode of that group differs from the phase applied to the immediately succeeding bunching electrode of that group, by a phase difference ($\Delta\phi$) of substantially $\Delta\phi=-360/N$, and simultaneously differs from the phase applied to the immediately preceding bunching electrode of that group, by a phase difference ($\Delta\phi$) of substantially $\Delta\phi=+360/N$. As a result, one full cycle of the waveform plays out across each group of N bunching electrodes at any given time. In particular, in this regard, the waveform is preferably as described above in relation to the first aspect of the invention.

Preferably, the method includes applying the voltage waveforms to generate a plurality of potential wells, the spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrode plates are planar. Preferably, the method includes selectively adjusting the well spacing configuration by adjusting the value of N. For example, preferably, N is equal to or greater than 8 (eight).

Preferably, the waveform frequency is such that the speed of translation, v, of a potential well along the axis of the channel is proportional to: f·L, where f is the modulation frequency (Hz) and L is the spatial separation, along the axis of the channel, between bunching electrodes at which the same value (e.g. same phase) of the applied voltage waveform exists (e.g. $v=f \cdot L$).

The method may comprise providing the supply voltages to axially segmented bunching electrodes in the manner described above in relation to the invention in its first (and second) aspects. For example, the supply voltage may be in a form which changes according to a waveform having a period (T), to translate the potential along at least a part of the length of said channel such that the potential well is translated a distance substantially equal to its length (e.g. axial length in a direction along the channel) in an interval of time substantially equal to the period (T). Preferably, the waveform is:

(a) substantially continuously smooth throughout its period (T); and, (b) substantially constant in value throughout a finite duration of time ($T_L<T$) within said period (T), corresponding to a minimum of the waveform.

Preferably, the rate of change of the waveform (e.g. $\partial U/\partial t$ applied to the waveform, U) is substantially continuously smooth throughout its period (T). Most preferably, the waveform has no waveform maxima throughout the finite duration of time ($T_L<T$). For example, the finite duration of time may contain only one minimum of the waveform. Indeed, the waveform as a whole may contain only one minimum within its period, T.

The method may comprise providing the supply voltage to comprise a AC voltage that varies in value over time according to the waveform, and does not comprise, or modulate, any underlying RF voltage signal. In this latter case, the potential well is not formed by a pseudo-potential but is formed by a 'real' potential.

The supply voltage may be applied, at an appropriate phase of the waveform, to each of a plurality of the axially segmented bunching electrodes, e.g. forming a group of spatially successive neighbouring electrodes, concurrently during the finite duration of time ($T_L<T$) within said period (T) of the waveform.

The minima of the waveform may be substantially constant in value throughout the aforesaid finite duration of time ($T_L$<T) within the aforesaid period (T), in the sense that it is actually constant, or is effectively or practically constant, or is at least such that it varies insignificantly during the aforesaid finite duration of time ($T_L$<T). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change (ΔU) in the value of the waveform, throughout $T_L$, expressed as a percentage (%) of the amplitude ($U_0$) of the waveform, then preferably: X≤10, or X≤5, or X≤2.5, or X≤1.0, or X≤0.5, or X≤0.25, or X≤0.1, or X≤0.05, X≤0.01.

The finite duration of time ($T_L$) may be such that: $T>T_L\geq T/k$, where k is any positive number (i.e. either a non-integer number or an integer) greater than one (1) (i.e. k>1). Preferably, k≥1.2. Preferably, k≤20, or k≤15, or k≤10. Preferably, for example, 1.2≤k≤8.0.

Defining $\hat{T}_L=100\times T_L/T$, as the duration of $T_L$ expressed as a percentage (%) of the period T, then preferably: $X/\hat{T}_L\leq 2.0$; or more preferably $X/\hat{T}_L\leq 1.0$; or more preferably $X/\hat{T}_L\leq 0.5$; or more preferably $X/\hat{T}_L\leq 0.25$; or more preferably $X/\hat{T}_L\leq 0.1$; or more preferably $X/\hat{T}_L\leq 0.05$; or more preferably $X/\hat{T}_L\leq 0.01$; or more preferably $X/\hat{T}_L\leq 0.001$.

Preferably, the modulus of the first time derivative (∂U/∂t) of the waveform (U), having waveform amplitude $U_0$, is such that:

$$\left|\left(\frac{T}{U_0}\right)\frac{\partial U}{\partial t}\right|\leq Y$$

throughout the aforesaid finite duration of time ($T_L$<T) within the aforesaid period (T) of the waveform wherein Y=50. For example, 50≥Y≥1.4, or more preferably 10≥Y≥2, or yet more preferably 7≥Y≥3, for example Y may be a value of about 5. In some examples, Y≥1.4. In this sense, the waveform may be said to be substantially constant during the finite duration of time, $T_L$. Preferably, the average value of the modulus of the first time derivative (∂U/∂t) of the waveform (U), throughout the aforesaid finite duration of time ($T_L$<T) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L$<T), in this sense.

Preferably, the value of the first time derivative (i.e. ∂U/∂t) of the waveform (U) is substantially continuous at least during the time interval, $T_L$, within the period (T) of the waveform. Preferably, the value of the first time derivative (i.e. ∂U/∂t) of the waveform is substantially continuous throughout substantially the whole period, T, of the waveform. Preferably, the value of the modulus of the first time derivative of the waveform, of waveform amplitude $U_0$, is such that:

$$\left|\left(\frac{T}{U_0}\right)\frac{\partial U}{\partial t}\right|\leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf).

Preferably, the waveform shape and/or the waveform frequency (i.e. f=1/T, where T is the waveform period) is such that during a predetermined finite time interval, $T_L$, the voltage value of the waveform is not greater than about 10% of the maximum voltage value of the waveform within the period of the waveform, where $T_L\geq T/N$. Here, N is the number of individual bunching electrodes in each subset of bunching electrodes, wherein each subset of bunching electrodes supports a respective period of the waveform. More preferably, this voltage value of the waveform is not greater than about 5% of the maximum voltage value of the waveform during the time interval, $T_L$. Yet more preferably, this voltage value of the waveform is not greater than about 3% of the maximum voltage value of the waveform during the time interval, $T_L$. Even more preferably, this voltage value of the waveform is not greater than about 2%, or preferably about 1%, or about 0.5%, or about 0.25%, or about 0.1% or about 0.01% of the maximum voltage value of the waveform during the time interval, $T_L$. Most preferably, this voltage value of the waveform is substantially zero during the time interval, $T_L$.

Preferably, the value of the first time derivative (i.e. ∂u/∂t) of the waveform is substantially continuous at least during the time interval, $T_L$.

Desirably, the waveform is shape is defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)*\xi(2\pi ft+\phi)$$

Here, the function U(2πt/T+Φ) represents the waveform as a periodic modulation function having a period T (sec), phase Φ, and an amplitude $U_0$. The function (2πft+ϕ) may either be a fast oscillating (e.g. RF) periodic function with frequency f and phase ϕ, or may be constant in value (e.g. analogous to setting: f=0) in cases where no RF component is present within the first supply voltage. For example, the shape of the waveform U(2πt/T+Φ) may, at least in part, comprise the shape of an 'error function' (erf(y)) such that:

$$U\left(2\pi\frac{t}{T}+\Phi\right)\sim(1+\mathrm{erf}(y))/2$$

during at least some of the duration of the period, T, of the waveform, where:

$$\mathrm{erf}(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T). Preferably, the waveform U(2πt/T+Φ) is either always positive in value, or is always negative in value. Preferably, the waveform U(2πt/T+Φ) is a continuous function. Preferably, the waveform U(2πt/T+Φ) has a maxima that is substantially constant in value throughout a finite duration of time ($T_H$<T) within the period (T) of the waveform. This maxima may preferably correspond to a local maxima of the potential well. Preferably, the waveform U(2πt/T+Φ) changes substantially continuously between the time interval $T_H$ and the aforementioned time interval $T_L$, within the period of the waveform, T.

Preferably, the method includes providing a first power supply unit and therewith providing a first supply voltage to axially segmented bunching electrodes amongst the electrodes so as to create an electric field defining the potential well(s) within the channel, and providing a separate second power supply unit and therewith providing a second supply voltage to radial confinement electrodes amongst the electrodes so as to create a radially confining electric field within the channel configured to radially confine ions within the channel.

In a further aspect, the invention may provide a method for controlling an ion guide, or mass filter, or mass analyser, or ion trap, comprising the method described above. In a yet further aspect, the invention may provide a method for controlling a time of flight mass analyser (e.g. an orthogonally acceleration time of flight mass analyser) comprising the method described above.

In another aspect, the invention may provide a computer-readable medium having computer-executable instructions configured to cause: a mass spectrometry apparatus, or ion guide apparatus, or mass filter apparatus, or mass analyser apparatus, or time of flight mass analyser apparatus, or ion trap apparatus to perform the method as described above. The apparatus may comprise a signal processing unit or may comprise a processor or computer programmed or programmable (e.g. comprising a computer-readable medium containing a computer program) to implement the configured to execute the computer-executable instructions.

A fifth aspect of the present disclosure relates to improvements to the injection of ions in an ion guide for bunched ion transport. In more detail, this aspect of the present disclosure relates to use of new waveforms (as in the first aspect of the disclosure) to simplify and improve the injection of ions into selected potential wells of the device. The main benefit of this aspect of the present disclosure is dramatically simplified electronics as compared to the prior art.

Accordingly, in a fifth aspect, the invention may provide a device for manipulating charged particles, the device comprising:

a series of electrodes disposed so as to form a channel for transportation of the charged particles;

a power supply unit(s) adapted to provide a first supply voltage to axially segmented bunching electrodes amongst said electrodes so as to create an electric field defining a potential within said channel, the potential having one or more local minima between local maxima defining a potential well which is selectively translated along at least a part of the length of said channel;

a power supply unit(s) adapted to provide a second supply voltage to radial confinement electrodes amongst said electrodes so as to create a radially confining electric field within said channel configured to radially confine charged particles within the channel;

wherein electrodes of the series of electrodes define a collection region within the channel for collecting charged particles thereat, and a transport region for transporting collected charged particles from the collection region; and, the power supply unit(s) is adapted to apply to electrodes defining the collection region, the first supply voltage selectively configured to be:

(1) a collection voltage signal to create an electric field defining said potential well within the collection region for collecting charged particles thereat; or (2) a transport voltage signal to create an electric field defining said potential well within the collection region for translating charged particles through the collection region to the transport region;

wherein the collection voltage signal creates an electric field defining a substantially static potential well and the transport voltage creates an electric field defining a said translated potential well.

Preferably, the translated potential well is created by translating the static potential well.

Preferably, the collection voltage signal comprises a voltage waveform the amplitude of which (when comprising a non-RF voltage signal), or modulation envelope of which (when comprising an RF signal), is substantially constant in time (i.e. temporally static, or not time-varying).

Preferably, the power supply unit(s) is adapted selectively to change the collection voltage signal into the transport voltage signal by applying a periodic time variation to the collection voltage signal thereby to translate the potential well created by the collection voltage signal.

Desirably, this change is coordinated with a transport voltage signal applied to electrodes defining the transport region which creates an electric field defining said potential well for translating charged particles through the transport region.

The coordination may be such that the transport voltage signal applied to bunching electrodes defining the terminal end of the collection region, are matched to the value of the transport voltage signal applied to bunching electrodes of the transport region immediately adjacent to the terminal end of the collection region. By being matched, the distribution of transport voltage values applied to bunching electrodes spanning the adjacent ends of the collection region and the transport region, may be consistent with the distribution of transport voltages to bunching electrodes extending along (e.g. all along) the transport region. This coordination may be such that the value of the transport voltage signal applied to bunching electrodes defining the terminal end of the collection region, and any temporal change therein, is coordinated with the value of the transport voltage signal applied to bunching electrodes of the transport region immediately adjacent to the terminal end of the collection region, and any temporal change therein. For example, when the respective transport voltage signals applied to bunching electrodes of the collection region and of the transport region is temporally periodic, and defined by a waveform having a waveform period, T, then coordination is achieved when the first supply voltage is selectively configured to be a collection voltage signal for a duration, Δt, that is substantially equal to an integer multiple of the period of the waveform: Δt=nT, where n=1, 2, 3 . . . etc.

For example, the waveform may be applied concurrently to different bunching electrodes at different respective phases along the periodic cycle of the waveform. Preferably, the difference as between a terminal bunching electrode(s) of the collection region, and a neighbouring bunching electrode of the transport region, is the same as the phase difference as between any two neighbouring bunching electrodes of the collection region and/or of the transport region. In other words, preferably the spatial distribution of phases of the waveform as applied to bunching electrodes located at either side of the join/interface/transition between the collection region and the transport region, is according to a pattern that repeats spatially along the ion guide channel.

For example, N phase steps (N=integer) may be selected which are at equally-spaced phase steps spanning the period of the waveform. Preferably, during the application of the transport voltage signals, N different phases of the voltages applied to respective electrodes of the collection region may be synchronised with N different phases of the voltages applied to electrodes of the transport region. However, during the application of the collection voltage signals, the N phases of the voltages applied to electrodes of the collection region are 'frozen' at any chosen phase angle whilst the N phases of the voltages applied to electrodes of the transport region continue. The N phases of the voltages applied to the collection region are subsequently 'unfrozen' after a time interval nT (n=integer). Likewise, the duration of translation voltages may also have time interval or duration of nT. Different occurrences (i.e. at different times) of the application of the collection voltage signals may have a different respective time intervals mT (m=integer), such that: m≠n. In some implementations, the number of equally-spaced phase steps (different phases) $N_{collect}$ spanning the period of the waveform applied in the collection region, may be different from the number of phases $N_{trans}$ spanning the period of the waveform applied in the transport channel. The number of axially segmented bunching electrodes spanning the collection region may be equal to N, or may be an integer multiple of N.

Desirably, electrodes defining the collection region are adjacent to, or aligned with, or contiguous with, electrodes defining the transport region, such that the collection region is in communication with the transport region. In this way, charged particles collected in the collection region, by electrodes defining the collection region, may be delivered to the transport region when the collection voltage transitions to the transport voltage. The radial confinement electrodes comprised within the collection region may also preferably be axially segmented electrodes (an example of this is referred to as "doubly segmented" herein). Optionally, the first supply voltage signal applied to axially segmented bunching electrodes (and/or the second supply voltage signal applied radial confinement electrodes) of the collection region may comprise a waveform with greater amplitude than the amplitude of voltages applied to axially segmented bunching electrodes (and/or the second supply voltage signal applied radial confinement electrodes) of the transport region.

The first supply voltage signal may comprise a periodic voltage waveform signal (e.g. non-RF signal), or may comprise an RF signal the amplitude of which is modulated by a periodic modulation waveform.

The power supply unit(s) may be adapted to provide first supply voltages (e.g. RF signals) to the axially segmented bunching electrodes to create a potential (e.g. a pseudo-potential, or otherwise) within the channel, the potential having the one or more local minima between local maxima defining a said potential well. The power supply unit(s) may be adapted to provide first supply voltages to successive bunching electrodes defining at least the collection region of the channel. This supply of first voltage supply signals may be in the manner described above according to the invention in its first aspect. For example, the power supply unit(s) may be adapted to provide supply first voltage supply signals (e.g. RF signals) to a plurality of bunching electrodes so as to define a pseudo-potential well (i.e. the potential forming the static or translated well is a pseudo-potential) which is selectively static or translated along at least a part of the length of the collection region.

Alternatively, the power supply unit(s) may be adapted to provide first voltage supply signal waveforms to a plurality of bunching electrodes so as to define a potential well from the applied voltage waveforms (i.e. the potential forming the static or translated well is not a pseudo-potential, but is formed by voltage waveforms), which is selectively static/translated along at least a part of the length of the collection region. This supply of first voltage supply signals may be in the manner described above according to the invention in its first aspect. The power supply unit(s) may be adapted to provide first voltage supply signals (e.g. RF signals) to a one or more other electrodes, at the collection region, so as to create a pseudo-potential within the channel. Preferably, at least some of the electrodes of the collection region are supplied with voltages (e.g. RF signals) for generating the pseudo-potential well (or parts of it), without being supplied simultaneously with voltage waveforms used to generate the translating potential well.

Preferably, the power supply unit(s) may be adapted to provide first voltage supply signal waveforms to bunching electrodes of the plurality of electrodes, so as to form concurrently a single said potential well within the collection region, or optionally a plurality of them spaced along the axis of the channel within the collection region. Preferably, each (if a plurality) said potential wells so formed are static in unison or translated in unison along at least a part of the length of the channel, within the collection region.

Preferably, the power supply unit(s) is adapted to provide first supply voltage signals to axially segmented bunching electrodes amongst said series of electrodes, so as to create an electric field defining a potential within parts of the channel defining the transport region, being other than the collection region. The potential within the transport region may comprise one or more local minima between local maxima defining a potential well which is selectively translated along at least a part of the length of the channel.

The power supply unit(s) may be adapted to supply said first supply voltage signals in the form of said transport voltage signal to electrodes of the transport region to create an electric field defining one or a plurality of translating potential well(s) within the collection region for translating charged particles through the transport region.

Preferably, the plurality of translating potential wells within the transport region are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

Preferably, the power supply unit(s) may be adapted to supply periodic first voltage supply signal waveforms with a waveform frequency (i.e. 1/T, where T is the waveform period) of between about 0.1 kHz and about 20 kHz, to bunching electrodes so as to generate concurrently the plurality of potential wells. Preferably, the waveform frequency is between about 1 kHz and about 4 kHz. The voltage waveforms may define a modulation waveform applied to an RF voltage signal, so as to provide an 'envelope' to the amplitude of the RF voltage signal, or may be applied as a pure voltage waveform alone, or in the absence of an RF voltage signal.

Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. In particular, the voltage waveform is preferably as described above in relation to the first aspect of the invention. For example, the phase of the voltage waveform applied to a given ($n^{th}$) bunching electrode may correspond with a phase of the waveform that is more advanced relative to the phase of the same waveform applied an immediately preceding neighbouring ($[n-1]^{th}$) bunching electrode. Similarly, the phase of the voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the waveform that is at a slightly different phase in its periodic cycle.

Preferably, when the first supply voltage is selectively configured to be:

(1) a collection voltage signal to create an electric field defining said potential well within the collection region for collecting charged particles thereat, then the phase of the voltage waveform applied to each bunching electrode within collection region does not change over time; or (2) a transport voltage signal to create an electric field defining said potential well within the collection region for translating charged particles through the collection region to the transport region, then the phase of the voltage waveform applied to each bunching electrode within collection region does change over time.

In this way, the first voltage supply signals may be controlled to change from being 'static' in time, or in phase, to being changing in time, or in phase, and vice versa.

Similarly, the first supply voltage applied to bunching electrodes of the transport region may be configured to be a transport voltage signal to create an electric field defining said potential well(s) within the transport region for translating charged particles through the transport region, wherein the phase of the voltage waveform applied to each bunching electrode within transport region does change over time.

Preferably, the power supply unit(s) may be adapted to provide the voltage waveforms of the first supply voltage to selected groups or subsets of successive bunching electrodes, being N in number, such that the phase of the voltage waveform applied to the first bunching electrode of a given group is substantially equal to the phase of the voltage waveform applied to the first bunching electrode of an immediately neighbouring group of N bunching electrodes. For example, the power supply unit(s) may be adapted to provide supply the voltage waveforms to the N bunching electrodes of a given group of bunching electrodes, such that the phase of the waveform applied to a given bunching electrode of that group differs from the phase applied to the immediately succeeding bunching electrode of that group, by a phase difference ($\Delta\phi$) of substantially $\Delta\phi=-360/N$, and simultaneously differs from the phase applied to the immediately preceding bunching electrode of that group, by a phase difference ($\Delta\phi$) of substantially $\Delta\phi=+360/N$. As a result, one full cycle of the waveform plays out across each group of N bunching electrodes at any given time. In particular, in this regard, the waveform is preferably as described above in relation to the first aspect of the invention.

Desirably, when the power supply unit(s) may be adapted to provide supply the voltage waveforms of the first supply voltage to generate a plurality of potential wells in the transport region, and to the collection region selectively, the spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrodes are plates or are planar. The power supply unit(s) may be adapted selectively to adjust the well spacing configuration by adjusting the value of N. A larger value of N may be more suitable for channels having a larger lateral dimension or diameter. For example, preferably, N is equal to or greater than 8 (eight).

Preferably, the waveform frequency of the first supply voltage is such that the speed of translation, v, of a potential well along the axis of the channel is proportional to: f·L, where f is the modulation frequency (Hz) and L is the spatial separation, along the axis of the channel, between bunching electrodes at which the same value (e.g. same phase) of the applied voltage waveform exists (e.g. $v=f \cdot L$).

The power supply unit(s) may be adapted to provide the first supply voltage to axially segmented bunching electrodes in the manner described above in relation to the invention in its first (and second) aspects. For example, the power supply unit(s) may be adapted to provide the first supply voltage in a form which changes according to a waveform having a period (T), and to translate the potential along at least a part of the length of said channel such that the potential well is translated a distance substantially equal to its length (e.g. axial length in a direction along the channel) in an interval of time substantially equal to the period (T). Preferably, the waveform is:

(a) substantially continuously smooth throughout its period (T); and, (b) substantially constant in value throughout a finite duration of time ($T_L<T$) within said period (T), corresponding to a minimum of the waveform.

In mathematics, a "continuous" function (whether analytical or numerical) is a function that does not have any abrupt changes, breaks or jumps in value, known as discontinuities. The term "continuously smooth" may be understood in to include a reference to this meaning. Preferably, the rate of change of the waveform (e.g. $\partial U/\partial t$ applied to the waveform, U) is substantially continuously smooth throughout its period (T).

Most preferably, the waveform has no waveform maxima throughout the finite duration of time ($T_L<T$). For example, the finite duration of time may contain only one minimum of the waveform. Indeed, the waveform as a whole may contain only one minimum within its period, T.

The first supply voltage may comprise a AC voltage that varies in value over time according to the waveform, and does not comprise, or modulate, any underlying RF voltage signal. In this latter case, the potential well is not formed by a pseudo-potential but is formed by a 'real' potential. Alternatively, the first supply voltage may comprise an RF voltage signal component with a modulated amplitude that varies in value over time according to the waveform. In this latter case, the potential well is formed by a pseudo-potential.

The supply voltage may be applied, at an appropriate phase of the waveform, to each of a plurality of the axially segmented bunching electrodes, e.g. forming a group of spatially successive neighbouring electrodes, concurrently during the finite duration of time ($T_L<T$) within said period (T) of the waveform.

The minima of the waveform may be substantially constant in value throughout the aforesaid finite duration of time ($T_L<T$) within the aforesaid period (T), in the sense that it is actually constant, or is effectively or practically constant, or is at least such that it varies insignificantly during the aforesaid finite duration of time ($T_L<T$). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change ($\Delta U$) in the value of the waveform, throughout $T_L$, expressed as a percentage (%) of the amplitude ($U_0$) of the waveform, then preferably: $X\leq10$, or $X\leq5$, or $X\leq2.5$, or $X\leq1.0$, or $X\leq0.5$, or $X\leq0.25$, or $X\leq0.1$, or $X\leq0.05$, $X\leq0.01$.

The finite duration of time ($T_L$) may be such that: $T>T_L\geq T/k$, where k is any positive number (i.e. either a non-integer number or an integer) greater than one (1) (i.e. $k>1$). Preferably, $k\geq1.2$. Preferably, $k\leq20$, or $k\leq15$, or $k\leq10$. Preferably, for example, $1.2\leq k\leq8.0$.

Defining $\hat{T}_L=100\times T_L/T$, as the duration of $T_L$ expressed as a percentage (%) of the period T, then preferably: $X/\hat{T}_L\leq2.0$; or more preferably $X/\hat{T}_L\leq1.0$; or more preferably $X/\hat{T}_L\leq0.5$; or more preferably $X/\hat{T}_L\leq0.25$; or more preferably $X/\hat{T}_L\leq0.1$; or more preferably $X/\hat{T}_L\leq0.05$; or more preferably $X/\hat{T}_L\leq0.01$; or more preferably $X/\hat{T}_L\leq0.001$.

Preferably, the modulus of the first time derivative ($\partial U/\partial t$) of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L<T$) within the aforesaid period (T) of the waveform wherein Y=50. For example, $50\geq Y\geq1.4$, or more preferably $10\geq Y\geq2$, or yet more preferably $7\geq Y\geq3$, for example Y may be a value of about 5. In some examples, $Y\geq1.4$. In this sense, the waveform may be said to be substantially constant during the finite duration of time, $T_L$. Preferably, the average value of the modulus of the first time derivative ($\partial U/\partial t$) of the waveform (U), throughout the aforesaid finite duration of time ($T_L<T$) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L<T$), in this sense.

Preferably, the value of the first time derivative (i.e. $\partial U/\partial t$) of the waveform (U) is substantially continuous at least during the time interval, $T_L$, within the period (T) of the waveform. Preferably, the value of the first time derivative (i.e. $\partial U/\partial t$) of the waveform is substantially continuous throughout substantially the whole period, T, of the waveform. Preferably, the value of the modulus of the first time derivative of the waveform, of waveform amplitude $U_0$, is such that:

$$\left|\left(\frac{T}{U_0}\right)\frac{\partial U}{\partial t}\right| \leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf).

Preferably, the waveform shape and/or the waveform frequency of the first supply voltage (i.e. f=1/T, where T is the waveform period) is such that during a predetermined finite time interval, $T_L$, the voltage value of the waveform is not greater than about 10% of the maximum voltage value of the waveform within the period of the waveform, where $T_L\geq T/N$. Here, N is the number of individual bunching electrodes in each subset of bunching electrodes, wherein each subset of bunching electrodes supports a respective period of the waveform. More preferably, this voltage value of the waveform is not greater than about 5% of the maximum voltage value of the waveform during the time interval, $T_L$. Yet more preferably, this voltage value of the waveform is not greater than about 3% of the maximum voltage value of the waveform during the time interval, $T_L$. Even more preferably, this voltage value of the waveform is not greater than about 2%, or preferably about 1%, or about 0.5%, or about 0.25%, or about 0.1% or about 0.01% of the maximum voltage value of the waveform during the time interval, $T_L$. Most preferably, this voltage value of the waveform is substantially zero during the time interval, $T_L$.

Preferably, the value of the first time derivative (i.e. $\partial/\partial t$) of the waveform of the first supply voltage is substantially continuous at least during the time interval, $T_L$. Preferably, the value of the first time derivative (i.e. $\partial/\partial t$) of the waveform of the first supply voltage is substantially continuous during substantially the whole period, T, of the waveform. This has the benefit of preventing unwanted impulses of force upon the charges particles within the potential well.

Desirably, the waveform is shape is defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)*\xi(2\pi ft+\phi)$$

Here, the function $U(2\pi t/T+\Phi)$ represents the waveform as a periodic modulation function having a period T (sec), phase $\Phi$, and an amplitude $U_0$. The function $(2\pi ft+\phi)$ may either be a fast oscillating (e.g. RF) periodic function with frequency f and phase $\phi$, or may be constant in value (e.g. analogous to setting: f=0) in cases where no RF component is present within the first supply voltage. For example, the shape of the waveform $U(2\pi t/T+\Phi)$ may, at least in part, comprise the shape of an 'error function' (erf(y)) such that:

$$U\left(2\pi\frac{r}{T}+\Phi\right) \sim (1+\mathrm{erf}(y))/2$$

during at least some of the duration of the period, T, of the waveform, where:

$$\mathrm{erf}(\gamma)=\frac{1}{\sqrt{\pi}}\int_{-y}^{y}e^{-x^{Z}}dx$$

and the variable y is proportional to (e.g. a function of) t and T. For example, the variable y may be proportional to the ratio t/T (e.g. y~t/T). Preferably, the waveform U(2πt/T+Φ) is either always positive in value, or is always negative in value. Preferably, the waveform U(2πt/T+Φ) is a continuous function. Preferably, the waveform U(2πt/T+Φ) has a maxima that is substantially constant in value throughout a finite duration of time ($T_H$<T) within the period (T) of the waveform. This maxima may preferably correspond to a local maxima of the potential well. Preferably, the waveform U(2πt/T+Φ) changes substantially continuously between the time interval $T_H$ and the aforementioned time interval $T_L$, within the period of the waveform, T.

The device may comprise a first power supply unit adapted to provide the first supply voltage to axially segmented bunching electrodes amongst the electrodes so as to create an electric field defining the potential well(s) within the channel, and a separate second power supply unit adapted to provide a second supply voltage to radial confinement electrodes amongst the electrodes so as to create a radially confining electric field within the channel configured to radially confine ions within the channel. This separation of power supply units may permit the voltage signals (e.g. RF and/or voltage waveform and/or AC) applied to the bunching electrodes, and their control, to be independent of the voltage signals (e.g. RF and/or voltage waveform and/or AC) applied to the radial confinement electrodes, and their control. This has advantages in terms of ease of operation, reduced complexity and reduced cost of manufacture.

The power supply unit(s) may be adapted to provide second supply voltage(s) (e.g. RF signals, or non-RF voltage waveforms) to radial confinement electrodes of the device to create a radially (i.e. transverse to the channel axis) confining potential (e.g. a pseudo-potential, or otherwise) within the channel. The amplitude of the second supply voltage(s) is preferably substantially constant. Preferably, the amplitude of the second supply voltage(s) is not modulated over time. The effect of the second supply voltage(s) applied to radial confinement electrodes, in combination with the presence of the axially segmented bunching electrodes, is to generate a radially confining electric field (potential). The radial confinement electrodes may also be axially segmented, such that at least the collection region, and optionally the transport region, comprises substantially only segmented electrodes. Optionally, each electrode segment of a given segmented electrode may be grouped to be substantially coplanar within a plane perpendicular to the axis of the channel, with a corresponding one of the electrode segments of each of the other segmented electrodes. Alternatively, the radial confinement electrodes may comprise continuous rods. The series of electrodes may be configured as a quadrupole ion guide. The radially confining electric field (potential) may be configured as a quadrupole field. The invention is applicable to higher-order fields and ion guides comprising greater number of poles, such as: hexapole, octopole, decapole etc.

The power supply unit(s) may be adapted to generate an RF voltage signal having any desired amplitude (e.g. of several hundred volts) according to techniques readily available to the skilled person and found in the relevant prior art. For example, such a voltage signal may be applied to radial confinement electrodes. The power supply unit(s) may be adapted to generate an RF voltage signal having a square waveform by switching between the two preselected voltage levels at a preselected RF switching frequency. Any one of, or both of, the two preselected voltage levels may be varied with time in any desired manner of rate of time variation, but preferably at a rate that is much slower than the preselected RF switching rate. Accordingly a time variation of any one or both of the preselected voltage levels provides an amplitude modulation envelope of the RF waveform. The time variation may be a time periodic variation. The waveform shape of the amplitude modulation envelope of the RF voltage signal may be any desired shape predetermined by the user. Desirably, the waveform shape of the amplitude modulation envelope may comprise parts in which the amplitude (of the modulation) is substantially constant (e.g. non-zero, or substantially zero) in value during a finite duration of time ($T_L$) within said interval of time (T) wherein the finite duration of time ($T_L$) corresponds to the aforesaid local minima. This may be in accordance with the invention in its first aspect, as described above.

Each bunching electrode, or at least a group of successive such electrodes, may be supplied with such a modulated RF voltage signal, and successive bunching electrodes may receive a respective such modulated RF voltage signal which is at a different respective phase of a common time-periodic modulation. This is explained in more detail below, and may result in the generation of a spatially varying potential (i.e. the aforementioned potential well) supported across the successive bunching electrodes whereby at any given point in time, each bunching electrode contributes a respective local value of potential to the potential field that extends along the group of bunching electrodes (or all of them) and defines the potential well. The respective local contribution is determined by the value of the modulation waveform applied to the contributing bunching electrode at that time.

By halting, e.g. temporarily, the time-variation of the modulation waveform, one may halt the translational motion of the potential well and preserve its shape and structure according to the value of the modulation waveform that continues to be applied (without time variation) to respective bunching electrodes of the group of electrodes in question (or all of them). One may then resume the time variation of the halted modulation waveform applied to respective bunching electrodes of the group of bunching electrodes (or all bunching electrodes) so as to resume translation motion of the potential well. By reversing the time-variation of the modulation waveform, one may reverse the direction of this translational motion.

The power supply unit(s) may comprise any suitable electronic high-frequency switching apparatus readily available to the skilled person (e.g. precisely timed MOSFETs). It means that, in practice, the fast-oscillating RF component of the waveform is not a sinusoidal waveform but rather a square waveform. The RF voltage signal may be provided, for example, by electrically controlling high-frequency (e.g. RF) switches so as to selectively electrically connect respective bunching electrodes alternately to positive and negative power supply rails to provide the RF oscillating component of the waveform.

In a further aspect, the invention may provide an ion guide, or mass filter, or mass analyser, or ion trap, comprising the device described above.

The device described above implements a corresponding method of manipulating charged particles, which is a further, corresponding aspect of the invention. As such, features of the invention described above in relation to the device are to be understood as implementation of a corresponding method.

Accordingly, in a sixth aspect, the invention may provide a method for manipulating charged particles, the method comprising:

providing a series of electrodes disposed so as to form a channel for transportation of the charged particles;

providing a power supply unit(s) and therewith applying a first supply voltage to axially segmented bunching electrodes amongst said electrodes so as to create an electric field defining a potential within said channel, the potential having one or more local minima between local maxima defining a potential well which is selectively translated along at least a part of the length of said channel;

providing a power supply unit(s) and therewith applying a second supply voltage to radial confinement electrodes amongst said electrodes so as to create a radially confining electric field within said channel configured to radially confine charged particles within the channel;

wherein electrodes of the series of electrodes define a collection region within the channel for collecting charged particles thereat, and a transport region for transporting collected charged particles from the collection region; and, by the power supply unit(s), applying to electrodes defining the collection region, the first supply voltage selectively configured to be:

(1) a collection voltage signal to create an electric field defining said potential well within the collection region for collecting charged particles thereat; or (2) a transport voltage signal to create an electric field defining said potential well within the collection region for translating charged particles through the collection region to the transport region;

wherein the collection voltage signal creates an electric field defining a substantially static potential well and the transport voltage creates an electric field defining a said translated potential well.

Preferably, the method includes creating the translated potential well by translating the static potential well.

Preferably, the collection voltage signal comprises a voltage waveform the amplitude of which (when comprising a non-RF voltage signal), or modulation envelope of which (when comprising an RF signal), is substantially constant in time (i.e. temporally static, or not time-varying).

Preferably, the method includes selectively changing the collection voltage signal into the transport voltage signal by applying a periodic time variation to the collection voltage signal thereby to translate the potential well created by the collection voltage signal.

Desirably, the method includes synchronising this change (e.g. to be in-phase) with a transport voltage signal applied to electrodes defining the transport region which creates an electric field defining said potential well for translating charged particles through the transport region. The synchronisation may be such that the transport voltage signal applied to bunching electrodes defining the terminal end of the collection region, matches the value of the transport voltage signal applied to bunching electrodes of the transport region immediately adjacent to the terminal end of the collection region. This match may be such that the value of the transport voltage signal applied to bunching electrodes defining the terminal end of the collection region, and any temporal change therein, are both substantially the same as the value of the transport voltage signal applied to bunching electrodes of the transport region immediately adjacent to the terminal end of the collection region, and any temporal change therein. For example, the method may include applying a temporally periodic transport voltage signal to the collection region and the transport region, which is defined by a waveform having a waveform period, T, then synchronising by selectively configuring the first supply voltage to be a collection voltage signal for a duration, $\Delta t$, that is substantially equal to an integer multiple of the period of the waveform: $\Delta t = nT$, where n=1, 2, 3 . . . etc.

Preferably, the method includes providing the first supply voltage signal so as to comprise a periodic voltage waveform signal (e.g. non-RF signal), or to comprise an RF signal the amplitude of which is modulated by a periodic modulation waveform.

Preferably, the method includes providing the first supply voltages (e.g. RF signals) to the axially segmented bunching electrodes to create a potential (e.g. a pseudo-potential, or otherwise) within the channel, the potential having the one or more local minima between local maxima defining a said potential well. Preferably, the method includes providing first supply voltages to successive bunching electrodes defining at least the collection region of the channel. This supply of first voltage supply signals may be in the manner described above according to the invention in its first aspect. For example, the method may include providing first voltage supply signals (e.g. RF signals) to a plurality of bunching electrodes so as to define a pseudo-potential well (i.e. the potential forming the static or translated well is a pseudo-potential) which is selectively static or translated along at least a part of the length of the collection region.

Alternatively, the method may include providing first voltage supply signal waveforms to a plurality of bunching electrodes so as to define a potential well from the applied voltage waveforms (i.e. the potential forming the static or translated well is not a pseudo-potential, but is formed by voltage waveforms), which is selectively static/translated along at least a part of the length of the collection region. This supply of first voltage supply signals may be in the manner described above according to the invention in its first aspect. The method may include providing first voltage supply signals (e.g. RF signals) to a one or more other electrodes, at the collection region, so as to create a pseudo-potential within the channel. Preferably, at least some of the electrodes of the collection region are supplied with voltages (e.g. RF signals) for generating the pseudo-potential well (or parts of it), without being supplied simultaneously with voltage waveforms used to generate the translating potential well.

Preferably, the method may include providing first voltage supply signal waveforms to bunching electrodes of the plurality of electrodes, so as to form concurrently a single said potential well within the collection region, or optionally a plurality of them spaced along the axis of the channel within the collection region. Preferably, each (if a plurality) said potential wells so formed are static in unison or translated in unison along at least a part of the length of the channel, within the collection region.

Preferably, the method may include providing first supply voltage signals to axially segmented bunching electrodes amongst said series of electrodes, so as to create an electric field defining a potential within parts of the channel defining the transport region, being other than the collection region. The potential within the transport region may comprise one or more local minima between local maxima defining a potential well which is selectively translated along at least a part of the length of the channel.

The method may include providing said first supply voltage signals in the form of said transport voltage signal to electrodes of the transport region to create an electric field defining one or a plurality of translating potential well(s) within the collection region for translating charged particles through the transport region.

Preferably, the plurality of translating potential wells within the transport region are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

Preferably, the method may include providing periodic first voltage supply signal waveforms with a waveform frequency (i.e. 1/T, where T is the waveform period) of between about 0.5 kHz and about 20 kHz, to bunching electrodes so as to generate concurrently the plurality of potential wells. Preferably, the waveform frequency is between about 1 kHz and about 4 kHz. The voltage waveforms may define a modulation waveform applied to an RF voltage signal, so as to provide an 'envelope' to the amplitude of the RF voltage signal, or may be applied as a pure voltage waveform alone, or in the absence of an RF voltage signal.

Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. In particular, the voltage waveform is preferably as described above in relation to the first aspect of the invention. For example, the phase of the voltage waveform applied to a given ($n^{th}$) bunching electrode may correspond with a phase of the waveform that is more advanced relative to the phase of the same waveform applied an immediately preceding neighbouring ($[n-1]^{th}$) bunching electrode. Similarly, the phase of the voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the waveform that is at a slightly different phase in its periodic cycle.

Preferably, when the first supply voltage selectively configured to be:

(1) a collection voltage signal to create an electric field defining said potential well within the collection region for collecting charged particles thereat, then the phase of the voltage waveform applied to each bunching electrode within collection region does not change overtime; or (2) a transport voltage signal to create an electric field defining said potential well within the collection region for translating charged particles through the collection region to the transport region, then the phase of the voltage waveform applied to each bunching electrode within collection region does change over time.

In this way, the first voltage supply signals may be controlled to change from being 'static' in time, or in phase, to being changing in time, or in phase, and vice versa.

Similarly, the method may include providing the first supply voltage to bunching electrodes of the transport region that is configured to be a transport voltage signal to create an electric field defining said potential well(s) within the transport region for translating charged particles through the transport region, wherein the phase of the voltage waveform applied to each bunching electrode within transport region does change over time.

Preferably, the method may include providing supply the voltage waveforms of the first supply voltage to selected groups or subsets of successive bunching electrodes, being N in number, such that the phase of the voltage waveform applied to the first bunching electrode of a given group is substantially equal to the phase of the voltage waveform applied to the first bunching electrode of an immediately neighbouring group of N bunching electrodes. For example, the method may include providing supply the voltage waveforms to the N bunching electrodes of a given group of bunching electrodes, such that the phase of the waveform applied to a given bunching electrode of that group differs from the phase applied to the immediately succeeding bunching electrode of that group, by a phase difference ($\Delta\phi$) of substantially $\Delta\phi=-360/N$, and simultaneously differs from the phase applied to the immediately preceding bunching electrode of that group, by a phase difference ($\Delta\phi$) of substantially $\Delta\phi=+360/N$. As a result, one full cycle of the waveform plays out across each group of N bunching electrodes at any given time. In particular, in this regard, the waveform is preferably as described above in relation to the first aspect of the invention.

Desirably, when the method includes providing the voltage waveforms of the first supply voltage to generate a plurality of potential wells in the transport region, and to the collection region selectively, the spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrode plates are planar. The power supply unit(s) may be adapted selectively to adjust the well spacing configuration by adjusting the value of N. A larger value of N may be more suitable for channels having a larger lateral dimension or diameter. For example, preferably, N is equal to or greater than 8 (eight).

Preferably, the waveform frequency of the first supply voltage is such that the speed of translation, v, of a potential well along the axis of the channel is proportional to: $f \cdot L$, where f is the modulation frequency (Hz) and L is the spatial separation, along the axis of the channel, between bunching electrodes at which the same value (e.g. same phase) of the applied voltage waveform exists (e.g. $v=f \cdot L$).

The method preferably includes providing the first supply voltage to axially segmented bunching electrodes in the manner described above in relation to the invention in its first (and second) aspects. For example, the method may comprise providing the first supply voltage in a form which changes according to a waveform having a period (T), and to translate the potential along at least a part of the length of said channel such that the potential well is translated a distance substantially equal to its length (e.g. axial length in a direction along the channel) in an interval of time substantially equal to the period (T). Preferably, the waveform is:

(a) substantially continuously smooth throughout its period (T); and, (b) substantially constant in value throughout a finite duration of time ($T_L<T$) within said period (T), corresponding to a minimum of the waveform.

In mathematics, a "continuous" function (whether analytical or numerical) is a function that does not have any abrupt changes, breaks or jumps in value, known as discontinuities. The term "continuously smooth" may be understood in to include a reference to this meaning. Preferably, the rate of change of the waveform (e.g. ∂U/∂t applied to the waveform, U) is substantially continuously smooth throughout its period (T).

Most preferably, the waveform has no waveform maxima throughout the finite duration of time ($T_L$<T). For example, the finite duration of time may contain only one minimum of the waveform. Indeed, the waveform as a whole may contain only one minimum within its period, T.

The first supply voltage may comprise a AC voltage that varies in value over time according to the waveform, and does not comprise, or modulate, any underlying RF voltage signal. In this latter case, the potential well is not formed by a pseudo-potential but is formed by a 'real' potential. Alternatively, the first supply voltage may comprise an RF voltage signal component with a modulated amplitude that varies in value over time according to the waveform. In this latter case, the potential well is formed by a pseudo-potential.

The first supply voltage may be applied, at an appropriate phase of the waveform, to each of a plurality of the axially segmented bunching electrodes, e.g. forming a group of spatially successive neighbouring electrodes, concurrently during the finite duration of time ($T_L$<T) within said period (T) of the waveform.

The minima of the waveform may be substantially constant in value throughout the aforesaid finite duration of time ($T_L$<T) within the aforesaid period (T), in the sense that it is actually constant, or is effectively or practically constant, or is at least such that it varies insignificantly during the aforesaid finite duration of time ($T_L$<T). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change (ΔU) in the value of the waveform, throughout $T_L$, expressed as a percentage (%) of the amplitude ($U_0$) of the waveform, then preferably: X≤10, or X≤5, or X≤2.5, or X≤1.0, or X≤0.5, or X≤0.25, or X≤0.1, or X≤0.05, X≤0.01.

The finite duration of time ($T_L$) may be such that: $T>T_L\geq T/k$, where k is any positive number (i.e. either a non-integer number or an integer) greater than one (1) (i.e. k>1). Preferably, k≥1.2. Preferably, k≤20, or k≤15, or k≤10. Preferably, for example, 1.2≤k≤8.0.

Defining $\hat{T}_L=100\times T_L/T$, as the duration of $T_L$ expressed as a percentage (%) of the period T, then preferably: $X/\hat{T}_L\leq 2.0$; or more preferably $X/\hat{T}_L\leq 1.0$; or more preferably $X/\hat{T}_L\leq 0.5$; or more preferably $X/\hat{T}_L\leq 0.25$; or more preferably $X/\hat{T}_L\leq 0.1$; or more preferably $X/\hat{T}_L\leq 0.05$; or more preferably $X/\hat{T}_L\leq 0.01$; or more preferably $X/\hat{T}_L\leq 0.001$.

Preferably, the modulus of the first time derivative (∂U/∂t) of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L$<T) within the aforesaid period (T) of the waveform wherein Y=50. For example, 50≥Y≥1.4, or more preferably 10≥Y≥2, or yet more preferably 7≥Y≥3, for example Y may be a value of about 5. In some examples, Y≥1.4. In this sense, the waveform may be said to be substantially constant during the finite duration of time, $T_L$. Preferably, the average value of the modulus of the first time derivative (∂U/∂t) of the waveform (U), throughout the aforesaid finite duration of time ($T_L$<T) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L$<T), in this sense.

Preferably, the value of the first time derivative (i.e. ∂U/∂t) of the waveform (U) is substantially continuous at least during the time interval, $T_L$, within the period (T) of the waveform. Preferably, the value of the first time derivative (i.e. ∂U/∂t) of the waveform is substantially continuous throughout substantially the whole period, T, of the waveform. Preferably, the value of the modulus of the first time derivative of the waveform, of waveform amplitude $U_0$, is such that:

$$\left|\left(\frac{T}{U_0}\right)\frac{\partial U}{\partial t}\right| \leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf).

Preferably, the waveform shape and/or the waveform frequency of the first supply voltage (i.e. f=1/T, where T is the waveform period) is such that during a predetermined finite time interval, $T_L$, the voltage value of the waveform is not greater than about 10% of the maximum voltage value of the waveform within the period of the waveform, where $T_L\geq T/N$. Here, N is the number of individual bunching electrodes in each subset of bunching electrodes, wherein each subset of bunching electrodes supports a respective period of the waveform. More preferably, this voltage value of the waveform is not greater than about 5% of the maximum voltage value of the waveform during the time interval, $T_L$. Yet more preferably, this voltage value of the waveform is not greater than about 3% of the maximum voltage value of the waveform during the time interval, $T_L$. Even more preferably, this voltage value of the waveform is not greater than about 2%, or preferably about 1%, or about 0.5%, or about 0.25%, or about 0.1% or about 0.01% of the maximum voltage value of the waveform during the time interval, $T_L$. Most preferably, this voltage value of the waveform is substantially zero during the time interval, $T_L$.

Preferably, the value of the first time derivative (i.e. ∂U/∂t) of the waveform (U) of the first supply voltage is substantially continuous at least during the time interval, $T_L$. Preferably, the value of the first time derivative (i.e. WOO of the waveform of the first supply voltage is substantially continuous during substantially the whole period, T, of the waveform. This has the benefit of preventing unwanted impulses of force upon the charges particles within the potential well.

Desirably, the waveform is shape is defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)^*\xi(2\pi ft+\phi)$$

Here, the function U(2πt/T+Φ) represents the waveform as a periodic modulation function having a period T (sec), phase Φ, and an amplitude $U_0$. The function (2πft+ϕ) may either be a fast oscillating (e.g. RF) periodic function with frequency f and phase ϕ, or may be constant in value (e.g. analogous to setting: f=0) in cases where no RF component is present within the first supply voltage. For example, the shape of the waveform U(2ηt/T+Φ) may, at least in part, comprise the shape of an 'error function' (erf(y)) such that:

$$U\left(2\pi\frac{t}{T}+\Phi\right)\sim(1+erf(y))/2$$

during at least some of the duration of the period, T, of the waveform, where:

$$erf(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T). Preferably, the waveform U(2πft/T+Φ) is either always positive in value, or is always negative in value. Preferably, the waveform U(2πt/T+Φ) is a continuous function. Preferably, the waveform U(2πt/T+Φ) has a maxima that is substantially constant in value throughout a finite duration of time ($T_H$<T) within the period (T) of the waveform. This maxima may preferably correspond to a local maxima of the potential well. Preferably, the waveform U(2πt/T+Φ) changes substantially continuously between the time interval $T_H$ and the aforementioned time interval $T_L$, within the period of the waveform, T.

The method may include providing a first power supply unit and therewith applying the first supply voltage to axially segmented bunching electrodes amongst the electrodes so as to create an electric field defining the potential well(s) within the channel, and a separate second power supply unit and therewith applying a second supply voltage to radial confinement electrodes amongst the electrodes so as to create a radially confining electric field within the channel configured to radially confine ions within the channel.

The method may include providing second supply voltage(s) (e.g. RF signals, or non-RF voltage waveforms) to radial confinement electrodes of the device to create a radially (i.e. transverse to the channel axis) confining potential (e.g. a pseudo-potential, or otherwise) within the channel. The amplitude of the second supply voltage(s) is preferably substantially constant. Preferably, the amplitude of the second supply voltage(s) is not modulated over time. The effect of the second supply voltage(s) applied to radial confinement electrodes, in combination with the presence of the axially segmented bunching electrodes, is to generate a radially confining electric field (potential). The radial confinement electrodes may also be axially segmented, such that at least the collection region, and optionally the transport region, comprises substantially only segmented electrodes. Optionally, each electrode segment of a given segmented electrode may be grouped to be substantially coplanar within a plane perpendicular to the axis of the channel, with a corresponding one of the electrode segments of each of the other segmented electrodes. Alternatively, the radial confinement electrodes may comprise continuous rods. The series of electrodes may be configured as a quadrupole ion guide. The radially confining electric field (potential) may be configured as a quadrupole field. The invention is applicable to higher-order fields and ion guides comprising greater number of poles, such as: hexapole, octopole, decapole etc.

In a further aspect, the invention may provide a method for controlling an ion guide, or mass filter, or mass analyser, or ion trap, comprising the method described above. In a yet further aspect, the invention may provide a method for controlling a time of flight mass analyser (e.g. an orthogonally acceleration time of flight mass analyser) comprising the method described above.

In another aspect, the invention may provide a computer-readable medium having computer-executable instructions configured to cause: a mass spectrometry apparatus, or ion guide apparatus, or mass filter apparatus, or mass analyser apparatus, or time of flight mass analyser apparatus, or ion trap apparatus to perform the method as described above. The apparatus may comprise a signal processing unit or may comprise a processor or computer programmed or programmable (e.g. comprising a computer-readable medium containing a computer program) to implement the configured to execute the computer-executable instructions.

A seventh aspect of the present disclosure relates to an improved structure for bunched ion transport. In more detail, this aspect of the present disclosure relates to a new planar structure to provide ion transport according to the first aspect of the present disclosure. This structure may be realised by PCBs providing greatly simplified manufacture.

In a seventh aspect, the invention may provide a device for manipulating charged particles comprising a guide assembly comprising a series of electrodes disposed so as to form a guiding channel defining an axis for transportation of the charged particles, the guide assembly comprising:

- a bunching electrode assembly comprising:
  - a first array of a plurality of planar bunching electrodes which are disposed so as to be separated axially along the guiding channel; and,
  - a second array of a plurality of planar bunching electrodes which are disposed so as to be separated axially along the guiding channel wherein the second array is disposed so as to be separated from the first array across the axis of the guiding channel;
- a radial confinement electrode assembly comprising a plurality of planar confinement electrodes which are disposed so as to be separated across the axis of the guiding channel to be plane-parallel therewith and to be mutually plane-parallel;
- a power supply unit(s) adapted to provide first supply voltages to bunching electrodes of said first array and of said second array and to provide second supply voltages to said plurality of planar confinement electrodes, so as to create an electric field defining a potential which radially confines charged particles within said guiding channel and has one or more local minima between local maxima defining a potential well which is translated along at least a part of the axis of said guiding channel.

Preferably, the power supply unit(s) is adapted to concurrently provide supply voltages in the form of a modulated voltage waveform and an RF voltage to bunching electrodes of the bunching electrode assembly and to confinement electrodes of the radial confinement electrode assembly.

Preferably, the power supply unit(s) is adapted to concurrently provide supply voltages in the form of a modulating voltage waveform applied to an RF voltage (i.e. to modulate the amplitude of the RF voltage) to bunching electrodes of the bunching electrode assembly.

Preferably, the power supply unit(s) is adapted supply RF voltages to planar confinement electrodes so as to create an electric field defining a pseudo-potential within said guiding channel.

Preferably, the first array of bunching electrodes is spaced from the second array of bunching electrodes by a lateral spacing transverse to the axis of the guiding channel. Preferably, the lateral spacing is uniform along at least a part of the guiding channel. Preferably, successive (e.g. neighbouring) planar bunching electrodes of the first array of planar bunching electrodes are axially separated by an axial spacing, or gap, in a direction parallel to the axis of the guiding channel. Preferably, successive (e.g. neighbouring) planar bunching electrodes of the second array of planar bunching electrodes are axially separated by an axial spacing, or gap, in a direction parallel to the axis of the guiding channel. Preferably, the separation between successive planar bunching electrodes of the first array matches the separation between successive planar bunching electrodes of the second array. Preferably, a given planar bunching electrode of the first array of planar bunching electrodes is axially aligned in register with a corresponding planar bunching electrode of the second array of planar bunching electrodes. Preferably, the lateral spacing between said planes is at least equal to the axial spacing of the said bunching electrodes. More preferably, the lateral spacing is at least two times (2×) the size of the axial spacing. Even more preferably, the lateral spacing is at least three times (3×) the size of the axial spacing. Optionally, in some embodiments, the lateral spacing is at least five times (5×) the size of the axial spacing.

The radial confinement electrode assembly may comprise a third array of confinement electrodes comprising one or more planar confinement electrodes disposed so as to be coplanar to planar bunching electrodes of the first array of bunching electrodes, which are opposed by one or more planar confinement electrodes disposed so as to be coplanar to planar bunching electrodes of the second array of bunching electrodes.

The radial confinement electrode assembly may comprise a fourth array of confinement electrodes comprising one or more planar confinement electrodes disposed so as to be coplanar to planar bunching electrodes of the first array of bunching electrodes, which are opposed by one or more planar confinement electrodes disposed so as to be coplanar to planar bunching electrodes of the second array of bunching electrodes.

Preferably, planar bunching electrodes of the first array of bunching electrodes are disposed between coplanar confinement electrodes of the third array of confinement electrodes and coplanar confinement electrodes of the fourth array of confinement electrodes.

Preferably, planar bunching electrodes of the second array of bunching electrodes are disposed between coplanar confinement electrodes of the third array of confinement electrodes and coplanar confinement electrodes of the fourth array of confinement electrodes.

The third array of confinement electrodes and the fourth array of confinement electrodes may be disposed so as to oppose each other in a direction transverse to (e.g. orthogonal to) the axis of the guiding channel (e.g. in a direction across the axis of the guiding channel). The third array of confinement electrodes and the fourth array of confinement electrodes may each extend along substantially the whole length of the guiding channel. The third array of confinement electrodes and the fourth array of confinement electrodes may each comprise one single (e.g. continuous) respective planar confinement electrode that extends along substantially the whole length of the guiding channel. The two respective single confinement electrodes may be plane parallel.

The third array of confinement electrodes and the fourth array of confinement electrodes may each comprise one pair of two respective continuous planar confinement electrodes. The two respective continuous confinement electrodes of each pair may be mutually plane parallel and may be spaced apart such that one confinement electrode of the pair is adjacent to (e.g. coplanar with) the first array of bunching electrodes, and the other confinement electrode of the pair is adjacent to (e.g. coplanar) the second array of bunching electrodes.

The third array of confinement electrodes and the fourth array of confinement electrodes may each comprise one group of four respective continuous planar confinement electrodes. The four respective continuous confinement electrodes of each group may be mutually plane parallel and may be spaced apart such that two coplanar confinement electrodes of the group are adjacent to (e.g. coplanar with) the first array of bunching electrodes, and the other two coplanar confinement electrodes of the group are adjacent to (e.g. coplanar with) the second array of bunching electrodes. In this way, the first array of bunching electrodes may be coplanar with a first pair of coplanar and parallel continuous confinement electrodes on one side of the first array of planar bunching electrodes, and with a second pair of coplanar and parallel continuous confinement electrodes on the other side of the first array of planar bunching electrodes. Similarly, the second array of bunching electrodes may be coplanar with a third pair of coplanar and parallel continuous confinement electrodes on one side of the second array of planar bunching electrodes, and with a fourth pair of coplanar and parallel continuous confinement electrodes on the other side of the second array of planar bunching electrodes. This arrangement enhances radial confinement potentials.

Preferably, the planar bunching electrodes of the second array are disposed so as to be plane-parallel to the planar bunching electrodes of the first array of planar bunching electrodes. Preferably, the planar bunching electrodes of the second array of planar bunching electrodes are disposed so as to be mutually co-planar. Preferably, the planar bunching electrodes of the first array of planar bunching electrodes are disposed so as to be mutually co-planar. Preferably, the planar electrodes of the first array of planar bunching electrodes and the planar electrodes of the second array of planar bunching electrodes are disposed so as to be plane-parallel to the axis of the guiding channel.

Preferably, a planar electrode of the first array of planar bunching electrodes and a planar electrode of the second array of planar bunching electrodes are disposed so as reside in a common plane that is transverse to the axis of the guiding channel. Preferably, each planar electrode of the first array of planar bunching electrodes is arranged to be coplanar with a respective planar electrode of the second array of planar bunching electrodes, wherein the common respective plane thereof is transverse to the axis of the guiding channel. The transverse plane is preferably perpendicular to the axis of the guiding channel.

Preferably, the planar bunching electrodes of the second array are disposed so as to be axially spaced to be non-coplanar and mutually plane-parallel. Preferably, the planar bunching electrodes of the first array are disposed so as to be axially spaced to be non-coplanar and mutually plane-parallel.

Preferably, the planar electrodes of the first array of planar bunching electrodes and the planar electrodes of the second array of planar bunching electrodes are disposed such that the first array is parallel to the second array and such that the first array of planar bunching electrodes opposes the second array of planar bunching electrodes across a lateral separation defining a width of the guiding channel.

Preferably, the third array of confinement electrodes is segmented to define an array of a plurality of electrode segments extending in a direction parallel to the axis of the guiding channel. Preferably, the third array of confinement electrodes is segmented to define an array of a plurality of electrode segments extending in a direction parallel to the axis of the guiding channel.

The confinement electrodes may be segmented in the same manner as the segmentation of the first of planar bunching electrodes and/or the second of planar bunching electrodes.

Desirably, the power supply unit(s) is adapted to supply bunching voltages only to bunching electrodes of said first array and of said second array so as to create an electric field defining said potential well.

Desirably, the power supply unit(s) is adapted to supply radial confinement voltages only to said plurality of planar confinement electrodes so as to create an electric field defining a potential within said guiding channel which radially confines charged particles within the channel.

The power supply unit(s) may be adapted to provide first supply voltages (e.g. RF signals, or non-RF voltage waveforms) to the axially segmented bunching electrodes to create a potential (e.g. a pseudo-potential, or otherwise) within the channel, the potential having the one or more local minima between local maxima defining a said potential well. For example, the power supply unit(s) may be adapted to provide first supply voltages (e.g. RF signals) to a plurality of bunching electrodes so as to define a pseudo-potential well (i.e. the potential forming the travelling well is a pseudo-potential) which is translated along at least a part of the length of the channel.

Alternatively, the power supply unit(s) may be adapted to provide first supply voltage waveforms (e.g. non-RF signals) to a plurality of bunching electrodes so as to define a potential well from the applied first supply voltage waveforms (i.e. the potential forming the travelling well is not a pseudo-potential, but is formed by voltage waveforms), which is translated along at least a part of the length of the channel. The power supply unit(s) may be adapted to provide second supply voltage(s) (e.g. RF signals, or non-RF voltage waveforms) to the axially segmented bunching electrodes to create a radially (i.e. transverse to the channel axis) confining potential (e.g. a pseudo-potential, or otherwise) within the channel. The amplitude of the second supply voltage(s) is preferably substantially constant. Preferably, the amplitude of the second supply voltage(s) is not modulated over time. The effect of the second supply voltage(s) applied to radial confinement electrodes, in combination with the presence of the axially segmented bunching electrodes, is to generate a radially confining electric field (potential). The series of electrodes may be configured as a quadrupole ion guide. The radially confining electric field (potential) may be configured as a quadrupole field. The invention is applicable to higher-order fields and ion guides comprising greater number of poles, such as: hexapole, octopole, decapole etc.

The power supply unit(s) may comprise a first power supply unit(s) adapted to provide first supply voltage(s), and a separate second power supply unit(s) adapted to provide second supply voltage(s). This separation of power supply units may permit the voltage signals (e.g. RF and/or voltage waveform and/or AC) applied to the bunching electrodes, and their control, to be independent of the voltage signals (e.g. RF and/or voltage waveform and/or AC) applied to the radial confinement electrodes, and their control. This has advantages in terms of ease of operation, reduced complexity and reduced cost of manufacture.

Desirably, the local minima is surrounded by a first local maxima located on a first side of the minima and a second local maxima located on a second, opposite, side of the local minima. The potential well may comprise a well floor or base containing one or more local minima, bounded by two separate well walls each containing, or defining, a respective one of two of the local maxima with each located at a respective one of two opposite sides of the well floor. The potential well may comprise a leading local maxima (or leading well wall) and a trailing local maxima (or trailing well wall), wherein the leading local maxima leads, or precedes, the trailing local maxima in the direction of translation of the potential well. In other words, preferably the trailing local maxima (or trailing well wall) follows the leading local maxima (or trailing well wall).

The value of the potential defining the well floor is preferably substantially smoothly-varying and preferably comprises only one local minimum. This enables charged particles within the potential to be desirably located at the one local minimum within the well, thereby accurately defining their position during transport through the channel, and extraction from it. The local minimum is preferably continuous with the two well walls bounding it, having substantially no (or at least no substantial) discontinuities in value or in gradient.

Preferably, the power supply unit(s) may be adapted to provide first supply voltage waveforms to bunching electrodes of the plurality of electrodes, so as to form concurrently a plurality of said potential wells spaced along the axis of the channel. Preferably, each of plurality of said potential wells so formed are translated in unison along at least a part of the length of the channel. Preferably, the plurality of potential wells are substantially equally spaced, neighbour-to-neighbour, in an array of potential wells. For example, the axial separation between the local minimum (and/or a local maximum, or other feature) of a given potential well and the local minimum (e.g. the equivalent feature or structure) of an immediately adjacent potential well, is substantially the same for each of the plurality of potential wells.

Preferably, the power supply unit(s) may be adapted to provide periodic first supply voltage waveforms with a waveform frequency (i.e. 1/T, where T is the waveform period) of between about 0.1 kHz and about 20 kHz, to bunching electrodes so as to generate concurrently the plurality of potential wells. Preferably, the waveform frequency is between about 1 kHz and about 4 kHz. The first supply voltage waveforms may define a modulation waveform applied to an RF voltage signal, so as to provide an 'envelope' to the amplitude of the RF voltage signal, or may be applied as a pure voltage waveform alone, or in the absence of an RF voltage signal.

Preferably, the power supply unit(s) may be adapted to supply the first supply voltage waveform to each respective bunching electrode of segmented electrodes such that it is time-shifted, or phase-shifted, compared with the voltage waveform concurrently supplied to adjacent electrodes. Preferably, substantially the same temporal waveform is applied to each of the plurality of bunching electrodes concurrently, with each bunching electrode receiving the waveform at a phase of the waveform that differs from the phase of the waveform received by neighbouring bunching electrodes. For example, the phase of the first supply voltage waveform applied to a given ($n^{th}$) bunching electrode may correspond with a phase of the waveform that is more advanced relative to the phase of the same waveform applied an immediately preceding neighbouring ($[n-1]^{th}$) bunching electrode. Similarly, the phase of the first supply voltage waveform applied to a given ($n^{th}$) bunching electrode may correspond with a phase of the waveform that is less advanced relative to the phase of the same waveform applied an immediately succeeding neighbouring ($[n+1]^{th}$) bunching electrode. In this way, each bunching electrode may be driven to receive the same voltage waveform, over time, but each bunching electrode is 'fed' a version of the first supply voltage waveform that is at a slightly different phase in its periodic cycle.

Preferably, the power supply unit(s) may be adapted to provide the first supply voltage waveforms to selected groups or subsets of successive bunching electrodes, being N in number, such that the phase of the first supply voltage waveform applied to the first bunching electrode of a given group is substantially equal to the phase of the first supply voltage waveform applied to the first bunching electrode of an immediately neighbouring group of N bunching electrodes. For example, the power supply unit(s) may be adapted to provide supply the first supply voltage waveforms to the N bunching electrodes of a given group of bunching electrodes, such that the phase of the waveform applied to a given bunching electrode of that group differs from the phase of the waveform applied to the immediately succeeding bunching electrode of that group, by a phase difference ($\Delta\phi$) of substantially $\Delta\phi=-360/N$, and simultaneously differs from the phase of the waveform applied to the immediately preceding bunching electrode of that group, by a phase difference ($\Delta\phi$) of substantially $\Delta\phi=+360/N$. As a result, one full cycle of the waveform plays out across each group of N bunching electrodes at any given time.

Desirably, the power supply unit(s) may be adapted to provide the first supply voltage waveforms to generate a plurality of potential wells. The spacing of neighbouring potential wells may be configured in relation to the lateral dimensions, or size, of the channel defined by the plurality of electrodes. For example, the lateral dimension may be the inscribed diameter of the channel, or the perpendicular separation between opposing electrodes if those electrode plates are planar. The power supply unit(s) may be adapted selectively to adjust the well spacing configuration by adjusting the value of N. The inventors have found that the correct choice of N can, for example, lead to better resolution in the discrimination of the masses of charged particles extracted from the device. For example, preferably, N is equal to or greater than 8 (eight).

Preferably, the waveform frequency of the first supply voltage waveforms is such that the speed of translation, v, of a potential well along the axis of the channel is proportional to: f·L, where f is the modulation frequency (Hz) and L is the spatial separation, along the axis of the channel, between bunching electrodes at which the same value (e.g. same phase) of the applied first supply voltage waveforms voltage waveform exists (e.g. v=f·L).

The power supply unit(s) may be adapted to provide the first supply voltage to axially segmented bunching electrodes in the manner described above in relation to the invention in its first (and second) aspects. For example, the power supply unit(s) may be adapted to provide the first supply voltage in a form which changes according to a waveform having a period (T), and to translate the potential along at least a part of the length of said channel such that the potential well is translated a distance substantially equal to its length (e.g. axial length in a direction along the channel) in an interval of time substantially equal to the period (T). Preferably, the waveform is:

(a) substantially continuously smooth throughout its period (T); and, (b) substantially constant in value throughout a finite duration of time ($T_L<T$) within said period (T), corresponding to a minimum of the waveform.

In mathematics, a "continuous" function (whether analytical or numerical) is a function that does not have any abrupt changes, breaks or jumps in value, known as discontinuities. The term "continuously smooth" may be understood in to include a reference to this meaning. Preferably, the rate of change of the waveform (e.g. $\partial U/\partial t$ applied to the waveform, U) is substantially continuously smooth throughout its period (T).

Most preferably, the waveform has no waveform maxima throughout the finite duration of time ($T_L<T$). For example, the finite duration of time may contain only one minimum of the waveform. Indeed, the waveform as a whole may contain only one minimum within its period, T.

The first supply voltage may comprise a AC voltage that varies in value over time according to the waveform, and does not comprise, or modulate, any underlying RF voltage signal. In this latter case, the potential well is not formed by a pseudo-potential but is formed by a 'real' potential. Alternatively, the first supply voltage may comprise an RF voltage signal component with a modulated amplitude that varies in value over time according to the waveform. In this latter case, the potential well is formed by a pseudo-potential.

The supply voltage may be applied, at an appropriate phase of the waveform, to each of a plurality of the axially segmented bunching electrodes, e.g. forming a group of spatially successive neighbouring electrodes, concurrently during the finite duration of time ($T_L<T$) within said period (T) of the waveform.

The minima of the waveform may be substantially constant in value throughout the aforesaid finite duration of time ($T_L<T$) within the aforesaid period (T), in the sense that it is actually constant, or is effectively or practically constant, or is at least such that it varies insignificantly during the aforesaid finite duration of time ($T_L<T$). The waveform may be said to vary insignificantly if the variation corresponds to a change in the value of the waveform, throughout $T_L$, of no more than a predefined percentage or proportion of the maximum variation between extreme values of the waveform, within the period (T) of the waveform (e.g. as a proportion of the peak-to-peak waveform amplitude $U_0$, or of the difference between its lowest value and its greatest value). For example, defining: $X=100\times\Delta U/U_0$, as the maximum permissible change ($\Delta U$) in the value of the waveform, throughout $T_L$, expressed as a percentage (%) of the amplitude ($U_0$) of the waveform, then preferably: X≤10, or X≤5, or X≤2.5, or X≤1.0, or X≤0.5, or X≤0.25, or X≤0.1, or X≤0.05, X≤0.01.

The finite duration of time ($T_L$) may be such that: $T>T_L\geq T/k$, where k is any positive number (i.e. either a non-integer number or an integer) greater than one (1) (i.e. k>1). Preferably, k≥1.2. Preferably, k≤20, or k≤15, or k≤10. Preferably, for example, 1.2≤k≤8.0.

Defining $\hat{T}_L=100\times T_L/T$, as the duration of $T_L$ expressed as a percentage (%) of the period T, then preferably: $X/\hat{T}_L\leq 2.0$; or more preferably $X/\hat{T}_L\leq 1.0$; or more preferably $X/\hat{T}_L<0.5$; or more preferably $X/\hat{T}_L<0.25$; or more preferably $X/\hat{T}_L\leq 0.1$; or more preferably $X/\hat{T}_L\leq 0.05$; or more preferably $X/\hat{T}_L\leq 0.01$; or more preferably $X/\hat{T}_L\leq 0.001$.

Preferably, the modulus of the first time derivative (WOO of the waveform (U), having waveform amplitude $U_0$, is such that:

$$\left|\left(\frac{T}{U_0}\right)\frac{\partial U}{\partial t}\right| \leq Y$$

throughout the aforesaid finite duration of time ($T_L<T$) within the aforesaid period (T) of the waveform wherein Y=50. For example, 50≥Y≥1.4, or more preferably 10≥Y≥2, or yet more preferably 7≥Y≥3, for example Y may be a value of about 5. In some examples, Y≥1.4. In this sense, the waveform may be said to be substantially constant during the finite duration of time, $T_L$. Preferably, the average value of the modulus of the first time derivative (∂U/∂t) of the waveform (U), throughout the aforesaid finite duration of time ($T_L<T$) does not exceed the value Y. Preferably, the average value of this modulus does not exceed 0.5Y, or preferably 0.25Y, or preferably 0.1Y, or preferably 0.05Y, or preferably 0.01Y, or preferably 0.001Y, throughout the aforesaid finite duration of time ($T_L$). The minimum of the waveform may be substantially constant in value, throughout the aforesaid finite duration of time ($T_L<T$), in this sense.

Preferably, the value of the first time derivative (i.e. ∂U/∂t) of the waveform (U) is substantially continuous at least during the time interval, $T_L$, within the period (T) of the waveform. Preferably, the value of the first time derivative (i.e. woo of the waveform is substantially continuous throughout substantially the whole period, T, of the waveform. Preferably, the value of the modulus of the first time derivative of the waveform, of waveform amplitude $U_0$, is such that:

$$\left|\left(\frac{T}{U_0}\right)\frac{\partial U}{\partial t}\right| \leq 100$$

throughout the aforesaid period (T) of the waveform. More preferably, this modulus may be no greater than 75, or more preferably no greater than 50, or more preferably no greater than 20, or more preferably between about 10 and about 15, such as about 12. Preferably, the waveform (U) comprises, or is at least partially defined according to, an 'error function' (erf).

Preferably, the first supply voltage waveform shape and/or the waveform frequency (i.e. f=1/T, where T is the waveform period) is such that during a predetermined finite time interval, $T_L$, the voltage value of the waveform is not greater than about 10% of the maximum voltage value of the first supply voltage waveform within the period of the waveform, where $T_L\geq T/N$. Here, N is the number of individual bunching electrodes in each subset of bunching electrodes, wherein each subset of bunching electrodes supports a respective period of the first supply voltage waveform. More preferably, this voltage value of the first supply voltage waveform is not greater than about 5% of the maximum voltage value of the waveform during the time interval, $T_L$. Yet more preferably, this voltage value of the first supply voltage waveform is not greater than about 3% of the maximum voltage value of the waveform during the time interval, $T_L$. Even more preferably, this voltage value of the first supply voltage waveform is not greater than about 2%, or preferably about 1%, or about 0.5%, or about 0.25%, or about 0.1% or about 0.01% of the maximum voltage value of the first supply voltage waveform during the time interval, $T_L$. Most preferably, this voltage value of the first supply voltage waveform is substantially zero during the time interval, $T_L$.

Preferably, the value of the first time derivative (i.e. ∂U/∂t) of the first supply voltage waveform is substantially continuous at least during the time interval, $T_L$. Preferably, the value of the first time derivative (i.e. ∂U/∂t) of the first supply voltage waveform is substantially continuous during substantially the whole period, T, of the waveform. This has the benefit of preventing unwanted impulses of force upon the charges particles within the potential well.

Desirably, the waveform is shape is defined in terms of a mathematical function. The mathematical function may comprise an analytical function (i.e. expressed as a mathematical equation) or may be a numerical function. Preferably, the first supply voltage may take the form:

$$V(f,T,t)=U(2\pi t/T+\Phi)*\xi(2\pi ft+\phi)$$

Here, the function U(2πt/T+Φ) represents the waveform as a periodic modulation function having a period T (sec), phase P, and an amplitude $U_0$. The function ξ(2πft+ϕ) may either be a fast oscillating (e.g. RF) periodic function with frequency f and phase ϕ, or may be constant in value (e.g. analogous to setting: f=0) in cases where no RF component is present within the first supply voltage. For example, the shape of the waveform U(2πt/T+Φ) may, at least in part, comprise the shape of an 'error function' (erf(y)) such that:

$$U\left(2\pi\frac{t}{T}+\Phi\right)\sim(1+erf(y))/2$$

during at least some of the duration of the period, T, of the waveform, where:

$$erf(y)=\frac{1}{\sqrt{\pi}}\int_{-y}^{y}e^{-x^2}dx$$

and the variable y is proportional to (e.g. a function of) t and T. For example, the variable y may be proportional to the ratio t/T (e.g. y~t/T). Preferably, the waveform U(2πt/T+Φ) is either always positive in value, or is always negative in value. Preferably, the waveform U(2πt/T+Φ) is a continuous function. Preferably, the waveform U(2πt/T+Φ) has a maxima that is substantially constant in value throughout a finite duration of time ($T_N<T$) within the period (T) of the waveform. This maxima may preferably correspond to a local maxima of the potential well. Preferably, the waveform U(2πt/T+Φ) changes substantially continuously between the time interval $T_H$ and the aforementioned time interval $T_L$, within the period of the waveform, T.

Preferably, the device comprises an extraction electrode assembly and an extraction voltage supply unit configured to selectively apply an extraction voltage to the extraction electrode assembly therewith to extract charged particles from the guiding channel. The extraction electrode assembly may comprise one or more of the bunching electrodes of the first and/or second array of bunching electrodes, and/or may comprise one or more radial confinement electrodes of the radial confinement electrode assembly.

The extraction voltage supply unit may be configured to apply the extraction voltage to the extraction electrode assembly therewith to apply a force to charged particles to extract them in a direction transverse (e.g. perpendicular, or orthogonal) to the guiding channel. The extraction direction may be perpendicular to a plane containing the first or second array of bunching electrodes. The extraction direction may be parallel to a plane containing the first or second array of bunching electrodes.

Orthogonal extraction may be conveniently performed in either lateral direction. Charged particles may be either extracted from the device through slits/apertures formed in the planar electrodes of the extraction electrode assembly, or through a mesh electrode of the extraction electrode assembly. In some embodiments the mesh electrode may be formed within the electrodes of the first or second array of bunching electrodes or within multiple electrodes of the first or second array of bunching electrodes.

Orthogonal extraction of charged particles from the ion guide may be made more convenient due to the planar structure of the electrodes. The extraction electrode assembly may comprise an ion-optical lens in proximity to the guiding channel. This is beneficial for minimising aberrations in the extraction optics, because the planar nature of the electrodes of the guiding channel permits closer proximity of the lens than would otherwise be the case.

The extraction voltage supply unit may be configured to apply the extraction voltage to the extraction electrode assembly therewith to apply a force to charged particles to extract them in a direction parallel (e.g. axially) to the guiding channel.

The device described above implements a corresponding method of manipulating charged particles, which is a further, corresponding aspect of the invention. As such, features of the invention described above in relation to the device are to be understood as implementation of a corresponding method.

Accordingly, in an eighth aspect, the invention may provide a method for manipulating charged particles comprising a guide assembly comprising a series of electrodes disposed so as to form a guiding channel defining an axis for transportation of the charged particles, the method comprising:

- providing a bunching electrode assembly comprising:
  - a first array of a plurality of planar bunching electrodes which are disposed so as to be separated axially along the guiding channel; and,
  - a second array of a plurality of planar bunching electrodes which are disposed so as to be separated axially along the guiding channel wherein the second array is disposed so as to be separated from the first array across the axis of the guiding channel;
- providing a radial confinement electrode assembly comprising a plurality of planar confinement electrodes which are disposed so as to be separated across the axis of the guiding channel to be plane-parallel therewith and to be mutually plane-parallel;
- providing a power supply unit(s) adapted and therewith applying first supply voltages to bunching electrodes of said first array and of said second array and applying second supply voltages to said plurality of planar confinement electrodes, so as to create an electric field defining a potential which radially confines charged particles within said guiding channel and has one or more local minima between local maxima defining a potential well which is translated along at least a part of the axis of said guiding channel.

It is to be understood that any feature of the invention according to any one of the aspects of the invention described above, may be applied to the invention as defined by any other aspect of the invention described above, unless the context otherwise provides.

The terms "electric field defining a potential" herein may be taken to include at least, but not exclusively, a reference to an electrical potential field, or an electrical potential or simply a potential. These abbreviated terms are often used in the art synonymously. The field may exist in, and extend through, free space such that the values (voltage) of the field at different spatial coordinates may define the shape of the field through space. This is to be contrasted with a voltage applied to an electrode.

The term "RF" herein is an abbreviation of the term "radio frequency". This term may preferably be given the meaning applied to it in the art, unless the context herein requires otherwise.

The term "waveform" herein may be taken to include at least, but not exclusively, a reference to a quantity (e.g. a voltage) that varies in value in a periodic or wave-like manner. A "voltage waveform" herein may be understood in this context. Where the context provides, a reference to a "voltage waveform" may be taken to include a reference to a periodic or wavelike variation in a voltage that is not an RF voltage signal, but changes much more slowly over time, as would be readily understood by the person skilled in the art. This may include a "voltage waveform" which is a modulation to, or an envelope function of, a modulated RF voltage, or may include a pure "voltage waveform" having no underlying RF signal component.

The terms "bunching electrode" herein may be taken to include at least, but not exclusively, a reference to an electrode, amongst a segmented array of a plurality of such electrodes, to which voltage waveform signals and/or RF voltage signals (which may be modulated) may be applied to individually generate electrical potential fields which combine with other such electrodes to collectively generate one or more electrical potential fields (e.g. a potential well) shaped to spatially "bunch" charged particles within them (herein referred to as "bunching potentials"). Some non-limiting but relevant structural examples were provided in U.S. Pat. No. 9,536,721B2.

SUMMARY OF THE FIGURES

Embodiments and experiments illustrating the principles of the invention will now be discussed with reference to the accompanying figures in which.

DETAILED DESCRIPTION OF THE INVENTION

Figure 1:
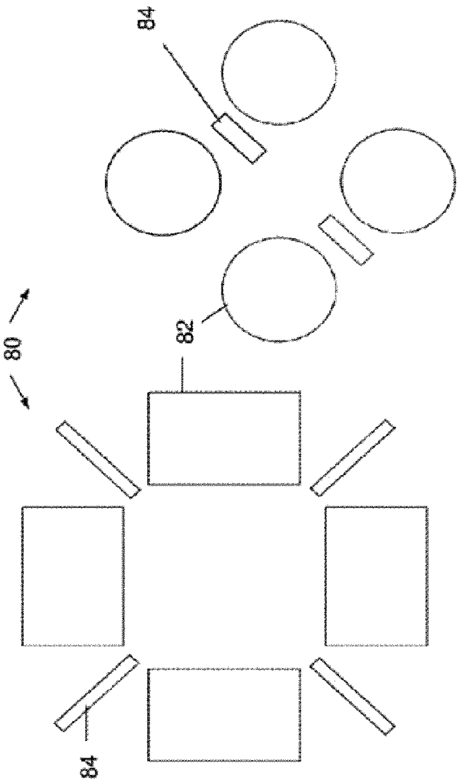
FIG. 1 (Prior art)
FIG. 1 relates to the prior art disclosure of US2014/0070087A1.
Figure 2:
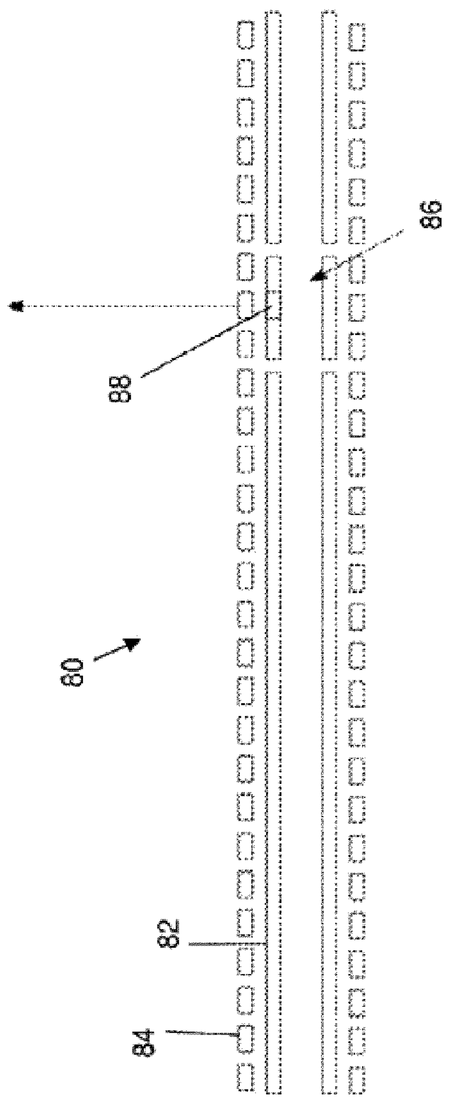
FIG.2 (Prior art)
FIG. 2 relates to the prior art disclosure of US2014/0070087A1.
Figure 3:
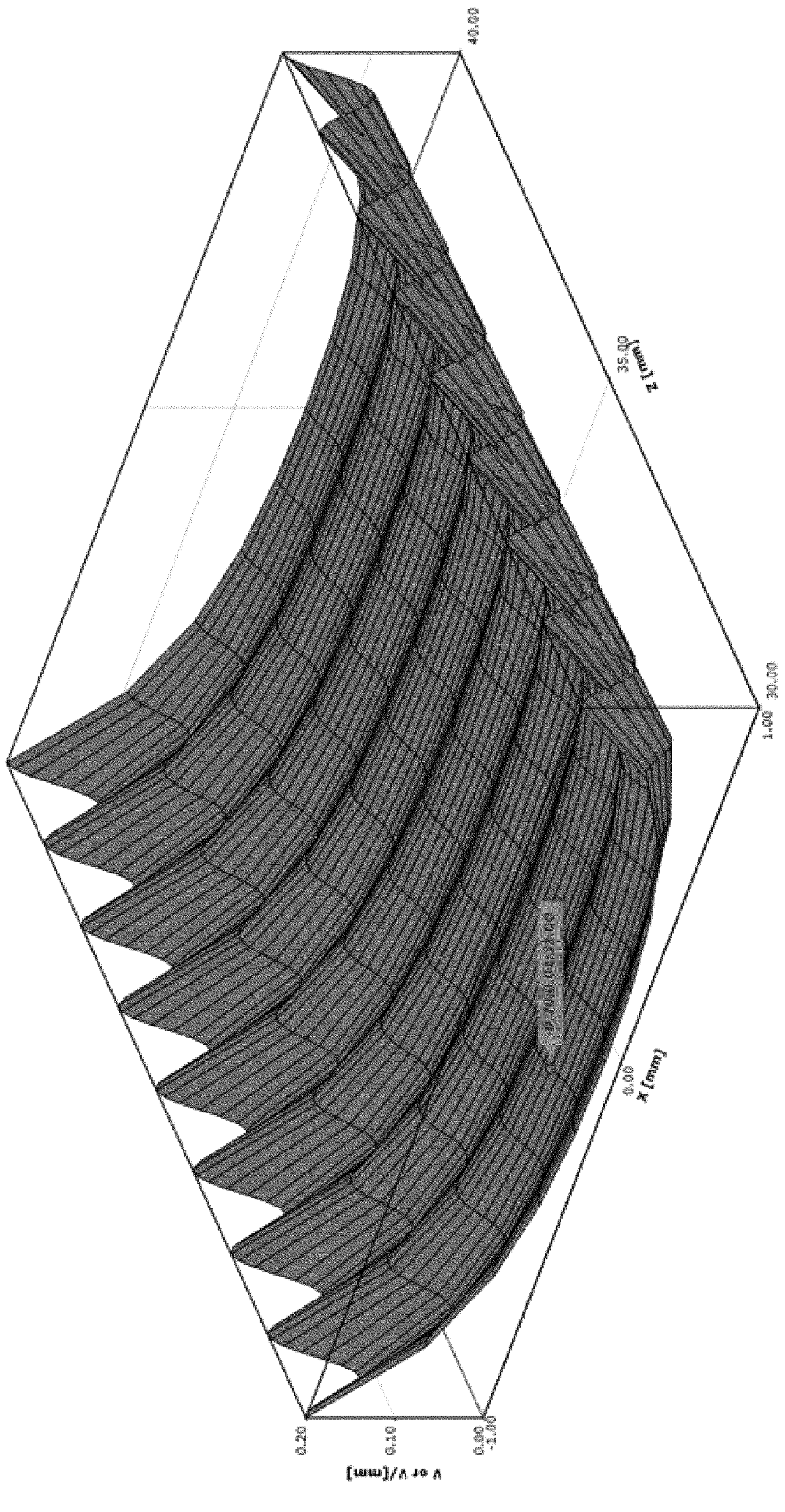
FIG. 3 shows the pseudo potential of the trapping field associated with a stacked ring ion guide FIGS. 4*a-b* relate to the prior art disclosure of U.S. Pat. No. 9,536,721B2.
Figure 4B:
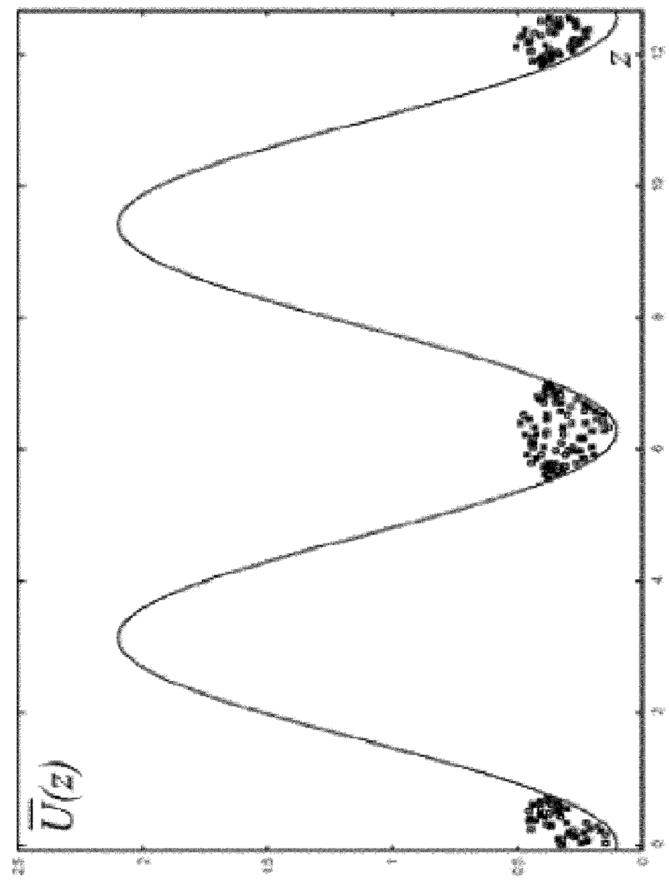
FIG. 4b (Prior art)
Figure 4A:
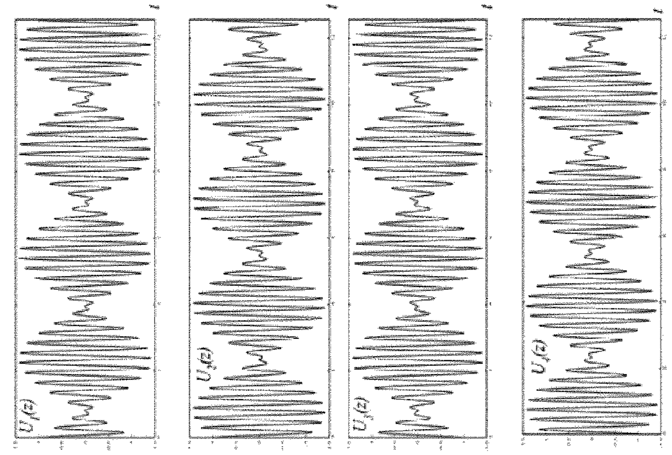
FIG. 4a (Prior art)

Aspects and embodiments of the present invention will now be discussed with reference to the accompanying figures. Further aspects and embodiments will be apparent to those skilled in the art. All documents mentioned in this text are incorporated herein by reference.

In the following disclosures, a theoretical discussion is given to provide the reader with an understanding of the basic properties of pseudo-potentials and fringing fields. This will be followed by examples of the advantageous practical applications and uses of these properties of pseudo-potentials and fringing fields that have been realised by the inventors.

The Pseudo-Potential

The approach of the pseudo-potential is widely used in the relevant parts of mass-spectrometry. A thorough theoretical description of the pseudo-potential travelling waves can be found, for example, in the prior art (U.S. Pat. No. 9,536,721B2). The following provides an understanding of the physics of confining charged particles with radio frequency fields, and an outline of the pseudo-potential approach exemplified via the simpler case of the 2D quadrupole mass filter.

We consider a counterpart to the purely electrostatic arrangements of ion confinement in RF fields, by considering a mechanical analogue useful for understanding. In particular, consider the trapping of a bead on a rotating saddle surface. The rotating saddle-potential analogue does not exactly correspond to the physics of an RF ion guide/trap, however it will capture the underlying principles in an intuitive and useful way. To confine a particle of mass m stably at a point of space, we require a restoring, i.e. binding force F (cf. Hooke's law):

$$F=-cr$$

Here, c is the spring constant, and r the position variable. A conservative force F can always be written in terms of a scalar potential U:

$$F=-\nabla U$$

Given the force, we can calculate the potential by integrating once:

$$U(x, y, z) = \frac{c}{2}(\alpha x^2 + \beta y^2 + \gamma z^2)$$

where α, β and γ are constants that play the role of c in three spatial directions. In anticipation of the discussion of trapping charged particles in electrostatic potentials, choose: α=−β=1, γ=0. With this choice, U forms a potential that has the shape of a saddle surface:

$$U(x, y) = \frac{c}{2}(x^2 - y^2)$$

Although potentials of this shape will allow to trap the particle along the x-direction, there exists no stable minimum and the particle could always escape along the y-direction. Hence, stable trapping is not possible with these static potentials. However, as we will show now using the example of a gravitational saddle potential, trapping becomes feasible when we introduce a time variation. In a gravitational potential, we can set:

$$c = \frac{mgh_0}{r_0^2}$$

We obtain the expression of a gravitational saddle potential:

$$U(x, y) = \frac{mgh_0}{2r_0^2}(x^2 - y^2)$$

Here, m is the mass of the bead, g the Earth's gravitational acceleration, and $h_0$ and $r_0$ are parameters that shape the curvature of the potential. It is possible to rotate the saddle with a angular frequency Ω around the vertical axis (z-axis), without applying any other motion to it, in order to 'balance' the bead within the saddle. This angular rotation transforms the static gravitational potential into a time-varying potential that can be described by writing the potential in terms of rotating axes x', y' as follows:

$$U(x', y') = \frac{mgh_0}{2r_0^2}(x'^2, y'^2)$$

The rotating saddle potential may be described in the laboratory frame by applying the standard coordinate transformation given by the rotation matrix:

$$\begin{pmatrix} x' \\ y' \end{pmatrix} = \begin{pmatrix} \cos(\Omega t) & -\sin(\Omega t) \\ \sin(\Omega t) & \cos(\Omega t) \end{pmatrix} \begin{pmatrix} x \\ y \end{pmatrix}$$

This gives:

$$U(x, y, t) = \frac{mgh_0}{2r_0^2}\{(x^2 - y^2)\cos(\Omega t) - 2xy\sin(\Omega t)\}$$

Pictorially, one may visualise the time-variation of this potential as a rotation of the saddle surface around the vertical axis, with a frequency Ω prevents the bead from rolling off the saddle surface. The faster the saddle rotates, the better the bead is confined within the saddle surface (i.e. gravitational potential surface). It can be shown that the bead may follow stable trajectories confined to the saddle surface if the rotation is fast enough. Although the rotating saddle potential intuitively illustrates the basic physics of trapping particles with a rapidly oscillating potential, it must be noted that the electrical potentials used in in ion trapping/guiding are not exactly of the mathematical form shown above for the gravitational potential saddle surface U(x, y, t). Rather, eclectic potentials in ion guides/traps are typically of a form:

$$U(x, y, t) \sim \frac{c'}{2}(x^2 - y^2)\cos(\Omega t)$$

Pictorially, the time-variation of this potential representation would rather resemble a flapping potential, where the curvature oscillates with time and the walls of the saddle potential flap like the wings of a bird. The constant $c'_0$ is dependent on the voltage U that is applied to the ion trap/guide electrodes.

Rapidly oscillating potentials like the "rotating-saddle" potential or the "flapping" potential can be used to confine particles and this is understood via the concept of the "pseudo-potential". In the pseudo-potential approximation, one considers the average potential that acts on a particle in a rapidly oscillating potential as an effective potential. It is calculated by taking the time-average over one period of the fast oscillation. To analyse the trajectory of the particles in such potentials, we may write down the equations of motion of the particle in the potential:

$$F = m\ddot{r} = -z\nabla U(r)$$

Here z is the charge of the particle with mass m. A generic type of electrical potential for ion confinement consists of a stationary, slowly changing or quasi-static part, $U_0(r)$, and a fast time-dependent oscillating part, $U_{RF}(r)\cos(\Omega t)$ which oscillates with a frequency Ω:

$$U(r) = U_0(r) + U_{RF}(r)\cos(\Omega t)$$

Assume that the frequency of the oscillating part is much larger than the inverse time scale of one period of motion T the particle would carry out only under the influence of i.e. $U_0(r)$, i.e. $\Omega >> 1/T$. As a result of this assumption, we obtain:

$$m\ddot{r} = -z\nabla(U_0(r) + U_{RF}(r)\cos(\Omega t)) = -z\nabla U_0(r) - z\nabla U_{RF}(r)\cos(\Omega t) = F_0(r) + F_{RF}(r)\cos(\Omega t)$$

The smooth particle trajectory due to the force $F_0(r)$ is modulated by an oscillating force $F_{RF}(r)$ at frequency Ω.

Thus, we may write the total trajectory r(t) as a sum of a smooth part R(t) and rapidly oscillating part ξ(t):

$$r(t) = R(t) + \xi(t)$$

Typically, the amplitude of the oscillations will be much smaller than the smooth part of the trajectory R, i.e. $|\xi| << |R|$. This permits us to expand the forces $F_0(r)$ and $F_{RF}(r)$ in a Taylor series up to lowest order in the parameter ξ, as follows:

$$F_0(R+\xi) = F_0(R) + \xi\cdot\nabla F_0(R) + \ldots$$

$$F_{RF}(R+\xi) = F_{RF}(R) + \xi\cdot\nabla F_{RF}(R) + \ldots$$

Omitting negligible parts of the series, the equation of motion becomes:

$$m(\ddot{R}(t) + \ddot{\xi}(t)) = F_0(R) + \xi(t)\cdot\nabla F_0(R) + [F_{RF}(R) + \xi(t)\cdot\nabla F_{RF}(R)]\cos(\Omega t)$$

The result of the equation of motion for the oscillating part of the trajectory is given approximately by:

$$m\ddot{\xi}(t) = F_{RF}\cos(\Omega t)$$

The solution to this equation is:

$$\xi(t) = -\left(\frac{F_{RF}}{m\Omega^2}\right)\cos(\Omega t)$$

By calculating the time average over: $m(\ddot{R}(t)+\ddot{\xi}(t))$, over one period $2\pi/\Omega$, we obtain an expression for a time-averaged pseudo-potential. In doing so, note that terms containing $\cos(\Omega t)$ will time-average to zero and only terms with $[\cos(\Omega t)]^2$ remain. Namely:

$$\langle m(\ddot{R}(t)+\ddot{\xi}(t))\rangle = F_0(R)+(\xi(t))\cdot\nabla F_0(R)+\langle [F_{RF}(R)+\xi(t)\cdot\nabla F_{RF}(R)]\cos(\Omega t))$$

Given that: $\langle \ddot{\xi}(t)\langle = \rangle (t)\langle =0$, this reduces to:

$$m\ddot{R}(t) = F_0(R) - \frac{\langle\cos^2(\Omega t)\rangle}{m\Omega^2}F_{RF}(R)\cdot\nabla F_{RF}(R)$$

Remembering that F is a conservative force, and $(\nabla\times F_{RF}(R)=0)$ this means that:

$$F_{RF}(R)\cdot\nabla F_{RF}(R)=F_{RF}(R)\cdot\nabla F_{RF}(R)+F_{RF}(R)\times(\nabla\times F_{RF}(R))=\tfrac{1}{2}\nabla(F_{RF}(R)\cdot F_{RF}(R))$$

As a result, and noting that $\langle \cos_2(\Omega t)\rangle = \tfrac{1}{2}$, we may write:

$$m\ddot{R}(t) = F_{sec} = F_0(R) - \frac{1}{4m\Omega^2}\nabla(F_{RF})^2 = -z\nabla U_{sec}$$

This means that a "secular" force ($F_{sec}$) may be defined as the time-averaged force acting on a particle of charge z in the rapidly oscillating RF potential. In other words, the secular force is proportional to the spatial gradient of a secular potential ($U_{sec}$):

$$U_{sec} = U_0 + \frac{(F_{RF})^2}{4m\Omega^2} = U_0 + U_{ps}$$

Here, $$U_{ps} = \frac{(F_{RF})^2}{4m\Omega^2}$$

This is the "pseudo-potential" created by the RF field. The time-averaged equation of motion over one period of the fast oscillation shows that, when time-averaged, the secular potential can be written as a sum of the stationary potential and the "pseudo-potential". For quadrupolar fields etc., the "pseudo-potential" is proportional to the square of the magnitude of the oscillating part of the potential because $F_{RF} \propto U_{RF}$, and is also inversely proportional to the particle mass-to-charge ratio: m/z. Note also that because $F_{RF}\propto z$, then $U_{ps}\propto z^2$, and the resulting force is independent of the sign of the charge on the charged particle in question. This explains why pseudo-potential waves can transport particles of both charge in the same wells.

Fringing Fields

In the inner regions of a linear quadrupole ion guide, far from a terminal end of the guide, the two-dimensional quadrupole potential can be written as:

$$U_{2D} = \frac{x^2 - y^2}{r_0^2}[U_0 - U_{RF}\cos(\Omega t)]$$

Here, $2r_0$ is the shortest distance between opposing rods of the quadrupole ion guide, and where the expression: $U_0-U_{RF}\cos(\Omega t)$ is the electric potential, measured with respect to ground, applied with opposite polarity to each of the two pairs of rods. It is a linear combination of DC (i.e. $U_0$) and RF (i.e. $U_{RF}\cos(\Omega t)$) components, where $\Omega$ is the angular frequency of the RF signal. This is a somewhat idealised circumstance which is a very good approximation in the inner regions of a linear quadrupole ion guide, far from a terminal end of the guide, but is increasingly inaccurate at axial positions along the ion guide increasingly close to the terminal end. Furthermore, the potential of the ion guide also extends outside of the ion guide beyond its terminal end, and does not simply fall instantaneously to a zero value outside of the exit end. Rather, a so-called "fringing field" region exists in which the amplitude or strength of the potential smoothly transitions from the value it would have It can be shown that the exit fringing-field, $U_{FF}$, may be quantified as:

$$U_{FF} = U_{2D}f(z) = \frac{x^2 - y^2}{r_0^2}[U_0 - U_{RF}\cos(\Omega t)]f(z)$$

Here, the diminishing term f(z) is a smoothly decreasing amplitude or strength function of the axial distance, z, along the ion guide axis on the approach to, and passing beyond, the exit end of the ion guide. As a consequence of the fringing region at the end of an ion guide, ions upon the central axis (i.e. the z-axis) of the ion guide experience a non-zero quadrupole potential outside of the ion guide that diminishes at increasing distance beyond the terminal end of the ion guide, in a direction along the z-axis. It can be shown that, to a good approximation:

$$f(z)=1-\exp(-a[z-z_0]-b[z-z_0]^2)$$

Here a and b are positive constants determined by the geometry of the quadrupole ion guide, and $z_0$ is an axial position outside the ion guide at a fixed potential (e.g. earthed). So-called Enge functions are also descriptive. This fringing effect applies equally to the pseudo-potential generated by an RF potential, as discussed above. Fringing fields exist in ion guides other than quadrupole geometry (e.g. hexapole, octopole, decapole etc.). One can see that the effect of the fringing field is to diminish the potential within the ion guide adjacent to, and also at, the terminal end of the guide and to define a non-zero extension of the potential extending a finite distance beyond the terminal end.

In the following disclosures, references will be made to the advantageous practical applications and uses of these properties of pseudo-potentials and fringing fields that have been realised by the inventors. The theoretical discussions above aim to provide the reader with an understanding of the basic properties of pseudo-potentials and fringing fields.

Waveforms

In practice, the waveforms of U.S. Pat. No. 9,536,721B2 (discussed above) have been found by the present inventors to have small imperfections, and these imperfections deteriorate the bunching effect of the transport device. These imperfections originate from rather small imperfections of the electronics that implement the waveforms. Despite the term "small", that refers to the magnitude of the imperfections in comparison to the amplitude of the waveforms, the effect of the imperfection in ion motion is detrimental and can result in total loss of ions.

In this disclosure, we disclose a new type of waveforms applicable to multi-pole ion guides, such as quadrupole ion guides, configured for bunched ion transport, having primary and bunching electrodes (some suitable structure is already disclosed by the inventors in U.S. Pat. No. 9,536,721B2). Such a type of device is thought to be useful in delivering comprehensive MS/MS analysis with high throughput and minimal losses. The disclosed waveforms may preferably provide the ability to keep the ions cooled for potentially tens of milliseconds of propagation time, e.g. after they have been transported into a high vacuum region, for example. They should provide the possibility to employ so called "soft" and "slow" methods of dissociation within the device, including methods like ETD (electron transfer dissociation) that produces product ions through reactions of particles of opposite charges. To provide maximum information with the minimum losses and nearly the absence of "cross-talk" between neighbouring wells, it is necessary that the bunches of ions stayed in their respective wells of the travelling potential waves without increase of their kinetic energy.

A first aspect, and a corresponding second aspect, of the present disclosure relates to an ion transfer method (the second aspect) and apparatus (the first aspect). This is, for example, as is described above in relation to the invention in its first and second aspects.

In more detail, this aspect of the present disclosure relates to an improved method of waveforms for the bunched ion transport in an ion guide. The ion guide provides for ion fragmentation, including fragmentation by "slow" methods, and combination with a TOF mass analyser. The new waveforms are suitable for a type of ion guide that has a multipole structure such as a quadrupole structure with two parallel continuous rods and two parallel rows of segmented electrodes, or with four parallel rows of segmented electrodes.

Advantages of the method and apparatus of the first aspect to the eighth aspect of the present disclosure, compared with the prior art known to the inventors, include:

- Orthogonal extraction can be implemented for targeted ion bunches with maximum mass range and preferably with minimal ion heating. This may be implement in accordance with the invention in its seventh and eighth aspects, for example.
- Ions are delivered to the Orthogonal extraction having minimal energy distribution and minimal bunch size.
- A significant reduction in the requirements for waveform accuracy and so the requirements on the power supply units (PSUs) needed compared to prior art waveforms.
- Compensation of effects due to parasitic waveforms distortions, should they occur.
- Allowing an increase in the height of the barriers of travelling waves described in the prior art, thereby providing greater transmitted mass range.
- Significantly reducing or preventing transfer or "cross-talk" of ions between adjacent wells (since any escaping axially from a well will be ejected radially rather transferred into a neighbouring well).
- Allowing a decoupling of properties of the travelling waves in axial and radial directions, so that the height of the potential barriers is not strongly linked to the strength of the radial confinement, like in prior art.
- Allowing better ion confinement than in the prior art.
- Allowing the shape and size of the transported ion bunch to be modified by features of the applied waveforms.
- Allowing waveforms to be realised with a simplified Digital switching scheme.
- Allowing ions to be transported such that the ion bunches are located at a minimal values of the modulated RF amplitude (when present) giving rise to the travelling pseudo potential, and recognising the implications for simplified and practical waveform requirements.
- Combining pseudo and real potentials thereby providing improved methods for transport potentials. This may be implement in accordance with the invention in its third and fourth aspects, for example.

These advantages may be implement in accordance with the invention in its first and second aspects, for example. It the invention in its first and second aspects is applicable to all aspects disclosed herein.

A third and fourth aspects of the present disclosure relate to an apparatus (the third aspect) and a corresponding method (the fourth aspect) of axial extraction. This is, for example, as is described above in relation to the invention in its third and fourth aspects described above. This is suitable for improving, for example, an oaToF (orthogonally acceleration time of flight mass analyser) or for applying the bunching ions guide to oaToF analyer. In more detail, these aspects of the present disclosure also relate to an apparatus and a corresponding method of axial extraction from the ion guide into the pulser region of an oaToF in such a way as to provide improvements to the oaToF analyser. This is, for example, as is described above in relation to the invention in its third and fourth aspects described above.

A fifth and a sixth aspect of the present disclosure each relates to improvements to devices (the fifth aspect) and corresponding methods (the sixth aspect) for the injection of ions in an ion guide for bunched ion transport. This is, for example, as is described above in relation to the invention in its fifth and sixth aspects. In more detail, these aspects of the present disclosure relate to use of new waveforms (as in the first and second aspect of the disclosure) to simplify and improve the injection of ions into selected potential wells of the device. The main benefit of this aspect of the present disclosure is dramatically simplified electronics as compared to the prior art.

A seventh and an eighth aspect of the present disclosure each relates to an improved structure (the seventh aspect) and corresponding methods (the eighth aspect) for bunched ion transport. In more detail, this aspect of the present disclosure relates to a new planar structure to provide ion transport according to arrangement disclosed herein in relation to the first, second, third, fourth, fifth or sixth aspect of the present disclosure. This structure may be realised by PCBs providing greatly simplified manufacture.

It is to be understood that the devices and methods relating to the first and second aspects of the invention, and the new waveforms disclosed herein, are applicable to all aspects of the invention disclosed herein.

New Waveforms

Figure 6:
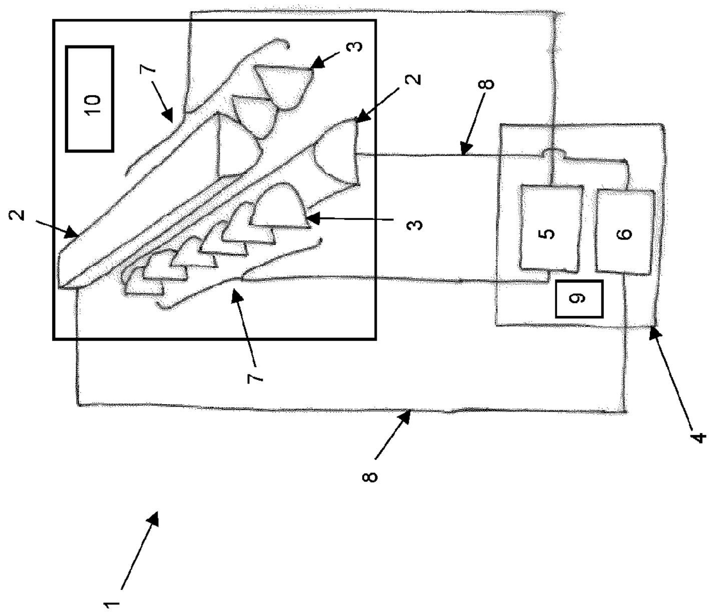
FIG. 6 illustrates a device for manipulating charged particles according to an embodiment of the invention.

An example of the invention will now be described to exemplify how the invention may provide a method, or device, for manipulating charged particles, the device comprising a series of electrodes disposed so as to form a channel for transportation of the charged particles. FIG. 6 schematically illustrates a device according to an embodiment of the invention. The device has a power supply unit 5 which provides a first supply voltage to axially segmented bunching electrodes so as to create an electric field within the channel. The potential of the electric field has one or more local minima which are translated along at least a part of the length of the channel at least within an interval of time (T). The first supply voltage, as applied to a given axially segmented bunching electrode, is held substantially constant in value during a finite duration of time ($T_L$) within the interval of time (T), and this finite duration of time ($T_L$) corresponds to the local minima. For practical use, this segment of the waveform period may be defined as the time segment throughout which the voltage of the waveform has values between (and including) its minimum value (e.g. zero, with any common DC offset excluded) and a value that does not exceed 10% of the amplitude of the waveform.

A power supply unit 6 concurrently provides a second supply voltage to radial confinement electrodes so as to create a radially confining electric field within the channel which is configured to radially confine ions within the channel. The nature of the suitable potentials, of the resulting potential well(s), and of their benefits, are described in the following examples.

During an attempt by the inventors to practically implement waveforms of the type:

$$U_0*\cos(2\pi t/T+\Phi)*\cos(2\pi ft+\phi)$$

described in the prior art (see background section, above), the inventors found a problem arising from a so called parasitic offset. The generation of the waveform is preferably done by the 'digital method': a waveform in the radio frequency range and having amplitude of several hundred volts is generated as described in various prior art. A square waveform is created by switching between the two voltage levels using precisely timed MOSFETs. It means that, in practice, the fast-oscillating component of the waveform is not a cosine: $\cos(2\pi ft+\phi)$, but rather a square waveform. In the prior art and in the present application the two voltage levels may vary with time. Time periodic variation provides an amplitude modulation envelope of the RF waveform.

Figure 5A:
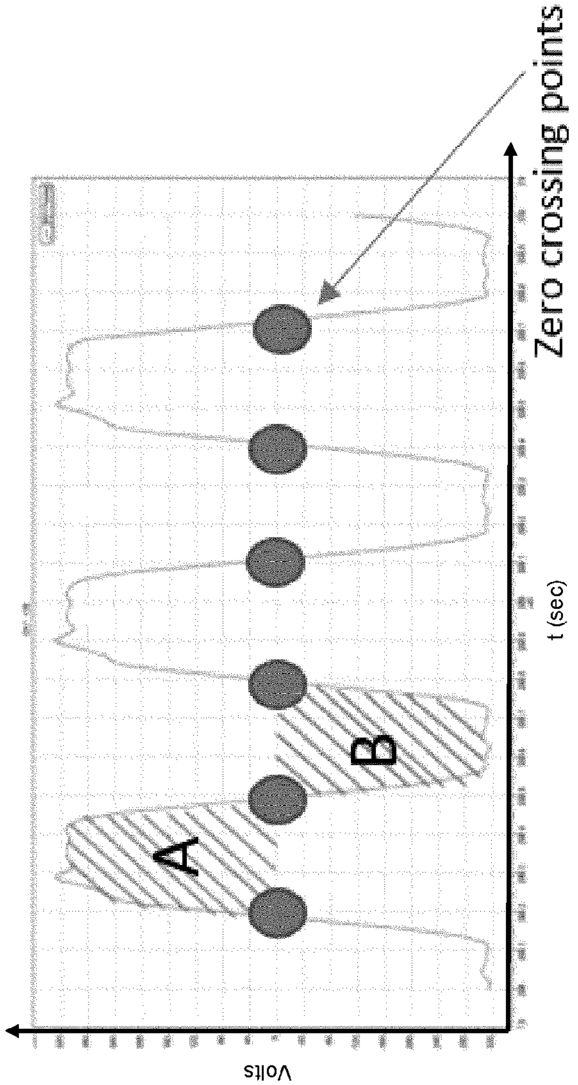
FIG. 5A illustrates parasitic offset.

Parasitic offset results in a voltage component not intentionally created that arises because each positive and negative half cycle is not exactly balanced, that is not equal and opposite. Such an offset may be evaluated by calculating of a difference between the integrated area of the positive and negative excursion of the RF waveform as shown in FIG. 5A. This difference is believed to originate from two sources. Firstly, it is due to the imbalance between the positive and negative amplitudes of the modulation waveform. The other source is due to a duty cycle of the RF waveform that deviates slightly from 0.5. The duty cycle is, basically, the ratio between the duration of the positive or negative half cycles of the carrier waveform to its period. Ideally the RF waveform (sometimes referred to as a carrier waveform) has a duty cycle of 0.5 (or 50%). The authors have found that small deviations of the duty cycle from 0.5 may give rise parasitic offset voltage that has a significant deleterious effect on the bunched ion transport.

The magnitude of the parasitic offset for each period of the carrier waveform is given by (A−B)*f where A and B are the areas of the positive and negative excursions, and may be calculated numerically form the digitised oscilloscope traces of a real waveform. A & B have units of (V*sec), f is the frequency of the RF waveform in units of Hz.

Figure 5B:
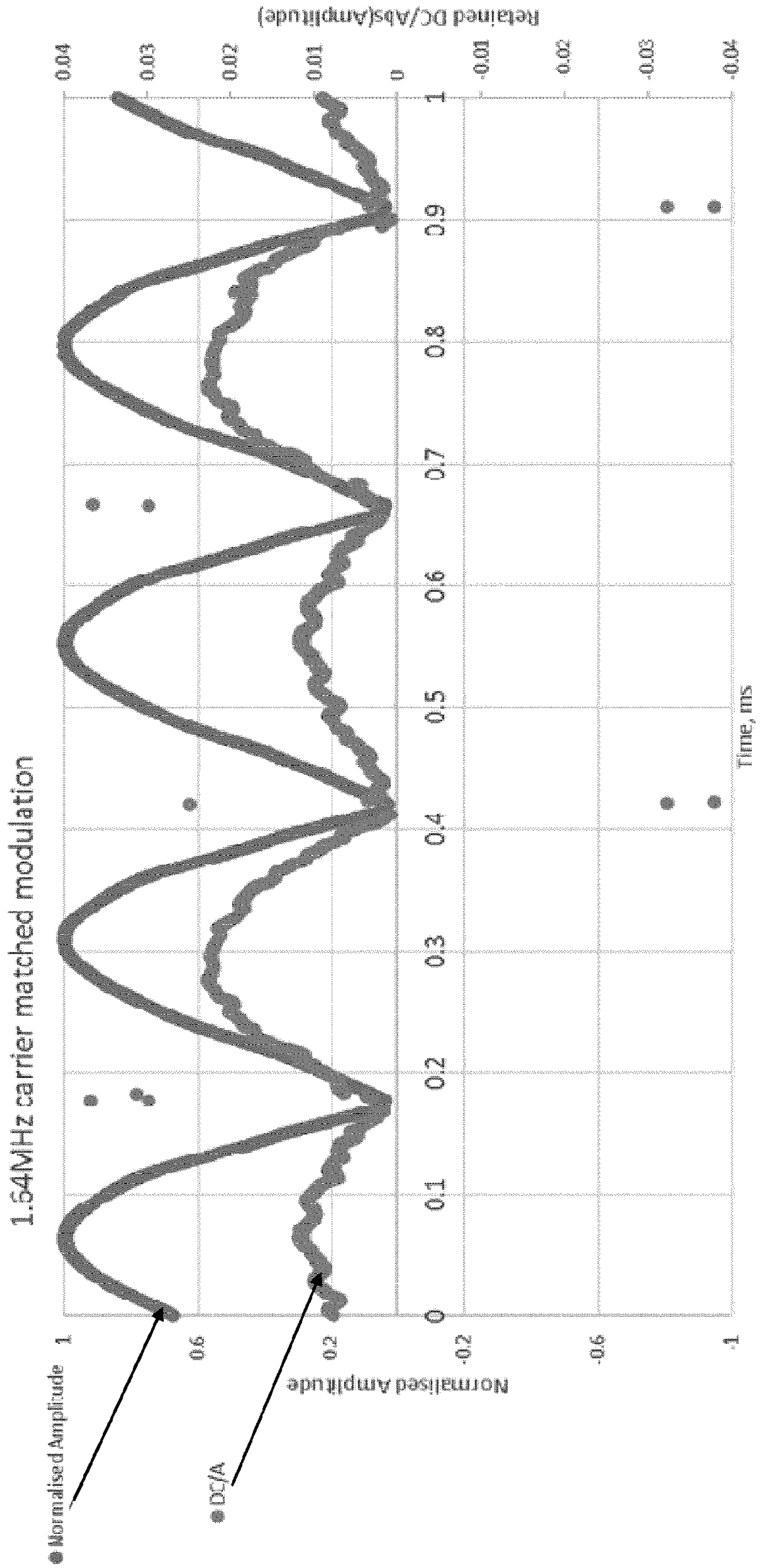
FIG. 5B illustrates an example of a calculated parasitic offset.

In real waveforms parameters of the waveforms are maintained within certain tolerances. The tolerances are determined by imperfections of the methods generating said waveforms. The imperfections include tolerances of the electronic components such as variation of capacitance and resistor values, MOSFET characteristics and the like, and the capacitance between elements of the ion guide itself (the load capacitance). An example of the calculated offset is shown in FIG. 5B of the present application. As seen from FIG. 5B, the parasitic offset is a signal with higher frequency than the modulation frequency and so difficult to remove by filtering methods. We note that a parasitic offset of 2V may originate from only 0.25% imbalance of the waveform with an amplitude of 400 V. Also, for 400 V RF amplitude waveforms with 1 MHz frequency the same parasitic offset of 2 V would be caused by only 5 ns of imbalance between positive and negative going half cycles. 2V is found to be detrimental to the performance for bunched ion transport in a quadrupole structured guide with 2.5 mm inscribed radius.

When there is a modulation of the waveform's amplitude or phase or other types of modulation, it is possible to improve the offset by specifying high component tolerances, which has been achieved by the inventors, but this is expensive and the effect may still not be sufficiently eliminated. On this basis, the inventors were motivated to seek an alternative, lower cost, and more effective solution.

As is shown in prior art document U.S. Pat. No. 9,536,721B2, a pseudo-potential may be created by the application of the following voltage waveforms:

$$U_0*\cos(2\pi t/T+\Phi)*\cos(2\pi ft+\phi)$$

To bunching electrodes along the axis (z-direction) of a quadrupole ion guide. The resulting axial pseudo-potential is given by:

$$\overline{U}(z,t)=(zE_0^2/8m\omega^2)(1+\cos(2z/L-2t/T)),$$

where $E_0$ is the time averaged electric field, z is the ion charge and m is the mass of an ion within the pseudo-potential. The minima of this pseudo potential for any coordinate z occurs at time t=n*T, where n is a natural number. The inventors have also realised that these are the moments of time when the waveform:

$$U_0*\cos(2\pi t/T+\Phi)*\cos(2\pi ft+\phi)$$

is maximal or minimal, i.e. at the extreme values of RF amplitude. This means that the ions, located in the minima of the travelling waves of the pseudo-potential are subjected to the highest parasitic offset voltages, where the parasitic offset may reach 2% of the RF amplitude, amounting to several volts. This is highly undesirable and can affect propagation of ion bunches in several different ways that are detrimental to their transport. They will cause overspill of the ions into neighbouring traveling pseudo-potential wells, they will cause heating, and mass-dependent losses. Short and abrupt changes of the potential can work like impulses of the electric potential, giving ions "kicks" of energy that results in overspill to neighbouring wells or radial loss (i.e. in a radial direction, transverse to the guide axis). The parasitic offset can contribute to the rising of the bottom of the pseudo-potential well. As the depth of the pseudo-potential well is inversely proportional to the mass of the ions, the heavy ions within the bunch of ions confined by the pseudo-potential well, will start escaping before lighter ions, and the mass range capability of the ion guide is reduced.

The parasitic offset naturally affects the ions the most when it arises in the vicinity (along the axis) of the conveyed ion bunches (i.e. the location of the minimum of the pseudo-potential well). Thus, the inventors have realised a need to reduce and preferably eliminate the influence of waveform's imperfections at the locations of all ion bunches. The inventors thus sought a method that minimises RF amplitude at said locations.

In seeking such a method, the present inventors realised the following in relation to the formation of not only pseudo-potential wells but also in relation 'real' potential wells formed as a AC voltage waveform (i.e. comprising no RF component):

That a waveform with a negligible or substantially zero amplitude in the locations of the moving ion bunches is preferable. This will mean that the ions will not be susceptible to parasitic offset of the waveform applied to the nearest waveforms. In another view, if the voltage waveform, e.g. a modulated RF waveform or an AC voltage waveform, has a 'zero' and constant value at the position of the potential wells, the waveform applied to the nearest electrodes cannot generate a parasitic offset liable to adversely influence said potential wells.

The pseudo-potential has significant value at locations of adjacent electrodes, at either side, but is significantly diminished at a location of the more distant adjacent electrodes. Thus in the case of 8 phases (N=8) it is preferred that three adjacent electrodes all have a zero level of the waveform at the same time within a period/cycle of the waveform.

That in a scheme having such properties, ions most preferably are radially trapped by an RF voltage, e.g. an additional RF voltage, applied to the primary rods (i.e. radial confinement electrodes), and this voltage can be provided by an RF waveform having a constant amplitude, noting that an RF waveform of constant amplitude can have any DC component completely removed by simple DC blocking methods. In this case, the ions inside the wells of the travelling waves may be confined radially only by the quadrupole trapping field of the primary rods (i.e. radial confinement electrodes).

That providing the same DC offset at the primary rods (i.e. radial confinement electrodes) and on the axially segmented bunching electrodes (bunching electrodes) enables no destruction of the potential wells and ensures that there is no resolving DC due to the parasitic offset.

In addition to these important insights, the waveforms taught by the present disclosure provide several new features and greater flexibility as compared to the prior art U.S. Pat. No. 9,536,721B2, such as:

Axial trapping and bunching potentials and the radial trapping potentials are substantially independent. This makes the operation of the device much simpler and easier. As a result, a higher radial trapping field can be applied compared to the prior art. The radial ion confinement is provided by the trapping multipole field, e.g. quadrupole field, of the primary rods (i.e. radial confinement electrodes) and the axial ion bunching is provided by the modulated potential (i.e. voltage waveform) having a plurality of phases (e.g. the phases of the waveform/modulation).

Additional parameters of the waveform influence the height of potential barriers between potential wells and the strength of the electrical field that keeps the ions in the well, providing more effective ion bunch confinement as compared to the prior art. It means ions can be better retained in their designated bunch with lower losses and a higher mass range for given amplitude of the modulated waveforms as compared to the prior art. Additionally, parameters of the waveform may control the axial size of the ion bunches, thus providing for greater flexibility.

The new waveforms may provide constant velocity translation as taught by U.S. Pat. No. 9,536,721B2 (i.e. no acceleration and de-acceleration) affecting 'smooth' transport of ion bunches. This may keep ions cool during transport and may be used to deliver the ion bunches to high vacuum regions and transport them further within a high vacuum region. At the same time, the teachings herein provide methods for more practical implementation, due to the reduced requirements of waveform accuracy.

The new type of waveforms is applicable to transport devices comprising a multipole field structure (e.g. a quadrupole field structure), consisting of primary rods and of bunching electrodes. The bunching electrodes may comprise finely segmented rods. Some relevant structural examples were provided in U.S. Pat. No. 9,536,721B2. The main role of the primary rods (i.e. radial confinement electrodes) is to provide the multipolar, e.g. quadrupolar, radial confinement field, to confine ions towards the axis of the transport device. The bunching electrodes are spaced apart along the optical axis of the ion guide. The axially-segmented bunching electrodes may be supplied with voltages by a power supply unit (PSU) providing a supply voltage having a plurality of waveforms. These waveforms generate within the guiding channel, along the axis of the device, a plurality of potential wells that move in an axial direction at a constant wave velocity along the ion guide. Typically, there are eight (8) phases (e.g. of a common voltage waveform) supplied to the plurality of bunching electrodes. In that specific case, each of the 8 phases may have a constant phase shift between phases of 360/8=45 degrees. More generally N phases are used, where N is a positive integer, in which case there is a constant phase shift of the phase angle between adjacent phases of 360/N degrees. Each respective one of the N phases is applied to every respective Nth electrode. Hence, a repetitive set of N electrodes each are used consequently. That is each electrode has a preceding electrode with a shift of the phase angle of −360/N degrees and a proceeding electrode with a phase shift+360/N degrees. The waveforms may be periodic voltages (e.g. comprising no RF component) or periodic modulated RF voltages (e.g. comprising an RF component the amplitude of which is modulated according to the waveform). The waveforms may be a combination of the two: that is the sum of periodic dependent voltages and periodic modulated RF voltages.

The waveforms, as applied to the electrodes, generate a potential or a pseudo-potential consisting of minima and maxima that move with a constant velocity along the axis of the transport device. The velocity may be adjustable according to the requirements of the ion transport and is determined by the modulation frequency and the repeat distance of the N electrodes. There may be M groups of N electrodes, the total length of the device is $L_{total}$=M*L, where Lisa length of the set of N electrodes. The roles of the primary electrodes (i.e. radial confinement electrodes) and bunching electrodes are most preferably deliberately separated.

FIG. 6 schematically illustrates an example of a device for manipulating charged particles, according to an embodiment of the invention. The device (1) comprises a series of electrodes (2, 3) disposed so as to form a channel for transportation of the charged particles. A first power supply unit (5) is adapted to provide a first supply voltage (7) which changes according to a waveform as disclosed herein, having a period (T), to axially segmented bunching electrodes (3) amongst so as to create an electric field within the channel. The potential of said electric field has a plurality of local minima between local maxima defining a potential well, such as is described herein, which is translated along at least a part of the length of the channel. The potential well is translated a distance substantially equal to its length (e.g.

axial length in a direction along the channel) in an interval of time substantially equal to the period (T). As discussed herein, the waveform is:

(a) substantially continuously smooth throughout its period (T); and, (b) substantially constant in value throughout a finite duration of time ($T_L<T$) within said period (T), corresponding to a minimum of the waveform.

A second power supply unit (6) is adapted to provide a second supply voltage (8) to radial confinement electrodes (2) so as to create a radially confining electric field within the channel configured to radially confine charged particles within the channel.

The device comprises a control unit (4) comprising the first and second power supply units (5, 6), and a computer (9) comprising a memory unit within which is stored a plurality of separate and discrete values of the waveform corresponding to a respective plurality of separate and discrete points along its cycle. The computer is arranged to control the first power supply unit to generate the waveform according to the discrete values stored within the memory unit.

The device comprises a buffer gas control unit (10) configured to control the pressure of a buffer gas within the channel such that the pressure at the exit of the channel is lower than 0.5 mbar. The buffer gas control unit is configured to control the pressure of a buffer gas within the channel such that the pressure of the buffer gas at one end of the channel is at least 20 times greater than the pressure at the other end of the channel. For example, the pressure at the exit/output end of the channel may be controlled to be at least 20 time lower than the pressure at the input end of the channel.

The control unit (4) may control the first supply voltage to comprise an RF voltage signal modulated according to the waveform such that the potential well is formed by a pseudo-potential, or to comprise an a AC voltage that varies in value over time according to the waveform, and does not comprise, or modulate, any underlying RF voltage signal.

The control unit (4) may control the first power supply unit (5) to supply the first supply voltage waveform to each respective electrode of the axially segmented bunching electrodes such that it is phase-shifted relative to the voltage waveform concurrently supplied to adjacent electrodes. This may comprise applying the first supply voltage to each of a plurality of successive axially segmented bunching electrodes at a different respective phases of the waveform concurrently during the finite duration of time ($T_L<T$) within said period (T) of the waveform.

The control unit (4) may control the first power supply unit (5) to supply the first supply voltage waveform such that the waveform frequency (f=t/T) is such that during the predetermined finite time interval, $T_L$, the value of the waveform is not greater than 10% of the maximum value of the waveform within the period, T, of the waveform, wherein $T_L \geq T/N$, and N is the number of successive axially segmented bunching electrodes forming a subset of axially segmented bunching electrodes which supports a full period, T, of the waveform. In some embodiments, the first power supply unit (5) may be controlled so that throughout the finite duration of time ($T_L$) the value of the waveform changes by no more than a predetermined maximum permissible change (ΔU) expressed as a percentage (%) of the amplitude ($U_0$) of the waveform such that: $100\times\Delta U/U_0 \leq 10$. In some embodiments, the first power supply unit (5) may be controlled so that $\Delta U'T'_L \leq 2.0$, wherein $T'_L=100\times T_L/T$ is the duration of $T_L$ expressed as a percentage (%) of the period T and $\Delta U'=100\times\Delta U/U_0$. In some embodiments, the first power supply unit (5) may be controlled so the modulus of the first time derivative (∂U/∂t) of the waveform (U), having waveform amplitude $U_0$, is such that:

$$|(T/U_0)\partial U/\partial t| \leq 50$$

throughout said finite duration of time ($T_L$). In some embodiments, the first power supply unit (5) may be controlled so the value of the modulus of the first time derivative of the first supply voltage waveform, of waveform amplitude $U_0$, is such that:

$$|(T/U_0)\partial U/\partial t| \leq 100$$

throughout said period (T) of the waveform. For example, these upper limits on the first time derivative may be particularly suitable when the waveform comprises an effort function ('erf') as is discussed herein. Desirably, the potential well generated by application of any of these waveforms and conditions defines a well floor and the value of the potential defining the well floor comprises only one local minimum which does not vary in value over time.

Examples of electrodes which could be used in the transport channel is given in FIGS. 7*a-d*. The primary and bunching electrodes may 'look like' rods of a standard linear quadrupole, with the bunching rods which should be segmented or dived by some means. For example, the radial trapping field may be generated by a voltage difference between the radial confinement electrodes and the axially segmented bunching electrodes. Thus, the RF radial confinement voltage may be applied to either the radial confinement electrodes, to the axially segmented bunching electrodes, or to both. When the radial confinement electrodes are segmented, and the voltages applied to the axially segmented bunching electrodes are not modulating RF voltages, they may be applied to both the axially segmented bunching electrodes and to the radial confinement electrodes.

Figure 7D:
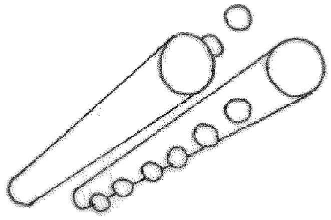
FIGS. 7*a-d* illustrate example electrode arrangements for use in a transport channel.
Figure 7C:
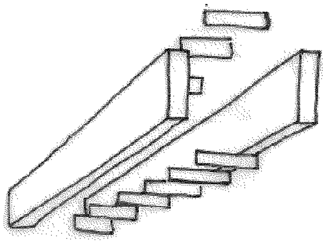
Figure 7B:
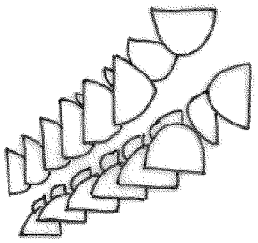
Figure 7A:
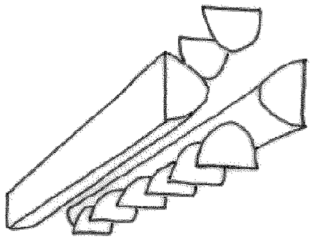

Both type of rods may have hyperbolic profile as shown in FIG. 7*a*. In other embodiments, both primary and bunching rods may be segmented as FIG. 7*b*. The cross-section of the primary and bunching rods can be other shapes, including, but not limited to, truncated hyperbolic electrodes, circular electrodes, trapezoidal electrodes, rectangular electrodes. In embodiments, the segmented bunching rods may be of different shape of cross-section from the primary ones. They may be located closer or further away from each other, than the primary rods are.

Figure 8A:
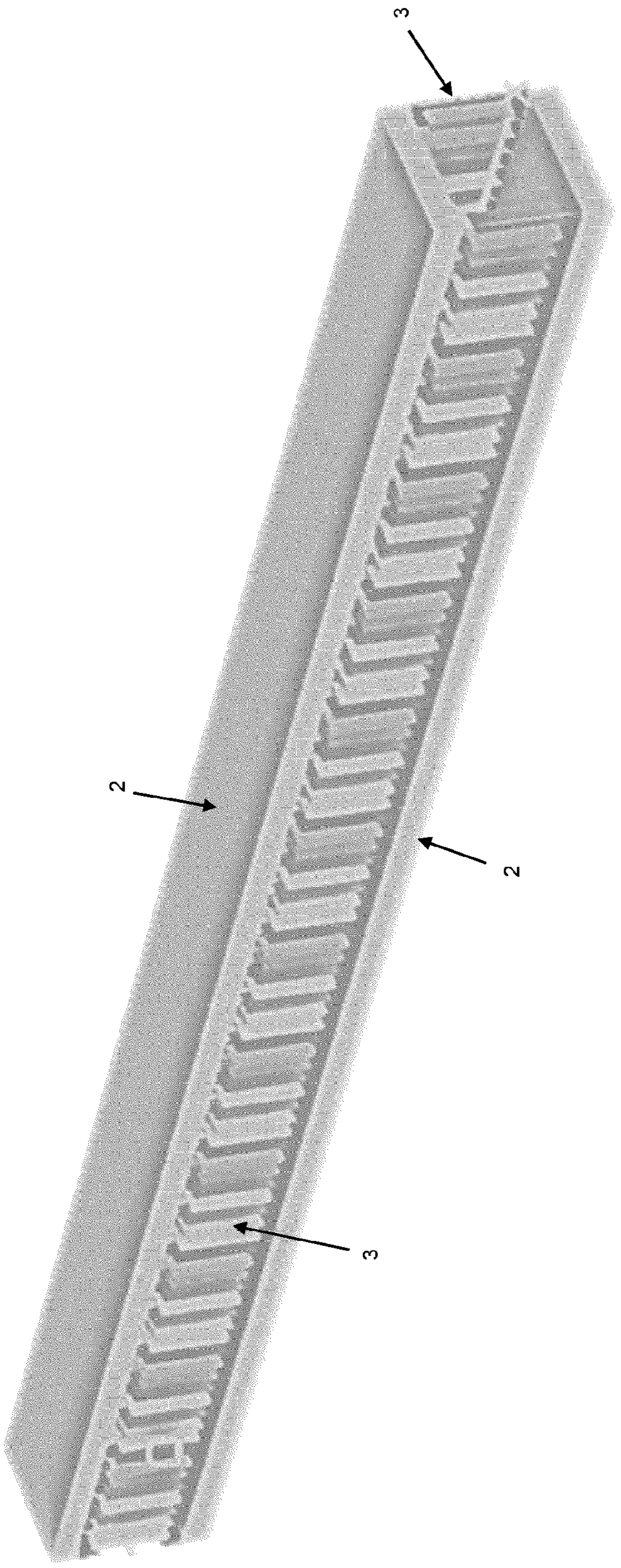
FIGS. 8*a-e* show example electrode structures for use in a transport channel.
Figure 8B:
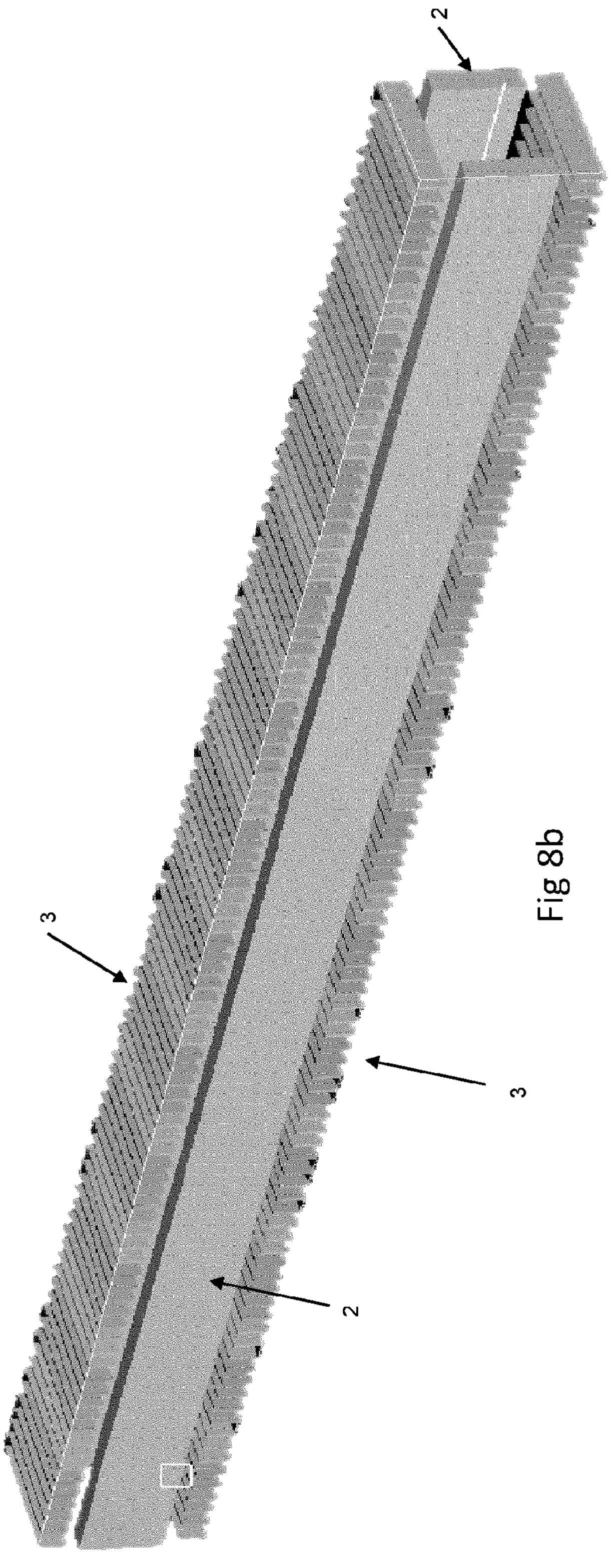
Figure 8C:
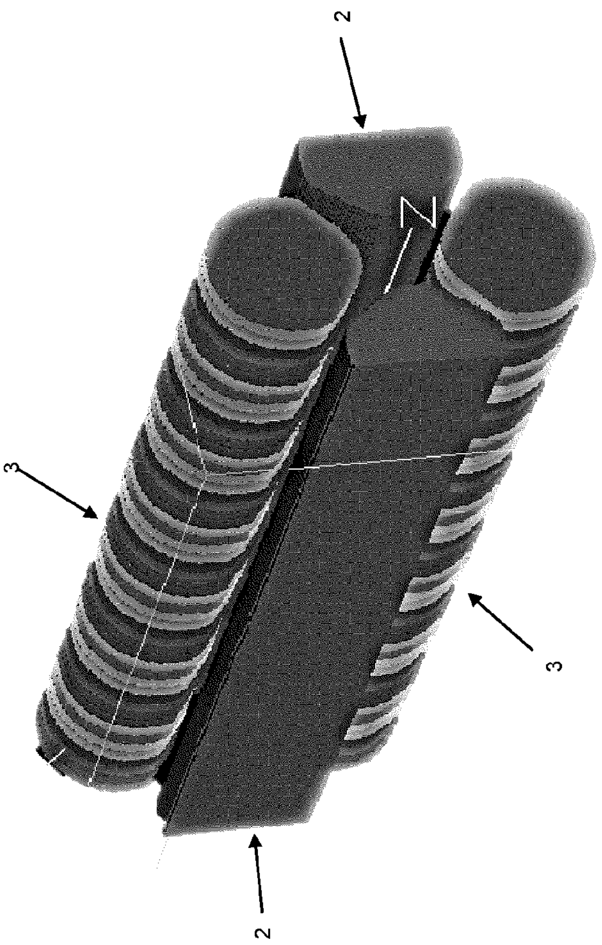
Figure 8D:
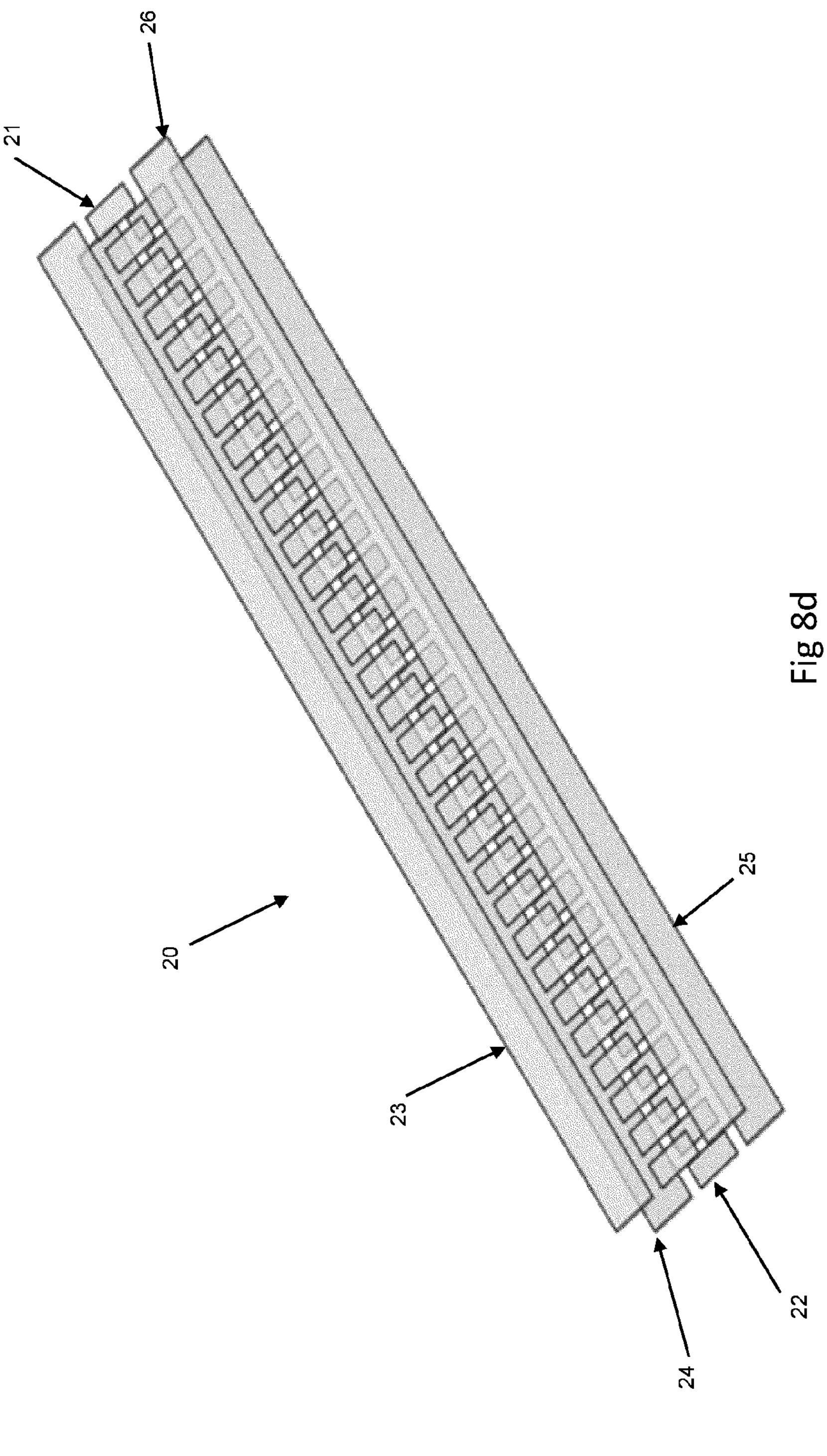

Some further applicable structures are shown in FIG. 8*a-e*. Here, FIG. 8*a* and FIG. 8*b* show examples having planar primary rods and planar bunching electrodes. FIG. 8*c* shows a structure with partially hyperbolic primary continuous electrodes and partially hyperbolic bunching electrodes. FIG. 8*d*, shows the alterative embodiments.

Figure 8E:
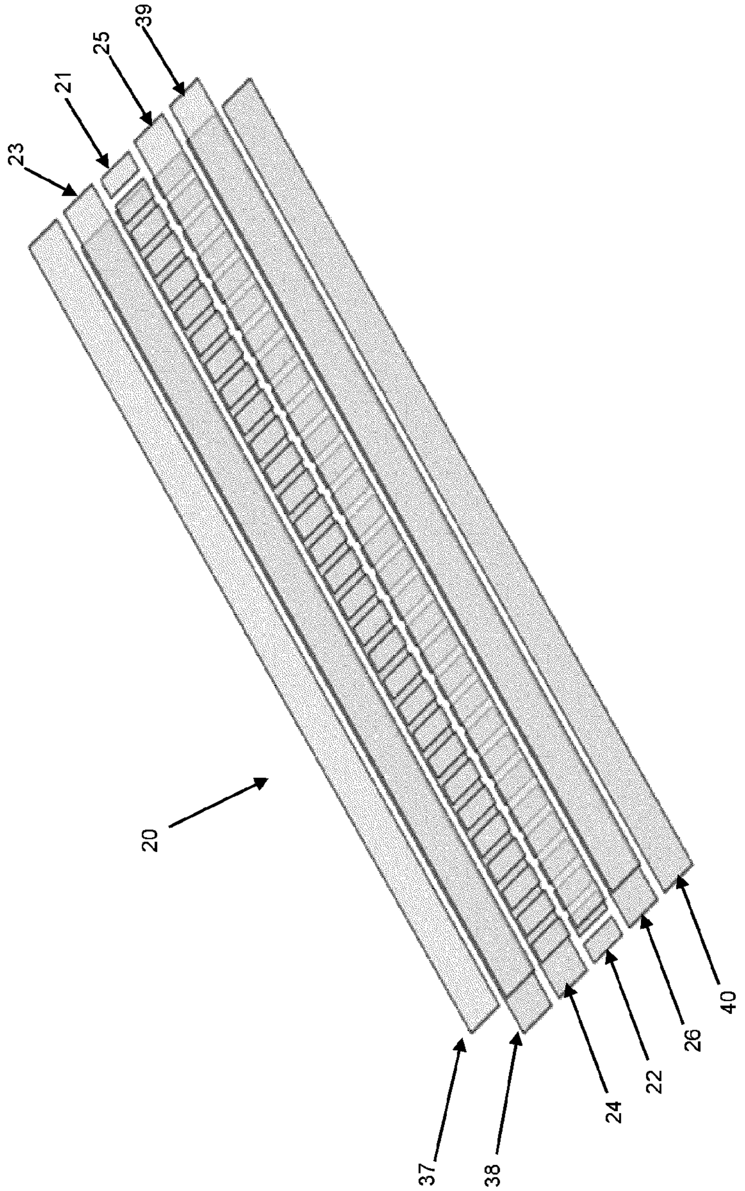

FIG. 8*d* shows device comprising electrode planes arranged in opposition. Each plane consisting of the inner bunching electrodes and two primary electrodes. This construction is easy to manufacture and may be created on printed circuit boards (PCBs), or electrodes mounted onto PCBs. FIG. 8*d* may be used to provide an approximation of a quadrupole field when viewed in cross section. FIG. 8*e* shows an alternative structure having two pairs of primary rods on each plane, 8 in total to provide a more accurate quadrupole field when appropriate voltages are applied.

This arrangement of bunching electrodes and radial confinement electrodes, may be comprised within a device (corresponding to item 1; FIG. 6) for manipulating charged particles, as described herein. The arrangement of bunching electrodes and radial confinement electrodes comprising a guide assembly 20 comprising a series of electrodes disposed so as to form a guiding channel defining an axis for transportation of the charged particles, the guide assembly comprising:

- a bunching electrode assembly comprising:
  - a first array 21 of a plurality of planar bunching electrodes which are disposed so as to be separated axially along the guiding channel; and,
  - a second array 22 of a plurality of planar bunching electrodes which are disposed so as to be separated axially along the guiding channel wherein the second array is disposed so as to be separated from the first array across the axis of the guiding channel;
- a radial confinement electrode assembly (23, 24, 25, 26) comprising a plurality of planar confinement electrodes which are disposed so as to be separated across the axis of the guiding channel to be plane-parallel therewith and to be mutually plane-parallel.

The power supply unit (items 5 and 6: FIG. 6) is adapted to provide first supply voltages 7 to bunching electrodes of said first array and of the second array and to provide second supply voltages 8 to the plurality of planar confinement electrodes, so as to create an electric field defining a potential which radially confines charged particles within the guiding channel and has one or more local minima between local maxima defining a potential well which is translated along at least a part of the axis of the guiding channel.

The first array 21 of bunching electrodes is spaced from the second array 22 of bunching electrodes by a lateral spacing transverse to the axis of the guiding channel. The lateral spacing is uniform along at least a part of the guiding channel. Successive (e.g. neighbouring) planar bunching electrodes of the first array of planar bunching electrodes are axially separated by an axial spacing, or gap, in a direction parallel to the axis of the guiding channel. Successive (e.g. neighbouring) planar bunching electrodes of the second array of planar bunching electrodes are axially separated by an axial spacing, or gap, in a direction parallel to the axis of the guiding channel. The separation between successive planar bunching electrodes of the first array matches the separation between successive planar bunching electrodes of the second array. A given planar bunching electrode of the first array of planar bunching electrodes is axially aligned in register with a corresponding planar bunching electrode of the second array of planar bunching electrodes. The lateral spacing is at least twice the size of the axial spacing. More preferably, the lateral spacing is at least three times (3×) the size of the axial spacing. Even more preferably, the lateral spacing is at least three and a half times (3.5×) the size of the axial spacing. Desirably, the lateral spacing is at least five times (5×) the size of the axial spacing.

The radial confinement electrode assembly comprises a third array (23, 24) of confinement electrodes comprising one or more planar confinement electrodes disposed so as to be coplanar to planar bunching electrodes of the first array of bunching electrodes, which are opposed by one or more planar confinement electrodes disposed so as to be coplanar to planar bunching electrodes of the second array of bunching electrodes. The radial confinement electrode assembly also comprises a fourth array (25, 26) of confinement electrodes comprising one or more planar confinement electrodes disposed so as to be coplanar to planar bunching electrodes of the first array of bunching electrodes, which are opposed by one or more planar confinement electrodes disposed so as to be coplanar to planar bunching electrodes of the second array of bunching electrodes. Planar bunching electrodes of the first array 21 of bunching electrodes are disposed between coplanar confinement electrodes of the third array (23, 24) of confinement electrodes and coplanar confinement electrodes of the fourth array (25, 26) of confinement electrodes. Planar bunching electrodes of the second array 22 of bunching electrodes are disposed between coplanar confinement electrodes of the third array (23, 24) of confinement electrodes and coplanar confinement electrodes of the fourth array (25, 26) of confinement electrodes.

The third array of confinement electrodes and the fourth array of confinement electrodes are disposed so as to oppose each other in a direction transverse to (e.g. orthogonal to) the axis of the guiding channel (e.g. in a direction across the axis of the guiding channel). The third array of confinement electrodes and the fourth array of confinement electrodes each extend along substantially the whole length of the guiding channel. The third array of confinement electrodes and the fourth array of confinement electrodes each comprise one single (e.g. continuous) respective planar confinement electrode that extends along substantially the whole length of the guiding channel. The two respective single confinement electrodes may be plane parallel.

The third array of confinement electrodes and the fourth array of confinement electrodes each comprise one pair of two respective continuous planar confinement electrodes. The two respective continuous confinement electrodes of each pair are mutually plane parallel and are spaced apart such that one confinement electrode of the pair is adjacent to (e.g. coplanar with) the first array of bunching electrodes, and the other confinement electrode of the pair is adjacent to (e.g. coplanar) the second array of bunching electrodes.

In another example, shown in FIG. 8*e*, the third array of confinement electrodes and the fourth array of confinement electrodes may each comprise one group of four respective continuous planar confinement electrodes (23, 24, 37, 38; 25, 26, 39, 40). In the example, the four respective continuous confinement electrodes of each group are mutually plane parallel and spaced apart such that two coplanar confinement electrodes of the group are adjacent to (e.g. coplanar with) the first array of bunching electrodes, and the other two coplanar confinement electrodes of the group are adjacent to (e.g. coplanar with) the second array of bunching electrodes. In this way, the first array of bunching electrodes are coplanar with a first pair of coplanar and parallel continuous confinement electrodes on one side of the first array of planar bunching electrodes, and with a second pair of coplanar and parallel continuous confinement electrodes on the other side of the first array of planar bunching electrodes. Similarly, the second array of bunching electrodes is coplanar with a third pair of coplanar and parallel continuous confinement electrodes on one side of the second array of planar bunching electrodes, and with a fourth pair of coplanar and parallel continuous confinement electrodes on the other side of the second array of planar bunching electrodes. This arrangement enhances radial confinement potentials.

Preferably, the planar bunching electrodes of the second array are disposed so as to be plane-parallel to the planar bunching electrodes of the first array of planar bunching electrodes. The planar bunching electrodes of the second array of planar bunching electrodes are preferably disposed so as to be mutually co-planar. The planar bunching electrodes of the first array of planar bunching electrodes may be disposed so as to be mutually co-planar. Also, the planar electrodes of the first array of planar bunching electrodes and the planar electrodes of the second array of planar bunching electrodes may be disposed so as to be plane-parallel to the axis of the guiding channel.

A planar electrode of the first array of planar bunching electrodes and a planar electrode of the second array of planar bunching electrodes may be disposed so as reside in a common plane that is transverse to the axis of the guiding channel. Each planar electrode of the first array of planar bunching electrodes may be arranged to be coplanar with a respective planar electrode of the second array of planar bunching electrodes, wherein the common respective plane thereof is transverse to the axis of the guiding channel. The transverse plane is preferably perpendicular to the axis of the guiding channel. The planar bunching electrodes of the second array may be disposed so as to be axially spaced to be non-coplanar and mutually plane-parallel. Also, the planar bunching electrodes of the first array may be disposed so as to be axially spaced to be non-coplanar and mutually plane-parallel.

In some examples, the planar electrodes of the first array of planar bunching electrodes and the planar electrodes of the second array of planar bunching electrodes are disposed such that the first array is parallel to the second array and such that the first array of planar bunching electrodes opposes the second array of planar bunching electrodes across a lateral separation defining a width of the guiding channel. In some examples, the third array of confinement electrodes is segmented to define an array of a plurality of electrode segments extending in a direction parallel to the axis of the guiding channel. The third array of confinement electrodes may be segmented to define an array of a plurality of electrode segments extending in a direction parallel to the axis of the guiding channel.

In some examples, the gaps between the segments of the bunching rods are larger or of the same value as the width of the segments. Preferably, the axial width of the bunching segments is much smaller that the inscribed radius of the transport device. Preferably more than 2.5 times smaller, preferably more than 5 times, more preferably more than 10 times. The lateral width of the bunching electrode segments is preferably equal to the inscribed radius of the channel of the device.

The inscribed radius of the transport channel preferably lies within the range: about 2 mm to about 5 mm. The gaps between the segments (in the axial direction) of the bunching rods preferably are more than 2 times the width of the bunching segments, preferably more than 4 times the width of the bunching segments.

Orthogonal Extraction of Ions from an Ion Guide.

Figure 9A:
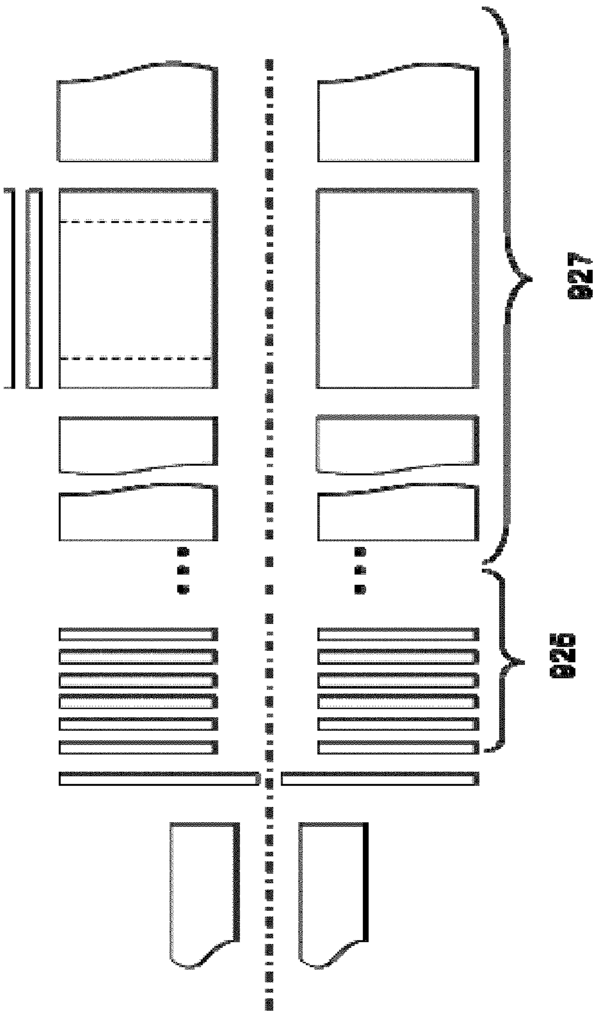
FIGS. 9*a-b* show an example ion guide suitable for orthogonal extraction.
Figure 9B:
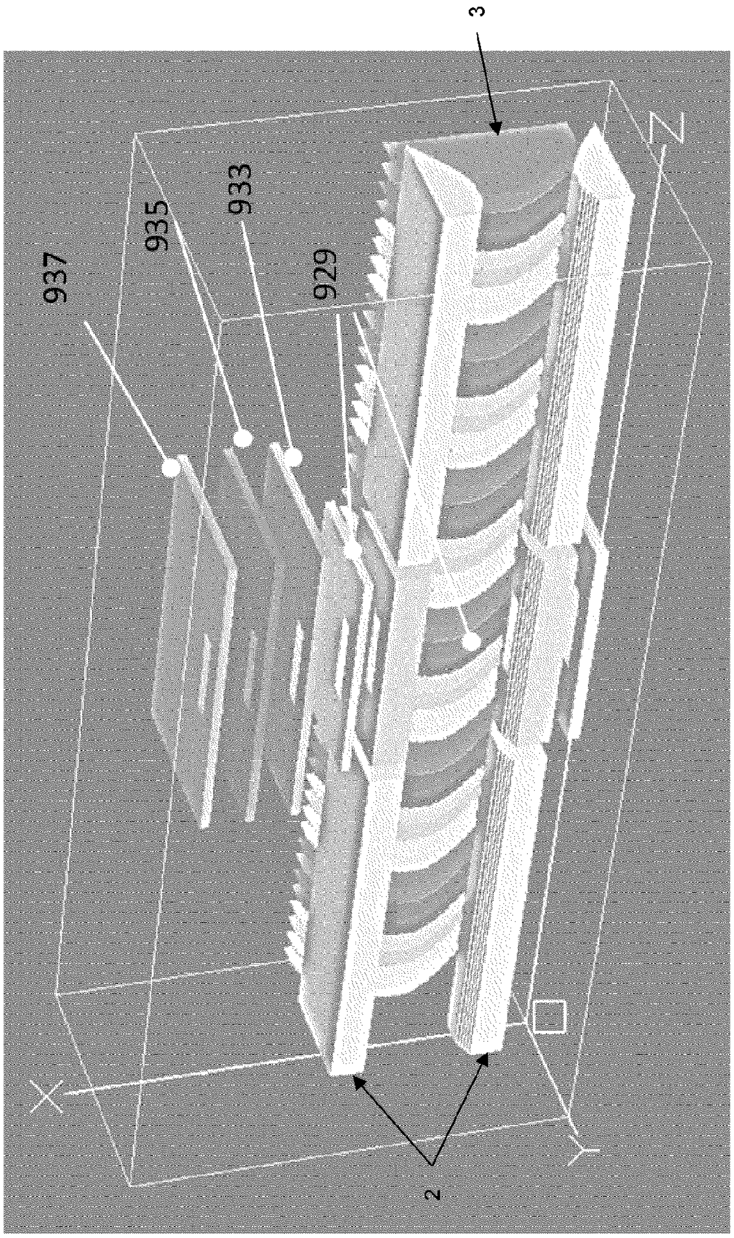

The primary rods (i.e. radial confinement electrodes) may be segmented in to two or more segments. At least one segment of each of the primary rods may be employed as an extraction region for extracting the on bunches from the guide. Ion bunches may be extracted from the extraction regions in substantially orthogonal direction to the axis of the ion guide. The ion bunches may be directed into one or more ToF mass analysers. FIGS. 9*a*-*b* show an example of an ion guide suitable for this type of extraction. With reference to FIG. 9*b*, a segmented ion guide is shown with a single extraction region 929, together with extraction lens electrodes 933, 935 and 937.

The extraction region is configured to provide two field configurations at two instances of time:

A transporting field, (that is the same as the transport Ion guide up and down stream, and an extraction field)

An extraction field (that is the same as the transport field up and down stream, and an extraction field).

In operation the extraction region is continually switched between these two fields. The switching frequency should be an integer division of the modulation frequency.

The primary rods (i.e. radial confinement electrodes) of the extraction region preferably have a slit to allow ions to go through it towards the mass analyser. Alternatively, the extraction segments of the primary rods could be made of a mesh or grid.

Extraction may be according to methods described in U.S. Pat. No. 9,536,721B2 and WO2018/114442, for example.

We note that bunching waveforms applied to the bunching electrodes may continue throughout the extraction cycle. This provides continuity of the travelling waves within the extraction region elsewhere in the transport device and without having multiple PSUs for providing the bunching waveforms.

Preferably the waveforms applied to the bunching electrodes do not change through both transmission and extraction stages of the extraction region. This way, no additional power supply or switch needed for the bunching rods of the extraction region.

Axial Extraction of Ions from the Ion Guide.

Ion bunches may also exit the ion guide in an axial direction (i.e. parallel to the ion guide axis) through an ion exit end. Ion bunches exiting axially may pass into an orthogonal extraction region, this provides alternative method of introducing ions into a ToF analyser (oaToF—orthogonally acceleration ToF). oaToF methods are well known in the art. They are employed widely in many commercial instruments, known as LC-ToF and Q-ToF formats. The axial extraction method has the advantage of allowing the analysis of ion placed in every consecutive potential well (no wells need to be missed in between the extractions).

Structures and Techniques for Generating the New Waveforms.

In practice, to generate the new waveforms disclosed herein:

- Bunching waveforms may be applied to repeated sets of N segmented electrodes (segments). The number of segments Nin each set of segments may be constant throughout the entire transport channel. The repeated sets of segments are indicated by the electrode shading in the section of the ion guide shown in FIG. 9*b* (which shows an example of an N=8 phases embodiment).
- Each of N modulation phase may be applied to each Nth electrode. For example, for N=8, Each electrode has a preceding electrode with a shift of the phase angle of −360/8=−45 degrees and a proceeding electrode with a phase shift of +45 degrees.
- The bunching electrodes may be separated in axial direction by distance s. Thus, the number of phases and electrode separation defines a repeat distance, L. In the current 8 phase embodiment the repeat distance, L is equal to 8*s. A total length of the device, $L_{total}$, may be significantly greater than L. There may be M groups of electrodes with each group comprising 8 bunching electrodes, then the total length of the ion guide, $L_{total}$ will be equal to M*L and in this example equal to M*8*s. As an example, s may be 1 mm, and M may be 50. Thus, the total length of the guide would be $L_{total}$=400 mm. The device may be longer or shorter than this depending on which application or instrument it is applied to.
- The repeat distance L also defines the wavelength of the travelling waves, and the distance between consecutive potential wells.

In the provided example, each of the 8 modulation phases is connected to exact M electrodes.

We note that in some examples the repeat distance s and the inscribed radius or lateral dimensions of the ion guide may vary along the length of the ion guide.

Further Description of New Waveforms

In practice:

An amplitude modulated waveform can be described by the function:

$$V_i(f,T,t)=U(2\pi t/T+\Phi_L)*\xi(2\pi ft+\phi)), \quad (1)$$

Here $U(2\pi t/T+\Phi_L)$ is a periodic modulation function with having a period T (sec), phase $\Phi_L=2\pi*i/N+\Phi_0$, where i=0, 1, . . . N−1, and $\Phi_0$ is an initial phase that can be arbitrary; $\xi(2\pi ft+\phi)$, is a fast oscillating periodic function with frequency f and phase $\phi$.

The component $U(2\pi t/T+\Phi_L)$ modulates the RF voltage. The RF voltage is denoted by function: $\xi(2\pi ft+\phi)$. It is also a periodic function having an RF frequency f (Hz). It can be for example a harmonic function or a square wave. The RF phase and frequency are preferably common to all modulation phases.

In general RF frequency f should be significantly greater than the modulation frequency, denoted as 1/T. Typically f could be in a range 0.2 to 5 MHz, and typically 1/T is in a range 0.1 to 20 kHz.

The phase angle $\Phi_i$ should be different for each modulation phase provided by the power supply unit (PSU). In the general case of N phases (N electrodes in the repeated set of segmented electrodes), the PSU should provide N waveforms as described by equation (1), each of the N phase have a different phase angle, the 1 to N phases have a phase angles given by: $\Phi_i=-2\pi i/N$, where i=0, 1, 2, . . . N−1. Returning to the example of 8 phases, the phase angle would be as follows:

Phase 1: $\Phi_1=0$ degrees;
Phase 2: $\Phi_2=-45$ degrees;
Phase 3: $\Phi_3=-90$ degrees;
Phase 4: $\Phi_4=-135$ degrees;
Phase 5: $\Phi_5=-180$ degrees;
Phase 6: $\Phi_6=-225$ degrees;
Phase 7: $\Phi_7=-270$ degrees;
Phase 8: $\Phi_8=-315$ degrees.

Period T determines the period of the travelling pseudo potential wells. That is the time between delivery of ion bunches occupying adjacent wells.

The wave velocity is given as L/T in units of m*s

Advantageously, an RF component of the waveforms and the radial trapping RF waveform may have the same phase angle, frequency and amplitude and can be conveniently derived from a single control unit.

A key aspect of the present invention is the form of the periodic modulation function, (by form we mean exactly how the amplitude changes with respect to time within a single period T), it is denoted as $U(2\pi t/T+\Phi_L)$.

The time dependence of each modulation phase should have the same form.

Figure 10A:
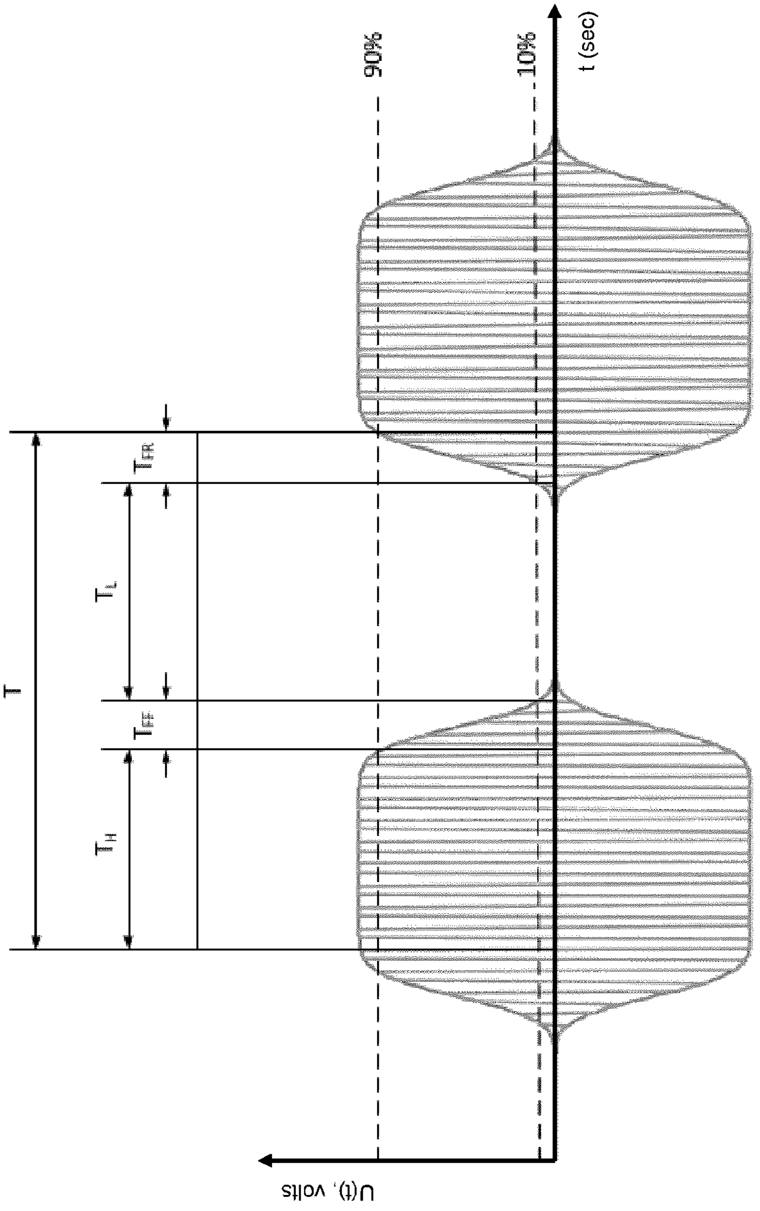
FIGS. 10*a-h* illustrate waveforms according to the present disclosure.
Figure 10B:
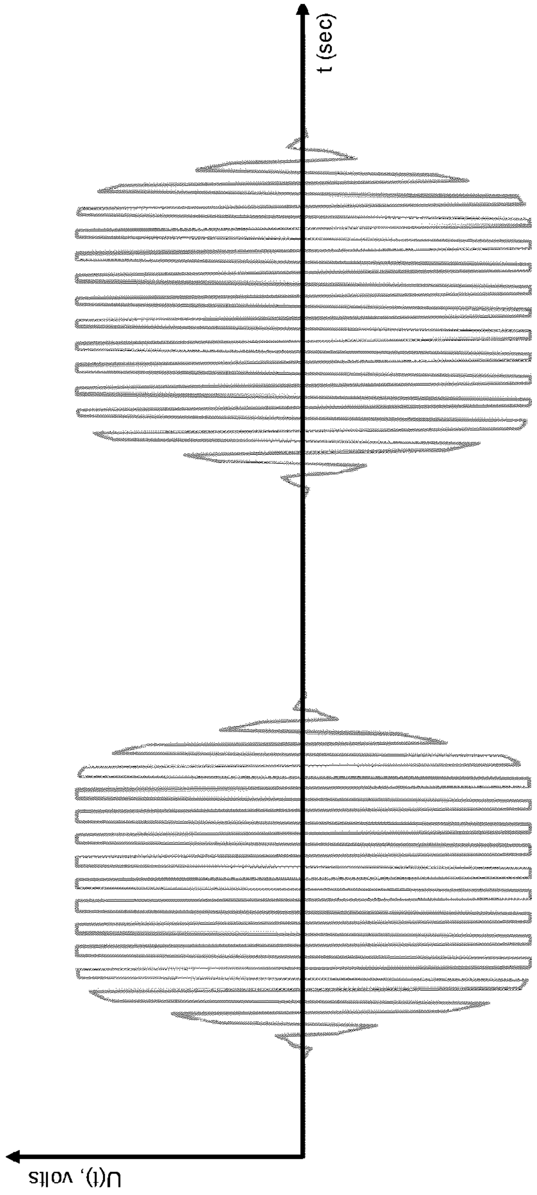
Figure 10C:
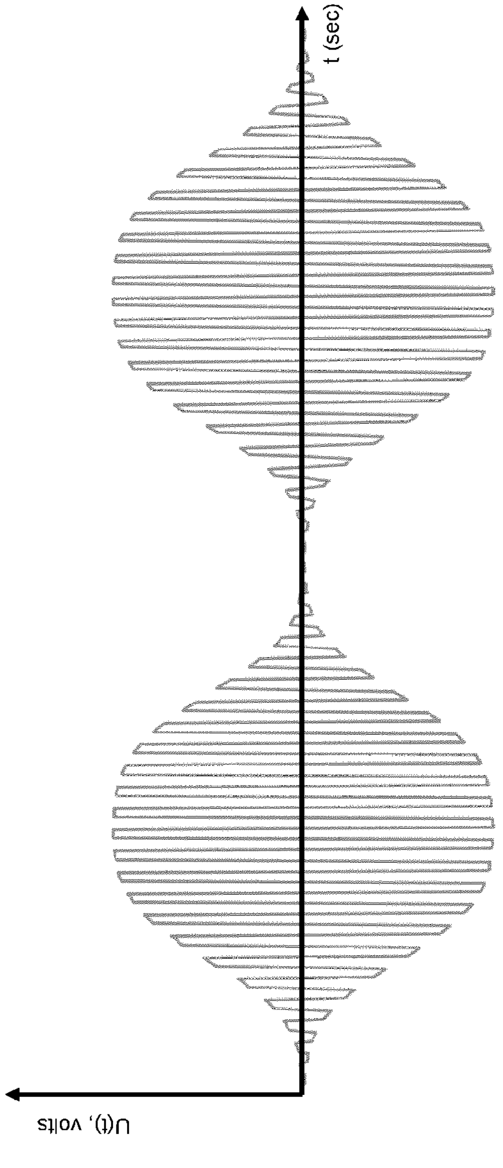

A periodic modulation function $U(2\pi t/T+\Phi_L)$ can be defined as a waveform that may be divided into 4 parts, within a single period, T, of the periodic function. With reference to FIG. 10*a*, there is a first duration in which the RF voltage is substantially constant high-level voltage or amplitude, denoted as $T_H$ in FIG. 10*a*. There is a second duration denoted as $T_{FF}$ in FIG. 10*a* in which the RF voltage in average is falling between the high-level voltage, or amplitude, to a low-level voltage. There is a third duration denoted as $T_L$ in FIG. 10*a* in which the low voltage is constant. There is a fourth duration denoted as $T_{FR}$ in FIG. 10*a* in which the RF voltage is rising between the low-level voltage or amplitude and the high-level voltage, or amplitude.

The rising and falling periods, $T_{FR}$ and $T_{FF}$ are preferably substantially non-zero and always present. Turning the $T_{FF}$ or $T_{FR}$ to zero would change the shape of the pseudo potential or potential too much providing periodic impulse forces to the ion bunches, or from another point of view abrupt changes of the axial field, thus causing acceleration and de-acceleration propagation of the potential wells and as prior art described above.

In practice, the present inventors believe the following conditions are preferred to achieve optimum performance:

$T_F=T_{FR}*T_{FF}$ and $T_{FR}+T_{FF}\leq T$. More preferably, $T_{FR}=T_{FF}$, and $T_{FR}+T_{FF}>T/20$ $T_L$ should preferably be $\geq T/N$. That is the time for wave to propagate the distance between 2 bunching electrodes. In some examples, $T_L\geq 2*T/N$.

$U(2\pi t/T+\Phi_L)$ should preferably be a continuous and smooth function (no sudden change in the voltage). The first derivative of $U(2\pi t/T+\Phi_L)$ with respect to time is most preferably less than 100 (where U and t are expressed as normalised parameters: $U'=U/U_0$ and $t'=t/T$). The quantity $U/U_0$ may be referred to as the "unit phase" as it will have maximum and value of 1 and usually extends between extreme values of 0 and 1. U' and t' are unit-less quantities.

The first differential of $U(2\pi t/T+\Phi_L)$ with respect to time is most preferably also be a continuous function.

The amplitude of the RF voltage applied to the primary rods should preferably not be modulated.

Other preferred conditions includes:

In some embodiments $T_{FR}=T_{FF}$, though in other embodiments $T_{FR}\neq T_{FF}$ In some embodiments $T_H=T_L$ though in other embodiments $T_H\neq T_L$.

The maximum voltage of the axial potential is preferably at least 70% of the amplitude of the applied voltage waveforms.

The minimum of the axial potential is preferably less than at least 30% of the amplitude of the applied voltage waveforms.

The sum of unit phases is preferably between 2 and N−2

The sum of unit phases is preferably an integer value.

When digital driving of the waveforms is used, the digitisation of the waveforms is preferably an integer number of N. For example, for the preferred N=8 the number of digital steps per period can be 256 (8 bit number).

In summary the form of the traveling potential wells and barriers, i.e. the height, shape and axial length (length along the axis) depend on aspects of the waveform as exemplified below.

The radially trapping RF is an important part of the entire system. As the bunching waveforms do not provide radial trapping, this role belongs to the radially trapping field. As it was emphasized above, both bunching waveforms and radially confining waveforms are independent.

However, when the bunching waveforms are the modulated RF waveforms, it is necessary to provide a certain ration of the frequencies for the both radially trapping RF and the modulated RF. In embodiments, it is practical to supply the same RF voltage for both types of waveforms. In this case, areas of high modulated voltage with the duration $T_H$ may create areas of weak electric field. This is advantageous, as the ions that could be "over spilling" from the wells of the travelling waves, would be poorly confined in between the wells and would escape the ion guide, thus, reducing or, preferably, eliminating the "cross-talk" between the wells. Otherwise, the both frequencies must be integer value of each other. This is to prevent unwanted loss of ions due to possible frequency beating. Also, phase shift between the both RF is possible. The most practically useful phase shifts would be 0° and 180°, as they, correspondingly, would create areas of weak or strong radially confining electric field.

In the examples discussed herein, the structure is preferably capable to create a quadrupole field (or a field that has substantial quadrupole component) in a plane orthogonal to the axis of the device, at least in part of the device.

In the examples discussed herein, a preferred minimum number of the segments in each set of bunching electrodes (N) that could deliver the described type of waveforms is six (6). A preferred number is: N=8, but other numbers can be used. The higher is the number the smoother is the translation of the ion bunch, but at the cost of greater complexity. Eight phases provide sufficient smoothness of transition for the travelling waves that would be able to keep a wide mass range of ions cooled throughout the entire pressure gradient of the transport channel.

Supporting Data

We now illustrate the invention by specific example, in which the form is based on the error function erf. All examples given in FIG. 10_a-g_ are based on this function. The error function is a special mathematical function of sigmoid shape that occurs commonly in probability and statistics, as well as other areas of mathematics. We apply this function to describe how the voltages change from low to high and from high to low values, as meets the requirements (under certain parameters ranges of the invention as defined above) it provides a 'smooth' transition between the two (high and low) voltage levels. The definition of the error function is:

$$\frac{1}{\sqrt{\pi}}\int_{-y}^{y} e^{-x^2}\,dx$$

The function, in mathematics is simply erf(y) where y is the quantity that determines the limit of integration of the gaussian function. We note that the gradient of erf is the gaussian function itself.

$$\mathrm{erf}(y) = \frac{1}{\sqrt{\pi}}\int_{-y}^{y} e^{-x^2}\,dx$$

In our example application the variable y is expressed in terms of time variable: t. The function erf(y) expresses our voltage or voltage amplitude (in case when it's used to modulate RF) with respect to time, i.e. it defines the function U(t) introduced above. The waveform must divide into two parts:

In the first half of the period T, 0<t≤T/2 where:

$$y = y_1 = -p + t\frac{4p}{T}$$

so the limits of the integration go from −p to p.

And in the second half, T/2<t≤T where:

$$y = y_2 = \left(-p + (T - t)\frac{4p}{T}\right)$$

so the limits of the integration go from −p to p. This provides a 'balanced' form of modulation: that is $T_H=T_L$ and $T_{FR}=T_{FF}$. The form of the modulation waveform thus can be expressed as:

$$U_p(t) = U_0 \cdot \begin{cases} 0.5(\mathrm{erf}(y_1)+1), & 0 < t \le T/2 \\ 0.5(-\mathrm{erf}(y_2)+1), & T/2 < t \le T \end{cases} \quad (2)$$

Figure 10D:
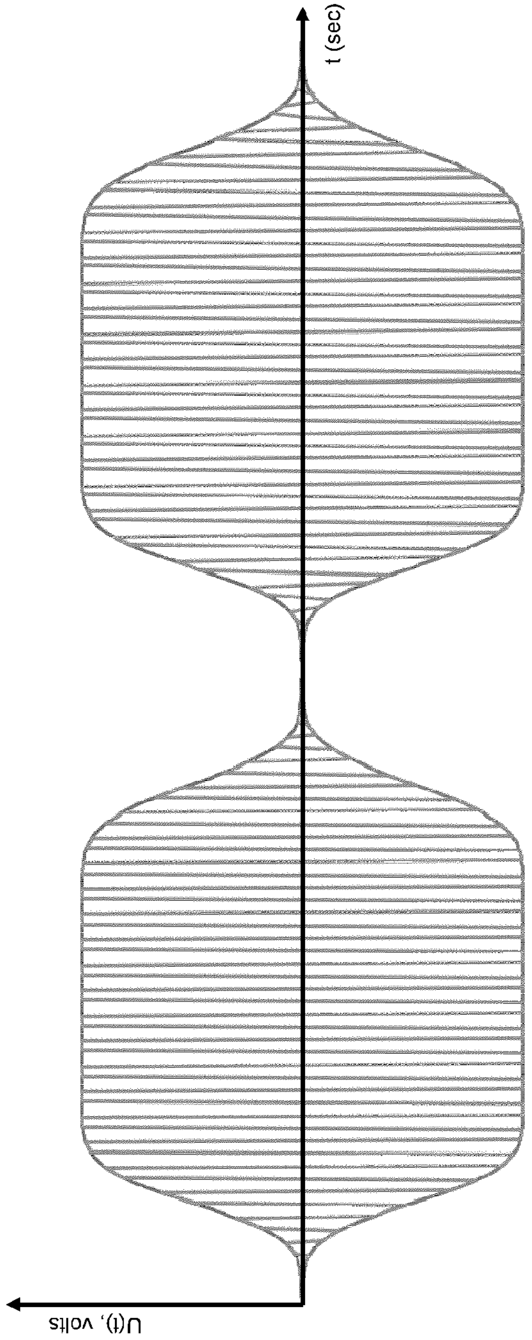
Figure 10E:
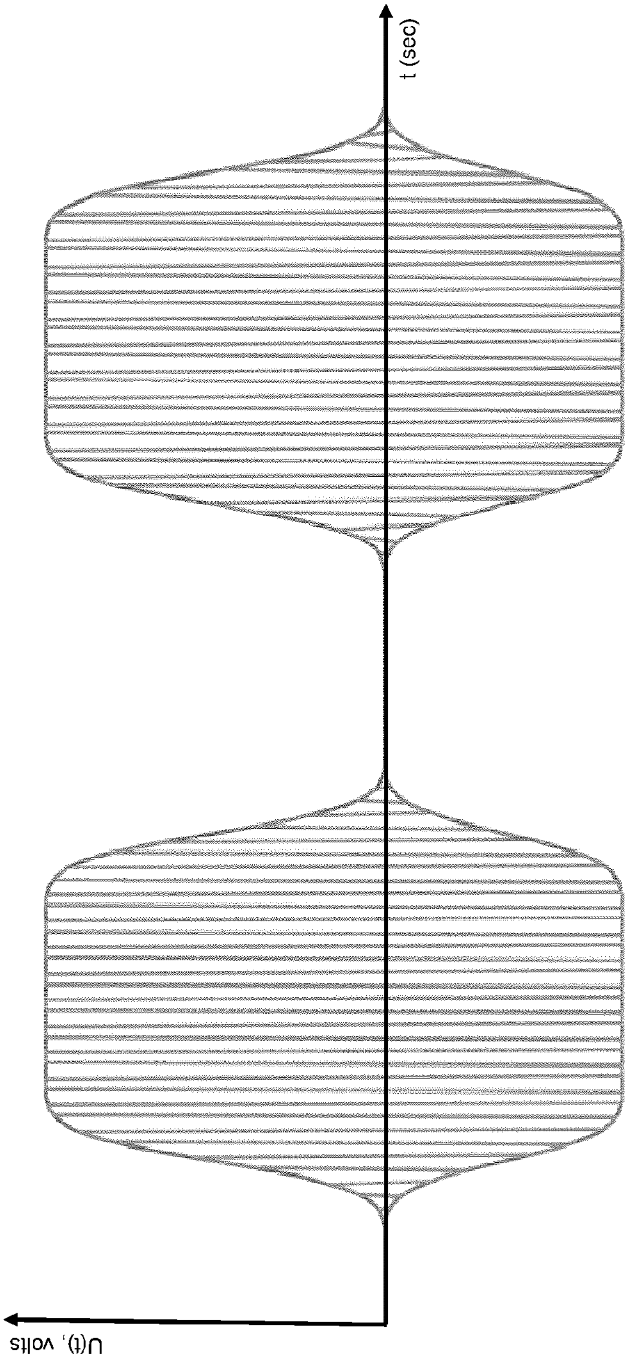
Figure 11:
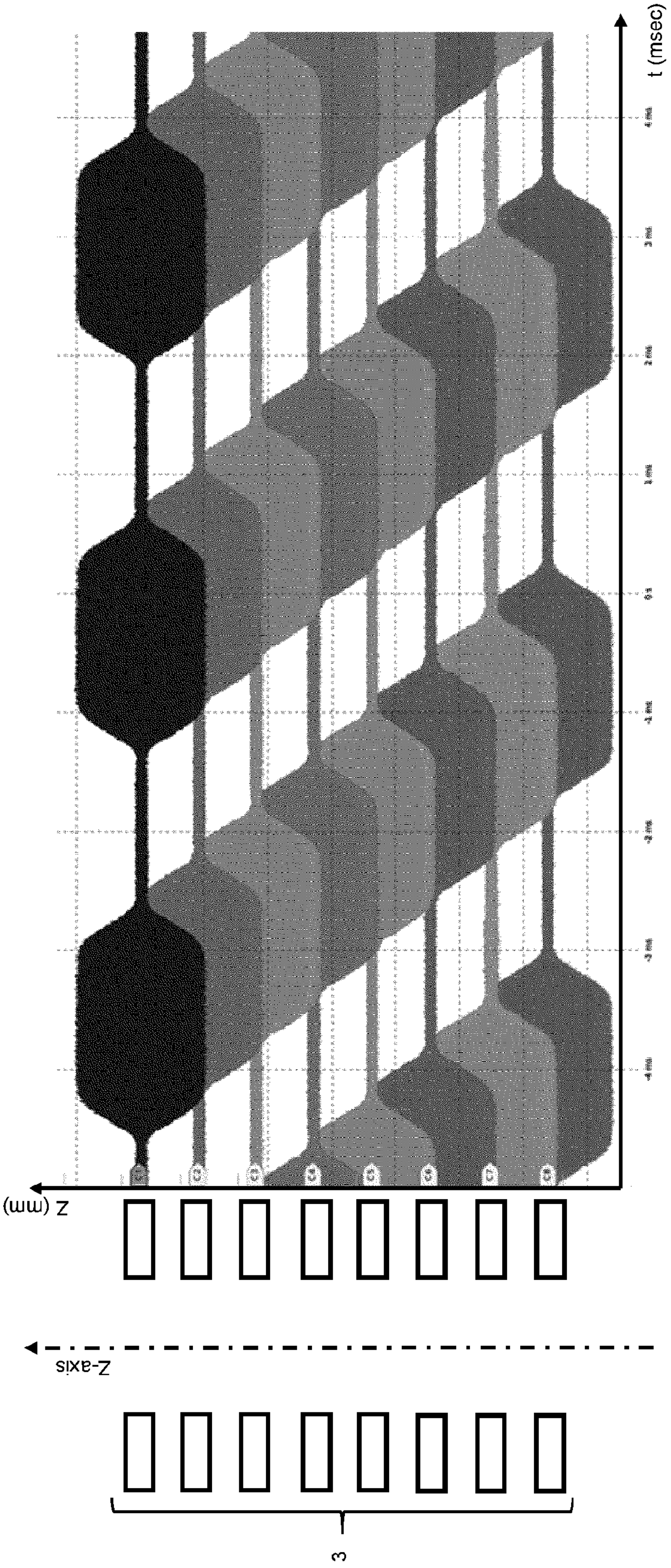
FIG. 11 shows an example of the disclosed waveforms.
Figure 12:
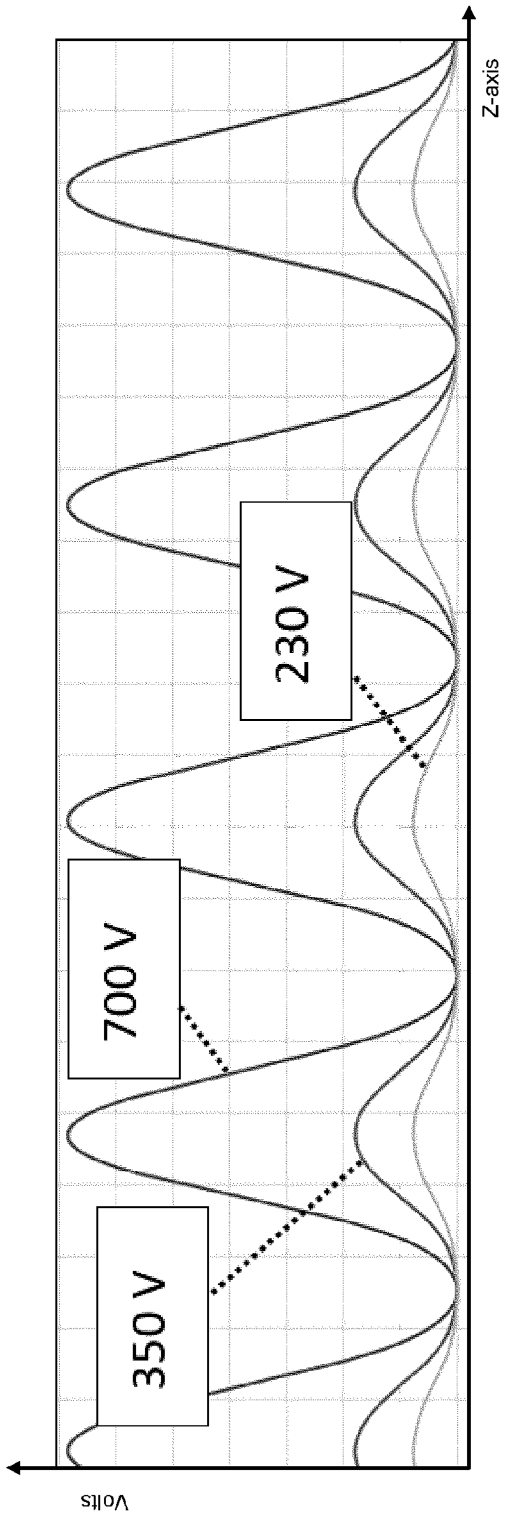
FIG. 12 shows the pseudo potential at the axis for an 8 phase ion guide corresponding to the waveforms of FIG. 11 having different amplitudes.

Here, T is the period of the modulation waveform and parameter p is a dimensionless parameter (effectively it is parameter that may be used to define the steepness of the transition between the high and low voltage states, and so the values of $T_{FR}$ and $T_{FF}$). FIG. 10_a_ and FIG. 10_b_ show a modulation waveform calculated for parameter p set to five (p=5). In this case the modulation waveform is modulating a higher frequency RF waveform (note that the relative frequency RF waveform to the modulation is artificially low in this figure so that the reader can see the square RF waveform). An example of the waveforms is in FIG. 11 and the corresponding potential at the axis for N=8 segmented electrodes in the repetitive set of an ion guide is shown in FIG. 12. FIG. 11 also schematically shows the segmented bunching electrodes 3 of the device 1 schematically illustrated in FIG. 6, to which the eight phases of the waveform are applied (here, N=8, rather than N=6 as shown in FIG. 6), such that each bunching electrode 3 in a group of eight successive electrodes receives the same waveform at a different respective one of eight phases of the waveform. The phase of the waveform applied to successive bunching electrodes at successive electrode positions along the Z-axis of the channel, increases in successive steps of 45 degrees.

FIG. 10_c_ shows another example, when the modulation waveform calculated for p parameter set to 2.5 (p=2.5). It is preferable that p>2.

This type of waveform will generate pseudo potential barriers of a Gaussian shape with equal distance from each other.

The period $T_H$ can be non-existent, i.e. the rising front of the waveform can reach its maximum and then immediately start falling. This is like the waveform shown in FIG. 10_c_. However, it may be beneficial to have a longer period $T_H$. This way, the height of the pseudo potential or potential barrier is larger.

An example, demonstrating the benefits of the non-zero $T_H$ together with the steeper rising and falling fronts of the waveform are in FIGS. 10_g_ and _h_. In FIG. 10_g_ there are two waveforms. Waveform 'a' has flatter fronts and $T_H\sim 0$. Waveform 'b' has clearly visible period of $T_H$. Both waveforms have the same period and amplitude. The difference in the resultant pseudo-potentials at the axis is depicted in FIG. 10_h_ 'a' and 'b' correspond to the two waveforms. One can see that the axial pseudopotential b' is at least twice higher. This example shows that the parameters of the travelling waves for the new type of waveforms can be modified without changing the amplitude or frequency of the waveforms, by modulation only.

A more general implementation of the error function (erf) of can be defined so that $T_{FR}=T_{FF}$ and $T_H\neq T_L$ including $T_H>T_L$ and $T_H<T_L$.

$$y_1 = -p + t\frac{4pf}{T} \quad (3)$$

$$y_2 = -p + (T-t)\frac{4pf}{T} \quad (4)$$

Where f is a dimensionless parameter close to 1 (one). The choice f>1 provides waveforms with $T_H>T_L$ and f<1 provides waveforms with $T_H>T_L$. An example of the case where $T_H>T_L$ is shown by FIG. 10*d*. The modulated RF waveform is shown together with the positive and negative forms of the modulation envelopes.

The duration $T_H$ is the period of maximal amplitude of the waveforms has two roles in bunching. First, it takes part in formation of the potential/pseudo potential barriers (an example is provided below for waveforms based on erf function). Second, it influences the dimension of the ion bunches in the axial direction.

Now we consider the case where a modulation waveform modulates amplitude of RF voltage. In practice this type of waveform is created by generating two components of the modulation waveform for each of the 8 phases to be provided by the PSU. That is a positive envelope according to equation (2) and a negative counterpart according to equation (5). The RF modulated waveform may be as shown in FIG. 10*a* to FIG. 10*d*. The RF voltage may be provided, for example, by a digital switching method which may employ high frequency switches so as to electrically connect the bunching electrodes alternately to positive and negative power supply rails to provide the RF oscillating component of the waveform.

$$U_n(t) = -Uo\begin{cases} 0.5(\mathrm{erf}(y_1)+1), & 0 < t \le T/2 \\ 0.5(-\mathrm{erf}(y_2)+1), & T/2 < t \le T \end{cases} \quad (5)$$

In the above examples, FIG. 10*a* to FIG. 10*d* the amplitude $U_n(t)$ and $U_p(t)$ (correspondingly, negative and positive potentials of the high frequency RF) are the same, just having opposite sign. These are examples where RF amplitude is modulated.

In embodiments, the amplitudes of $U_n(t)$ and $U_p$ (t) may differ. For positive ions it is advantageous that: $[U_p(t)]>[U_n(t)]$, and for negative ions: $[U_p(t)]<[U_n(t)]$. An example of the $[U_p(t)]>[U_n(t)]$ case is shown by FIG. 10*e*.

Figure 10F:
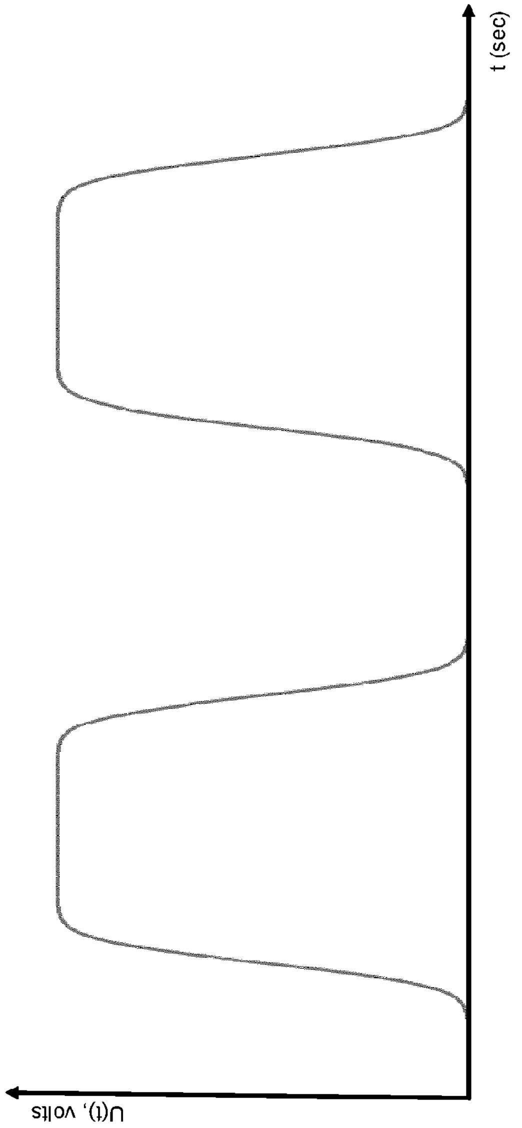
Figure 10G:
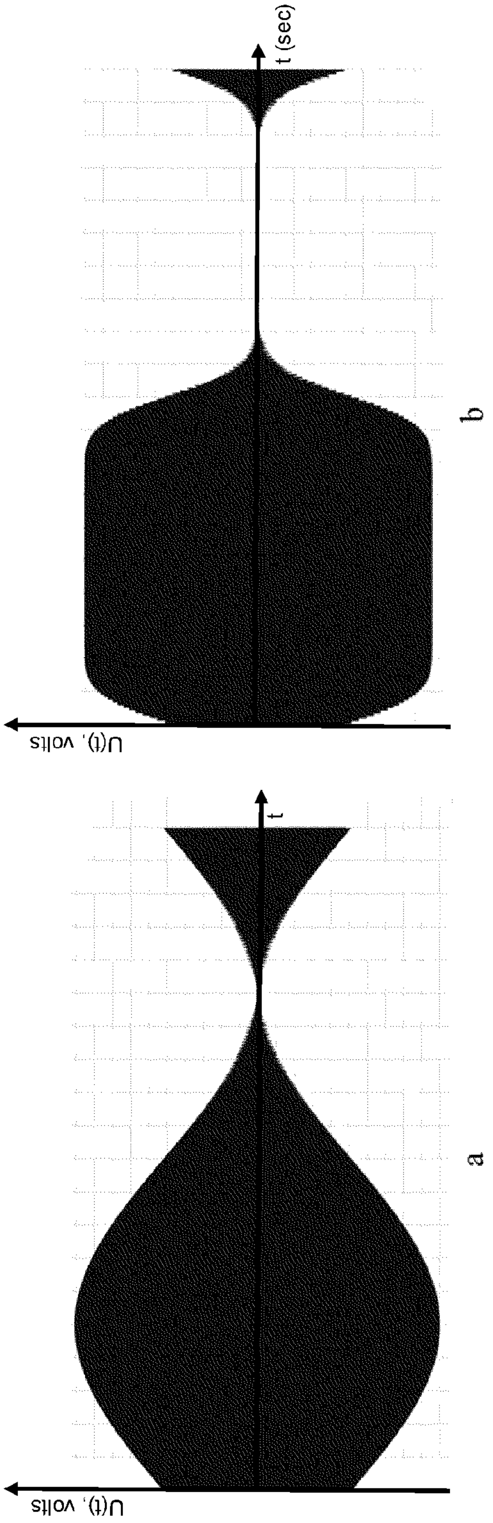
Figure 10H:
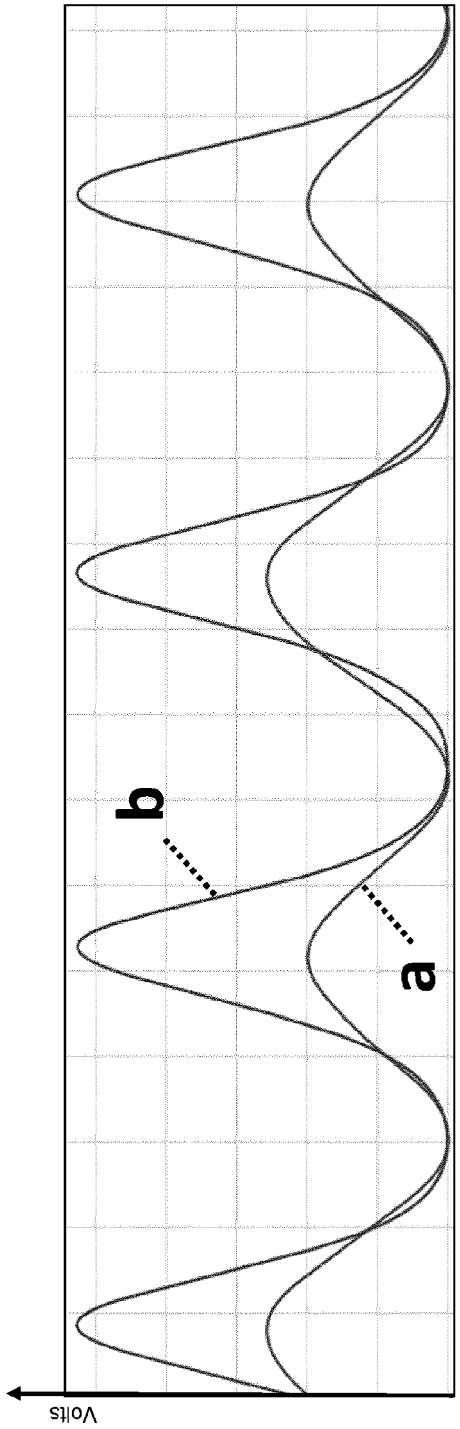

In this case an offset voltage (a deliberate offset) with the same form as the RF modulating voltage is generated, such as shown in FIG. 10*f*. The generation of this type of modulation waveform voltage may be done for the following reasons:

A parasitic offset voltage may be generated, which may be in part or all negative. This negative component would detract ions from the pseudo potential that is generated by the modulated RF voltage. Thus, a negative parasitic offset voltage would reduce the performance of the device. This negative component can be prevented by the condition $[U_p(t)]>[U_n(t)]$.

The modulation waveform voltage adds or reinforces the modulation waveform amplitude. Thus, the modulation may then have two components: an RF voltage component and a slowly changing AC voltage component (the characteristic time of the change is much greater than the frequency of the RF). For the transmission of positive ions the two components reinforce each other. The RF component creates the translating pseudo potential wells, and the slow AC voltage component generates translating potential wells. The height of pseudo potential wells are mass dependent and the translating potential wells are independent of mass. The combination of the translating pseudo potential wells and potential wells improves ion confinement and extends the mass range of transmitted ions.

Thus, to be clear, the methods taught herein allow for any relative combination of the potential and the pseudo potential components in generation of the travelling potentials.

So, a strong feature of the methods taught herein is the ability to cope with possible parasitic offsets that may reduce the height of the pseudo potential barriers. Due to the features of the new waveforms, the parasitic offset in the positions of the ions will not occur. However, if there is a parasitic offset in the regions of the fronts of the waveform, this may change the effective height of the pseudo potential barrier. If the parasitic offset is negative, the positively charged ions would have greater possibility to escape the pseudo potential. This effect is possible to correct using the new waveforms, as taught by introducing a deliberate positive offset. Such deliberate shift is not dependent on the ion mass; therefore, it keeps the wide mass range. The opposite sign of the ions would naturally require the opposite sign of the deliberate offset.

These examples are based on one type of function only, the error function. However, the function could be considered as a subset of a broader range of possible functions. Another function is given by equation (6). Solutions are imaginary, but the real part gives solutions to provide the waveforms.

$$U(y,k)=\mathrm{erf}(\sqrt{y\ln(k)})-\mathrm{erf}(\sqrt{-y\ln(k)}) \quad (6)$$

Here k is an additional parameter/variable the value of which is selectable as desired. It is important to note that the presented above functions are not the only type of functions that can satisfy the preferred conditions outlined previously. The rising and falling fronts together with the duration of the high and low voltage parts can be presented with the help of wide range of mathematical functions, including splines. In practice, the electronics, realising the waveforms, introduces its own correction to the view of the waveforms. Therefore, erf functions, presented here, is a useful and simple tool to understand the behaviour of the waveforms and the potential and pseudo potential created with their help. However, they cannot be treated as the only exhaustive way to describe the more general waveforms.

Influence on Dissociation

When a method of dissociation, such as ETD (electron transfer dissociation), are employed within the ion guide, both positive and negative particles need to be transported in the same potential wells simultaneously. Advantageously, this feature can remain when deliberate positive offsets are used. This is due to the fact, that the pseudo potential is m/z dependent. Reactant ions in ETD are normally of a low mass, e.g., anthracene radical anions (m/z 177 and m/z 179) or fluoranthene radical anion (m/z 202). These low mass ions are affected by higher pseudo potential than the higher mass analyte ions, so a small positive deliberate shift still effectively allows to transmit together positive ions reactant and negative reagent ions.

In some examples, travelling waves can be produced by the disclosed waveforms without RF component, that is only a modulation waveform voltage as shown in example 'b' of FIG. 10*f*, at least for part of the length of the ion guide. In this case, only ions of the same charge can be transported. The example waveform of FIG. 10*f* was created with f=1 and p=5, with reference to equations 2 to 5. Positive ions would be transported by the positive potential, and conversely negative ions would be transported by an inverted variant of FIG. 10*f*. The period of the waveforms still preferably has all 4 parts, $T_L$, $T_F$ (consisting of both rising and falling parts), $T_H$. In some examples, the amplitude of the waveforms could be, for example, around 5 v to 20 v. Of course, other values are also possible or may be preferable. In some examples, the number of repeated sets of axial segments could be, for example, eight (8) or could be ten (10). Of course, other values are also possible or may be preferable.

Example 1

Figure 13A:
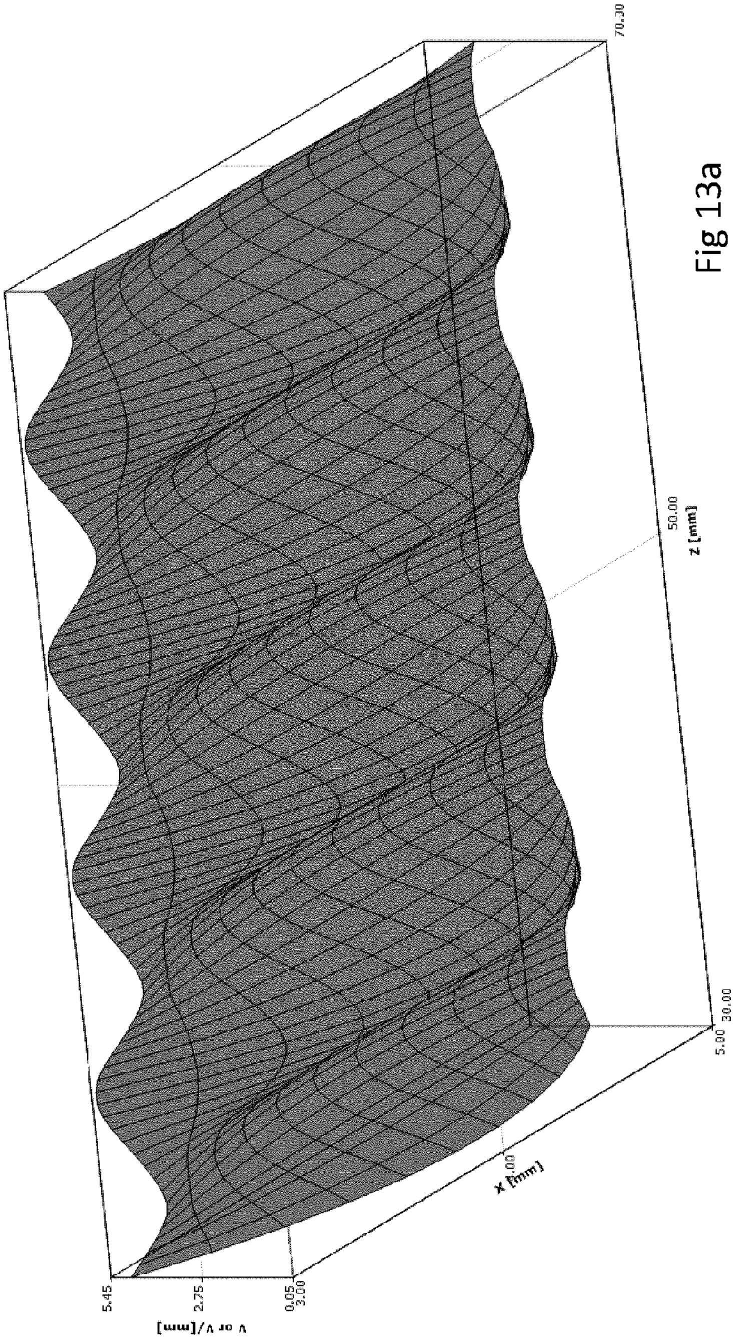
FIG. 13*a* shows a pseudopotential in a ZX plane due to a prior art modulation technique (infinite modulated sine wave).

In FIG. 13*a* there is a 3D picture of the pseudo potential in the ZX plane for ions with the m/z equal to 1000 Th described in prior art:

$$\overline{U}\cdot(z,t)=(E_0^2/8m\omega^2)(1+\cos(2z/L-2t/T))$$

Here, Z is the direction of the axis of the ion guide (in a longitudinal direction), X is a direction towards the continuous rods (geometry depicted in FIG. 7*a*) with an inscribed radius of 2.5 mm. The pseudo potential was created using sets of 8 electrodes with a 1 V constant potential at the continuous rod. The waveforms had amplitude 390 V (0–p) and frequency 1.2 MHz.

Figure 13B:
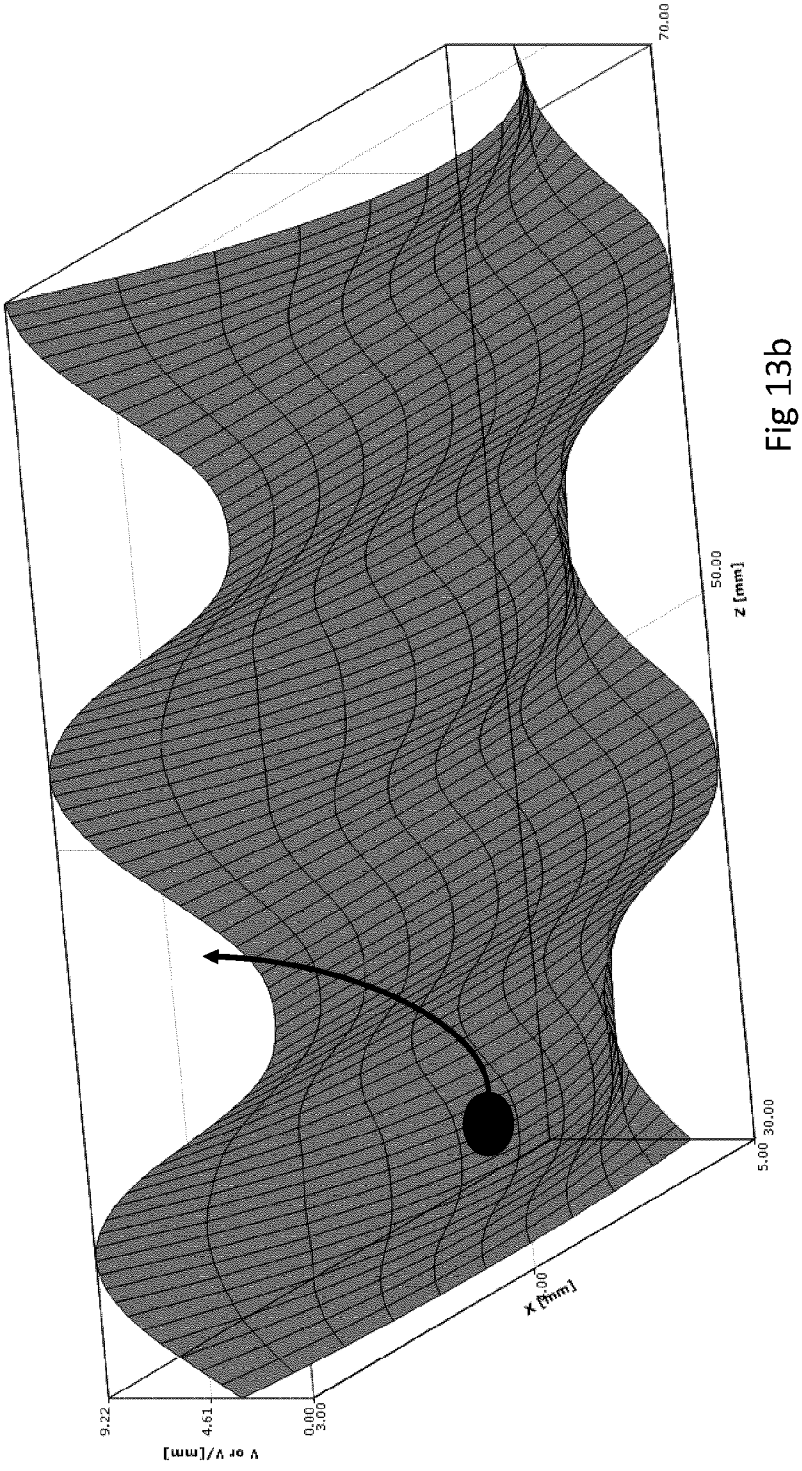
FIG. 13*b* shows a pseudopotential in a ZX plane due to a modulation technique according to the present disclosure ('erf' modulation).

In FIG. 13*b* the moving pseudo potential created using the modulated waveforms from Eq. (2) with p=5. The amplitude of the RF carrier was 360 V (0–p) and 1 MHz was the frequency. An RF carrier of 200 V (0–p) and 1 MHz as applied to the radial confinement electrodes.

Comparing the two figures, one can see a better radial confinement is provided by the new waveform based on erf waveforms of Eq. (2): the height of the pseudo potential at the continuous rod is higher in FIG. 13*b* at X=3 mm at the graph. This is due to the radially confining RF applied to the continuous rods. Note that both waveforms provide similar low mass cut off (around 170 Th). One could also notice that the structure of the pseudo potential wells in the two cases is different. In case with erf, there are twice less wells that carry the ions (an example of such a well contains a black circle depicting ions in the position of an ion bunch). There is another well in between the ion carrying wells and note that this well has very small or no electric field in the X direction. These areas of weak field serve to allow ions to escape from the ion guide radially (depicted by a black arrow). This is useful property of the new waveforms as it reduces any the cross talk of ions that may be in consecutive wells. Any ions that may be lost radially from a well in an axial direction will be lost from the guide in a radially direction instead of over-spilling into the adjacent well. This feature is uniquely available for the waveforms disclosed in the current publication, when the phase of the RF at the continuous rods is the same as the phase of the bunching waveforms at the segments.

Example 2

Figure 13C:
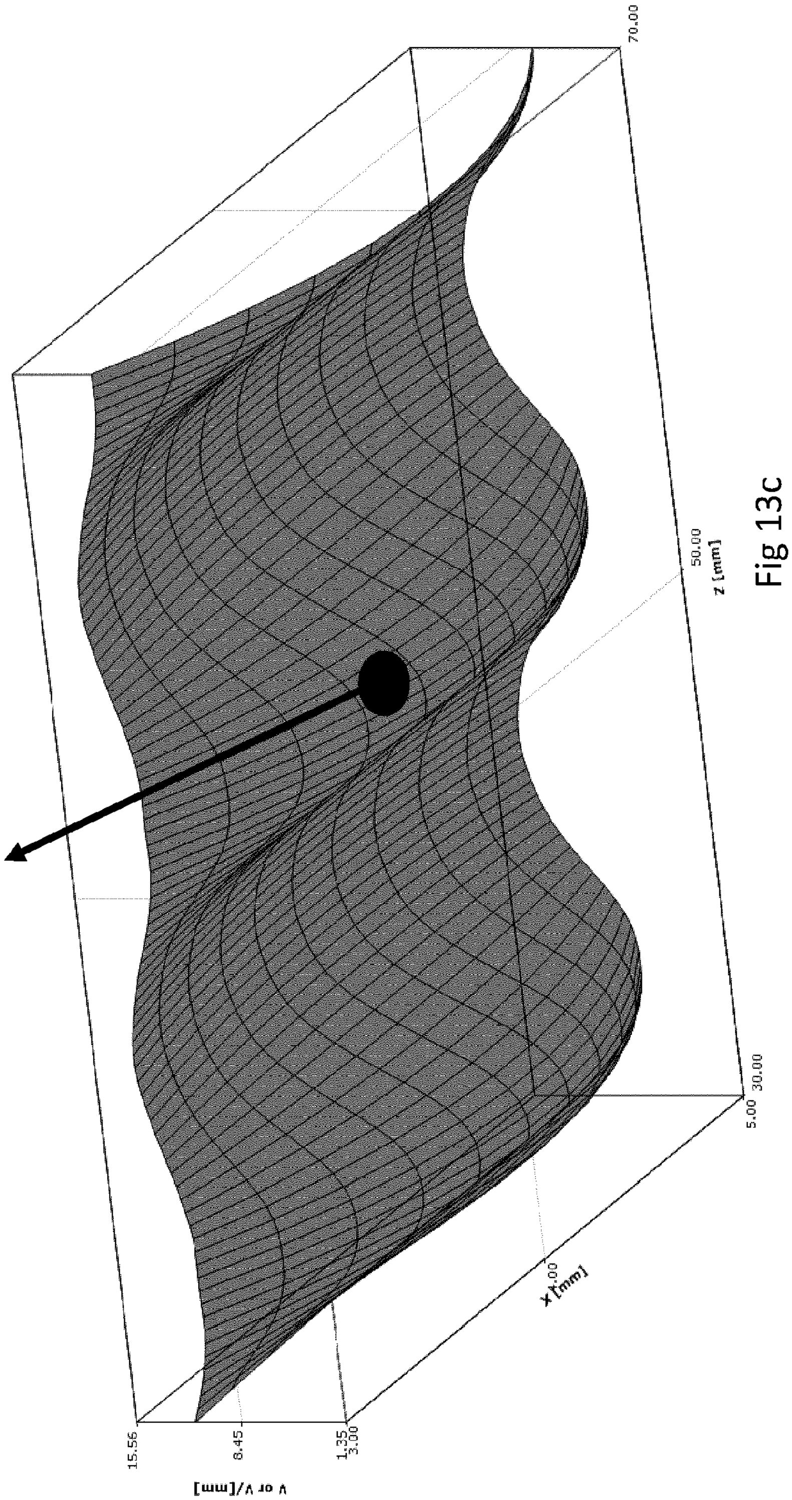
FIG. 13*c* shows a total potential in a ZX plane due to a modulation technique according to the present disclosure ('erf' modulation) plus a deliberate positive offset (+20V).

FIG. 13*c* shows a pseudo potential from FIG. 13*b* with an added deliberate offset of +20V. The offset keeps the level of the low voltage the same increasing the high voltage level. A simplified example of such offset was depicted in FIG. 10*e*. As it was mentioned above, such an offset is technically easy to implement for digital waveforms. Comparing FIGS. 13*b* and 13*c*, one can see that with the deliberate offset there is no intermediate well. Instead, it has become a high barrier, increased several times. In this case, if there are any escaping ions, they are also likely to escape the guide radially, directly from the 'ion carrying' wells. The creation of the high axial barrier between the wells will also reduce any over-spilling (see the back circle depicting the ions and the black arrow showing the likely escape route).

AC Waveforms

As mention before the voltage supply can be configured such that N phases (waveforms) have no modulated aspect (i.e. no RF component). For example, in this case one phase of the waveform could look like that of FIG. 10*f*, or the corresponding negative part as appropriate. This type of AC waveform may be used for the purposes of the present invention when certain types of fragmentation methods are not implemented, The waveform of FIG. 10*f* is described by the equation 5 with parameters f=1 and p=5, hereafter erf(f,p). As before, the requirements of these waveforms are to allow ions to cool during their bunched transport within the bunching ion guide. By 'cool' we mean that they are substantially thermalized, meaning they have the same Maxwellian velocity distribution as the buffer gas molecules contained in the ion guide. Furthermore, ions should preferably remain cool when ion bunches are transferred from the high-pressure region of the device into the low-pressure region of the device. That is, they should keep the same Maxwellian velocity distribution as they attained in the high-pressure region.

To meet these requirements, this function the waveform should preferably define axial potentials that translate along the axis of the device with a substantially smooth manner. That is to say, the axial potentials (and features thereof) should preferably move smoothly, such that any acceleration and de-accretion should be smooth. Preferably axial potentials should move along the axial of the device at a constant velocity.

The inventors have found that smooth and gradual rising and falling of the edges of the waveform allow smooth motion of the ions. Desirably, within the $T_L$ period of the waveform the increase/decrease of the voltage should reach the magnitude of 0.1 $U_0$ during the time of much more than 1 period of RF, where $U_0$ is the amplitude of the waveform In use, there are addition requirements that are most preferably satisfied. For example, in some embodiments and applications of the invention it is desirable that a maximum range of masses is transported within each well of the bunching ion guide. Towards this aim, a waveform that may provide high potential barriers between adjacent ion bunches whilst maintaining the radial trapping pseudo potential. This aspect also helps in the capture of higher energy ions and operation of the injection region at reduced pressure of operation.

The inventors have found that erf waveform of FIG. 10*f*, that is erf(1,5), satisfices these stated requirements well. As described above this waveform is equally suitable for the case when the erf waveform is used in the modulation of a carrier RF, and the transport of the ions is by pseudo-potentials.

We note that the erf function is an example of the suitable waveform. However, other waveforms have been found to be suitable. Any waveform appropriately defined according to the current teachings is recorded digitally and stored in computer memory. The N phases of the waveform are created by N digital to analogue converters and then amplified by N audio amplifiers to produce the analogue waveforms to be applied to the bunching ions guide. Thus, the function that defines the waveform with N=8 is to be defined by a number of discrete time steps. For example, 256 discrete times steps per AC period is a suitable number, and the number should most preferably be greater than 32. Most preferably, the number of discrete time steps is a factor of N. For another example, if N=6, then the number of discrete steps should preferably be selected from: 36, 72, 108, 144 . . . and so on.

When the waveforms are to be AC waveforms, the positive or the negative phase is applied to the M sets of N electrodes as taught herein. The parts of the PSU may be present or absent. When present the voltage it supplies may comprise: a RF voltages; or RF voltages+AC waveform component; or purely an AC waveform. The RF voltages may be modulated.

The AC waveforms U(t) may be defined as erf(f,p) more generally. Various waveforms are shown as modulations applied to an RF voltage, in FIGS. 10*a* to 10*d*. These are achieved by selection of parameters f and p (equations 5). The applicable range of f and p is dependent on the number of phases employed (N). Higher ranges of f and p are possible for larger values of N. Parameter f determines the symmetry of the waveform. For example, if: f>1, then as shown in FIG. 10*a*, TH becomes longer than $T_L$, and when f<1, TH becomes shorter than TL. For a given value of f, p determines the duration of $T_{FF}$ and $T_{FR}$. The value off is preferably chosen to define the axial size of the ion bunch. A longer bunch may be chosen so as to carry a larger number of ions. A shorter bunch may be chosen for example to improve axial ejection.

Figure 45:
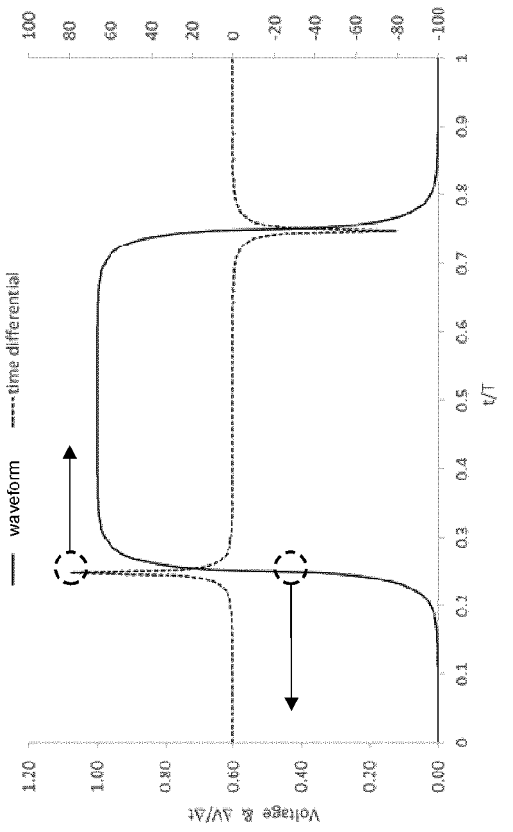
FIG. 45 shows an example of the disclosed waveform and its time derivative.
Figure 44:
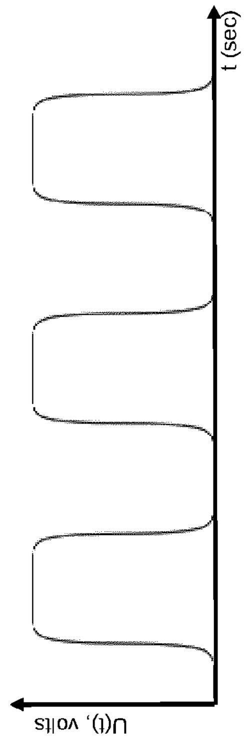
FIG. 44 shows an example of the disclosed waveform.

Although erf(f,p) is a convenient function, it is not the only means effective waveforms can be created. For example, equation (6) may be used and the waveform FIG. 44 is illustrative of this. This function gives rounded and smooth rising and falling edges and steep walls. This function provides smooth acceleration and de-acceleration transport of the ion bunches. Note that this waveform has slowly rising/falling edges that is a highly desirable feature of the new waveform. This type of waveform may be preferred in some embodiments and applications of the invention. FIG. 45 shows one full cycle of the digitised version of the waveform (256 times per cycle) in normalised units of time (i.e. t'=t/T) and in normalised units of voltage (i.e. $U'=U/U_0$), where $U_0$ is the amplitude of the waveform.

Other approaches of waveform may be employed, as long as the teachings defined above may be met. For example, one may subject a trapezoidal shaped waveform to appropriate digital smoothing to provide a waveform that conforms to the teachings above.

To be clear when the N phases of the waveform are AC voltages, it remains the case that the ion guide structure creates a field (e.g. a quadrupole field) to be used for radial confinement of the ions by the application of the aforesaid second supply voltage e.g. to radial confinement electrodes.

EXAMPLES

This aspect of the invention is illustrated by way of some example simulations. A bunching ion guide may have segmented bunches electrodes and continuous radially confining electrodes, the bunching electrode being spaced at 2.2 mm. In each case a confining RF of 150V and 1.429 MHz and the amplitude of the AC waveform was the 10V and its frequency was 1 KHz and N was 8. Ion bunches were transferred for a distance 4 L, in which for the first 2 L there was a pressure of 10 mTorr of Helium buffer gas and the next 2 L there was a vacuum. In each case ions in the range 150 Da to 1500 Da (150 Da, 200 Da, 600 Da, 800 Da, 1000 Da and 1500 Da) were initiated with 1 eV of axial energy. All ions were of single positive charge and 100 ions of each mass were lunched, there being ions 600 in total. In the case of the 1000 Da ions the progression of the ion bunch along the axis together with their axial energy, was monitored.

Figure 48:
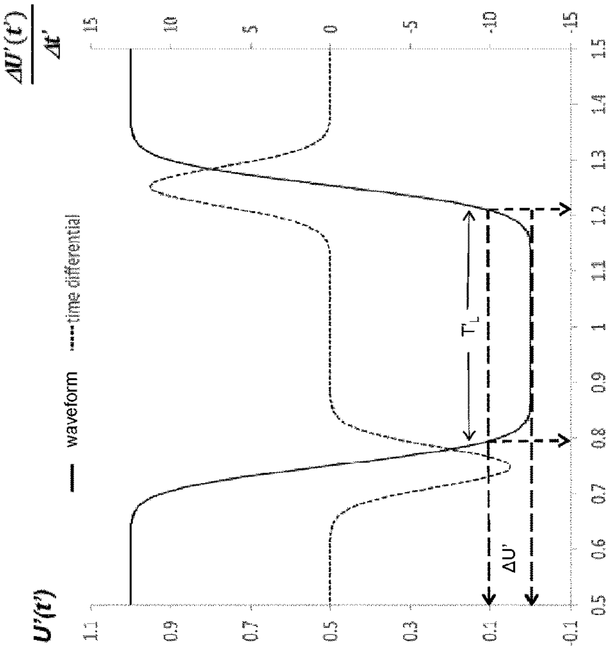
FIG. 48 shows an example of the disclosed waveform and its time derivative.
Figure 46:
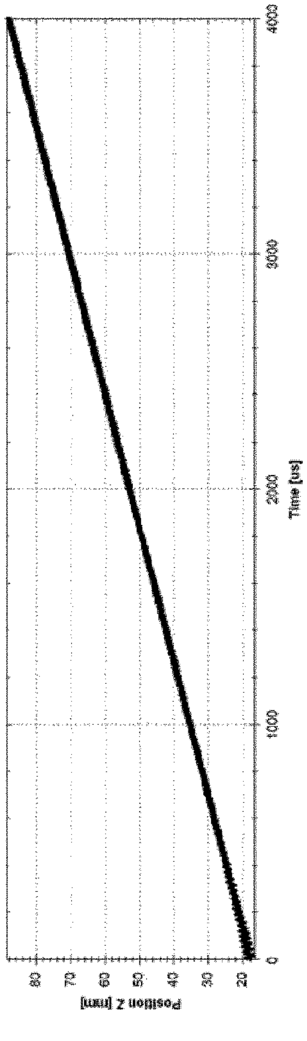
FIG. 46 shows an example of the trajectory of ions within an ion guide.
Figure 47:
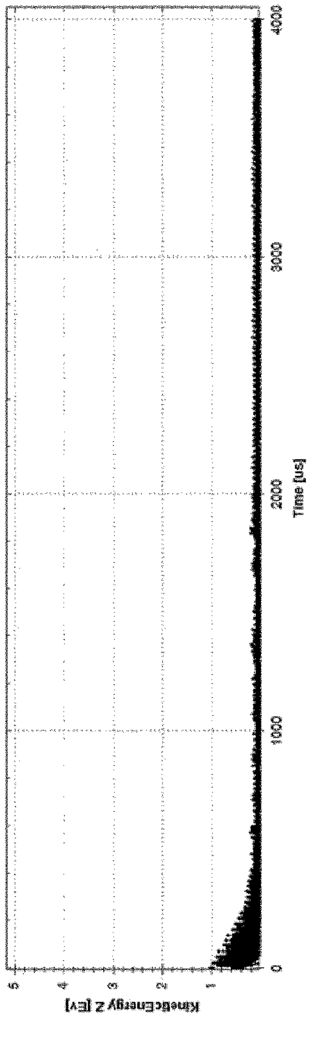
FIG. 47 shows an example of the kinetic energy of ions within an ion guide.

In this example, the waveform U(t) is defined as erf(1,5) and is shown by FIG. 48. Here, FIG. 46 shows the progression of the ion bunch along the axis. Notice that after an initial cooling period when the ion bunch is oscillating in the axial potential well, the ion bunch progresses at a constant velocity. FIG. 47 shows the progression of the axial kinetic of the ion bunch (the individual energy of each ion is recorded). The initial energy of 1 eV is reduce in 500 ms, thereafter the ions energy remains constant and the energy of the highest energy ions is <200 eV, the RMS energy is 0.0129 eV. For this waveform all ions within the range 150 Da to 1500 Da were transmitted within the originating potential well without losses.

FIG. 48 shows the unit waveform plotted by dimensionless units U'(t) against t'. The timing of the rising/falling of the voltage by 0.1 U'(t) is around 0.05 t' in this example. The RF period is much shorter than the period of the bunching waveform, typically it is 250-1000 times shorter. Therefore, the condition of the gradual change during $T_L$ is satisfied: 0.05 $t' \gg T_{RF}/T$. Also shown in FIG. 48, the first time differential $\partial U'(t)/\partial t'$ is plotted as represented by the dashed curve which refers to the secondary axis at the right hand side of the plot. It is to be understood that the time derivative, when expressed herein as $\partial U/\partial t$ is intended to include as reference to numerical derivatives (e.g. $\Delta U/\Delta t$, e.g. as shown in FIG. 48) as calculated using discrete values of a function, and to analytical derivatives of a mathematical function or equation.

In this example maximum $\partial U'(t)/\partial t'$ has a value of twelve (12) which is reached at 80% of the rising and falling edges of the waveform. To evaluate the actual rate of change we must multiply $\partial U'(t)/\partial t'$ by the quantity $U_0/T$. Thus, in this example the rate of change of voltage is 12×10/1 V/ms, which is equal to 120 V/ms. The 'normalised' quantity $\partial U'(t)/\partial t'$ is used herein (i.e. $U'=U/U_0$, and t'=t/T, where $U_0$ is the waveform amplitude and T is the waveform period) as it allows to teach the maximum rate of change of the voltage in a general sense.

Figure 50:
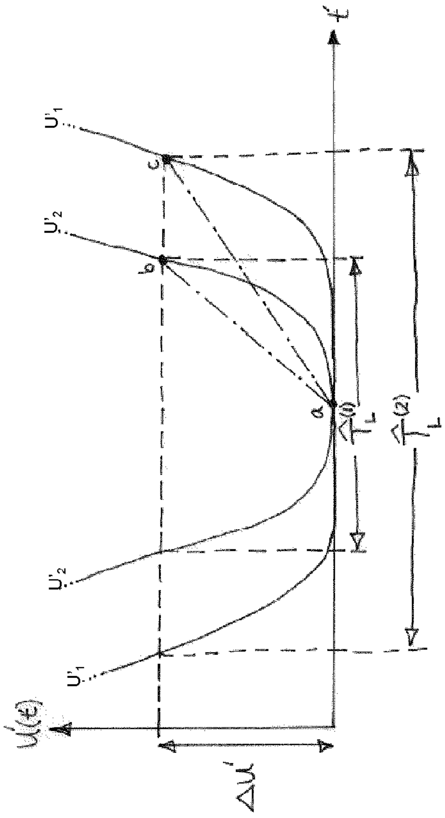
FIG. 50 shows an example of the disclosed waveform.
Figure 49:
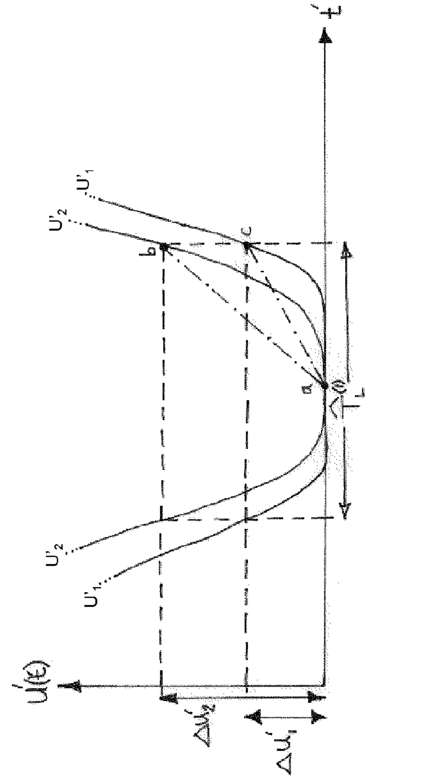
FIG. 49 shows an example of the disclosed waveform.

FIG. 48 indicates a quantity ΔU' and a quantity $T'_L$. The Quantity ΔU' represents the maximum permissible change in the value of U' throughout the interval of time $T'_L$ ($T'_L=T_L/T$) during which the waveform is said to be substantially constant. By suitably selecting a minimum permissible value for $T'_L$ (e.g. $T'_L \geq 0.1$) and a maximum permissible value of ΔU', as conditions which a waveform must satisfy, one is able to adjust the values of quantity ΔU' and a quantity $T'_L$, subject to these constraints, and still allow the waveform to satisfy the condition of being substantially constant throughout $T'_L$. Referring to FIG. 49, consider a minimum permissible value for $T'_L$ is set as $\hat{T}_L^{(1)}$. If a maximum permissible value for U' is set as $\Delta U_2'$, then any reduction in ΔU' will also satisfy the requirements that the waveform is substantially constant throughout $T'_L$. For example, if ΔU' is reduced to $\Delta U_1'$, then any waveform complying with this new condition is made somewhat more 'flatter' throughout $T'_L$, as a result. In addition, the quantity $\Delta U'/T_L$ is directly proportional to the gradient of the line joining the minimal point 'a' and the maximal point 'b' of the waveform within T'L, and this gradient is the average value of the waveform between points 'a' and 'b'. In this way, by constraining the quantity ΔU' and the quantity $T'_L$ one may constrain the average gradient of the waveform throughout $T'_L$. FIG. 50 illustrates the similar effect of increasing the size of $T'_L$, e.g. from $\hat{T}_L^{(1)}$ to $\hat{T}_L^{(2)}$, while fixing the value of ΔU', with similar effect.

Figure 51:
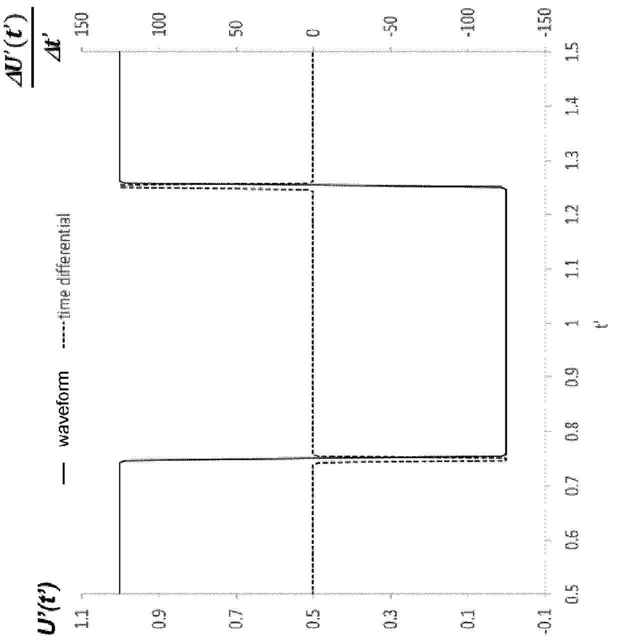
FIG. 51 shows an example of a waveform and its time derivative.
Figure 52:
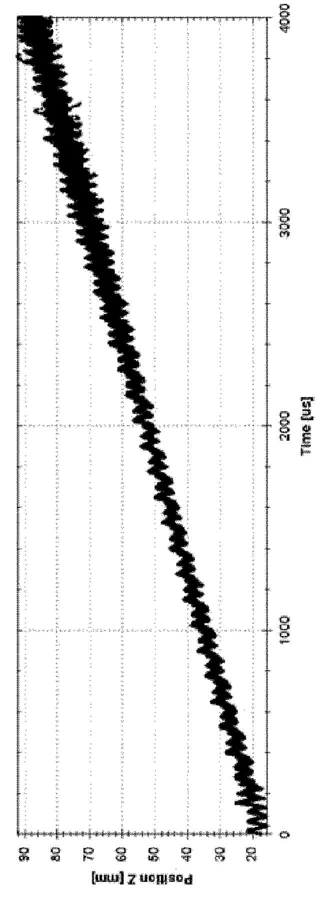
FIG. 52 shows an example of the trajectory of ions within an ion guide.
Figure 53:
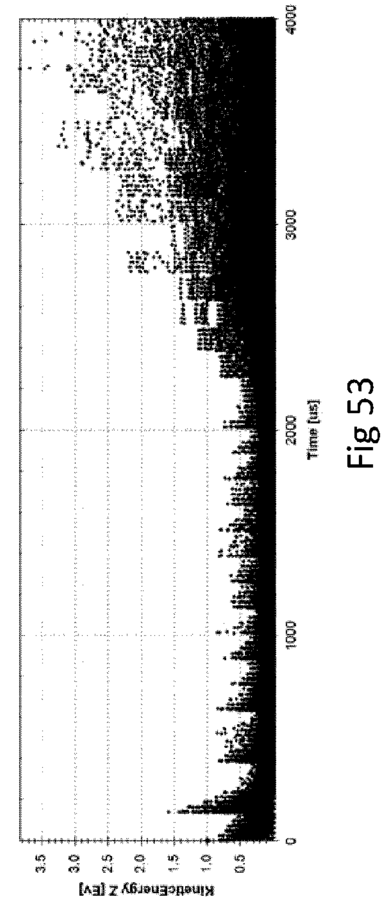
FIG. 53 shows an example of the kinetic energy of ions within an ion guide.

By way of comparison, FIG. 51 shows a waveform, and simulation data, for the extreme case of erf(1,100). For these values U'(t') represents are square waveform, as is shown by FIG. 51. Here ∂U'(t)/∂t' has increased to 125 giving a rate of voltage change, in this example, of 125×10/1=1250 V/ms. Clearly, the rising and falling of the edges of the waveform do not satisfy the conditions that the waveform should be substantially constant, by virtue of a gradual change during $T_L$. The corresponding progression of the ion bunch along the axis is shown by FIG. 52 and the progression of the axial kinetic of the ion bunch. From FIG. 53 it is seen that the ion bunch is continuously excited as it is translated along the guide channel. Here the pressure within the channel was set to include a region at which the pressure was 10 mTorr. At this pressure ions have time to partially re-cool before the next 'jump' forward caused by the advancing wall of the potential well. Once the ion bunch enters the vacuum region after 2000 μs of progression, the energy starts to continuously increase. The maximum energy exceeds 3.5 eV at a time of 4000 μs of progression and at this time seven ions are lost radially by this time. As shown by FIG. 52, the axial dimension of the bunch also progressively increases after the ion bunch enters the vacuum region. With respect of transmission of the wide mass range, the square waveform induced significant losses of ion masses 100, 150 and 800 Da. Those ions that remained spread of the over several potential wells of the bunching ion guide.

This waveform fails the criterial defined above, because U'(t) is not a smooth function, ∂U'(t)/∂t' is not a continuous function. Here, ∂U'(t)/∂t'=125 and thus exceeds to limit, defined above, of 100.

Figure 54:
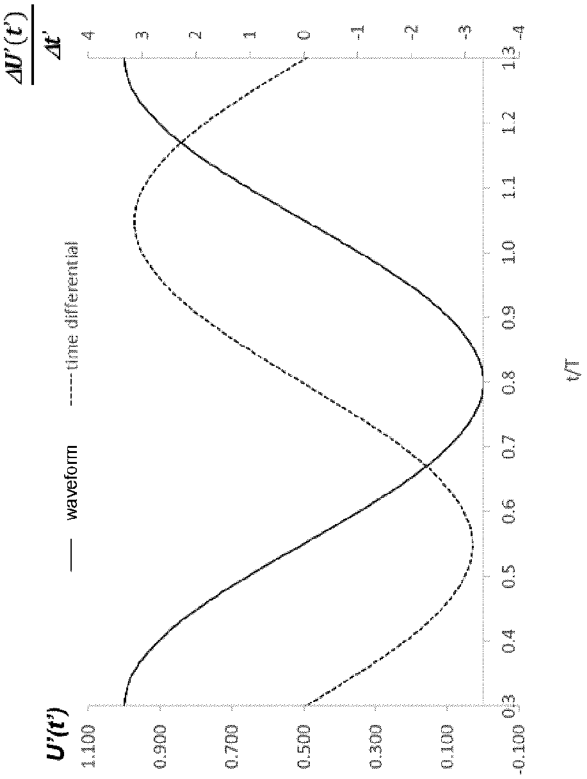
FIG. 54 shows an example of the disclosed waveform and its time derivative.
Figure 55:
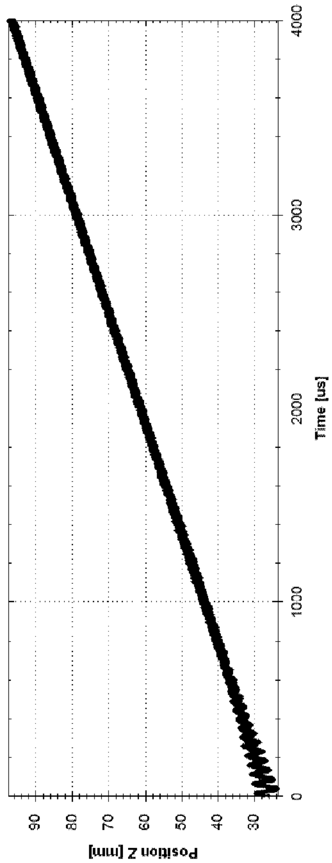
FIG. 55 shows an example of the trajectory of ions within an ion guide.
Figure 56:
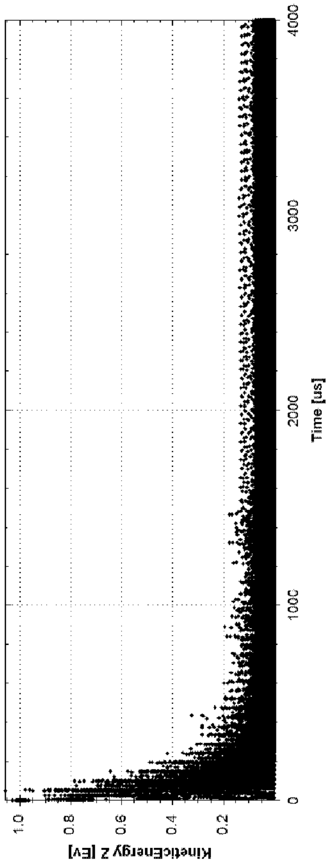
FIG. 56 shows an example of the kinetic energy of ions within an ion guide.

A third example is shown by FIGS. 54 to 56, which show a further example where U'(t) comprises a sinusoidal function or a set of sinusoidal functions. As shown by the figures, sinusoidal functions are effective for the transport of ions at constant velocity and for transfer of ions bunches into vacuum, and so are offer and effective solution for some embodiments and applications when pseudo potential wells are not required. We note not that the sinusoidal function offers axial potential having a higher minimum value and lower ever maximum and lower electrical field strength than can be achieved by an erf type function. Thus, it is inferior to erf type functions in respect of the mass range the ion guide can convey and inferior to erf type function for maintaining energetic ions within their designated bunches.

Double Segmentation

The invention in any of its aspects may be implemented using doubly segmented electrodes (i.e. both the bunching electrodes and the radial confinement electrodes are axially segmented). An example is as shown by FIG. 7*b*. This electrode structure allows the application of the AC voltages (preferably not modulated RF voltages) to be applied to all four adjacent segments located at one common axial position. The segments of the bunching rods and the segments of radial confining rods would most preferably have the same axial spacing and located at the same axial positions. This embodiment offers a high mass range than does the singularly segmented embodiment. Simulation shows that the doubly segmented offers up to 2.6 higher mass range and the singularly segmented embodiment employing the same AC waveform, radially confining RF voltage, and N value. The doubly segmented variant also offers the higher AC voltages to be applied, allows for the capture of further higher energetic ions in the injection region. The inventors have found that, when using doubly-segmented electrode arrangements, ions with up to 200 eV of kinetic energy as they enter in to the collection region may be captured. Thus, the doubly-segmented electrode arrangements of the ion guide are preferably used at least within a collection region, as described in aspects of the current invention, and doubly-segmented electrode arrangements may also be used in a 'down-stream' cooling region of the bunching ion guide. This allows for the effective in parallel ion cooling and ion transport, providing increase in ion throughput and the possibility of injecting ions into the bunching ion guide at lower buffer gas pressures.

A doubly-segmented device may also be employed effectively when ions are to be ejected axially from the bunched ion guide according to further aspects of the invention. Embodiments of the ion guide according to any aspect of the invention disclosed herein, may comprise of doubly-segmented parts and singly segmented parts (e.g. in which only bunching electrodes are axially segmented).

Axial Extraction of Ions from the Ion Guide

The invention in its third and fourth aspects may provide a device, and a method, for manipulating ions, and examples will be described below. The device may comprise a series of electrodes disposed so as to form a channel for transportation of the charged particles. It may include one or more power supply unit(s) adapted to provide supply voltages:

(a) to axially segmented bunching electrodes amongst the series of electrodes so as to create an electric field defining a potential within said channel, the potential having one or more local minima between local maxima defining a potential well which is translated along at least a part of the length of the channel, and (b) to radial confinement electrodes amongst the series of electrodes so as to create a radially confining electric field within the channel configured to radially confine ions within the channel.

The device may have an axial extraction region comprising electrodes amongst the series of electrodes disposed at least at, or defining, an end of the channel of the device. Thee electrodes may be arranged to receive the supply voltage to create therewith an electric field defining a pseudo-potential within the channel such that the depth of the potential well varies according to the mass-to-charge ratio (m/z) of the charged particles transported therein and reduces as a local maxima of the potential well is translated axially towards and/or along the axial extraction region thereby to release the transported charged particles of different mass-to-charge ratio (m/z) at different respective times. The device described above with reference to FIG. 6 to FIG. 8*e*, for example, may implement this.

Figure 14:
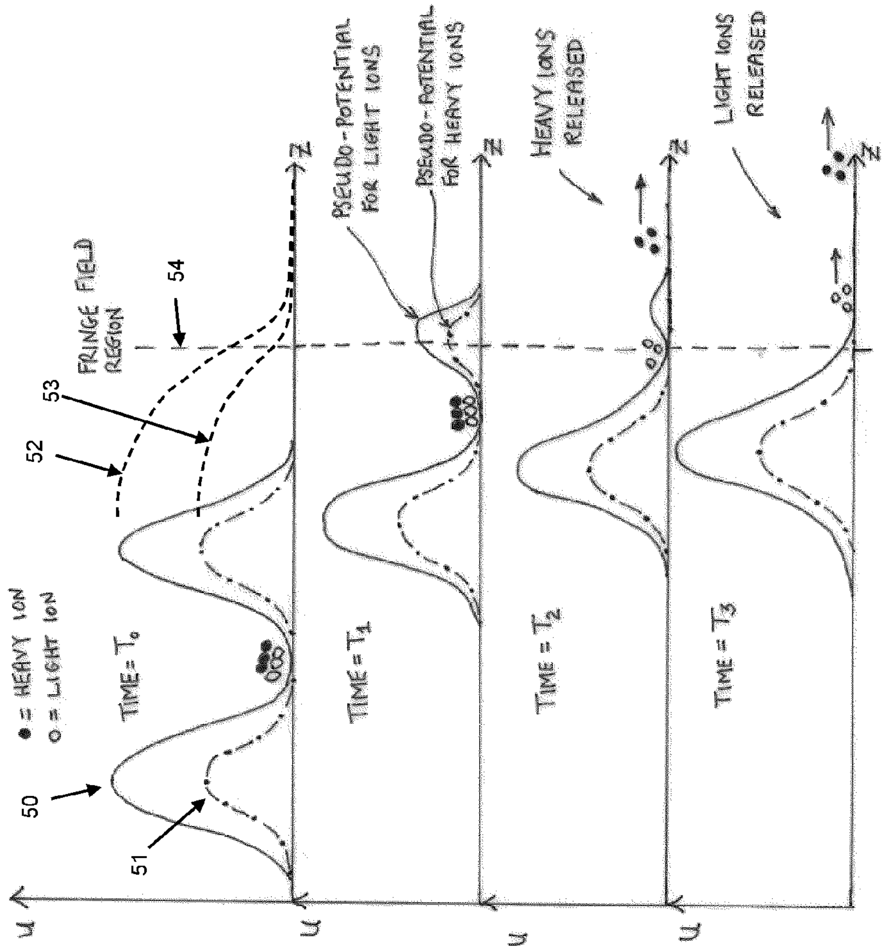
FIG. 14 show examples of a travelling potential well.

FIG. 14 schematically illustrates the dynamic development of a pseudo-potential well (50, 51) as the well is translated along a length of the channel of the ion guide towards, and into, and extraction region of the ion guide defined by the terminal electrodes 54 of the ion guide. The terminal end of the ion guide is indicated by a vertical dashed line, and it is in the vicinity of this terminal end of the ion guide that fringing field effects are present. This is denoted as the fringing field region within FIG. 14.

The effect of the fringing field region is to diminish the amplitude of a pseudo-potential both within the ion guide and also beyond, and in proximity to, the terminal end of the guide.

FIG. 14 illustrates the progression of the pseudo-potential well as experienced by ions within a bunch of ions confined within the local minimum of the well, which is between two local maximum of the pseudo-potential. These two local maximum comprise a leading maximum which is at all times closer to the terminal end of the ion guide, and is ahead of the local minimum of the potential well, and a following maximum which is at all times further from the terminal end of the ion guide than either of the leading maximum or the local minimum.

The bunch of ions comprises ions of relatively lower mass-to-charge ratio (m/z), which are denoted notionally as “light ions”, and ions of relatively larger mass-to-charge ratio (m/z), which are denoted notionally as “heavy ions”. Given that the pseudo-potential perceived by a given ion is inversely proportional to its mass-to-charge ratio, then this means that the height or amplitude of the leading and following maximum of the potential well 50 perceived by the light ions is greater than the height or amplitude 51 perceived by the heavy ions. This is schematically indicated in FIG. 14 in the form of two concurrent pseudo-potential wells having the same location, but possessing leading/following maximum of different relative heights.

At a time T0, the pseudo-potential well resides within the ion guide at a significant distance from the terminal end of the guide where it does not experience any significant effect of the fringing field region. As a result, this the amplitude of the leading maximum of the potential well, which is nearest to the fringing field region, is substantially the same amplitude as that of the following maximum of the potential well. Also shown in FIG. 14 (at time T0) are to exponentially decaying envelope curves, represented as dashed lines (52, 53), which extend from the peak of the leading maximum of each pseudo-potential well (52 one for the light ions and 53 is one for the heavy ions), and progress through the fringing field region and beyond, at which point they have fallen to a substantially zero value. Each respective envelope curve represents the height that the associated leading maximum will be diminished to as it advances further towards the fringing field region, during times T1, T2 and T3. It can be seen that the envelope curves are non-zero at positions beyond the end of the ion guide, but that envelope curve for the pseudo-potential perceived by heavy ions reaches insignificant values sooner than does the pseudo-potential perceived by light ions. The consequences of this difference are as follows.

At a time T1, the pseudo-potential well has advanced closer to the terminal end of the guide and the leading maximum of the potential well begins to experience a significant effect of the fringing field region. As a result, the amplitude or height of the leading maximum of the potential well perceived by all ions within the bunch of ions, is significantly diminished. Nevertheless, even though diminished, the height of the leading maximum is still sufficient to define and effective potential well to retain both heavy ions and light ions.

Subsequently, at time T2, the pseudo-potential well has advanced even further towards the terminal end of the guide such that the notional position of the leading maximum of the potential well has passed beyond the terminal end of the guide but, due to the effect of the fringing field region, the height or amplitude of the leading maximum may still possess a significant value depending upon the mass-to-charge ratio of the ions perceiving the pseudo-potential. In particular, light ions perceive a stronger pseudo-potential which is effectively able to persist at significant levels beyond the end of the ion guide such that light ions continue to be trapped within the potential well they perceive. However, heavy ions perceive a weaker pseudo-potential which is unable to persist at any significant level beyond the end of the ion guide at time T2, and as a result are no longer trapped within a potential well since they no longer perceive any significant leading maximum which would otherwise have formed a barrier to them exiting their potential well. This is schematically illustrated in FIG. 14 by the release of heavy ions with the continued trapping of light ions.

Finally, at time T3, the potential well perceived by the light ions has advanced even further towards the terminal end of the ion guide such that the leading maximum of the pseudo-potential perceived by the light ions is now also insignificant and insufficient to define an effective potential well. The pseudo-potential well is no longer able to retain the light ions, which are consequently released from the ion guide.

In this way, heavy ions are able to be extracted from the ion guide before lighter ions are extracted, thereby enabling mass discrimination amongst the ions within the bunch of ions transported by the potential well with respect to their release time form the axial extraction region of the ion guide.

Figure 15:
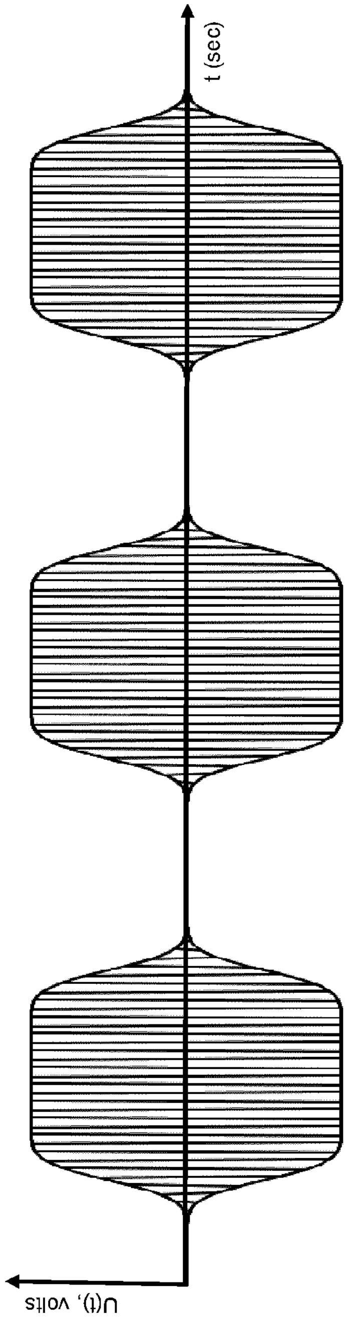
FIG. 15 shows an example of the disclosed waveform.
Figure 24:
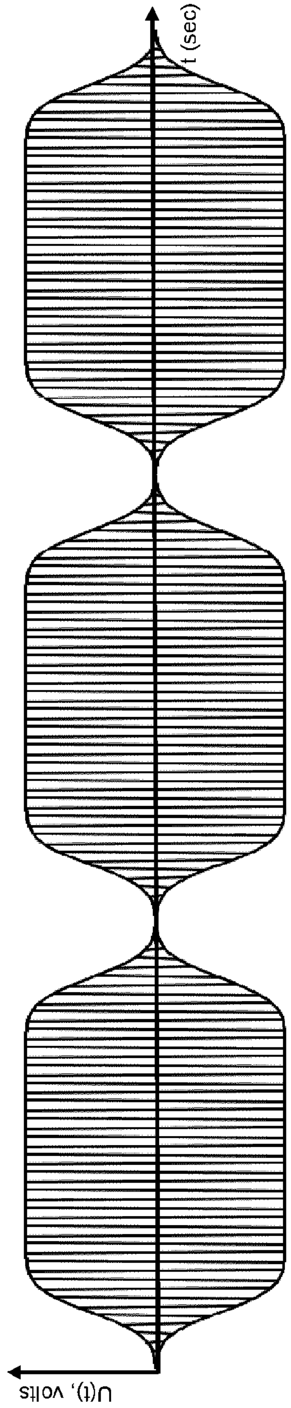
FIG. 24 shows an example of the disclosed waveform.

FIG. 15 shows a periodic voltage waveform of the type described above, the positive and negative envelope is it is according to equation 5 with parameters f=1 and p=5, that is erf(1,5) with reference to the invention in its first and second aspects, over three full waveform periods. FIG. 24 shows another example of a periodic voltage waveform of the type described above, with reference to the invention in its first and second aspects, over three full waveform periods. This waveform corresponds to erf(2,2). This waveform is used to compress the ion bunches in an axial direction. The modulation envelope applied to the RF voltage differs from the envelope illustrated in FIG. 15 (note the waveform is draw with an RF much lower than the actual frequency for easier visualisation). In example data, disclosed herein, the frequency of the RF voltage applied to the bunching electrodes was 3 MHz, and the amplitude of the RF voltage was 2000 V. An RF voltage of 3 MHz, with an amplitude of 1000 V, was concurrently applied to the radial confinement electrodes of the ion guide. An axial extraction voltage of −15.0V was applied to the extraction electrode. This alternative waveform, shown in FIG. 24, when applied to individual bunching electrodes of the ion guide in the phase-shifted manner described above, results in pseudo-potential wells illustrated in FIG. 25. Here the pseudo-potential is plotted as a function of distance (z) along the axis of the ion guide. The left-hand column shows the pseudo-potential wells as perceived by light ions (200 Da) whereas right column shows the pseudo-potential wells perceived by heavy ions (2000 Da).

Figure 25:
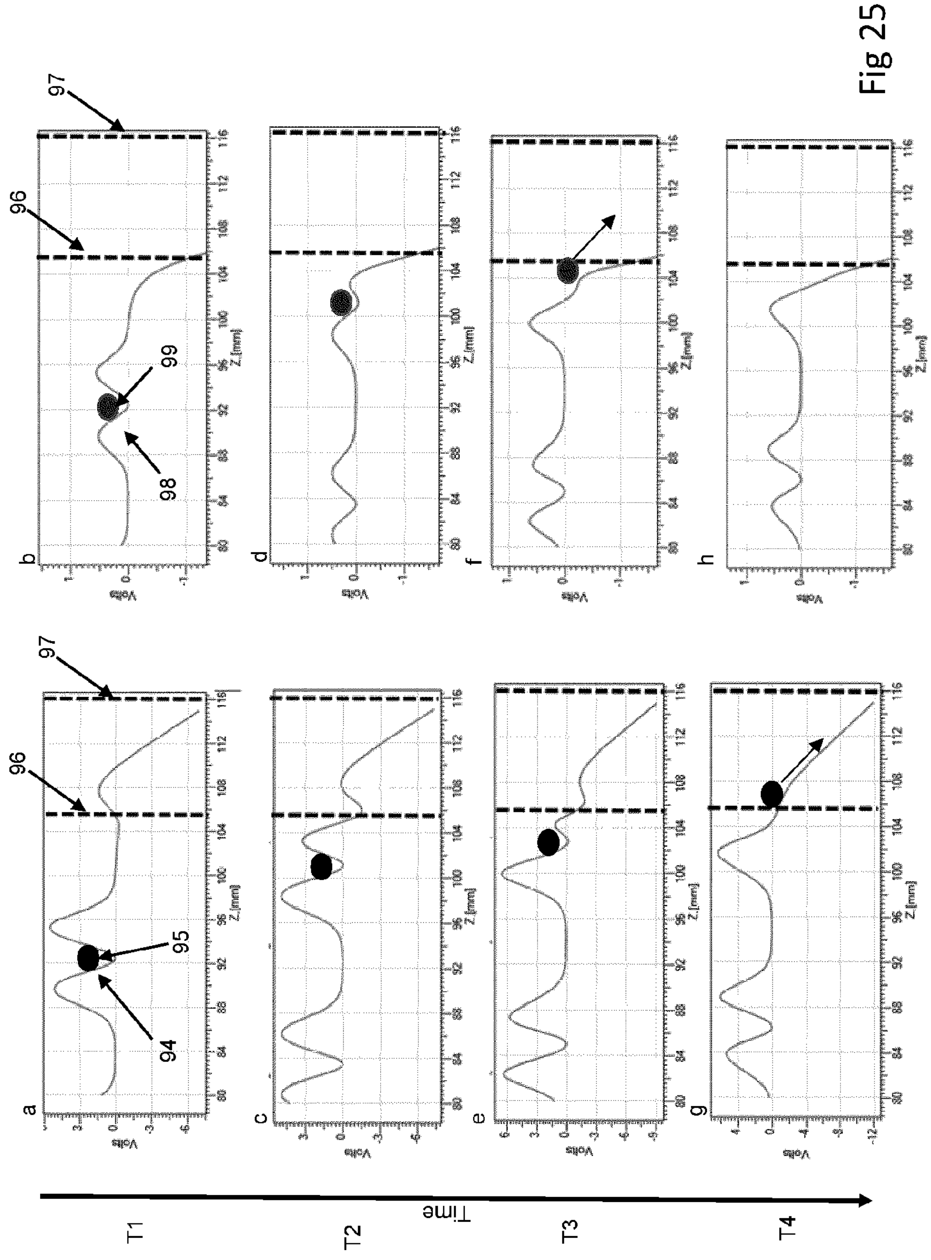
FIG. 25 shows examples of a travelling pseudo-potential well.

FIG. 25 shows the axial progression of a pseudo-potential well (94, 98) formed according to this waveform, in which a bunch of ions is conveyed. The bunch of ions comprises lighter ions (95) and heavier ions (99). The left-hand panels (a, c, e, g) of FIG. 25 correspond to the pseudo-potential perceived by lighter ions within the ion bunch and the right hand panels (b, d, f, h) of FIG. 25 correspond to the pseudo-potential perceived by heavier ions within the ion bunch.

The axial position of an extraction electrode is indicated by a vertical dashed line 97 located at axial position: z=116 mm. The terminal end of the ion guide is indicated by a vertical dashed line 96 located at axial position: z=105.5 mm.

The panels a and b of FIG. 25 correspond to the pseudo-potentials perceived by the ion bunch at the same point in time: t=T1. The panels c and d of FIG. 25 correspond to the pseudo-potentials perceived by the ion bunch at the same point later in time: t=T2. The panels e and f of FIG. 25 correspond to the pseudo-potentials perceived by the ion bunch at the same point even later in time: t=T3. Finally, the panels g and h of FIG. 25 correspond to the pseudo-potentials perceived by the ion bunch at the same latest point in time: t=T4.

By comparing the panels e and f of FIG. 25 at time: t=T3, it can be seen that the pseudo-potential (panel f) perceived by heavy ions releases those heavy ions at that time, whereas the pseudo-potential (panel e) perceived by light ions continues to confine those light ions at that time. Only at a later time: t=T4, corresponding to panel g, does the pseudo-potential perceived by light ions release those light ions.

Figure 16:
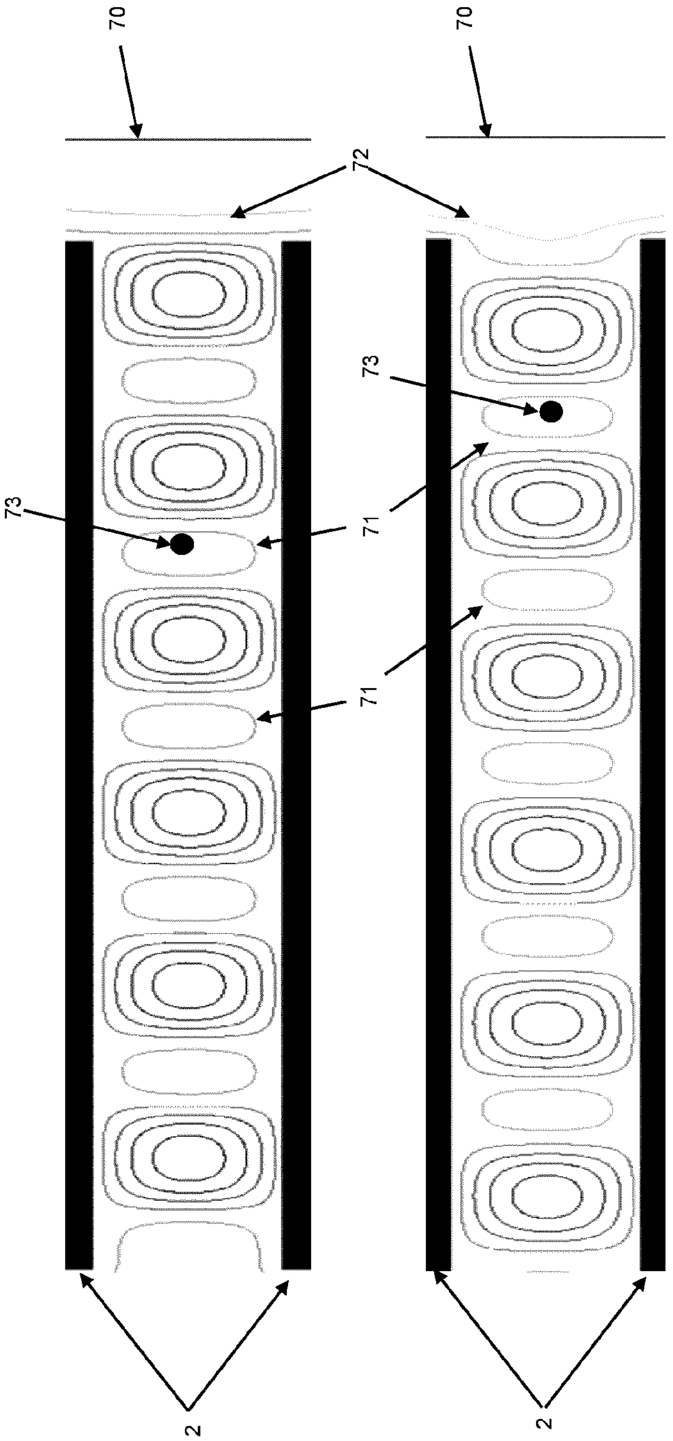
FIG. 16 shows examples of a train of travelling potential wells at two points in time.
Figure 17:
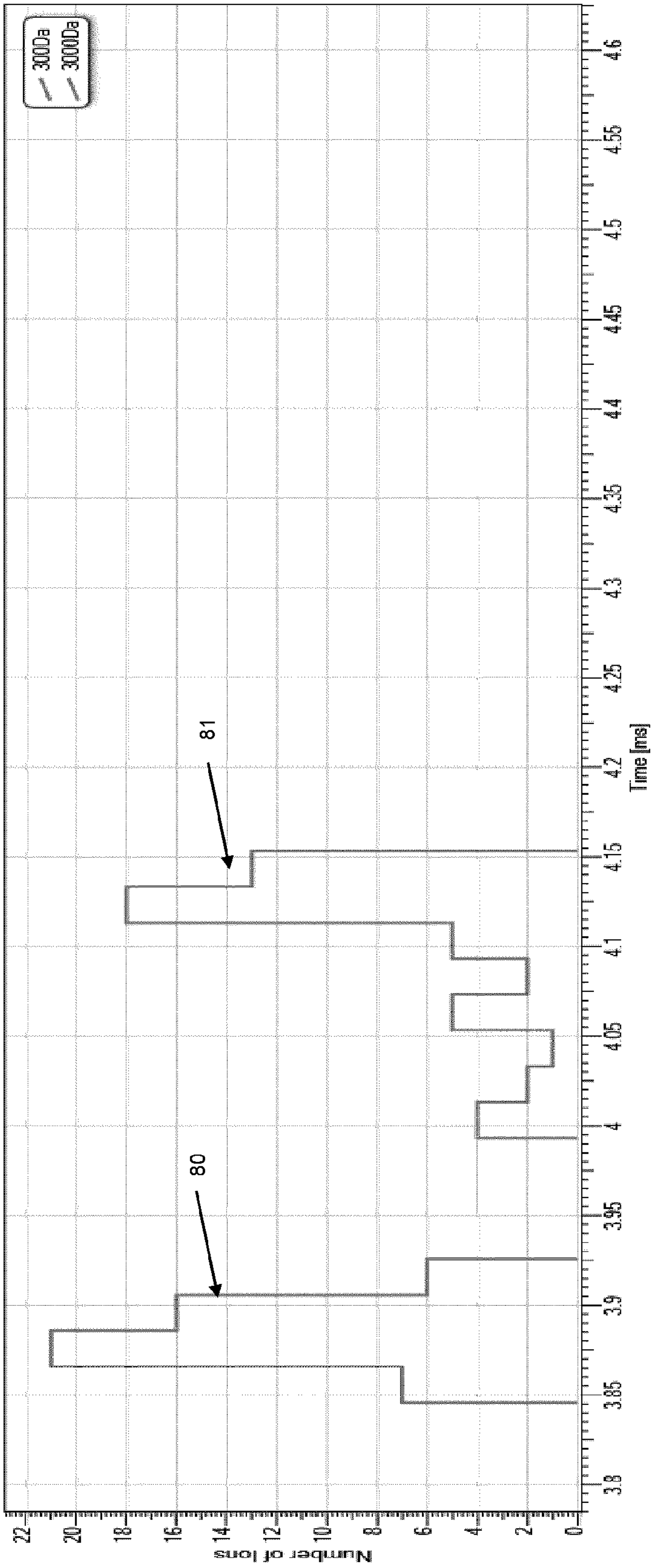
FIGS. 17 to 23 show examples of ion traces.

FIG. 16 schematically illustrates a view of the equipotential lines of the pseudo-potential, for ions 73 of a given mass-to-charge ratio, at two subsequent times this, and illustrates the axial advancement of the pseudo-potential wells 71 and the opening up of the equipotential field lines 72 at the terminal end of the ion guide as a potential well transits the fringing field region. FIG. 16 also shows the position of an optional extraction electrode 70, here shown at the right-hand terminal end of the ion guide, to which an extraction voltage may be applied in order to assist in diminishing the height of the leading maximum of a travelling potential well within the ion guide as it translates towards the extraction region at the terminal end of the ion guide.

FIGS. 17 to 21 show ion traces of ions released from the extraction region at the terminal end of the ion guide, in the manner described above, as a result of applying different extraction voltages (or no extraction voltage) to the extraction electrode. This data was obtained with erf(1,5) of FIG. 15.

Figure 20:
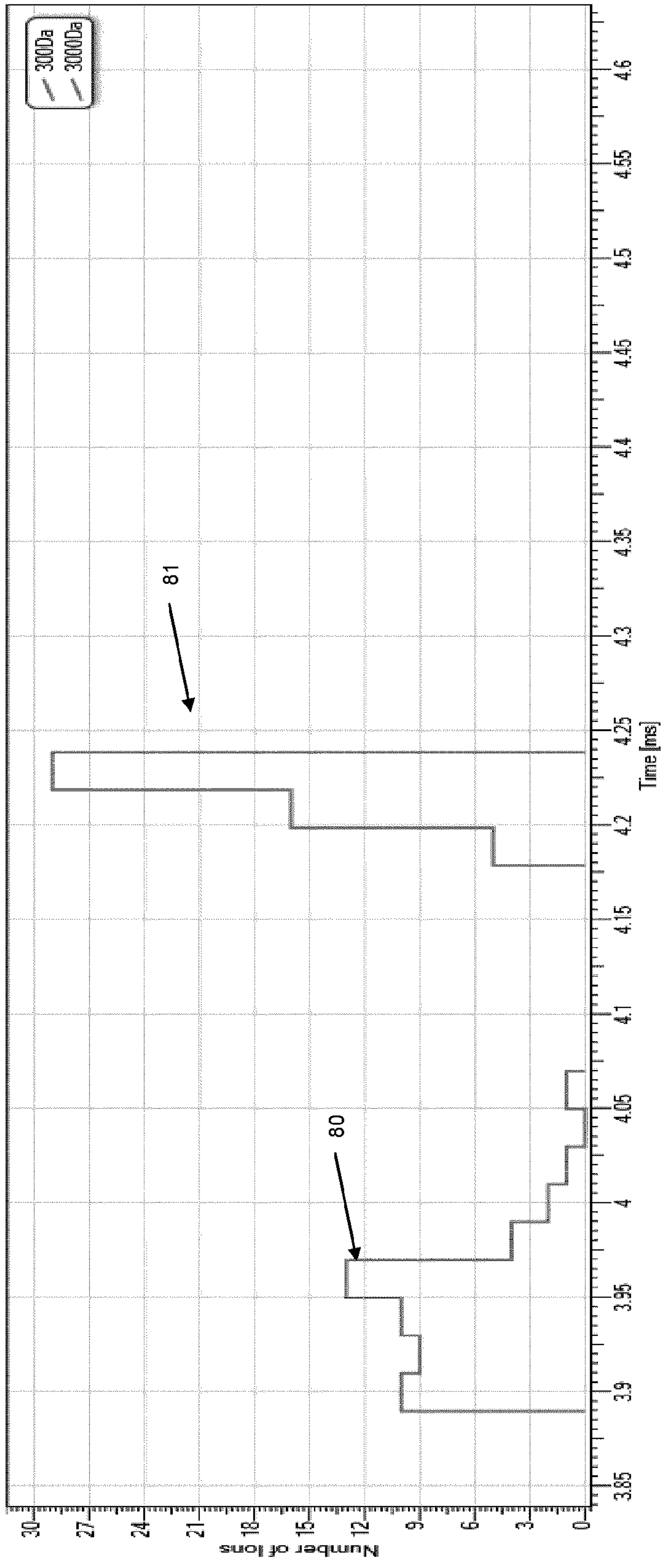
Figure 21:
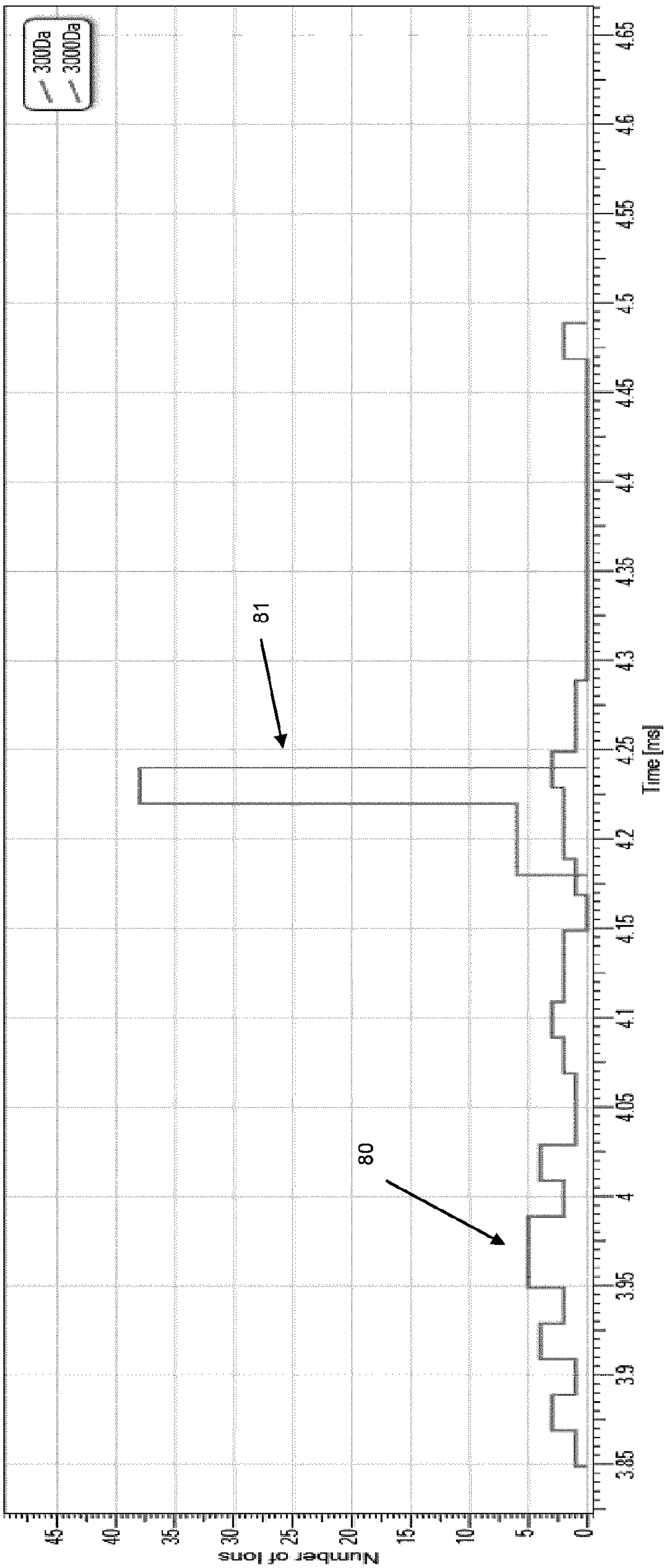

In particular, in each of FIG. 17 to FIG. 21, there is shown a mass spectrum in respect of a released or extracted ‘bunch’ of ions containing ions of masses 300 Da (trace 81) and of masses 3000 Da (trace 80). The RF frequency of the RF voltage, modulated by the modulation waveform shown in FIG. 15, was 3 MHz with an amplitude of 2000 V. This in the spectrum shown in FIG. 17, the extraction voltage applied to the extraction electrode was −2.0V. In the spectrum shown in FIG. 18, the extraction voltage applied to the extraction electrode was −1.5V, whereas in the spectrum shown in FIG. 19 the extraction voltage was −1.0V. FIG. 20 shows the mass spectrum when the extraction voltage was reduced to −0.5V. Finally, FIG. 21 shows the mass spectrum when substantially no extraction voltage is applied (i.e. a voltage of 0.0V, or Earth/ground).

Figure 22:
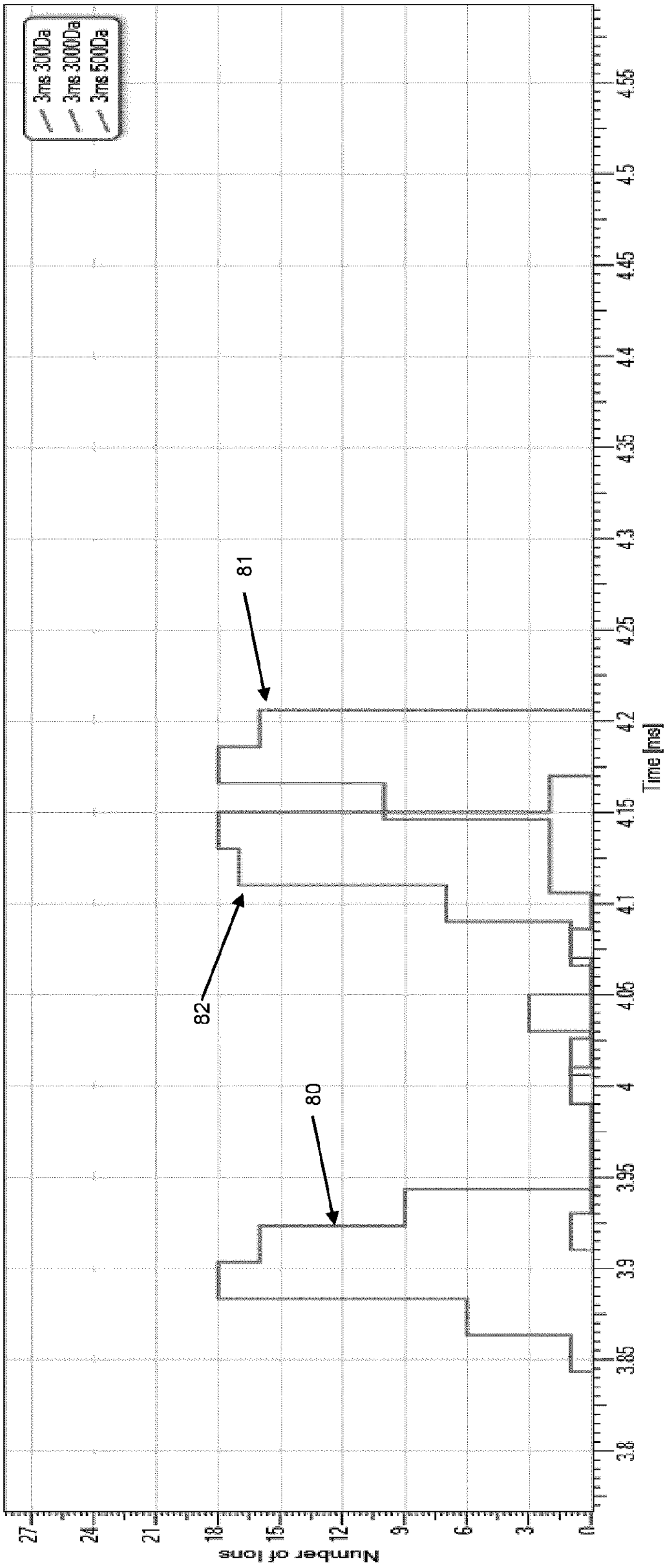
Figure 23:
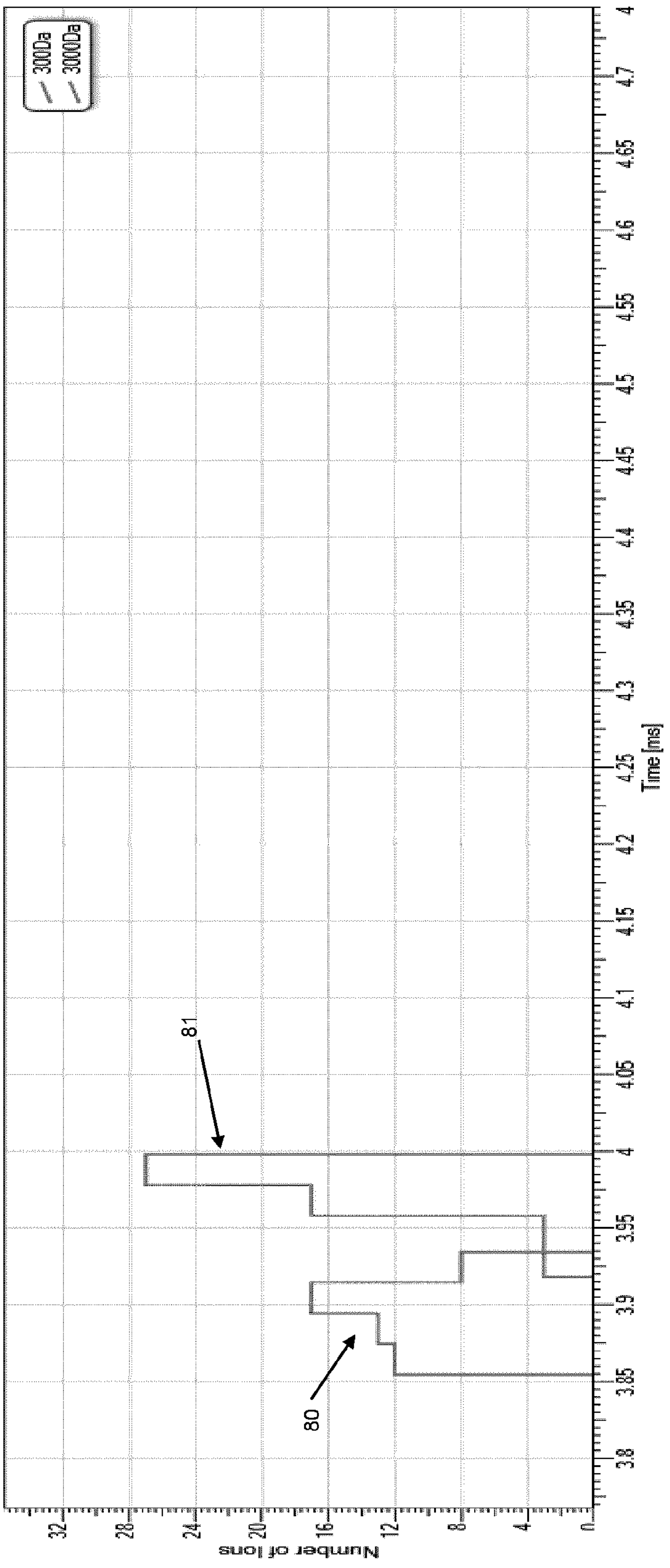

It can be seen that, in all cases, mass separation results, and is improved by applying an extraction voltage to an extraction electrode, which is lower than the voltages applied to bunching electrodes to form the pseudo-potential wells, of merely up to a few volts in value. For comparison, FIG. 22 shows a mass spectrum in respect of an extracted ‘bunch’ of ions comprising ions of mass 300 Da, 500 Da (trace 82) and 3000 Da. In this case, an extraction voltage of −1.5 volts was applied to the extraction electrode. Similarly, FIG. 23 illustrates a mass spectrum in respect of an extracted ‘bunch’ of ions comprising ions of mass 300 Da and 3000 Da. In this case, the RF frequency, voltage amplitude, and extraction voltage applied to the extraction electrode differ from the previous examples.

Figure 18:
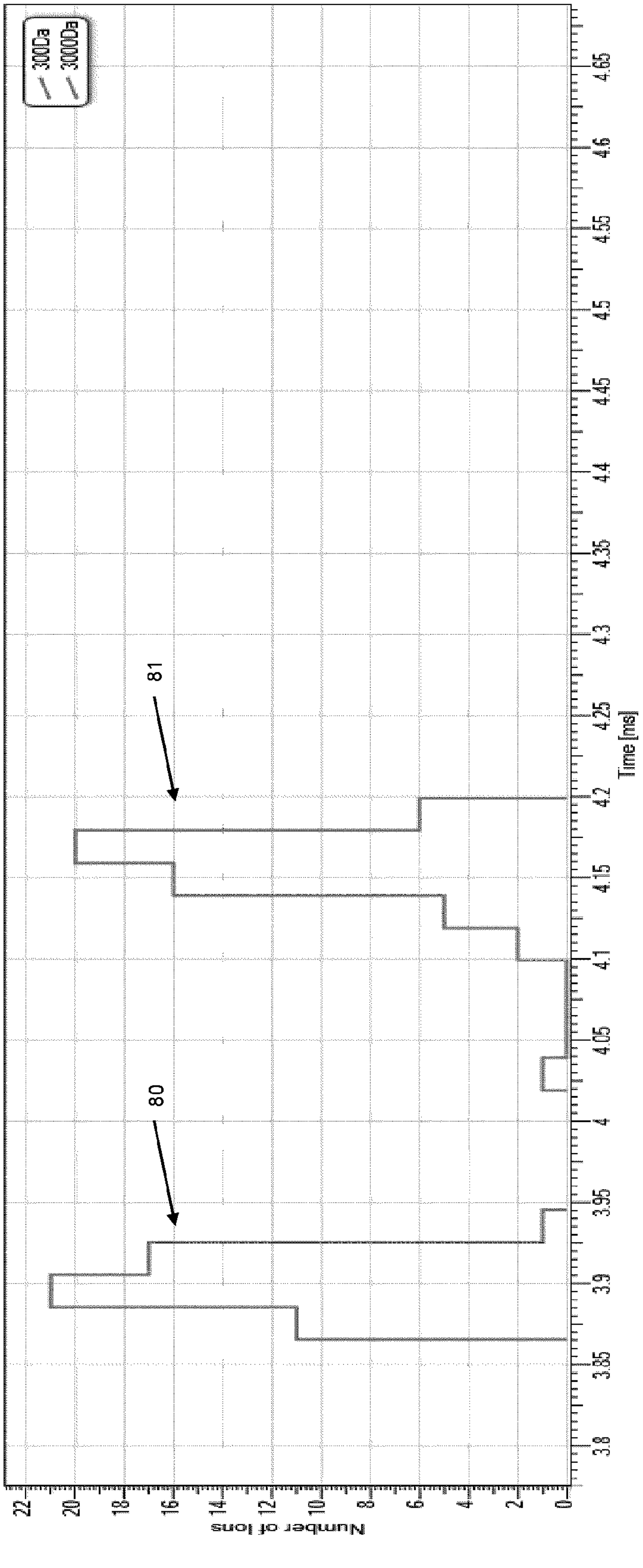
Figure 19:
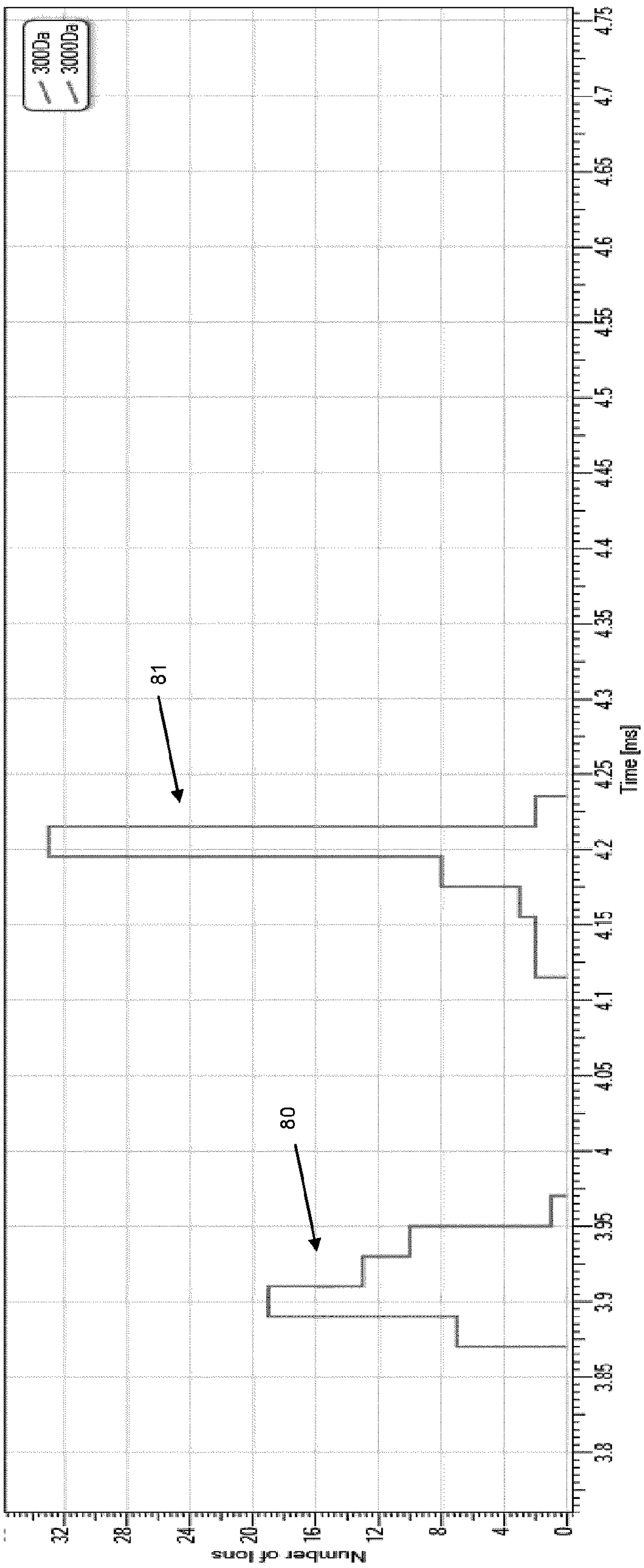
Figure 26:
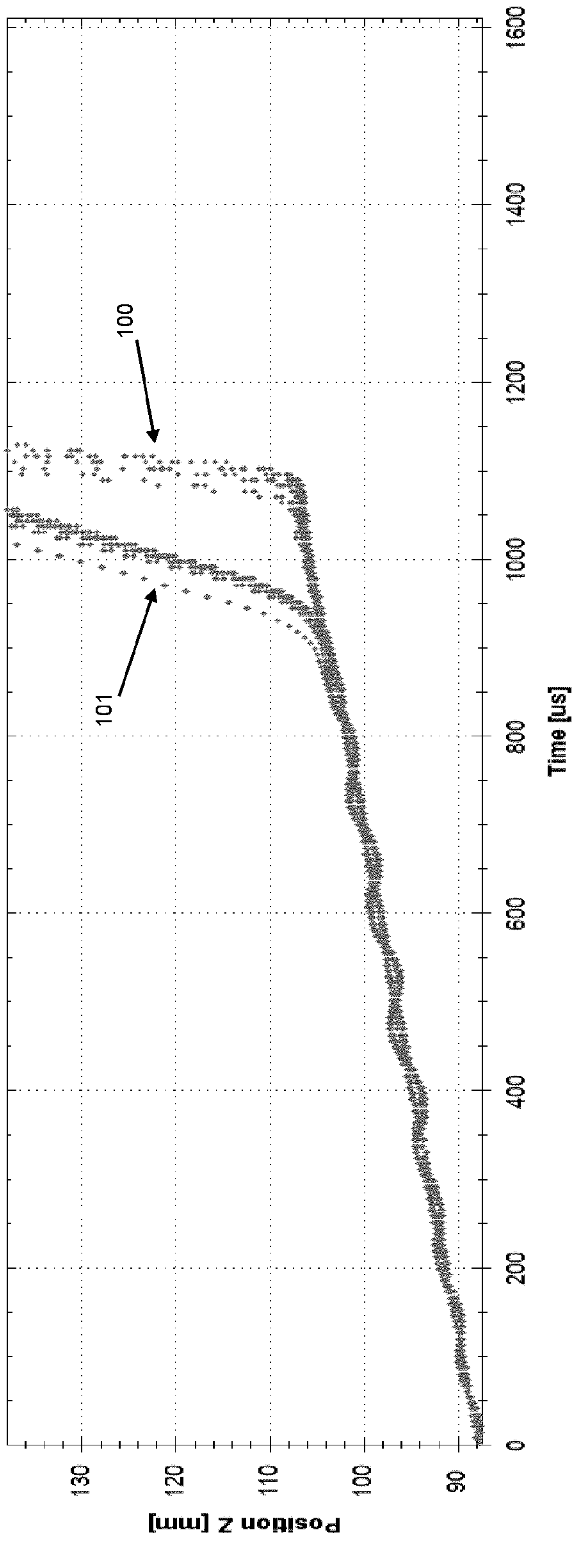
FIG. 26 shows an example of the trajectory of ions within and extracted axially from an ion guide.

FIG. 26 illustrates the trajectory of ions of the ‘bunch’ of ions responsible for the mass spectrum illustrated in FIG. 18. Here, the axial position (along the z-axis) of ions within the ion guide, and beyond the end of the ion guide, is illustrated as a function of time. The trajectory 100 of light ions of 300 Da is shown together with the trajectory 101 of heavy ions of 3000 Da. It can be seen that the heavy ions and the light ions traverse along the axis of the ion guide at a substantially uniform speed until the bunch of ions reaches the terminal end of the ion guide. This occurs at a time of about 900 μs as shown in FIG. 26. At that time the leading maximum of the pseudo-potential well perceived by the heavy ions is effectively suppressed and the trajectory of the heavy ions shows a rapid acceleration along the z-axis: this signals the release or extraction of the heavy ions. Sometime later, at a time of about 1100 μs the leading maximum of the pseudo-potential well perceived by the lighter ions is effectively suppressed, and the trajectory of the lighter ions shows a rapid acceleration along the z-axis: this signals the release or extraction of the lighter ions.

Figure 29:
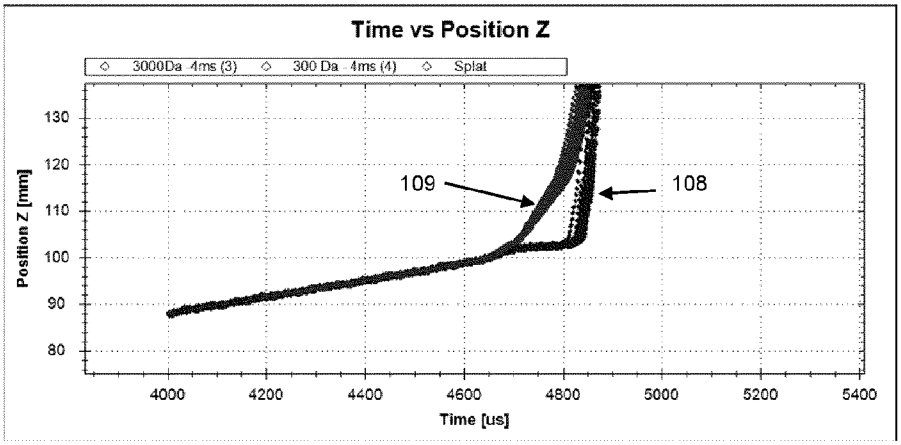
FIG. 29 shows an example of the trajectory of ions within and extracted axially from an ion guide.

After leaving the guide different mass ions experience the same extraction field, lighter ions travel faster than the heavier ions, and thus ions of a different mass, at a larger z position the light ions will catch up to the heavier ions. Using this principle, the invention provides a means to have a wide mass range of ions ejected from a single bunch from the bunched ions guide to converge at the same axial position at a selected axial distance from the end of the ion guide. FIG. 29 shows an example of this, as is discussed in more detail below.

Figure 28:
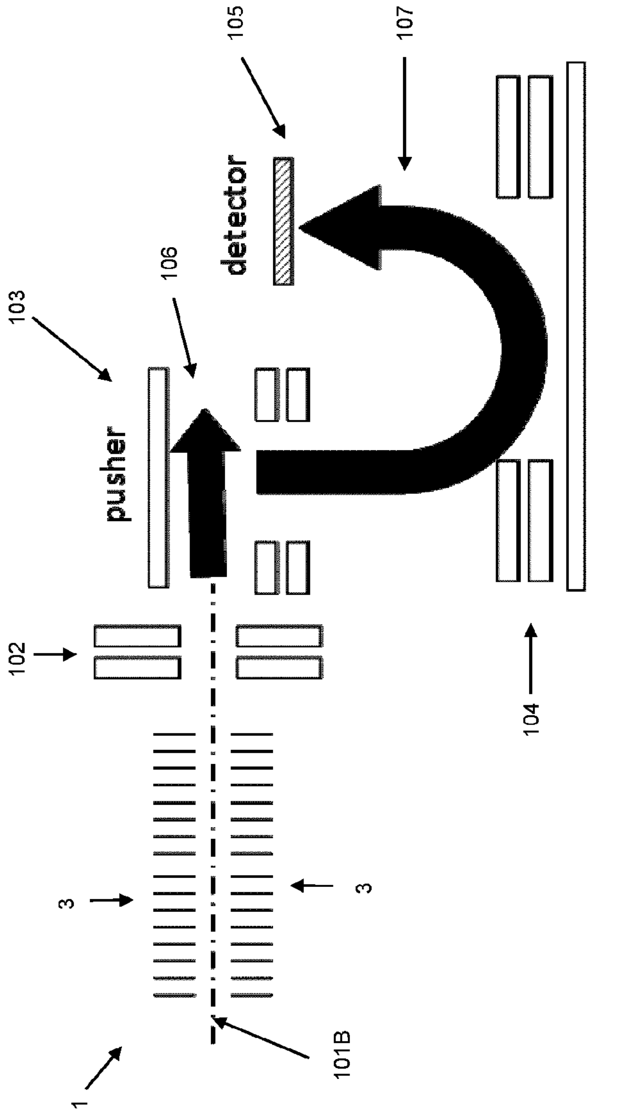
FIG. 28 shows an example of the trajectory of ions extracted axially from an ion guide, and subsequently entered into a ToF spectrometer.

Accordingly, ion bunches may exit the ion guide in an axial direction (i.e. parallel to the ion guide axis) through an ion exit end. Ion bunches exiting axially may be passed into the orthogonal extraction (pusher) region of an ‘oaToF’ spectrometer, for example, as schematically shown in FIG. 28. This provides an improved method of introducing ions into a ToF analyser. In this case the invention can be applied to well-known existing ToF pulsing methods, namely oaToF—orthogonal acceleration/extraction ToF. Many oaToF methods are well known in the art. The invention provide for an TOF mass spectrometer having a wide mass range and high frequency pulsing of the oaToF.

The device 1, described herein with reference to FIG. 6, may comprise on or more charged-particle optical elements 102 (e.g. ion optical element(s), lenses etc.) arranged to receive charged particles extracted from the extraction region and to impose a convergence of the trajectories of the received charged particles. For example, one or more ion-optics lenses (e.g. Einzel lenses, etc.) may be so arranged downstream of the extraction region, aligned to the longitudinal axis 101B of the guide channel of the device 1. For example, the extraction electrode(s) (70, 97: FIGS. 16, 25) may also serve the function of at least a part of such a charged-particle optical element(s). This assists in directing and positioning extracted charged particles at a desired location downstream of the extraction region, such as at the entrance to a time-of-flight (ToF) mass spectrometer (e.g. its flight tube). Accordingly, extracted charged particles may be accurately and efficiently delivered to a ToF spectrometer. After travelling in the downstream direction and being introduced into a time-of-flight (ToF) mass spectrometer, the charged particles 106 may approach an orthogonal acceleration electrode 103 of the ToF mass spectrometer at which they may be urged, by an electric field generated by the orthogonal acceleration electrode, to start a flight 107 along a flight tube of the ToF mass spectrometer with an acceleration in the orthogonal direction, with a predetermined timing. The charged particles so accelerated from the orthogonal acceleration electrode 103 may then first fly freely in the flight space within a flight tube of the ToF spectrometer, and then be returned back in the opposite direction by a reflection electric field formed by a reflector 104 to again fly freely in the flight space until the charged particles reach the ion detector 105 of the ToF mass spectrometer. In this way, the axial translation of charged particles within potential wells within the device, may allow a supply of charged particles to a ToF and, at the ToF, the axial motion of the delivered charged particles may be converted to an orthogonal motion within the flight tube of the ToF, for spectral ToF measurements. The device may include such a time-of-flight (ToF) mass spectrometer.

The present disclosure teaches methods of transporting ions of wide mass range in bunches, e.g. formed with the help of the new type of waveforms disclosed herein. The waveforms comprise a phase-shifted set of modulated RF voltages in which their modulation frequency is much lower than the RF frequency. These may create pseudo-potential travelling wells, i.e., sequence of pseudo potential maxima and minima travelling along the transport channel of the ion guide with a set speed. The pseudo potential is m/z dependent, therefore, propagation of the pseudo potential travel waves at the exit of the ion guide creates a natural reduction (ramping) of the height of the pseudo potential barrier (i.e. leading maxima of the travelling well) which happens when a pseudo potential well reaches the end of the device.

Figure 27:
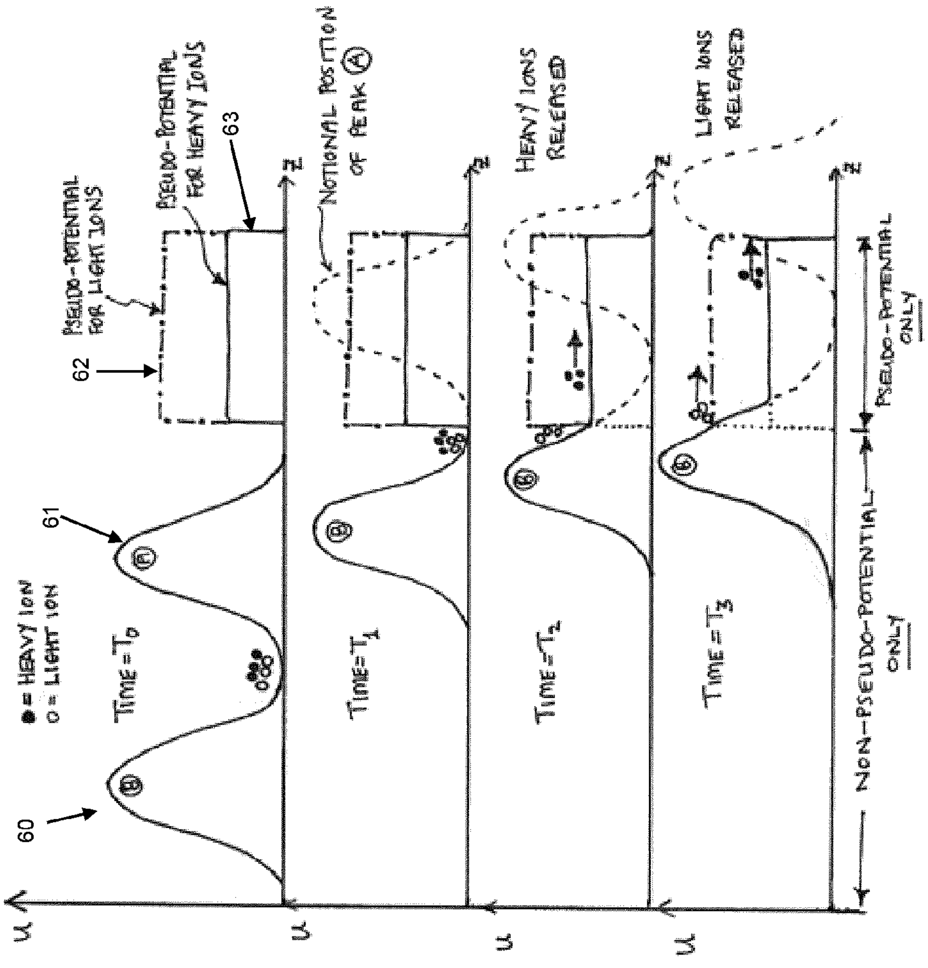
FIG. 27 show examples of a travelling potential well.

FIG. 27 illustrates an alternative arrangement in which the travelling potential wells (between peaks 60, 61) are not pseudo-potential wells, but are instead 'real' potentials formed by voltage waveforms corresponding to the modulation waveform/envelope that was applied to the RF voltage signals in the example illustrated and described above with reference to FIG. 14.

The progression of the potential well as experienced by ions within a bunch of ions confined within the local minimum of the well, which is between two local maxima (60, 61) of the potential. These two local maximum comprise a leading maximum (A) which is at all times closer to the terminal end of the ion guide, and is ahead of the local minimum of the potential well, and a following maximum (B) which is at all times further from the terminal end of the ion guide than either of the leading maximum or the local minimum. The bunch of ions comprises ions of relatively lower mass-to-charge ratio (m/z), which are denoted notionally as "light ions", and ions of relatively larger mass-to-charge ratio (m/z), which are denoted notionally as "heavy ions". Whilst under the influence of the potential well, all ions experience the same potential well and travel at the same velocity along the axis of the ion guide. A static pseudo-potential provides a barrier that varies according to the mass of ions crossing it.

When the position of the local minimum of the travelling potential well coincides with the facing edge of the pseudo-potential barrier (62, 63) (at time T1), then the depth of the potential well varies (i.e. its floor rises) according value of the travelling potential well at the entrance to the extraction region where the pseudo-potential barrier exists. Once the travelling potential well has advanced sufficiently that it's value at the axial position where the pseudo-potential barrier begins, is equal to the height of the pseudo-potential barrier at then point, then the depth of the potential well will have diminished to zero (i.e. its floor rises to the height of the pseudo-potential barrier) and ions within the 'bunch' of ions are released.

The height of the pseudo-potential barrier varies according to the mass-to-charge ratio (m/z) of the ions transported within the potential well. Ions of greater mass-to-charge ratio (m/z) perceive a lower pseudo-potential barrier 63 and are lifted over that barrier by the advancing potential well (at time T2) before ions of lower mass-to-charge ratio (m/z) which perceive a higher pseudo-potential barrier 62 and are lifted over that barrier by the advancing potential well (at time T3) only after the release of heavier ions. In this way, heavy ions are able to be extracted from the ion guide before lighter ions are extracted, thereby enabling mass discrimination amongst the ions within the bunch of ions transported by the potential well. In particular, heavy ions are released earlier than lighter ions, providing a means by which ions of all m/z values may conversion together at a common axial location at some position from the end of the bunching ion guide. An RF voltage may be applied to one of the segmented electrodes, it may be the final segment of the penultimate segment or the any segment in the final set of N segments. Segments following the final segments may be DC extraction electrodes, or DC extraction electrodes may be located outside the extraction region.

Figure 30:
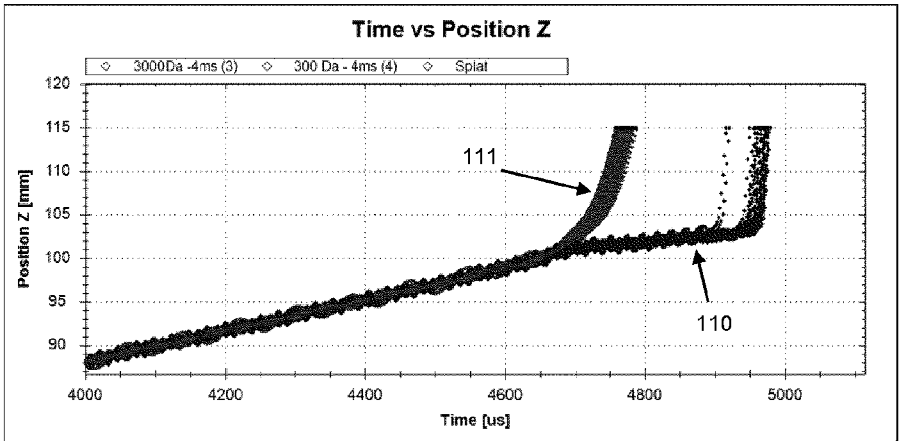
FIG. 30 shows an example of the trajectory of ions within and extracted axially from an ion guide.

In the following example data, an RF voltage was applied to the final electrode segment of the device, that is to say, an RF voltage was applied to the final segment of the last set of N segments, where N=8. FIGS. 29 and 30 show further simulations to illustrate this second embodiment for axial ejection of ions from the bunching ion guide. These figures show the axial position (along the z-axis) of heavy ions 109 and 111 (3000 Da) and light ions 108 and 110 (300 Da) as they axially eject from the ion guide, and including the ion trajectories beyond the end of the ion guide. Parameters corresponding to the simulation results shown in FIG. 30 were adjusted (erf function amplitude, pseudo-potential barrier height and axial extraction voltage) to provide a large time separation between the ejection of the heavy and light ions. Parameters corresponding to the simulation results shown in FIG. 29 were adjusted to provide a smaller time separation between the ejection of the heavy and light ions. In the simulation results shown in FIG. 29, the ions converge at the axial distance of 35 mm from the end of the ion guide. This aspect of the invention applies to production ions and precursor ions. This aspect of the invention may be applied to a ToF mass spectrometer, a Q-ToF mass spectrometer or to a lossless 2 dimensional tandem mass spectrometer.

Collection and Transport of Ions Axially

New waveform disclosed herein provide significant simplifications to the manner in which ions may be injected in to an ion guide. This may substantially reduce costs and improve performance and robustness in an ion guide apparatus. Also, this allows one to apply a method of ion bunch formation that avoids switching of the potential between different values at different stages of the bunch formation. Such methods may be advantageous if larger spatial separation of the ion bunches within the device is needed. For example, such larger separation (by one or more empty wells) is highly preferable when the phase space volume of the ion bunches can be affected by the extraction field of the extraction region, when the ions arrive to the extraction region close enough.

Figure 33:
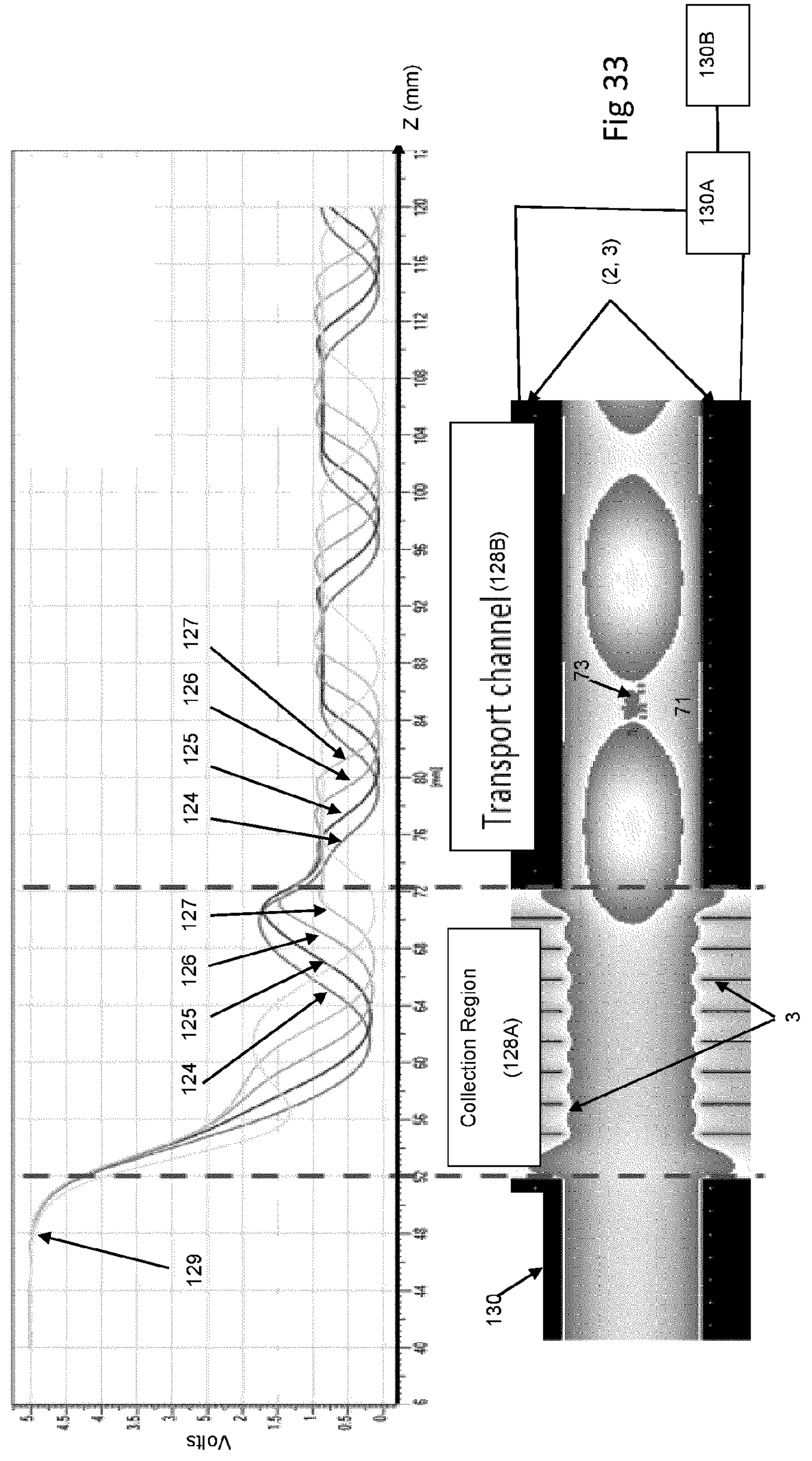
FIG. 33 shows an example of static potential wells contiguous with travelling potential wells, and the ion guide supporting them.

The device and methods for manipulating charged particles according to the invention in its fifth and sixth aspects is applicable to this purpose. For example, an embodiment of such a device is illustrated in FIG. 33. This device comprises a series of electrodes (2, 3) disposed so as to form a channel for transportation of the charged particles. This channel may be according to a device disclosed herein according to the invention in its first aspect (e.g. FIG. 6).

The device comprises a power supply unit (130A) adapted to provide a first supply voltage to axially segmented bunching electrodes amongst said electrodes so as to create an electric field defining a potential 71 within said channel, the potential having one or more local minima between local maxima defining a potential well which is selectively translated along at least a part of the length of said channel. The power supply unit (130A) is adapted to provide a second supply voltage to radial confinement electrodes amongst said electrodes so as to create a radially confining electric field within said channel configured to radially confine charged particles 73 within the channel.

Electrodes of the series of electrodes define a collection region 128A within the channel for collecting charged particles thereat, and a transport channel 128B for transporting collected charged particles from the collection region.

The power supply unit 130A is adapted to apply to electrodes defining the collection region, under control from a control unit 130B, the first supply voltage selectively configured to be:

(1) a collection voltage signal to create an electric field defining said potential well within the collection region 128A for collecting charged particles thereat; or (2) a transport voltage signal to create an electric field defining said potential well within the collection region for translating charged particles through the collection region 128B to the transport region;

wherein the collection voltage signal creates an electric field defining a substantially static potential well and the transport voltage creates an electric field defining a said translated potential well.

The translated potential well is created by translating the static potential well. The upper panel of FIG. 33 shows the axial shape of the static potential well 124 formed in the collection region, and of concurrent translated potential wells formed in the transport region. The ion input end of the collection region is in communication with an ion input device 130 which is at a local high potential 129, indicated in FIG. 33. This potential changes smoothly into a potential well shape 124 along the axial length of the collection region. Similarly, the ion output end of the collection region is in communication with an input end of the transport channel 128B which is at a time-varying local potential, indicated in FIG. 33, which changes in time as the potential wells within the transport region are continuously generated and translated along the axis of the transport region in a direction away from the output end of the collection region (i.e. in the manner of a conveyor). At the output end of the collection region, the potential of the static potential well 124 within the collection region changes smoothly into a potential immediately adjacent to it within the transport region.

The collection voltage signal comprises a voltage waveform the amplitude of which (when comprising a non-RF voltage signal), or modulation envelope of which (when comprising an RF signal), is substantially constant in time (i.e. temporally static, or not time-varying). The power supply unit 130A is adapted selectively to change the collection voltage signal into the transport voltage signal by applying a periodic time variation to the collection voltage signal thereby to translate the potential well created by the collection voltage signal. This is indicated in FIG. 33 (upper panel) in the form of the translation of the previously static potential well 124, within the collection region, into a translating potential well (125, 126, 127) at successive times after the transition from static well to travelling well has been made. The well is thereby translated into, and along, the transport region 128B.

This change is synchronised (e.g. is in-phase) with a transport voltage signal applied to electrodes defining the transport region which creates an electric field defining said potential well for translating charged particles through the transport region. The synchronisation is such that the transport voltage signal applied to bunching electrodes defining the terminal end of the collection region, matches the value of the transport voltage signal applied to bunching electrodes of the transport region immediately adjacent to the terminal end of the collection region. This match is such that the value of the transport voltage signal applied to bunching electrodes defining the terminal end of the collection region, and any temporal change therein, are both substantially the same as the value of the transport voltage signal applied to bunching electrodes of the transport region immediately adjacent to the terminal end of the collection region, and any temporal change therein. For example, when the transport voltage signal applied to the collection region and the transport region is temporally periodic, and defined by a waveform having a waveform period, T, then synchronisation is achieved when the first supply voltage is selectively configured to be a collection voltage signal for a duration, $\Delta t$, that is substantially equal to an integer multiple of the period of the waveform: $\Delta t=nT$, where n=1, 2, 3 . . . etc.

Figure 31:
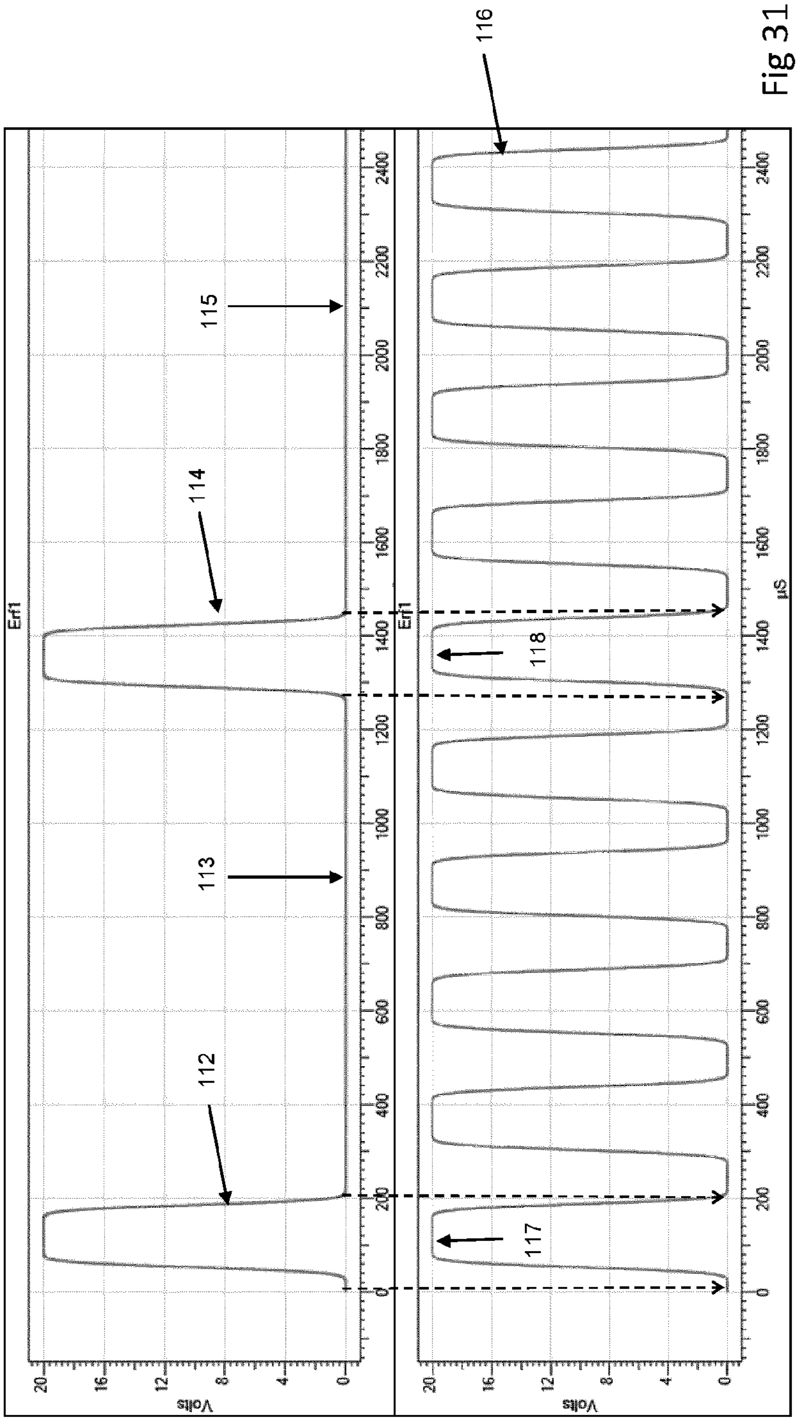
FIG. 31 shows examples of the disclosed waveform.
Figure 32:
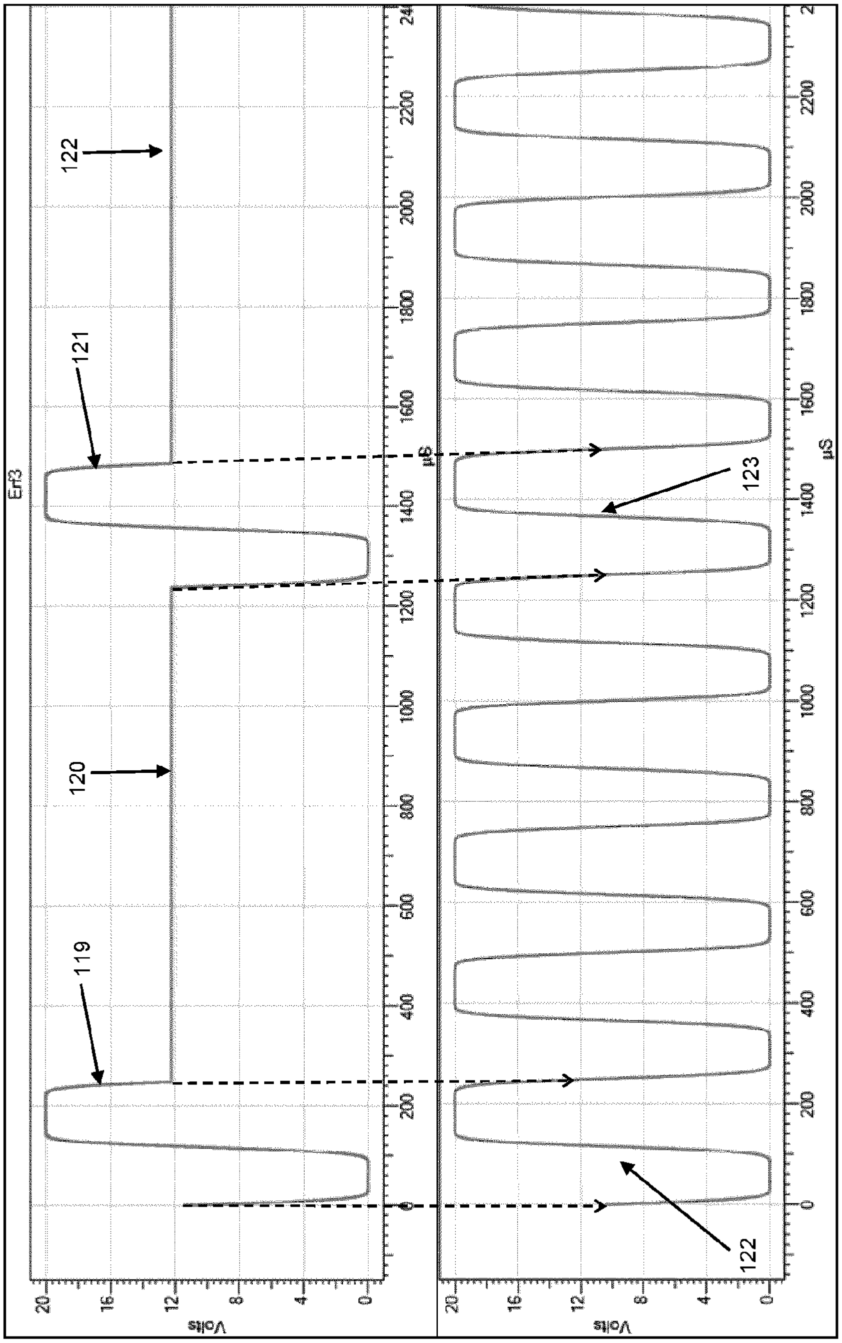
FIG. 32 shows examples of the disclosed waveform.

FIG. 31 and FIG. 32 illustrate an example of this. FIG. 31 shows an example of when a transition is made whereby a potential well in the collection region is changed from being a travelling/translated well to being a static well. The upper panel of FIG. 31 shows the voltage applied to a given one of the multiple segmented electrodes defining the collection region for producing a static potential well. The lower panel of FIG. 31 shows the voltage applied to a given one of the multiple segmented electrodes defining the collection region had the transition not been made, and the potential well had remained a travelling well. This waveform is applied throughout the transport part of the device (128B in FIG. 33) to the corresponding electrodes in each of the set of N. A voltage waveform 117 (lower panel of FIG. 31) for generating a travelling well is in phase with a voltage waveform 112 applied to the electrode immediately prior to the transition. Immediately after the transition, the applied voltage 113 corresponds to the phase of the waveform at the instant of transition. This persists for the duration of the time for which a static well 124 is required. At the end of that period of time, the applied voltage 114 corresponds to the phase of the waveform 118 that would otherwise have been applied had no transition taken place. A second static period of time 115 may then follow, in the same manner.

The upper panel of FIG. 32 shows the voltage applied to another, different one of the multiple segmented electrodes defining the collection region for producing a static potential well. The lower panel of FIG. 32 shows the voltage applied to a given one of the multiple segmented electrodes defining the collection region had the transition not been made, and the potential well had remained a travelling well. This waveform is applied throughout the transport part of the device (128B in FIG. 33) to the corresponding electrodes in each of the set of N. A voltage waveform 122 (lower panel of FIG. 32) for generating a travelling well is in phase with a voltage waveform 119 applied to the electrode immediately prior to the transition. Immediately after the transition, the applied voltage 120 corresponds to the phase of the waveform at the instant of transition. This persists for the duration of the time for which a static well 124 is required. At the end of that period of time, the applied voltage 121 corresponds to the phase of the waveform 123 that would otherwise have been applied had no transition taken place. A second static period of time 122 may then follow, in the same manner.

The voltage applied to each segmented bunching electrode is similarly rendered static, all occurring at the same point in time, by such a transition described above. Because the same waveform is applied to each bunching electrode forming the collection region (and the transport region), but at a different respective phase along the periodic cycle of the waveform (in the manner shown in FIG. 11), then this means that the voltage applied to a given bunching electrode remains at the voltage of the waveform at the instant of the transition to a static well. Consequently, because different phases of the waveform are applied, at that instant, to successive respective electrodes along the collection region, this means that those respective electrodes possess correspondingly different respective voltage values—the differences are in accordance with the waveform. This has the effect of rendering the potential well, which is formed by the collective effect of the bunching electrodes in the collection region, static. This is achieved simply by halting the temporal changes in the phase of the waveform applied to those electrodes. A subsequent transition back to a travelling/translating potential well is achieved by resuming the temporal changes in the phase of the waveform applied to those electrodes.

This methodology greatly simplifies the control electronics. Reasons that such simplifications originate from the intrinsic properties of the waveforms disclosed herein, and are made possible by the new waveforms because:

(1) Firstly, the radial confinement and the axial bunching voltages may be applied independently and supplied continuously. These voltages are able to be common to the ion collection region of the ion guide as well as the main transport region of the bunching ion guide. This allows one to keep radially confining potential always present in the gathering (collection) region; no switching is needed.

(2) Secondly, as the ions are always located at potential or pseudo potential minima of the travelling waves, they are always located adjacent to electrodes during the phase of modulation when the modulation voltage is zero. Thus, the inventors realised that the new waveforms disclosed herein themselves possess qualities of a suitable 'gathering' potential for use in collecting ions. One needs only to "halt" the modulation waveform in the 'gathering' region, or 'collection' region, during those times that a group of ions are to be introduced into the ion guide.

The electronics scheme becomes particularly simplified and of much lower cost as a result. When we use the term 'modulated voltage waveforms' we refer a voltage that has a waveform modulation without an underlying RF signal. This is a specific case falling within the scope of the new waveform disclosed more generally in the present disclosure, in which an RF voltage component may be present or may be absent. In other words, no modulated RF voltage component is present, but only the modulation voltage, itself is employed. Not needing to create the modulated RF voltage component provides a very significant simplification of the electronics need for the ion injection. This is possible because the radial confining RF voltage is independent and continuously present. The radially confining voltage waveform may be a 'digitally' generated RF waveform (e.g. 'digitally' meaning: generated by switching rapidly between two voltages values) and a single voltage generator may be used to supply all parts of the bunching ion guide including the bunch forming region. The waveforms within the transport part of the device (128B in FIG. 33) can be either RF-modulating or without the RF component. The synchrony/coordination of the waveforms in both parts of the device allows smooth transition of the bunches of ions between the regions of collection and transport.

In more detail, the waveforms, creating the travelling wave in the gathering/collection region, can be temporally stopped ("halted"), thus providing a set of static voltages necessary to achieve the static gathering/collection potential of the step one, whilst the travelling wave in the downstream device continues. This can be readily accomplished by a digital controller. The halting provides efficient loading of ions into a targeted single potential well of the bunching ion guide. The static voltages should be re-started, at the correct phase (they become time dependent again after n periods, i.e. n*T) and are synchronised and in phase with the modulation waveform that run continuously on all parts of the device other than the gathering/collection region. When the waveforms of the gathering/collection region start varying, the transport stage of the bunch formation starts. An example of one phase of modulated voltage waveforms suitable for the bunch formation is show in of FIG. 10*f*. Modulated voltage waveforms may be employed in the gathering/collection region, because, at any given time or location, ions of only one polarity will be injected. The voltages in the rest of the bunching ion guide may be modulated RF waveforms if necessary, for example, when ions of both polarities are conveyed in the same minima at the same time.

Note that the gathering/collection region may be formed from segmented rods, (both X rods and Y rods are segmented) or segmented and continuous rods (only X or only Y rods are segmented), of any type of electrode structure disclosed herein. When the gathering/collection region is formed from segmented rods, the modulated voltages waveforms may be applied to both x and y rods, which allows higher voltages to be applied. This way, two opposite rows of the electrodes will have both radially confining RF and modulated voltages waveforms applied at the same time (This summation of waveforms is much more technically easy to achieve than modulation as required by the prior art). This may be a significant advantage in some applications of the device and can bring several benefits:

1) It may provide for the injection of a wider ranges of masses at one time.
2) It may allow for the injection of more energetic ions.
3) It may allow for the speeding up of the ion injection (loading) process in to the gathering/collection region.
4) It may allow for a reduction in the pressure in the gathering/collection region thus allowing the injection of precursor ions with reduced possibility of dissociation by CID. These 'intact' precursor ions may later be dissociated by other dissociated means.

An example of such a modulated voltage waveforms is shown in FIG. 31 and FIG. 32. These modulated voltage waveforms are based on the exemplary equation (2), above. Here, we shall denote them as 'I_ERF' waveforms, where "I" stands for "Injection" and ERF denotes the fact that equation (2) exploits error function (elf) with parameters f=1 and p=5. The top panel of each of FIG. 31 and FIG. 32 shows traces, of two (2) out of the 8 waveform voltages (NB. the other 6 are not shown). Such voltages (112, 114) are applied to two neighbouring bunching electrodes within a collection region of the ion guide. These voltages were created from a digitally-stored set of discrete values of the desired waveform, described herein, and no RF frequency component was applied to them. The waveforms applied to the rest of the bunching electrodes in the adjacent transport region of the ion guide, or part thereof, may be either modulated RF waveforms or modulated voltage waveforms.

In the top panels of FIG. 31 and FIG. 32, one can see that the I_ERF waveforms display clear halting periods (113, 120). This is the time when the ions are gathered/collected in the gathering/collection region. The period of halting also defines the axial distance (in wavelengths of the travelling potential wells) between bunches of ions as they propagate in the transport region of the bunching ion guide. The halt duration should preferably be an integer multiple of the waveform modulation period, T.

Both I_ERF and ERF waveforms are synchronised during the ion transport stage, within the collection region, as can be seen from the bottom panels of FIG. 31 and FIG. 32. This ensures transfer of ions out of the collection region without, or with minimal, losses.

The amplitudes of the waveforms in the bunch forming region and the rest of the ion guide may be of different magnitudes. This could be advantageous. For example, ions entering the bunch forming region may be energetic; this would require higher amplitude of the corresponding waveforms.

A Planar Ion Guide Structure

The main problem to solve in manufacturing of the invention is to find an electrode structure for the express purpose of bunched ion transport that is fast and easy to manufacture, are reproducible and of lower cost. The current structures described elsewhere herein may be manufactured, but they comprise many individual accurate components which must be accurately manufactured and manually assembled. This is time consuming and expensive and not well controlled. These structures do not lend themselves for batch production, of several 10 s or 100 s of devices that is required in the analytical industry to which they are to be applied.

An additional problem with prior art methods is that lateral dimensions of device may not be practically reduced below ~5 mm. In some application smaller dimensions channels are desirable for reducing the overall size of the instrumentation PSUs. Smaller embodiments of the invention may further reduce cost and extend the possible range of applications to which it may be applied. Smaller embodiments improve the performance of some aspects. The aim of the current invention was to solve these problems.

According to prior art, the necessary electrical field is created by planar electrodes. However, in the current application of bunched ion transport the electrode structures most preferably have many segments, of the order 50 to several 100 s of segments. The electrode spacing in the longitudinal direction is most preferably be two times (2×) smaller than the gap between the two electrode planes. Preferably, at least three times (3×) smaller and typically three and a half times (3.5×) smaller, even more smaller values may be used.

An example structure is shown by FIG. 8*d*. In this embodiment device comprising two electrode planes arranged in parallel opposition. Each plane consisting of a row of multiple inner bunching electrodes and two continuous radial confinement electrodes. The several phases of modulated voltage waveforms (or modulated RF waveforms) may be applied to the inner bunching electrodes (21, 22) and an RF voltage may be applied to the continuous outer radial confinement electrodes (23, 24, 25, 26). Within this planar structure the RF voltage applied to the radial confinement electrodes provides the function of radially confining the ion bunches. The several phases of modulated voltage waveforms of the type described herein applied to the inner bunching electrodes (21, 22) provide the function of bunched ion transport. The electrode planes may be spaced apart by metal support members, so that metal support members an integral part of the continuous electrodes (items 137*a-d* and 138*a-d*, shown in FIGS. 35 to 38).

A cross-section of a planar device constructed in this manner is also shown in FIGS. 35 to 38. Referring to FIGS. 35 to 38, which show examples in cross-section across the axis of the ion guide channel, the configuration of bunching ion guide shown in FIG. 8*d* may also be constructed from electrode planes (items 132*a-d*, 133*a-d*, 134*a-d*, shown in FIGS. 35 to 38). In this embodiment, the device comprising pairs of electrode planes arranged in square opposition. One pair of the electrodes consist of two opposing rows, 133*a-d*, of multiple bunching electrodes and two other pairs, 132*a-d* and, 134*a-d* either side of the bunching electrodes 133*a-d*, each contain the continuous radial confinement electrodes. The several phases of modulated voltage waveforms (or modulated RF waveforms) are applied to the pair of electrode planes forming the bunching electrodes and an RF voltage of fixed amplitude is applied to the continuous radial confinement electrodes. Within this planar structure the RF voltage is applied to the pair of electrode planes forming the continuous radial confinement electrodes.

The two planes of electrodes are preferably formed as mirror images of each other, around a centre plane, the centre plane bisecting the gap between the two parallel planes of electrodes. This type of construction is much easier, faster and of lower cost to manufacture than the preceding structures described herein, it may be created on printed circuit boards (PCBs) shown as items 135*d*, 135 and 136 in FIGS. 35 to 38. Multiple layer PCBs may be used as shown in the prior art for making convenient electrical connections to the multiple planar electrodes. PCBs may be manufactured in larger quantities and at low cost. A cross section of a planar device constructed in this manner is also shown in FIGS. 35 to 38.

Figure 35:
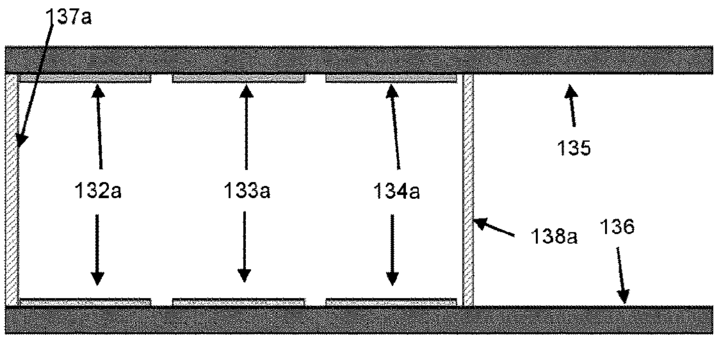
FIGS. 35 to 38 show examples of the disclosed ion guide in cross-sectional view.
Figure 36:
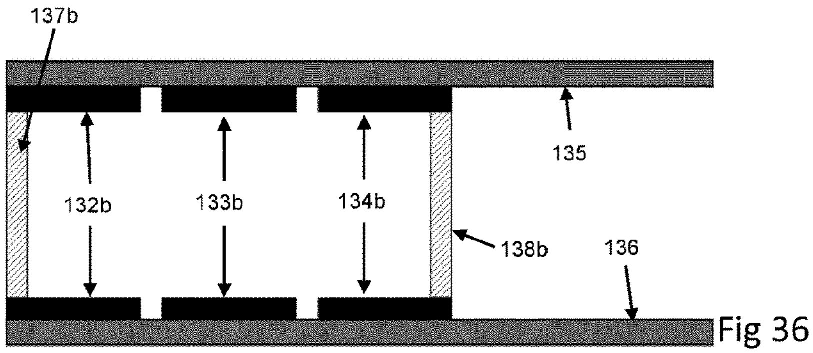
Figure 37:
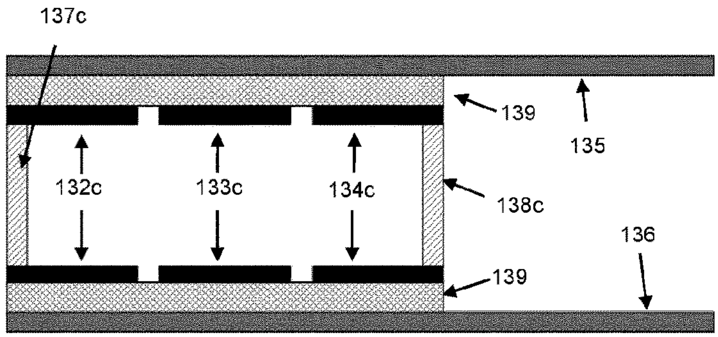

In some embodiments additional metallic electrodes may be mounted to PCBs (135*d*, 135 and 136) as shown in FIG. 35 to FIG. 37, which may be placed and attached to the PCB with enough accuracy along with related passive or active electronics components. These components may be placed using well established robotic methods of the electronic industry. The PCBs may be extended in the lateral direction as shown in FIGS. 35, 36 and 37 for the mounting of the said electronics components.

FIG. 8*d* may be used to provide an approximation of a quadrupole field when viewed in cross section. FIG. 8*e* shows an alternative structure having two pairs of primary rods on each plane, eight in total to provide a more accurate quadrupole field when appropriate voltages are applied. The structure of FIG. 8*d* will provide sufficient accuracy of the radially confining electrical fields for purpose of conveying of ion bunches and the collisional cooling of transporting ion bunches. For some embodiments of the invention a 'purer' quadrupole field may be necessary. This may be achieved, by increasing the number of electrode segments in the lateral direction. This higher purity field can be provided without increasing the cost of the planar electrode structure but does requires a higher demand on the requirements of the PSU to generate the divided voltages.

The structure of FIG. 8*d* will provide sufficient accuracy of the radially confining electrical fields for purpose of conveying of ion bunches and the collisional cooling of transporting ion bunches. For some embodiments of the invention a 'purer' quadrupole field may be necessary. This may be achieved by increasing the number of electrode segments in the lateral direction. This higher purity field can be provided without increasing the cost of the planar electrode structure but does demand higher requirements of the PSU to generate the divided voltages.

Figure 34:
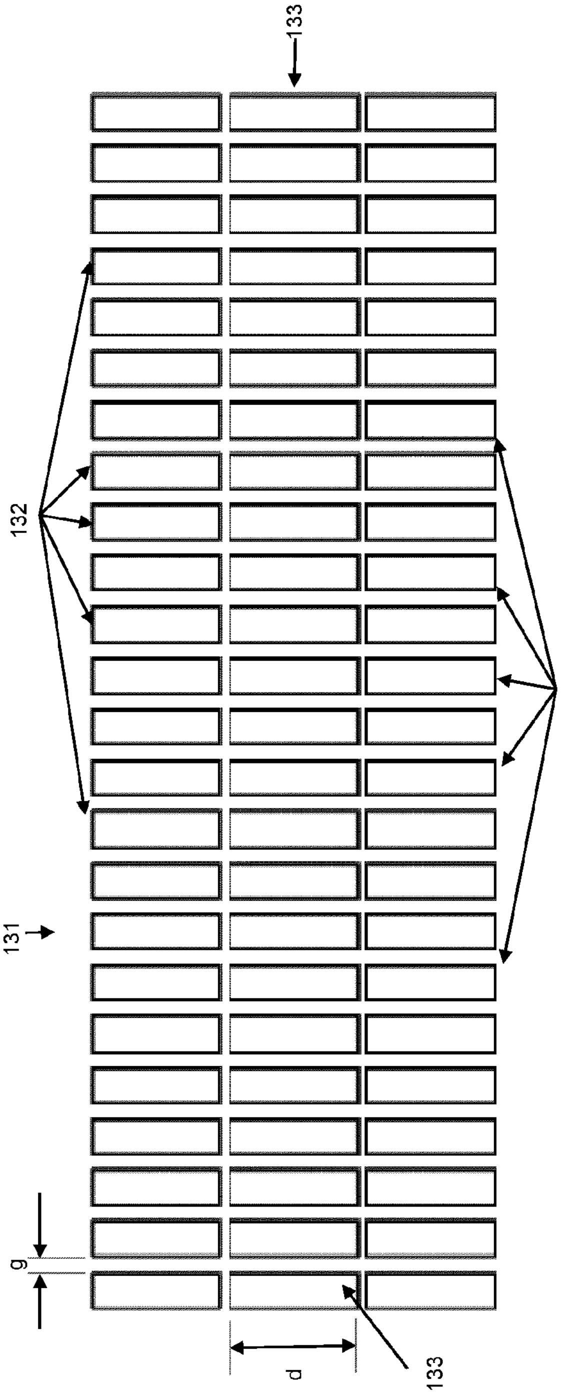
FIG. 34 shows an example of planar electrodes of the disclosed ion guide.

In some embodiments the radial confinement electrodes may also be segmented in a manner similar to that of the bunching electrodes. FIG. 34 shows an example in a plan view showing one of two opposing planes of electrodes. In this case the several phases of modulated voltage waveforms may be applied to the inner bunching electrodes 133 and segmented radial confinement electrodes (132, 134) together with the RF voltage for radial confinement of the ions. This embodiment allows for significantly higher bunching voltages to be applied. This allows for more tightly packed bunches in the axial direction and for the confinement of a higher mass range of ions and for the injection of more energetic ions. As noted above the invention allows for the simultaneous transport and collisional cooling of the ion bunches The PCB substrate may provide sufficient accuracy and rigidity for some of the described embodiments of the invention. The manufacturing accuracy may be improved by inserting a pane 139 of ceramic, glass ceramic or machinable ceramic between the PCBs and the electrodes, as shown in FIG. 37.

Figure 38:
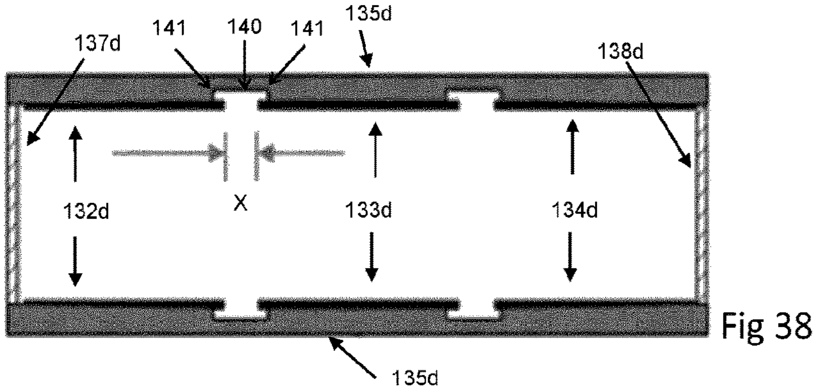

In further embodiments the PCB or ceramic substrate material may be machined as shown by FIG. 38. This format is useful to reduce risk of surface charge deposits on the insulating surfaces between electrodes which if deposited within the internal channel and may cause the formation of unwanted electric fields due to the static charge. This would interfere with the correct functioning of the device. The insulating surfaces may also be further coated with additional materials to prevent surface charge formation as is known by those versed in the art. The format of the arrangement of FIG. 38 also provides the increase of the 'surface tracking distance' allowing for the application of higher voltage differences between adjacent electrodes. In particular, if the ceramic/dielectric substrate part charges up too much, then the electric field resulting form that surface charge could have an unwanted and variable effect on the field inside the ion guide. By undercutting (see 141) the ceramic adjacent to the gap 140 between neighbouring electrodes of the guide, as indicated by the gap distance "x" in FIG. 38, this increases the surface tracking distance to allow for high voltages to be applied to the electrodes. The close gap, x, reduces the possibility of stray ions to pass through it. However, if they do, then the field resulting from surface charge build-up there is prevented from penetrating back through the gap, x.

In preferred embodiments, the width of the planar electrodes in the lateral direction (d), transverse to the guiding axis of the ion guide, may be dimensioned so to be equal to the gap (g) between the planes of electrodes such as is indicated in FIG. 34. That is, preferably: g=d. However, in other embodiments one may select g to be in the range: 0.5 d≤g≤2 d.

As shown the in FIGS. 35 to 38 the two planes of electrodes are spaced apart by two side members (137*a-d*; 138*a-d*). These side members may be made of a closed or open structure. Closed structures are useful for reducing the conductance of gas along the channel. The open structure may be employed for introducing buffer gas or reactant gas into the transport channel or may be employed for pumping gas from the channel. A channel may be constructed of several such regions in various combinations.

Orthogonal extraction of ions from the bunched ion guide can also be made more convenient due to these planar structures. It allows for the formation of extraction lens in closer proximity to the bunching ion guide, which is useful for minimising aberrations in the extraction optics. Orthogonal extraction may be conveniently performed in either lateral direction. Ions may be either extracted from the device through slits/apertures formed in the planar electrodes, or through a mesh. In some embodiments the mesh may be formed within the electrodes or within multiple electrodes. In further embodiments the spacing of the bunching electrodes formed on electrode planes may be varied so as to extend or contract the ions bunch as it is conveyed along the bunching ion guide. This may readily be achieved by the device formed from electrode planes.

Yet a further advantage of forming a bunching ion guide from electrode planes is that multiple bunching ion guide channels may be formed into a single plane for the parallel conveying of ions. All solutions in all described embodiments are enabled by the new waveforms that are disclosed in detail herein.

Figure 39:
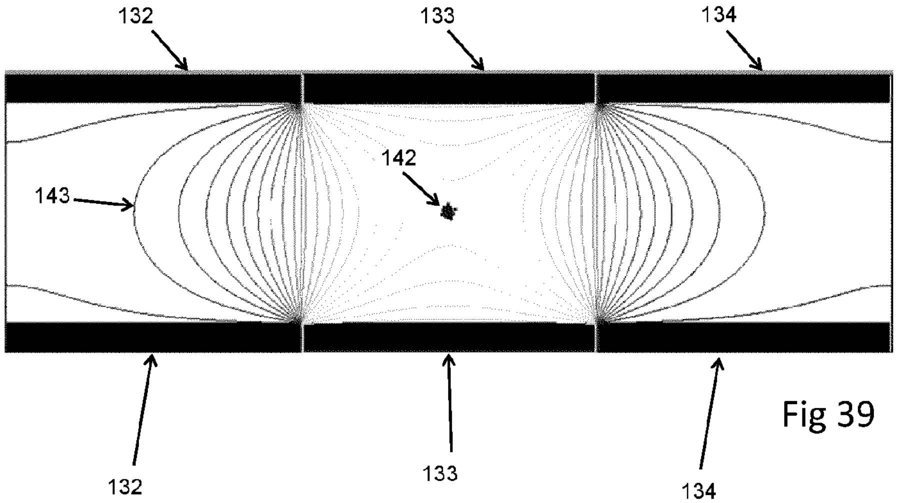
FIGS. 39 to 41 show examples of the disclosed ion guide in cross-sectional view, with equipotential lines of electric fields therein for ion confinement and for orthogonal ion extraction.

An example embodiment of a planar constructed bunching ion guide is shown in cross section by FIG. 39. In this example the bunching electrodes 133 and radial confinement electrodes 132 and 134 are arranged such that the spacing is set so that d/g=1.33. (here d=10 and g=7.5). The electrical equipotentials 143 are shown for the case when a single voltage is applied to all four outer electrodes 132 and 134, and the two inner electrodes 133 have zero potential. A potential well is formed in which a bunch of ions 142 is confined.

These equipotentials show the form of the radial trapping field. It is an approximate quadrupole potential and is adequate for providing the radial trapping function. The FIG. 39 shows the formation of ions bunch 142 when an RF voltage amplitude of 1000V (o-p) and frequency of 1 MHz is applied to the four outer electrodes. The ion bunch is shown after 2 ms of propagation in the guide channel. The buffer gas was Argon gas set at a pressure of 10 mTorr. The bunching waveforms (eight phases of modulated voltages or modulated RF voltages, for example as shown in FIG. 11) may be applied to the two inner rows of electrodes 133. When modulated voltages are used (like in FIG. 10*f*), they may also be applied to the four outer electrodes 132 and 134 or all six of the electrodes (132, 133, 134). The outer electrodes 132, 134 are preferably segmented as shown in FIG. 34. When modulated voltages are applied to all six electrodes, higher amplitudes may be applied. The selection of which electrodes the modulated voltages are applied influences the shape of the ion bunch in the lateral direction. This may be usefully exploited.

Figure 40:
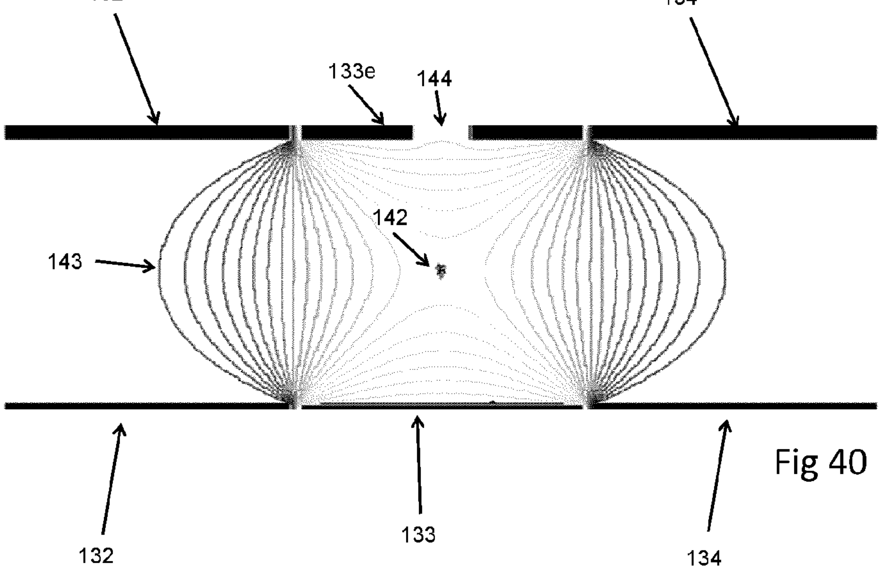
Figure 41:
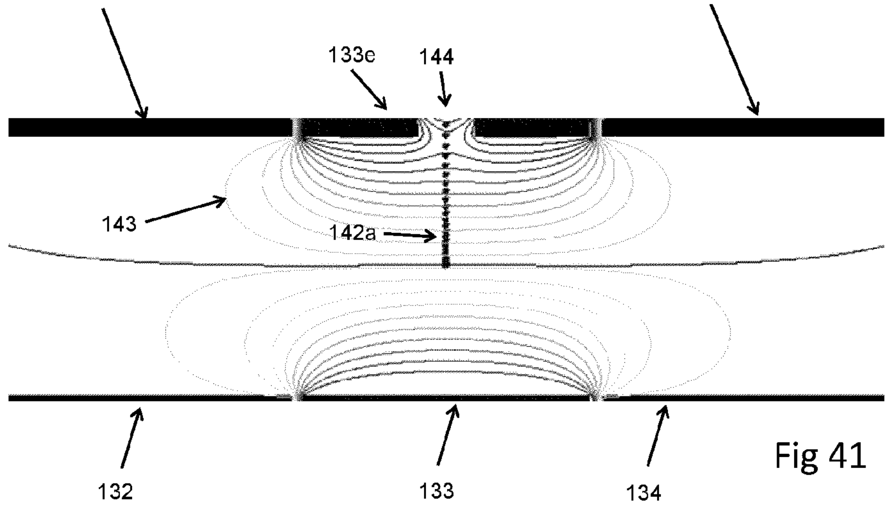
Figure 42:
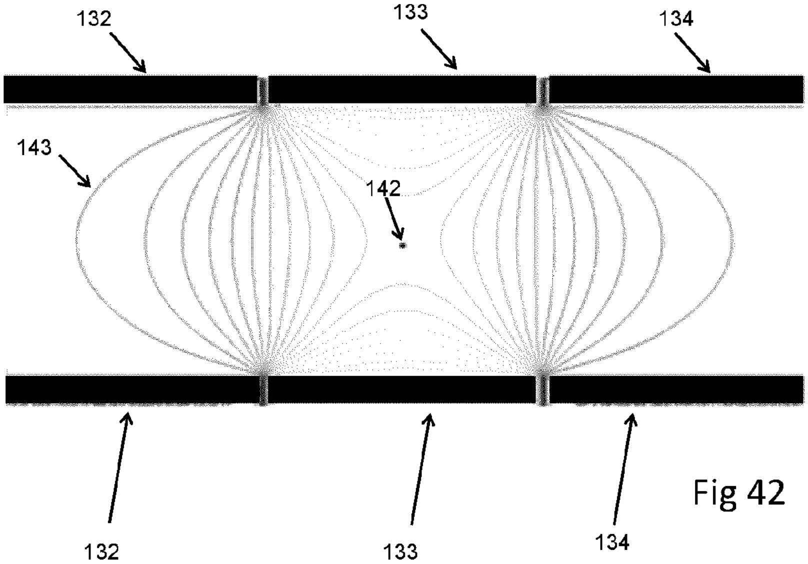
FIGS. 42 to 43 show examples of the disclosed ion guide in cross-sectional view, with equipotential lines of electric fields therein for ion confinement and for orthogonal ion extraction.
Figure 43:
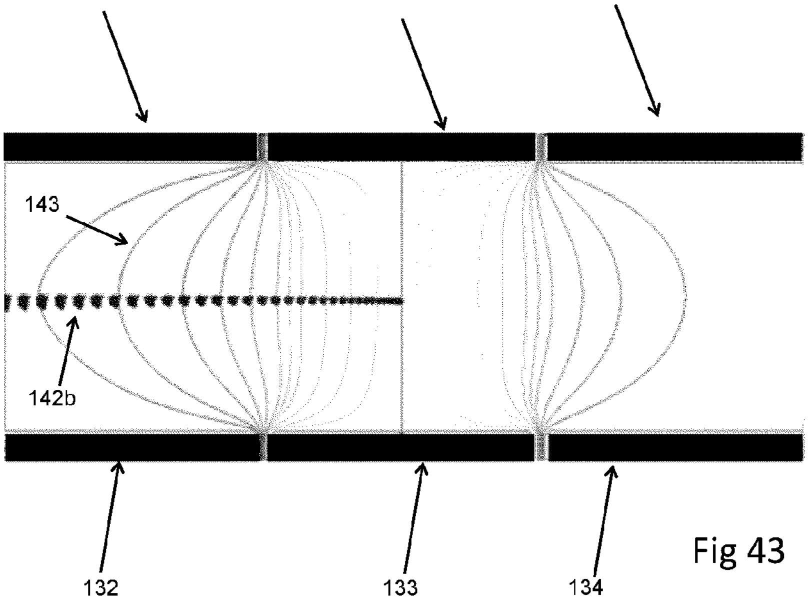

Orthogonal extraction of ions, according to the invention, is exemplified by FIGS. 40 and 41. These figures show the device in cross-sectional view. The guide has dimensions: d/g=1, and d=2 mm. The resulting electrical potential lines are shown when voltages are applied to all four outer electrodes. This geometry provides a more symmetrical quadrupole field. A formed ion bunch is shown for the RF voltage of 1000V and 3.3 MHz (applied to the four outer electrodes). The upper inner electrode (bunching electrode 133*e*) has an aperture 144 through which an ion bunch 142 may be extracted to exit the device. The aperture is 0.36 mm in the lateral dimension. FIG. 42 shows the orthogonal extraction due to the application of an extraction voltage to the upper (133*e*) and lower (133) inner electrodes (bunching electrodes). The equipotential lines 143 of the extraction electrical field are shown by FIG. 43. The passage of the ion bunch 142*a* towards and through the aperture 144 is shown.

FIGS. 42 and 43 show the device, according to another embodiment, in cross-sectional view. The guide has dimensions: d/g=1, and d=2 mm. The resulting electrical potential lines 143 are shown when voltages are applied to all four outer electrodes (132, 134) in FIG. 42. Also in FIG. 42, a formed ion bunch 142 is shown for an applied RF voltage of 1000V and 3.3 MHz (applied to the four outer electrodes). The outer electrodes (radially confining electrodes, 132 and 134) are spaced apart in opposition to each other, to define a gap through which an ion bunch may be extracted in a direction 142*b* parallel to the planes of those opposing electrodes, to exit the device. FIG. 46 shows the orthogonal extraction due to the application of an extraction voltage to the upper and lower outer electrodes (radially confining electrodes 132). The equipotential lines 143 of the extraction electrical field are shown by FIG. 45.

Ions may be extracted from the planar bunched ion guide towards, according to either orthogonal extraction arrangement, for example, towards a ToF analyser.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below.

The entirety of each of these references is incorporated herein.

[1] US2014/0070087A1

[2] U.S. Pat. No. 9,536,721B2

[3] K. Giles et al, Rapid Commun. Mass Spectrom. 2004; 18: 2401-2414

[4] U.S. Pat. No. 8,067,747

The invention claimed is:

1. A device for manipulating charged particles, the device comprising:

a series of electrodes disposed so as to form a channel for transportation of the charged particles;

a power supply unit(s) adapted to provide a first supply voltage which changes according to a waveform having a period (T), to axially segmented bunching electrodes amongst said electrodes so as to create an electric field within said channel, the potential of said electric field having one or more local minima between local maxima defining a potential well which is translated along at least a part of the length of said channel such that the potential well is translated a distance substantially equal to its length in an interval of time substantially equal to the period (T);

a power supply unit(s) adapted to provide a second supply voltage to radial confinement electrodes amongst said electrodes so as to create a radially confining electric field within said channel configured to radially confine charged particles within the channel;

wherein said waveform is:

(a) substantially continuously smooth throughout its period (T); and, (b) substantially constant in value throughout a finite duration of time ($T_L<T$) within said period (T), corresponding to a minimum of the waveform.

2. A device according to claim 1 wherein first supply voltage comprises an RF voltage signal modulated according to the waveform such that the potential well is formed by a pseudo-potential.

3. A device according to claim 1 wherein the first supply voltage comprises an AC voltage that varies in value over time according to the waveform, and does not comprise, or modulate, any underlying RF voltage signal.

4. A device according to claim 1 in which the power supply unit(s) is adapted to supply the first supply voltage waveform to each respective electrode of the axially segmented bunching electrodes such that it is phase-shifted relative to the voltage waveform concurrently supplied to adjacent electrodes.

5. A device according to claim 1 in which the power supply unit(s) is configured to apply the first supply voltage to each of a plurality of successive axially segmented bunching electrodes at a different respective phases of the waveform concurrently during the finite duration of time ($T_L<T$) within said period (T) of the waveform.

6. A device according to claim 1 in which the waveform frequency ($f=1/T$) is such that during the predetermined finite time interval, $T_L$, the value of the waveform is not greater than 10% of the maximum value of the waveform within the period, T, of the waveform, wherein $T_L \geq T/N$, and N is the number of successive axially segmented bunching electrodes forming a subset of axially segmented bunching electrodes which supports a full period, T, of the waveform.

7. A device according to claim 1 wherein:

throughout the finite duration of time ($T_L$) the value of the waveform changes by no more than a predetermined maximum permissible change ($\Delta U$) expressed as a percentage (%) of the amplitude ($U_0$) of the waveform such that: $100 \times \Delta U/U_0 \leq 10$.

8. A device according to claim 7 wherein the finite duration of time ($T_L$) is such that $\Delta U'/T'_L \leq 2.0$, wherein $T'_L = 100 \times T_L/T$ is the duration of $T_L$ expressed as a percentage (%) of the period T and $\Delta U' = 100 \times \Delta U/U_0$.

9. A device according to claim 1 wherein the modulus of the first time derivative ($\partial U/\partial t$) of the waveform (U), having waveform amplitude $U_0$, is such that:

$$|(T/U_0)\partial U/\partial t| \leq 50$$

throughout said finite duration of time ($T_L$).

10. A device according to claim 1 wherein the value of the modulus of the first time derivative of the first supply voltage waveform, of waveform amplitude $U_0$, is such that:

$$|(T/U_0)\partial U/\partial t| \leq 100$$

throughout said period (T) of the waveform.

11. A device according to claim 1 wherein the power supply unit(s) comprises a first power supply unit(s) adapted to provide first supply voltage(s), and a separate second power supply unit(s) adapted to provide second supply voltage(s).

12. A device according to claim 1 wherein the minimum of the potential well defines a well floor and the value of the potential defining the well floor comprises only one local minimum which does not vary in value over time.

13. A device according to claim 1 comprising a memory unit within which is stored a plurality of separate and discrete values of the waveform corresponding to a respective plurality of separate and discrete points along its cycle.

14. A device according to claim 1 comprising a buffer gas control unit configured to control the pressure of a buffer gas within the channel such that the pressure at the exit of the channel is lower than 0.5 mbar.

15. A device according to claim 1 comprising a buffer gas control unit configured to control the pressure of a buffer gas within the channel such that the pressure of the buffer gas at one end of the channel is at least 20 times greater than the pressure at the other end of the channel.

16. A device according to claim 1 wherein said radial confinement electrodes comprise axially segmented electrodes.

17. A device according to claim 1 wherein said radial confinement electrodes comprise axially segmented or comprise axial regions of segmented electrodes and axial regions of continuous unsegmented electrodes.

18. A device according to claim 1 wherein the waveform comprises a sinusoidal function or a set of sinusoidal functions.

19. A method for manipulating charged particles, the method comprising:

providing a series of electrodes disposed so as to form a channel for transportation of the charged particles;

providing a power supply unit(s) and therewith providing a first supply voltage which changes according to a waveform having a period (T), to axially segmented bunching electrodes amongst said electrodes so as to create an electric field within said channel, the potential of said electric field having one or more local minima between local maxima defining a potential well which is translated along at least a part of the length of said channel such that the potential well is translated a distance substantially equal to its width in an interval of time substantially equal to the period (T);

providing a power supply unit(s) and therewith providing a second supply voltage to radial confinement electrodes amongst said electrodes so as to create a radially confining electric field within said channel configured to radially confine charged particles within the channel;

wherein said waveform is:

(a) substantially continuously smooth throughout its period (T); and, (b) substantially constant in value throughout a finite duration of time ($T_L < T$) within said period (T), corresponding to a minimum of the waveform and coinciding with said local minimum of the potential well.

20. A method according to claim 19 wherein first supply voltage comprises an RF voltage signal modulated according to the waveform such that the potential well is formed by a pseudo-potential.

21. A method according to claim 19 wherein the first supply voltage comprises an AC voltage that varies in value over time according to the waveform, and does not comprise, or modulate, any underlying RF voltage signal.

22. A method according to claim 19 comprising supplying the first supply voltage waveform to each respective electrode of the axially segmented bunching electrodes such that it is phase-shifted relative to the voltage waveform concurrently supplied to adjacent electrodes.

23. A method according to claim 19 comprising supplying the first supply voltage to each of a plurality of successive axially segmented bunching electrodes at a different respective phases of the waveform concurrently during the finite duration of time ($T_L < T$) within said period (T) of the waveform.

24. A method according to claim 19 in which the waveform frequency ($f = 1/T$) is such that during the predetermined finite time interval, $T_L$, the value of the waveform is not greater than 10% of the maximum value of the waveform within the period, T, of the waveform, wherein $T_L \geq T/N$, and N is the number of successive axially segmented bunching electrodes forming a subset of axially segmented bunching electrodes which supports a full period, T, of the waveform.

25. A method according to claim 19 in which:

throughout the finite duration of time ($T_L$) the value of the waveform is controlled to change by no more than a predetermined maximum permissible change ($\Delta U$) expressed as a percentage (%) of the amplitude ($U_0$) of the waveform such that: $100 \times \Delta U/U_0 \leq 10$.

26. A method according to claim 25 comprising controlling the waveform to constrain the finite duration of time ($T_L$) is such that $\Delta U'/T'_L \leq 2.0$, wherein $T'_L = 100 \times T_L/T$ is the duration of $T_L$ expressed as a percentage (%) of the period T and $\Delta U' = 100 \times \Delta U/U_0$.

27. A method according to claim 19 comprising controlling the waveform such that the modulus of the first time derivative ($\partial U/\partial t$) of the waveform (U), having waveform amplitude $U_0$, is such that:

$$|(T/U_0)\partial U/\partial t| \leq 50$$

throughout said finite duration of time ($T_L$).

28. A method according to claim 19 comprising controlling the waveform such that the value of the modulus of the first time derivative of the first supply voltage waveform, of waveform amplitude $U_0$, is such that:

$$|(T/U_0)\partial U/\partial t| \leq 100$$

throughout said period (T) of the waveform.

29. A method according to claim 19 comprising providing the first supply voltage(s) via a first power supply unit(s), and separately providing the second supply voltage(s) via a separate second power supply unit(s).

30. A method according to claim 19 wherein the minimum of the potential well defines a well floor and value of the potential defining the well floor comprises only one local minimum which does not vary in value over time.

31. A method according to claim 19 comprising providing a memory unit within which is stored a plurality of separate and discrete values of the waveform corresponding to a respective plurality of separate and discrete points along its cycle.

32. A method according to claim 19 comprising controlling the pressure of a buffer gas within the channel such that the pressure at the exit of the channel is lower than 0.5 mbar.

33. A method according to claim 19 comprising controlling the pressure of a buffer gas within the channel such that the pressure of the buffer gas at one end of the channel is at least 20 times greater than the pressure at the other end of the channel.

34. A computer-readable medium having computer-executable instructions configured to cause: a mass spectrometry apparatus, or ion guide apparatus, or mass filter apparatus, or mass analyser apparatus, or time of flight mass analyser apparatus, or ion trap apparatus to perform the method according to claim 19.

* * * * *